US009387401B2

(12) United States Patent
Knutsson et al.

(10) Patent No.: US 9,387,401 B2
(45) Date of Patent: Jul. 12, 2016

(54) METHOD FOR IMPLEMENTING A COMPUTER GAME

(71) Applicant: King.com Limited, St. Julians (MT)

(72) Inventors: Sebastian Knutsson, Stockholm (SE);
Niklas Malmqvist, Stockholm (SE);
Jonas Magnusson, Stockholm (SE);
Tobias Nyblom, Stockholm (SE)

(73) Assignee: King.com Ltd., St. Julians, MT (US)

( * ) Notice: Subject to any disclaimer, the term of this patent is extended or adjusted under 35 U.S.C. 154(b) by 164 days.

(21) Appl. No.: 14/029,434

(22) Filed: Sep. 17, 2013

(65) Prior Publication Data

US 2014/0106876 A1    Apr. 17, 2014

Related U.S. Application Data

(60) Provisional application No. 61/701,907, filed on Sep. 17, 2012, provisional application No. 61/811,019, (Continued)

(30) Foreign Application Priority Data

| Feb. 6, 2013 | (GB) | 1302121.7 |
|---|---|---|
| Feb. 19, 2013 | (GB) | 1302910.3 |
| Mar. 12, 2013 | (GB) | 1304442.5 |
| Mar. 12, 2013 | (GB) | 1304444.1 |
| Mar. 13, 2013 | (GB) | 1304545.5 |
| Apr. 4, 2013 | (GB) | 1306117.1 |
| Apr. 4, 2013 | (GB) | 1306118.9 |
| Jun. 13, 2013 | (GB) | 1310589.5 |
| Jun. 13, 2013 | (GB) | 1310592.9 |
| Jun. 21, 2013 | (GB) | 1311119.0 |
| Aug. 7, 2013 | (GB) | 1314147.8 |
| Sep. 10, 2013 | (GB) | 1316045.2 |

(51) Int. Cl.
*G06F 17/00* (2006.01)
*A63F 13/40* (2014.01)

(Continued)

(52) U.S. Cl.
CPC ........... *A63F 13/10* (2013.01); *A63B 71/06* (2013.01); *A63F 13/00* (2013.01); *A63F 13/005* (2013.01); *A63F 13/12* (2013.01); *G06F 9/44* (2013.01); *G07F 17/32* (2013.01); *G07F 17/3274* (2013.01)

(58) Field of Classification Search
USPC .......................................... 463/16–25, 30–32
See application file for complete search history.

(56) References Cited

U.S. PATENT DOCUMENTS

| 5,488,496 A | 1/1996 | Pine |
| 6,068,552 A | 5/2000 | Walker et al. |

(Continued)

FOREIGN PATENT DOCUMENTS

| DE | 10304725 A1 | 9/2004 |
| EP | 1 564 698 A2 | 8/2005 |

(Continued)

OTHER PUBLICATIONS

International Search Report, dated Jan. 16, 2014, and Written Opinion, issued in corresponding International Application No. PCT/EP2013/069314.

(Continued)

*Primary Examiner* — Ronald Laneau
(74) *Attorney, Agent, or Firm* — Saul Ewing LLP

(57) ABSTRACT

A method, implemented as computer code being executed by one or more processors, in which computer game graphics for a casual, social game are shown on a display of a computing device and in which one or more of the processors are programmed to show: a virtual path or other virtual world that indicates the level reached by the player and some of that player's social network friends; a score board that displays the score of a player once he has completed a level successfully, together with the highest scores of some of its social network friends' for that level; and in which each level of the game can be failed and, if the processor determines that the player is running out of moves or time, then the processor causes the game to automatically display a message offering extra moves and/or time for the player to purchase, to carry on playing the game, or other in-game assistance.

57 Claims, 124 Drawing Sheets

Related U.S. Application Data filed on Apr. 11, 2013, provisional application No. 61/818,702, filed on May 2, 2013, provisional application No. 61/827,298, filed on May 24, 2013, provisional application No. 61/832,348, filed on Jun. 7, 2013, provisional application No. 61/832,355, filed on Jun. 7, 2013, provisional application No. 61/832,359, filed on Jun. 7, 2013, provisional application No. 61/832,362, filed on Jun. 7, 2013, provisional application No. 61/832,364, filed on Jun. 7, 2013, provisional application No. 61/832,369, filed on Jun. 7, 2013.

(51) Int. Cl.

| | | |
|---|---|---|
| *G07F 17/32* | (2006.01) | |
| *A63F 13/00* | (2014.01) | |
| *A63B 71/06* | (2006.01) | |
| *A63F 13/30* | (2014.01) | |
| *G06F 9/44* | (2006.01) | |

(56) References Cited

U.S. PATENT DOCUMENTS

| | | | |
|---|---|---|---|
| 6,117,013 A | 9/2000 | Eiba | |
| 7,073,792 B2 | 7/2006 | Esposito et al. | |
| 7,749,060 B1 | 7/2010 | Olmes et al. | |
| 8,002,633 B2 | 8/2011 | Shimizu et al. | |
| 8,088,010 B1 | 1/2012 | Hill et al. | |
| 8,237,743 B2 | 8/2012 | Csurka et al. | |
| 8,277,320 B1 | 10/2012 | Hart et al. | |
| 8,369,873 B2 | 2/2013 | Krasner et al. | |
| 8,526,490 B2 | 9/2013 | Buckley et al. | |
| 8,672,744 B1 | 3/2014 | Steere et al. | |
| 8,711,923 B2 | 4/2014 | Buckley et al. | |
| 8,727,893 B2 | 5/2014 | Otremba et al. | |
| 8,784,181 B2 | 7/2014 | Frank et al. | |
| 8,964,830 B2 * | 2/2015 | Perlman et al. | 375/240.01 |
| 9,033,803 B1 | 5/2015 | Etter et al. | |
| 2002/0068632 A1 | 6/2002 | Dunlap et al. | |
| 2002/0082068 A1 * | 6/2002 | Singhal | 463/9 |
| 2002/0094870 A1 | 7/2002 | Murray et al. | |
| 2003/0049592 A1 | 3/2003 | Park et al. | |
| 2003/0074416 A1 | 4/2003 | Bates et al. | |
| 2003/0119581 A1 | 6/2003 | Cannon et al. | |
| 2004/0053688 A1 | 3/2004 | Hosaka et al. | |
| 2004/0137987 A1 | 7/2004 | Nguyen et al. | |
| 2004/0224772 A1 | 11/2004 | Canessa et al. | |
| 2005/0256985 A1 | 11/2005 | Shea | |
| 2006/0068876 A1 | 3/2006 | Kane et al. | |
| 2006/0160620 A1 | 7/2006 | Matthews et al. | |
| 2006/0223635 A1 | 10/2006 | Rosenberg et al. | |
| 2006/0277474 A1 | 12/2006 | Robarts et al. | |
| 2006/0281541 A1 | 12/2006 | Nguyen et al. | |
| 2006/0287098 A1 | 12/2006 | Morrow et al. | |
| 2007/0077993 A1 | 4/2007 | Midgley et al. | |
| 2007/0259709 A1 | 11/2007 | Kelly et al. | |
| 2008/0005353 A1 | 1/2008 | Panabaker et al. | |
| 2009/0170608 A1 | 7/2009 | Herrmann et al. | |
| 2009/0203415 A1 | 8/2009 | Falciglia et al. | |
| 2009/0209311 A1 | 8/2009 | Bennett et al. | |
| 2010/0144426 A1 | 6/2010 | Winner | |
| 2010/0151934 A1 | 6/2010 | Kniberg et al. | |
| 2010/0218135 A1 | 8/2010 | Brugler et al. | |
| 2010/0227675 A1 | 9/2010 | Luxton et al. | |
| 2010/0271367 A1 | 10/2010 | Vaden et al. | |
| 2010/0317437 A1 | 12/2010 | Berry et al. | |
| 2011/0014977 A1 | 1/2011 | Yamazaki et al. | |
| 2011/0053681 A1 | 3/2011 | Goldman et al. | |
| 2011/0111835 A1 | 5/2011 | Cohen et al. | |
| 2011/0136561 A1 | 6/2011 | Acres et al. | |
| 2011/0136572 A1 | 6/2011 | Karn et al. | |
| 2011/0269532 A1 | 11/2011 | Shuster et al. | |
| 2012/0030094 A1 | 2/2012 | Khalil et al. | |
| 2012/0040752 A1 | 2/2012 | Koo et al. | |
| 2012/0077580 A1 | 3/2012 | Mahajan et al. | |
| 2012/0079126 A1 | 3/2012 | Evans et al. | |
| 2012/0122552 A1 | 5/2012 | Youm et al. | |
| 2012/0191606 A1 | 7/2012 | Milne | |
| 2012/0198417 A1 | 8/2012 | Haviv et al. | |
| 2013/0035164 A1 | 2/2013 | Osvald et al. | |
| 2013/0172061 A1 | 7/2013 | Iosilevsky et al. | |
| 2013/0267285 A1 | 10/2013 | Kelley et al. | |
| 2013/0316832 A1 | 11/2013 | Olofsson et al. | |
| 2013/0323697 A1 | 12/2013 | Shadduck et al. | |
| 2013/0331162 A1 | 12/2013 | Krivicich et al. | |
| 2014/0024450 A1 | 1/2014 | Ramachandran et al. | |
| 2014/0080600 A1 | 3/2014 | Knutsson et al. | |
| 2014/0235338 A1 | 8/2014 | Hansson et al. | |
| 2014/0252987 A1 | 9/2014 | Hinrichs et al. | |
| 2014/0342791 A1 | 11/2014 | Valeriano et al. | |
| 2014/0357367 A1 | 12/2014 | Lee | |
| 2014/0370950 A1 | 12/2014 | Jaksch et al. | |
| 2015/0050997 A1 | 2/2015 | Suzman et al. | |
| 2015/0174489 A1 * | 6/2015 | Evald et al. | 463/31 |

FOREIGN PATENT DOCUMENTS

| | | | |
|---|---|---|---|
| EP | 1870143 A1 | 12/2007 | |
| EP | 2 211 299 A2 | 7/2010 | |
| JP | 2005-228086 | 8/2005 | |
| WO | WO01/46790 A2 | 6/2001 | |
| WO | 2006/052212 A1 | 5/2006 | |
| WO | 2007/078533 A2 | 7/2007 | |
| WO | WO 2007/078533 | 7/2007 | |
| WO | 2008/109685 A2 | 9/2008 | |
| WO | 2009/029108 A1 | 3/2009 | |
| WO | 2010/002897 | 1/2010 | |
| WO | WO 2010/045716 A1 | 4/2010 | |
| WO | 2010/083346 A1 | 7/2010 | |
| WO | 2010/096784 A1 | 8/2010 | |
| WO | 2011/011466 | 1/2011 | |
| WO | WO 2011/041467 A2 | 4/2011 | |
| WO | WO 2012/013198 A1 | 2/2012 | |
| WO | WO 2013174933 | 11/2013 | |

OTHER PUBLICATIONS

Anonymous, "Amazon Survival YouTube video, Uploaded to YouTube on Mar. 13, 2009, video length 6:06", https://www.youtube.com/watch?v=8S2gM5POUUk, Mar. 13, 2009, 1.

Anonymous, "Bejeweled 2 Wikipedia Article", Sep. 30, 2015, 1-3.

Anonymous, "Bejeweled article", Wikipedia, Sep. 30, 2015.

Anonymous, "Best iOS/Android cross-platform mobiledevelopment SDKs", retrieved from the Internet: URL:http://webification.com/best-iosandroid-cross-platform-mobile-development-sdks [retrieved on Jul. 2, 2013] XP055069062, Sep. 26, 2011, p. 1.

Anonymous, "Bubble Witch Saga—GameSpot", Retrieved from the Internet: URL:http://www.gamespot.co/bubble-witch-saga/ [retrieved on Mar. 21, 2014] XP055109245, pp. 1-2.

Anonymous, "Buck Rodgers Turn Based Strategy Game Design and Planning Document", https://cs.nyu.edu/courses/spring07/V22.0474.001/groups/tbsgame/tbsgame_des.pdf, Feb. 21, 2007.

Anonymous, "Candy Crush Saga Facebook Game levels 1-10 video on YouTube, YouTube screen shorts figures 1-7", https://www.youtube.com/watch?v=8TleNDnJiN8, Apr. 15, 2012.

Anonymous, "Candy Crush Saga for Facebook, YouTube video demonstrating levels 1-10, video length 15:23", https://www.youtube.com/watch?v=cfqHVkWX5yE, Apr. 12, 2012, 1 page.

Anonymous, "Candy Crush Saga on Facebook Review on YouTube video, Screen shots of YouTube video, figures 1-13", https://www.youtube.com/watch?v=AbH8Givg6XM, Sep. 7, 2012.

Anonymous, "Cross-platform", retrieved from the Internet: URL:http://en.widipedia.org/w/index.php?title=Cross-platform &oldid=487867404 [retrieved on Jul. 1, 2013] XP055068984, Apr. 17, 2012, pp. 1-16.

Anonymous, "Daily Bonus Level Oct. 17, 2012: Bubble Witch Saga Fan Site", retrieved from the Internet:URL:http://bubble-witch-saga.se/daily-bonus-level-17-oct-2012/ [retrieved on Mar. 21, 2014] XP055109244, Oct. 17, 2012, pp. 1-2.

Anonymous, "Dig Dug article", Wikipedia, Sep. 30, 2015.

(56) References Cited

OTHER PUBLICATIONS

Anonymous, "Facebook Platform—Wikipedia, the free encyclopedia", Retrieved from the Internet: URL:http://en.wikipedia.org/w/index/php?title=Facebook_Platofrm&oldid=533105338 [retrieved on Mar. 21, 2014] XP055109249, pp. 1-2.

Anonymous, "Facebook Spiel Candy Crush Saga: Cheats, Tipps, News and Videos BILDspielt", URL: http://www.bildspielt.de/social-games/3-gewinnt/candy-crush-saga-180643/ [retrieved on Oct. 25, 2013] XP055085339, Apr. 12, 2012, pp. 1-10.

Anonymous, "Game Architecture: Model-View-Controller", retrieved from the Internet: URL:http://www.koonsolo.com/news/model-view-controller-for-games/ [retrieved on Oct. 8, 2013] XP055083073, Jul. 13, 2009, pp. 1-2.

Anonymous, "Guide to Bubble Witch Saga—Facebook Hints & Tips—How to level guide", retrieved from the Internet: URL:http://reindeerz.hubpags.com/hub/Bubblewitch [retrieved on Dec. 9, 2012] XP055092347, Apr. 10, 2012, pp. 1-2.

Anonymous, "iPhone Game 'Trism' break $250,000. Review.—[Updated] razorianflyofficial", retrieved from the Internet: URL: https://razorianflyofficial.wordpress.com/2008/09/25/iphone-game-trism-breaks-25000-review/, [retrieved on Apr. 15, 2015] XP055183153, Sep. 26, 2008.

Anonymous, "King.com expands to Google+ with Bubble Witch Saga", Retrieved from the Internet: URL:http://www.insidesocialgames.com/2012/01/24/king-com-expands-to-google-with-bubble-witch-saga/ [retrieved on Mar. 21, 2014] XP055109246, Jan. 24, 2012, pp. 1-2.

Anonymous, "King.com Skill Games for iPhone and Facebook: http://www.ubergizmo.com/2009/07/king-com-skill-games-for-iphone-and-facebook/", retrieved from the Internet: URL:http://www.google.de/imgres?client=firefox-a&hs=0gJ&sa=X&rls=org.mozilla:en-GB:official&biw=1680&bih=858&tbm=isch&tbnid=Dp0hnHVKMxtoUM: &imgrefurl=http://www.ubergizmo.com/2009/07/king-com-skill-games-for-iphone-and-faceboo, Jul. 13, 2009, pp. 1-2.

Anonymous, "Minecraft", retrieved from the Internet: URL:http://en.widipedia.org/w/index?title=Minecraft&oldid=409326251 [retrieved on Jul. 1, 2013] XP055068987, May 2, 2014.

Anonymous, "Model-view-controller", retrieved from the Internet: URL:http://en.widipedia.org/w/index/php?title=Model%E2%80%93view%E2%80%93controller&oldid=511810952 retrieved on Oct. 8, 2013] XP055083072, Sep. 11, 2012, pp. 1-2.

Anonymous, "OpenOffice, Creating Charts and Graphs", Dec. 2004, 1-17.

Anonymous, "Pygame", retrieved from the Internet: URL:http://web.archive/org/web/20120413123244/http://www.pygame.org/wiki/tut_design [retrieved on Oct. 8, 2013 XP055083074, Apr. 13, 2012, pp. 1-5.

Anonymous, "Search for Play Free Online Games on GamesGames.com Home Action Strategy Bomberman War Games Shoot & Throw Worms Fly & Shoot Run & Shoot Tower Defence Flying Wreck the City Adventure Collect & Run Puzzle & Run Role Playing Games Escaping Jump & Shoot Point", retrieved from the Internet: URL:http://web.archive.org/web/20120621061714/http://www.gamesgames.com/games/social-games/social-games.html [retrieved on Oct. 15, 2013] XP055084089, Jun. 21, 2012, pp. 4-6.

Anonymous, "Why King.com's Candy Crush is crushing it on Facebook", retrieved from the Internet: URL: http://blog.games.com/2012/05/01/why-king-coms-candy-crush-is-crushing-it-on-facebook/ [retrieved on Oct. 25, 2013] XP055085338, May 1, 2012, pp. 1-4.

Collins, "Will Collins Game Spotlight: Candy Crush Saga", retrieved from the Internet: URL:https//developers.facebook.com/blog/post/2012/06/15/game-spotlight--candy-crush-saga/ [retrieved on Oct. 25, 2013] XP055085345, Jun. 15, 2012, pp. 1-2.

Demeter, "Trism: Upcoming iPhone Game by Demiforce", retrieved from the Internet: URL: https://www.youtube.com/watch?v=hy0ptZisr70, [retrieved on Apr. 16, 2015] XP054975820, Feb. 26, 2008.

Dotson, "Bubble Witch Saga Pops Bubbles o iOS and Facebook >148Apps> iPhone, iPad, and iPod touch App Reviews and News", retrieved from the Internet: URL:http://www.148apps.com/news/bubble-witch-saga-pops-bubbles-ios-facebook/ [retrieved on Dec. 9, 2013] XP055092342, Jul. 27, 2012, pp. 1-2.

Duffy, "Home Product Guies Software Internet 7 Great Google+ Games You Might Also Like", retrieved from the Internet: URL:http://www.pcmag.com/article2/0,2817,2391136,00.asp [retrieved on Oct. 15, 2013] XP055084091, Aug. 16, 2011, p. 1.

Josef, "Bloxley Tutorial #1—Sokoban", http://bloxley.net/2010/10/tutorial-1-sokoban, Oct. 13, 2010.

Murphy, "Bejeweled 2 Strategy Guide", www.bigfishgames.com, Aug. 15, 2010.

Namco, "Dig Dug Video Game (copy unavailable)", 1982.

Popcap, "Bejeweled Video Game (copy unavailable)", 2001.

Rua, "Candy Crush Saga Gameplay First Look (Episode 1-10 levels)", retrieved from the Internet: URL: https://www.youtube.com/watch?v=8TleNDnJiN8 [retrieved on Apr. 16, 2015] XP054975821, Apr. 15, 2012.

Schoenau-Fog, "The Player Engagement Process—An Exploration of Continuation Desire in Digital Games", http://www.digra.org/wp--content/uploads/digital-library/11307.06025.pdf, 2011.

Squires, "Bubble Witch Saga is going mobile—Gamezebo", retrieved from the Internet: URL:http://www.gamezebo.com/news/2012/06/27/bubble-witch-saga-going-mobile [retrieved on Dec. 9, 2013] XP055092339, Jun. 27, 2012, pp. 1-2.

* cited by examiner

Explosive shots

Ghost shots

Bomb dropper shot

Treasure wall

Level end

Black balls

METHOD FOR IMPLEMENTING A COMPUTER GAME

CROSS-REFERENCE TO RELATED APPLICATIONS

This application is based on, and claims priority to U.S. Provisional Application No. 61/701,907, filed Sep. 17, 2012; UK Application No. 1302121.7, filed Feb. 6, 2013; UK Application No. 1302910.3, filed Feb. 19, 2013; UK Application No. 1304442.5, filed Mar. 12, 2013; UK Application No. 1304444.1, filed Mar. 12, 2013; UK Application No. 1304545.5, filed Mar. 13, 2013; UK Application No. 1306117.1, filed Apr. 4, 2013; UK Application No. 1306118.9, filed Apr. 4, 2013; U.S. Provisional Application No. 61/811,019, filed Apr. 11, 2013; U.S. Provisional Application No. 61/818,702, filed May 2, 2013; U.S. Provisional Application No. 61/827,298, filed May 24, 2013; U.S. Provisional Application No. 61/832,348, filed Jun. 7, 2013; U.S. Provisional Application No. 61/832,355, filed Jun. 7, 2013; U.S. Provisional Application No. 61/832,359, filed Jun. 7, 2013; U.S. Provisional Application No. 61/832,362, filed Jun. 7, 2013; U.S. Provisional Application No. 61/832,364, filed Jun. 7, 2013; U.S. Provisional Application No. 61/832,369, filed Jun. 7, 2013; UK Application No. 1310589.5, filed Jun. 13, 2013; UK Application No. 1310592.9, filed Jun. 13, 2013; UK Application No. 1311119.0, filed Jun. 21, 2013; UK Application No. 1314147.8, filed Aug. 7, 2013; and UK Application No. 1316045.2, filed Sep. 10, 2013, the entire contents of each of which being fully incorporated herein by reference.

BACKGROUND OF THE INVENTION

1. Field of the Invention

The invention relates to casual social games.

2. Technical Background

There are multiple technical challenges facing the designer of computer implemented games. These challenges can be broadly categorised into the following areas: 'engagement'; 'viralisation' and 'monetisation'.

We will look first at 'engagement', which involves designing game play to be engaging and rewarding to players. This typically requires games to be easily understood at their simplest or introductory levels, providing rewarding game play with even quite simple game mechanics, but becoming progressively more challenging so that players are not bored, but remain engaged and develop rewarding skills. Effective engagement requires various forms of feedback to reinforce players' sense of success and accomplishment. Effective engagement can be greatly magnified if the game has as social aspect—for example, it is linked into a social network so that game players can interact with their friends in the social network. The game can then transform into something that goes far beyond a simple solo game experience, into a shared journey.

'Viralisation' requires a game to be include various techniques that encourage players to share the game with others, encouraging them to play the game. It is a key technique in enabling mass-scale distribution or penetration of games. Viralisation can be especially effective when the game is integrated into a social network environment in some manner, so that the game can then propagate through the network of player's friends, and their friends and so on.

'Monetisation' covers those techniques that enable revenue to be generated from a game; this involves many challenges, because the monetisation techniques need to be acceptable to players and in no way undermine engagement.

A successful and original game will requires a team of game designers to solve complex problems of engagement, viralisation and monetisation; this can take many months of skilled work and, not infrequently, a great deal of trial-and-error testing of new ideas, functions and game mechanics before a game successfully combines all these elements into a new experience.

The techniques described in this patent specification can be deployed in many different game play architectures. For example, a computer game can be implemented as a computer program that is stored and runs entirely locally on the processor of a PC, games console, tablet or mobile telephone or other computing device. The game could be implemented solely as a computer program that is stored and runs entirely on one of many processors in a remote server, and data streams are supplied to the client device (e.g. tablet, smartphone etc) to enable the client to render and display graphics and sounds; this 'web services' approach is increasingly common. Another approach is a hybrid, in which back-end servers handle some elements of the game play, but a Java game applet is provided to client devices and it is the locally running Java applet that generates the graphics/sounds/user interaction for game play on the player's client device. Some data may be fed back to the back-end servers to enable scoring, interaction with other players and cross-platform synchronisation. Generally, the techniques described in this specification are not specific to any one game architecture but can be deployed on any suitable game architecture.

This patent specification describes not only various ideas and functions, but also their creative expression. A portion of the disclosure of this patent document therefore contains material to which a claim for copyright is made and notice is hereby given: Copyright King.com Limited 2011 and 2012 (pursuant to 17 U.S.C. 401). A claim to copyright protection is made to all screen shots, icons, look and feel and all other protectable expression associated with the game Bubble Witch Saga, illustrated and described in this patent specification.

The copyright owner has no objection to the facsimile reproduction by anyone of the patent document or the patent disclosure, as it appears in the Patent and Trademark Office patent file or records, but reserves all other copyright rights whatsoever. No express or implied license under any copyright whatsoever is therefore granted.

DISCUSSION OF RELATED ART

Casual social games have been implemented before and are known. However previous inventions have not successfully devised effective solutions to one or more of engagement, viralisation and monetisation in the same way as the present invention does.

SUMMARY OF THE INVENTION

A first aspect is:

A method, implemented as computer code being executed by one or more processors, in which computer game graphics for a casual, social game are shown on a display of a computing device and in which one or more of the processors are programmed to show:

a virtual path or other virtual world that indicates the level reached by the player and some of that player's social network friends;

a score board that displays the score of a player once he has completed a level successfully, together with the highest scores of some of its social network friends' for that level;

and in which each level of the game can be failed and, if the processor determines that the player is running out of moves or time, then the processor causes the game to automatically display a message offering extra moves and/or time for the player to purchase, to carry on playing the game, or other in-game assistance.

Any one or more of the following optional features may be included, resulting in a method:

in which the message is generated and displayed when the player has 5 moves left in which, if the player selects an option to purchase extra moves and/or time, that sends a signal that (a) is interpreted by a remote server as an instruction to debit an account of the player with a sum of money and (b) is interpreted (optionally by a remote server) as an instruction to provide the player with the extra moves to enable the player to carry on playing the game.

in which the processor causes a gameboard to be shown with multiple game elements that are removed when matched or switched by a player, such as in a match-3, clicker or switcher game in which the game elements are one or more of: candies, bubbles, flowers, animals, fruits, vegetables, toys.

in which the processor shows a current game level position and highest scores for each completed level, for both the player and also some of its friends on a social network application or environment.

in which a player can see, for example in real-time, which of their friends on the social network are currently playing the game and the level at which they are playing in which a player can collaborate with friends in the social network, such as by sending lives, in-game currency, boosters, charms, other in-game elements, messages.

in which in-app purchases are bought for real or virtual currency by touching an icon of the purchase shown next to the gameplay board, and then touching a 'buy' button that is subsequently displayed.

in which functions and features relating to sharing players' game state information, including levels and achievements, on a virtual path or other virtual world with that player's social network friends is continuously or regularly optimized for engagement and monetization by continuously or regularly monitoring and analyzing player behavior and interaction, such as monetisation.

in which a single user database, which may be distributed or centralised, tracks all metrics for all players, including all game state information, irrespective of the platform used by each of those players, and that single user database is accessible by several different games, such as a match 3 switcher and a match 3 clicker, a bubble shooter etc.

in which every change in the game state, such as every move of a game piece by the user, and every consequential change in every game piece on the game board, is accompanied by sound and/or visual feedback to provide immediate, positive gratification to the player.

in which a player's score and game level position and also the scores and game level positions of all their social network friends also playing the game, is fully sync'd across different platforms, such as iOS, desktop and Android, and there are sections of the game that must be unlocked through either help from those friends or through a purchase.

in which friends can send gifts, boosters, extra moves, in-game currency, or extra lives to one another.

in which players can see their own and social network friends' game level position on a virtual path or other virtual world and where a visual prompt is displayed by the game if a friend's high score has been beaten by that player, the prompt enabling the player to send a message to that friend.

in which players can see their own and also their social network friends' game level position on a virtual path or other virtual world and where the player can play the game in offline mode on one platform/device and the progress in the game and other game state information is synchronised with a remote server when the device is online again and the player can continue playing the game on another platform.

in which players can see their own and their social network friends' game level position on a virtual path or other virtual world and the game enables the player to buy a permanent booster which can be used without limit in time.

in which players can see their own and their social network friends' game level position on a virtual path or other virtual world, in which successive levels have different difficulty rankings to introduce variety even without a new game mechanic being introduced—e.g. after a difficult level, there is an easier level.

where some or all of those friends are sent a message prompting the friend(s) to assist the player once that player has played, but not completed, a level, for more than a predefined time or predefined number of attempts.

in which players can see their own and their social network friends' level position on a virtual path or other virtual world and where the player is prompted to notify a social network friend when the friend's high score on a specific level has been beaten by that player.

in which players can see their own and their social network friends' game level position on a virtual path or other virtual world, in which the game state information is fully sync'd across different platforms, such as iOS, web-based social network application or environment, and Android, and, in which the gameplay for each level can be enhanced through the use of an acquired item, such as a booster.

in which players can see their own and their social network friends' game level position on a virtual path (or other virtual world), in which the game state information is fully sync'd across different platforms, such as iOS, web-based social network application or environment, and Android, and, in which the gameplay for each level can be enhanced through the use of an acquired item, such as a booster, and where the game state information relating to the acquisition or use of an acquired item is synchronized across several different platforms.

in which players can see their own and their social network friends' game level position on a virtual path or other virtual world and, in which the game board contains switchable elements that can be matched with other switchable elements and switchable elements that cannot be matched with other switchable elements on the game board, where one of the goals for completing a level is to interact with the game board in such a way that a predefined number of non-matchable switchable elements are placed in any of a plurality of predefined areas on the game board, such as being brought down from the top of the gameboard to the bottom.

in which the player has to satisfy multiple criteria within a limited number of moves to complete the level; in which the criteria include at least two of the following:
  reaching a target score
  removing matchable game elements to clear a path for a non-matchable game element to reach a predefined area on the game board
  clear a predefined number of a certain type of game items layered on the game board having a matchable game element, together with each of the layered game items, where each layered game item can be removed by removing a matcheable game element in the same position as the layered game item.
in which a player can purchase on-line a booster to aid gameplay and that booster, once available for use on the player's current platform, can be used immediately and alternatively on any other platform used by the player, and in which game state information for that player, including information relating to use of the booster, is synchronised using a remote server across each of several different devices used by that player.
in which players can see their own and their social network friends' game level position on a virtual path (or other virtual world) with nodes representing levels in the game, and each node can reveal, in response to user input, a graphical preview representation of the gameboard for that level and, if the player has played that level before, a visual indication of how well the player succeeded on that level.
in which, after a player has failed to meet the level completion criteria, a message is shown articulating why the level completion criteria was not met, and offering as the only visually significant option to replay the level.
in which, after a player has achieved the level completion criteria, a message is shown articulating that the level was successfully completed, and offering as the only visually significant option to share information to a social network.
in which some or all game levels are untimed, eliminating any time pressure
in which the game is a casual, social game and some or all levels have a true fail, to enable monetization through purchasing extra moves;
in which there is a continuous musical soundtrack plays during gameplay
in which the game generates and displays congratulatory messages when the player scores more than a predefined amount, or matches more than a predefined number of game elements, in a single move
in which there is an algorithm for automatically detecting when there are no possible moves left
in which there is an algorithm for re-shuffling the elements on the game board.
in which a processor generates, if no move has been made for a while, help or hints by brightening and enlarging game elements used in a possible move on the board with a flashing animation, such as an animation that occurs once, or repeats twice or thrice
in which a processor is programmed to require a player to reach a target score before running out of moves in order to complete a level successfully, but completing the level is not timed
in which a processor is programmed to automatically replenish a life for a player in 30 minutes
in which a processor is programmed so that, if a player finishes a level in under the target number of moves, then random game elements on the game board are triggered and give the player bonus points
in which a processor is programmed so that, if a level is finished with moves left, those moves are converted to special game elements that trigger for extra bonus points
in which a processor is programmed so that the game generates and displays congratulatory messages when the player scores more than a predefined amount, or matches more than a predefined number of game elements, in a single move
in which a processor is programmed so that the player can ask his friends for lives
in which a processor is programmed so that the player can ask his friends for other help
in which social network friends are prompted to assist another player if that other player has played, but not completed, a level meeting a certain criteria
in which a processor is programmed so that the player can send gifts to friends
in which a processor is programmed so that the game can be synchronized between different devices
in which a processor is programmed so that a player can seamlessly stop and re-start playing the game at any time since game state information is stored, e.g. remotely and/or on the playing device
in which every change in the game state, such as every move of a game piece by the user, and every consequential change in every game piece on the game board, is accompanied by sound and visual feedback to provide immediate, positive gratification to the player
in which game state information is preserved, enabling a remote server system to identify a player and all aspects of the state of the game they are playing, so that the player can end game play on one device and resume from a different device at a later time at exactly the same state
in which the different device can be a different type of device, so that the player can move seamlessly between playing the game on a smartphone and on a tablet
in which a remote server system can identify a player because that player has accessed the game through a social network
in which the game is a casual, social game, namely a game that can be downloaded as an app to a smartphone and/or tablet computer and which can be accessed or played using a social network application or environment
in which the processor is programmed to show a virtual path or other virtual world that indicates the level reached by the player and that player's social network friends
in which the design of the game is optimised through a process including the step of: using data analytics to understand the impact of changes to the game design in terms of player engagement and/or monetisation and/or viralisation and; implementing changes to the game design, including frequent changes such as daily or weekly changes, to optimise player engagement and/or monetisation and/or viralisation.

A second aspect is:
A computing device adapted to play a computer game, the device including a processor, a memory, a display, a touch screen or a cursor based input device, and computer code stored in device memory or on a remote server and executable by the device processor or a remote processor, and in which the computer code generates computer game graphics for the display on the device; and in which one or more processors are programmed to show:

a virtual path or other virtual world that indicates the level reached by the player and some of that player's social network friends;

a score board that displays the score of a player once he has completed a level successfully, together with the highest scores of some of its social network friends' for that level;

and in which each level of the game can be failed and, if the processor determines that the player is running out of moves and/or time, then the processor causes the game to automatically display a message offering extra moves and/or time for the player to purchase, to carry on playing the game, or other in-game assistance.

A third aspect is:

A non-transitory computer readable medium encoded with instructions for controlling a computer system to display a game on a display; and in which the instructions running on the processor(s) result in the display of:

a virtual path or other virtual world that indicates the level reached by the player and some of that player's social network friends;

a score board that displays the score of a player once he has completed a level successfully, together with the highest scores of some of its social network friends' for that level;

and in which each level of the game can be failed and, if the processor determines that the player is running out of moves and/or time, then the processor causes the game to automatically display a message offering extra moves and/or time for the player to purchase, to carry on playing the game, or other in-game assistance.

Various additional aspects can each be combined with any of the above.

A fourth aspect is:

A method, implemented as computer code being executed by one or more processors, in which computer game graphics for a casual, social game are shown on a display of a computing device and in which one or more of the processors are programmed such that:

a player can see its own and also its social network friends' game level position on a virtual path, or other virtual world, shown on the player's computing device display;

the computing device displays icons representing functions that assist or enhance gameplay, such as a booster or charm, and if the player selects an icon, that sends a signal that (a) is interpreted by a remote server as an instruction to debit an account of the player with a sum of money and (b) is interpreted (optionally by a remote server) as an instruction to provide the player, with the function that assists or enhances game play and to enable the player to use that function whilst playing the game;

the computing device also permits a user to select and to try a function that assists or enhances gameplay before buying that function or without having to buy that function.

A fifth aspect is:

A method, implemented as computer code being executed by one or more processors, in which computer game graphics for a casual, social game are shown on a display of a computing device and in which one or more of the processors are programmed such that:

when the user has completed a predefined level, the processor causes a message to be displayed to a player giving that player the option, in order to progress to a higher level, to send a 'request for help' message to one or more friends of the user, those friends being listed as friends of the player in a database running on a remote server hosting a social network application or environment;

and the processor tracks if one or more of those friends sends a reply message via the remote server agreeing to provide help.

Any one or more of the following optional features may be included in this fifth aspect:

In which the request for help message is sent using an instant messaging service, such as instant messaging over the social network application or environment In which the request for help message is sent using an asynchronous or non-instant messaging application or service such as SMS in which, when the user has completed a predefined level, the processor causes a message to be displayed to a player giving that player the option, in order to progress to a higher level, to select a function or option displayed on the computing device that sets the player an automatically generated task or quest.

A sixth aspect is:

A method, implemented as computer code being executed by one or more processors, in which a computing device displays computer game graphics showing game elements;

and in which the processor determines if a player has met the target needed to pass a level and, when that occurs, the processor automatically generates and displays a number of point scoring events by automatically using game elements in a way a player would use them to score points;

and the processor then automatically allocates additional bonus points or items to the player.

Any one or more of the following optional features may be included, in this sixth aspect:

point scoring events continue rapidly until no further points can be scored point scoring events continue until no further game elements are available for automatic point scoring gameplay new game elements, not previously shown on the gameboard prior to the user meeting the target, are automatically generated by the processor and activated in a way that a player would activate them to score points.

game elements are elements that can be moved by a player in gameplay and that are removed when matched or switched by a player, such as in a match-3, clicker or switcher game, or are collected in a container, as in a shooter game;

game elements are shot out from a shooter game elements are initially statically positioned on a gameboard game elements are candies, bubbles, animals, vegetables computing device to display (a) a number of virtual bubbles in a virtual scene arranged below a virtual ceiling and (b) a virtual shooter that the user can control to shoot down the virtual bubbles and where, if there are fewer than X virtual balloons remaining immediately adjacent to the virtual ceiling, then all of those remaining virtual balloons fall from the ceiling.

A seventh aspect is:

A method, implemented as computer code being executed by one or more processors, in which a computing device displays computer game graphics for a casual, social game showing a shooter which a player can control to shoot out moving elements, such as balls, and which impact obstruction objects, such as pins, following a trajectory to the obstruction object determined by the processor;

and in which a processor enables a player to see its own and also its social network friends' game level position on a virtual path, or other virtual world, shown on the player's computing device display; and and in which the processor tracks the number of times that moving objects hit the obstruction objects and increments a score counter based on this number and causes a player's score to be shown on a display of the computing device.

Any one or more of the following optional features may be included in this seventh aspect:

in which the moving elements are one or more of: balls, balloons, candies, fruits, animals, vegetables in which the moving elements disappear on contact with an obstruction element in which the moving elements bounce off an obstruction element and follow a trajectory determined by the processor into scoring containers, with the processor attributing a score to the player each time a moving element falls into a container in which a different score is attributed to some of the scoring containers in which the obstruction elements are of different types or colours, each associated with different bonus scores.

in which the one type of obstruction element, if hit by a moving element, splits that moving element into two moving elements.

in which the obstruction elements are removed by the processor from the screen if the user does not achieve a desired result with a shot.

in which the additional obstruction elements are drawn on the screen by the processor if the user achieves a desired result with a shot.

in which the type of additional obstruction element depends on the gameplay of the user, such as the more consecutive shots with moving elements popped leads to an obstruction element with higher bonus scoring potential in which the obstruction elements are spaced apart a sufficient distance so that moving elements can pass freely between them.

in which the processor alters the position of the obstruction elements during gameplay

BRIEF DESCRIPTION OF THE DRAWINGS

FIG. 123 shows notification settings turned on.

DETAILED DESCRIPTION

Figure 4:
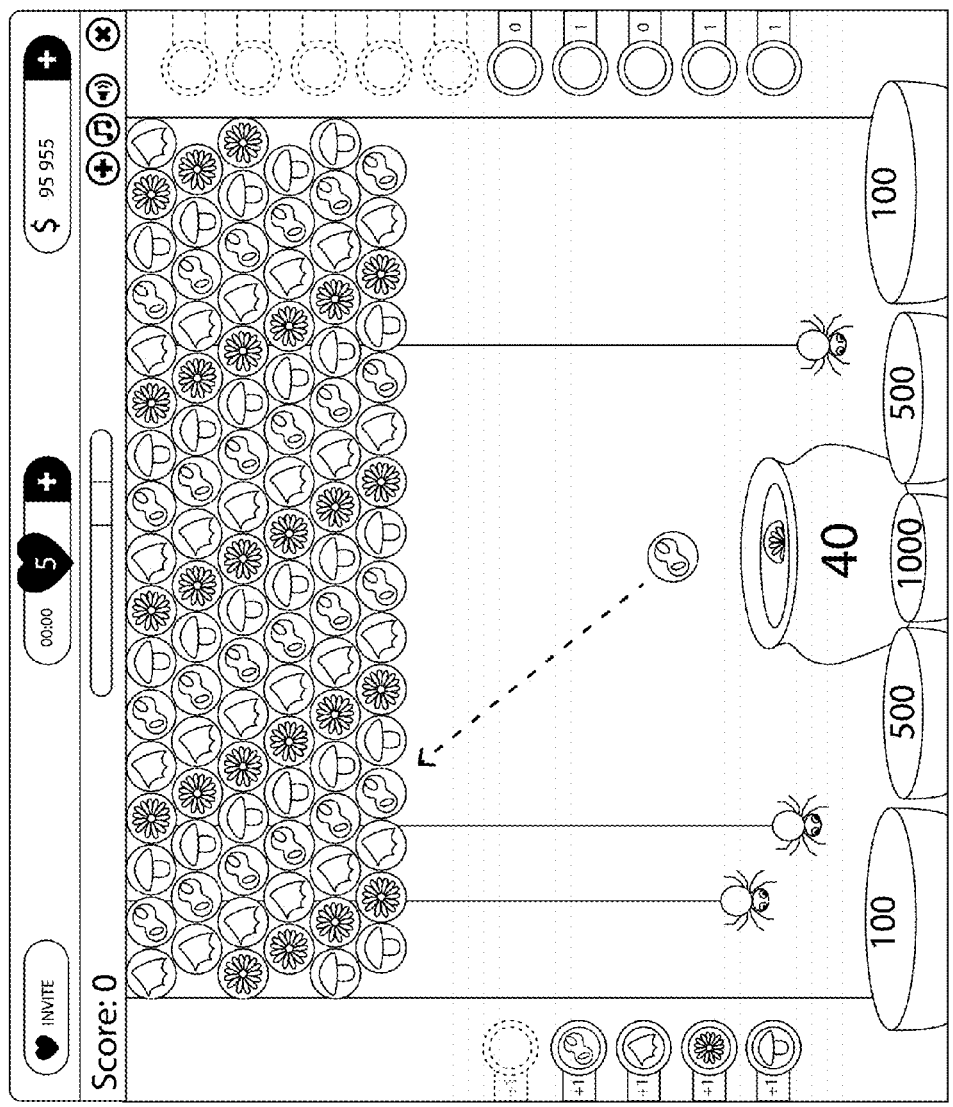
FIG. 4 shows an exemplary game board layout.

The games described in this document is to a great extend embodied in King.com's Bubble Witch Saga game but it is understood that the inventions described can be implemented in many different ways and it is not intended to be limited to only one game. An exemplary game board where some of the ideas described herein can be implemented is shown in FIG. 4.

The terms user and player are used interchangeably throughout this document and no specific meaning is intended using one or the other term.

The terms user and player are used interchangeably throughout this document and no specific meaning is intended using one or the other unless the context suggests otherwise.

In the following description of various implementations of the invention, reference is made to the accompanying drawings which form a part thereof, and in which is shown by way of illustration various implementations in which the invention may be utilized. It is to be understood that other implementations may be utilized, and structural and functional modifications may be made without departing from the scope of the present invention.

Figure 1:
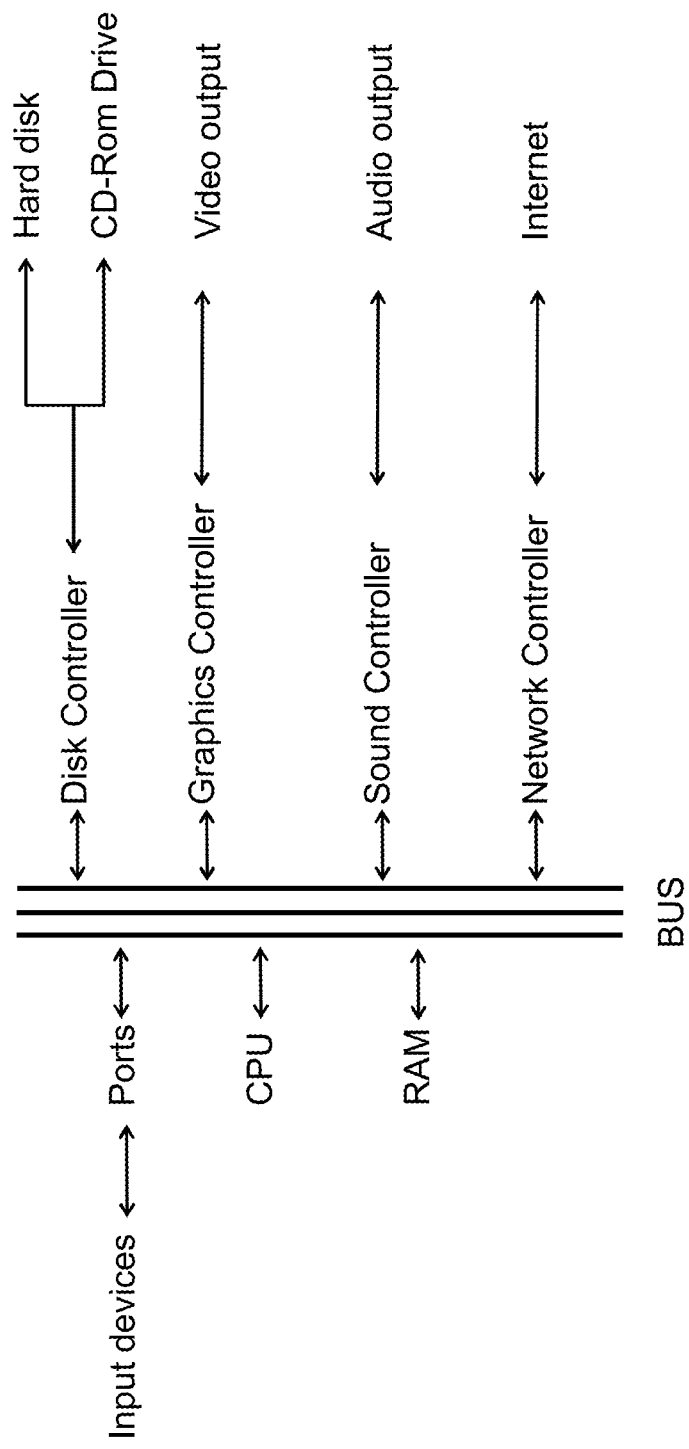
FIG. 1 shows a schematic illustration of a computing device.

FIG. 1 shows a schematic picture of a computing device, containing a Central Processing Unit and Random Access Memory. The CPU acts according to input given from input devices, such as a keyboard, mouse or touchscreen. Computer BUSes are used to communicate, both between input devices and the CPU, but also between different controllers within the computer device, such as the graphics controller and the network controller. These controllers in turn communicate with external devices, such as a monitor for video output with which the graphics controller communicates, and the network controller communicates with for instance the internet, through wireless or wired connections. A user can interact with the computing device through input devices, such as a pointing device (e.g. a mouse) and a keyboard.

Figure 2:
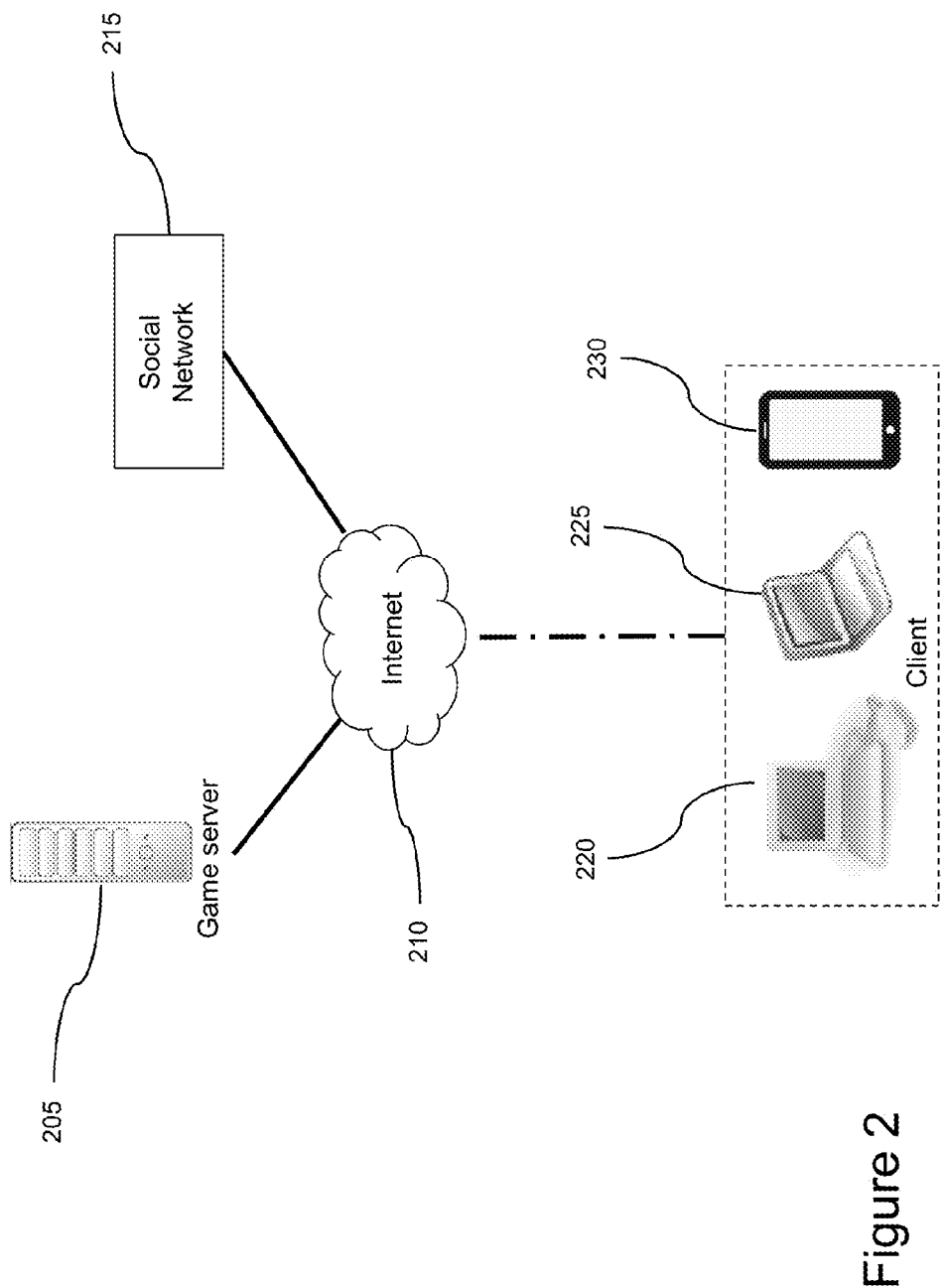
FIG. 2 shows an exemplary environment.

FIG. 2 portrays an exemplary overall environment in which the present invention can be utilized. A virtual game is stored on for instance a game server 210. The virtual game is to be played on a client device, such as a computer 240, 250 or a smartphone or other handheld device 260. The client device can also be a kiosk, arcade gaming station, smart TV or other device with computing capabilities, input devices and a screen that can present the game to a user. The client device communicates with a game server 210 and a social network server 230, for instance through the Internet 220 or other network. It should be understood that the social network 230 and the game server 210 does not have to be located in different places, they could be on the same server or on a plurality of servers located in different locations. People skilled in the art will understand that other devices than the exemplary ones listed can be also be used without departing from the spirit and scope of the invention.

Different Implementations

The techniques described in this patent can be deployed in many different gameplay architectures. For example, a computer game can be implemented as a computer program that is stored and runs entirely locally on the processor of a PC, games console, tablet or mobile telephone or other computing device. The game can be implemented solely as a computer program that is stored and runs entirely on one of many processors in a remote server, and data streams or updates are supplied to the client device (e.g. tablet, smartphone etc.) to enable the client to render and display graphics and sounds; this 'web services' approach is increasingly common.

Another approach is a hybrid one, in which back-end servers handle some elements of the gameplay, and for instance a Java game applet is provided to client devices and it is the locally running Java applet that generates the graphics/sounds/user interaction for gameplay on the player's client device. Some data may be fed back to the back-end servers to enable scoring, interaction with other players and cross-platform synchronisation. Generally, the techniques described in this specification are not specific to any one game architecture but can be deployed on any suitable game architecture.

The game can be implemented allowing a user to interact with it in different ways depending on the capabilities of the device which the user is accessing the game with. A user can interact with the game through using a touch screen where the user can select and/or move elements on the game board with a finger or for instance with a stylus. The game can also be played with a pointing device such as a mouse or other interaction devices such as a keyboard.

Mobile devices may have a touch screen interface where the player can interact with the game using a finger or a pointing device such as a stylus. Some mobile devices have hard keys that complement the touch screen interface. Such hard keys may be in the form of a button or in the form of a joystick type of interaction.

Over the course of players playing the game, data will be produced. This data can for instance be related to a player's game performance or to game information related to a social network to which the game is connected. It is possible to gather this data, store it and make use of it for instance to improve the game. One example is by using a database to store the amount of times players try and fail a level on average. This data can then be reviewed, and if the players seem to fail a substantial amount of times before completing a level, the difficulty can be adjusted accordingly. The difficulty can be adjusted through changing a score target for the level, increasing the available time or moves or giving the player for instance a booster to enhance the gameplay.

There can be certain performance indicators used to measure the success of the game. These indicators can for instance relate to player retention, the virality of the game and the revenue of the game.

A person skilled in the art will realise that the different approaches to implementing the game is not exhaustive, what is described herein are certain preferred embodiments. It is possible to implement the way in a number of variations without departing from the spirit or scope of the invention.

Game Overview

We will now describe an exemplary embodiment with reference to some of the figures. Although this is an exemplary embodiment it is understood that also other implementations are possible.

Figure 3:
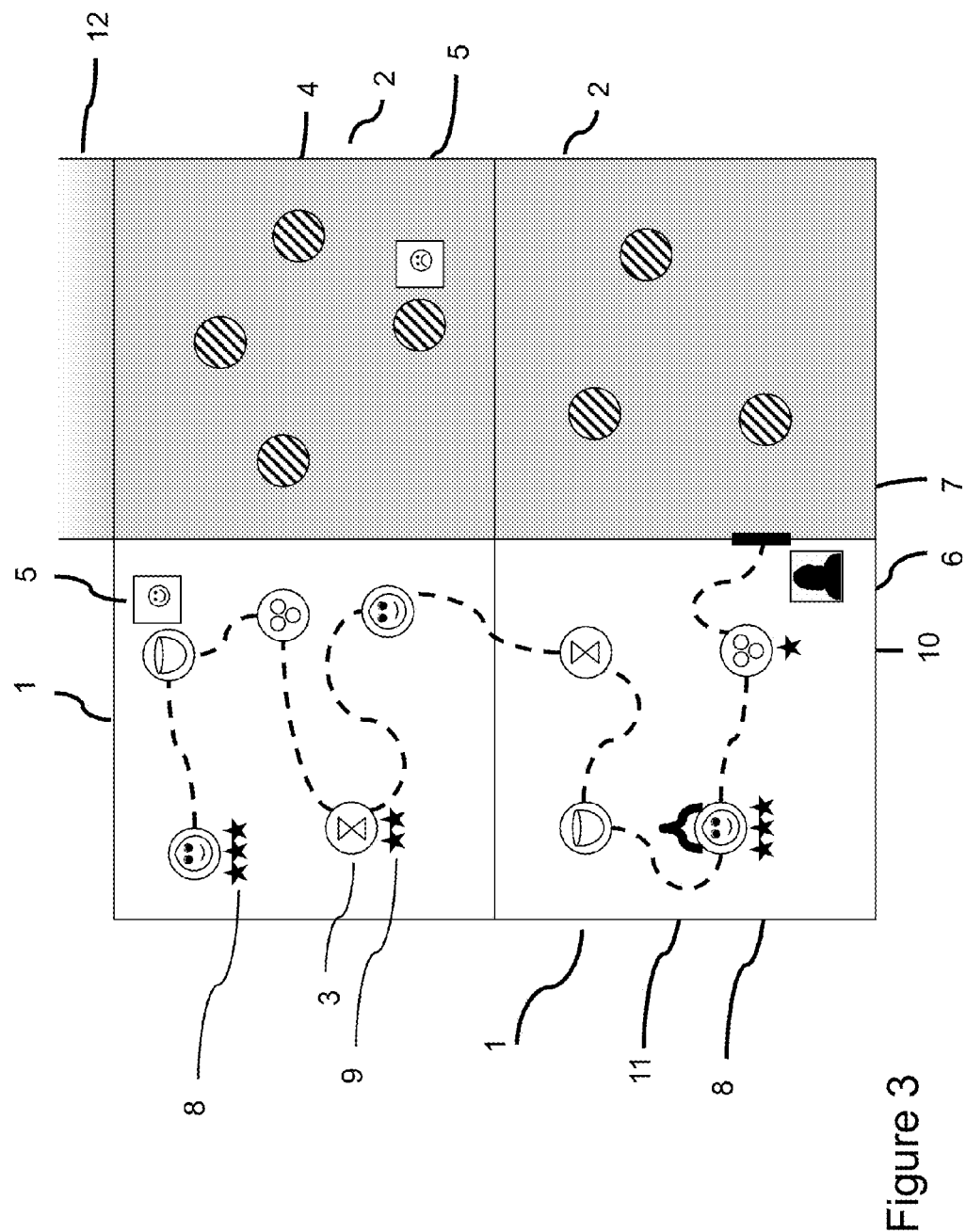
FIG. 3 shows a virtual map layout.

FIG. 3 shows a virtual map layout of a game environment, displayed on the computing device used by the game player. The virtual map is linked to a game, typically a skill based game (such as a bubble shooter game like Bubble Witch Saga) in which a player can progress through multiple levels of increasing difficulty. As the player increases through the levels of difficulty in the game, his progress is represented as a journey along a path in the virtual map. Representing progress in this manner provides an additional layer of engagement for players, and also opportunities for viralisation and monetisation.

The virtual map consists of stages 1, 2 with varying number of levels 3, 4. The user traverses between levels and completes the levels one by one along a path by playing the associated game and moving up levels in that game. The number of stages and levels can vary depending on the implementation. The levels can be numbered consecutively throughout the game or they can be numbered within a stage, it is also understood that other ways of identifying the stages and levels can be implemented. New stages to the virtual map can be added by the game designers at any time—so a game may be launched with say 20 levels, but within two or three months, there may be fifty or sixty levels present.

New stages in the virtual map can unlock when the user completes the last level on the last stage. The user is sometimes faced with challenges 7 to finally unlock the next stage in the virtual map. One such challenge is described further in FIG. 7.

In addition to the shown virtual map layout in FIG. 3, there can also be other levels or stages that are not part of the progress along the path in the virtual map. Such stages or levels can be present in the game associated with the virtual map at all times or can be unlocked when the user reaches a certain in-game element. This in-game element can for instance be completing a specific level, reaching a predetermined high score (in Bubble Witch Saga, for instance, collecting a specific number of stars when completing a level—highly skilled game play can win the user three stars) or paying virtual currency to unlock the stage or level.

The map layout in FIG. 3 may be used in games connected to or linked with a social network such as Facebook™. It is common that the users on such networks have avatars with for instance a photo of the user and/or the user's name. Such avatars can for instance also be a sign or a figure. The user's avatar is displayed on the map layout alongside the level where the user is 6. It is understood that there are different alternative implementations of where the user currently is on the map. This can for instance be the latest level the user completed, the level with the highest score or the last completed level along the traversed path.

The user can connect with other users of the social network, either as "friends" on the social network or as "friends" within the game environment. If the user has connected to other users who also play the game on the social network, then the avatar of each those other users is displayed at the location or level on the map that the other user has reached in its own game play 5. This location can be the highest level the other user has completed. An alternative implementation is to display the other user's avatar at the most recent level the user has completed.

The user can alternatively be given the option to select which users he would like to see on the virtual map. The users to choose from can be from the friends on the social network and the user can get suggestions to show the friends which meet a certain criteria, for instance the friends which he has interacted with the most in the past or friends living in the same areas he does.

The user can alternatively get the option to choose from other people not being friends on the social network, but that meet other certain criteria. The criteria can for instance be that they live in the same area as the user that they are in the same age, that they have played the game in a similar fashion or a combination of said criteria. It is understood that the user can be presented with a range of criteria, only some of which are described here. The user may also have the option to opt in or opt out from being shown to non-friends.

The user can play any of the unlocked levels on the map, so the user can go back and replay already completed levels to get a better score or beat friends' high scores.

To complete a level the user has to reach a certain number of points in the game, this level can be represented with a symbol such as a star. So that a star is lit when the user reaches that number of points on that level. The user can earn more than one star on each level and the levels are re-playable to get a higher score.

The symbol representing how well the user has played on each level is displayed alongside the level on the map 8, 9, 10.

If the game is connected to a social network or that the user has connected with other players in the game, the levels will present a leaderboard showing who among the user's connection has the high score. There is a notification 11 shown on the map if the user that has the highest score among the friends connected to the game. The leaderboard will be further described in relation to FIG. 33.

FIG. 4 shows the layout of an in level game, with four colours of bubbles that have to be popped by matching the bubbles fired from the cauldron with same-coloured bubbles in groups of three or more. A dotted line shows the extended aim line which moves with the mouse's cursor (or other position or pointing indicator, such as touch pad, touch point etc) to allow the player some accuracy in firing the bubbles from the cauldron. The bubble can be shot with for example a click of the pointing device once the extended aim is positioned by the player to his satisfaction. The number of bubbles remaining to be shot from the cauldron is written on the cauldron. The edge of the screen allows bubbles to be bounced off to access other bubbles, which would otherwise be trapped. The player can cycle between two or three bubbles using the space bar, depending on whether they have bought a specific charm from a charm store, allowing some flexibility in the colour of bubble that has to be shot (a charm can be bought that allows the user to cycle between three bubbles using the space bar; being able to select the next bubble to fire can greatly increase scores and is one of the techniques used to provide engagement to even advanced players.

In this implementation a minimum of nine bubbles have to be popped on the top row to proceed to the next level, and also the star meter on the top has to pass the first line from the left to gain one 'Star' to proceed to the next level which also can be represented with that the player has to reach a certain score to move to the next level. A star is gained when bubbles fall from the top of the screen into the cauldrons at the lower end of the game board. The cauldrons are worth different values, 100, 500 and 1000. If enough points are gained from the bubbles falling into the cauldrons, up to three stars can be earned when the star meter is fully filled. Once 9 'holes' have been made in the ceiling from popping bubbles, all the remaining bubbles fall down; this prevents the player from having the sometimes quite tedious and dull task of shooting each individual bubble hangin from the ceiling (another technique to aid engagement). Also, any remaining bubbles in the cauldron from which bubbles are shot, will be fired into the air to bounce back onto the spiders and earn additional points towards the total number of stars. The number of bubbles fired in to the air can be capped, for instance at 10 bubbles.

Figure 58:
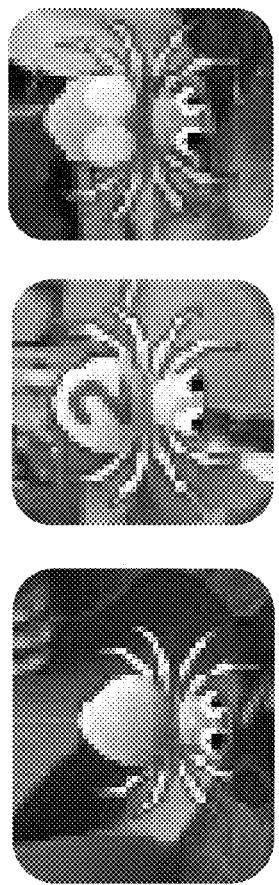
FIG. 58 shows one implementation of the different spiders available.

Spiders appear when a one or a succession of good shots has been made. They can be blue, gold and green, each of which causes a different effect on the bubbles. If a bubble hits a spider, then it will bounce or deflect off it—this alters the trajectory of the bubble and a skilful player can arrange for bubbles to bounce off spiders into the higher value containers near to the middle. Blue spiders increase the score marginally, gold spiders double the points gained, and green spiders cause a duplication of any bubbles that hit them. Therefore, spiders can increase the number of points gained from the cauldron and possibly the number of stars earned. FIG. 58 shows one implementation of the different spiders available which the bubbles bounce on.

The bubbles in bubble store show on the screen comprise of one of each of the possible four colours of bubble; a player can buy any colour of bubble for 6 Facebook™ credits—this may help complete a particularly tough level. As a general principle, the game designer will often implement challenges or difficulties in gameplay, and a player will be offered the ability to buy some kind of resource (e.g. a bubble of a specific colour; a charm etc) that will enable the player to overcome that difficulty more readily. For example, the icons labelled 7 are 'Wishes', which can be considered temporary 'Charms'. These help the player to complete a level, e.g. The Wish of Scrolling, allows the player to see to the top of the screen once per game if the top line of bubbles is not yet uncovered. Wishes can also only be bought with Facebook™ credits.

Figure 5:
FIG. 5 shows an exemplary implementation of a virtual map.

FIG. 5 shows an actual virtual map layout of a game environment used in the game Bubble Witch Saga. The virtual map consists of the stages aforementioned with different levels within them. The icon 13 allows the player to invite friends to the game. From this screen the player can choose to access any level from any stage that they have previously unlocked; a player may wish to replay an earlier level in the associated game because they enjoyed it; to get a higher star rating or many other reasons detailed below. 9 allows the user to turn on or off the sounds made by the game, and 8 allows the player to turn on or off the music within the game.

14 shows how long it will be before a new life is added to the total number of lives remaining, 15. The total number of lives remaining has a maximum cap depending on the level the player has got to or if they have invested in Charms from the Charm-Store using Facebook™ credits to increase this. 16 gives the player the option to add extra lives before waiting for 14 to count down from 30:00 to 0:00 when a new life appears. 16 gives the player the option to either watch a sponsored advert for a life or ask a friend to send them a life.

17 shows the icon for Facebook™ credits, and 18 shows the number of these that the player has purchased using real currency. 19 allows the player to purchase more credits and will take them to a screen to enter their credit card details.

1 shows the icon for in-game 'Coins' (virtual currency) which can be used to buy 'Magic Potions' which help the player complete levels (See 4.2). Coins can be gained by exchanging real currency for coins using 3, or by unlocking stars in each level, with the greater the number of stars unlocked resulting in a greater reward of coins. Coins can also be earned by beating a friend on the leaderboard once the level has been played again after completion. 2 shows how many coins the player currently has.

6 shows the total number of stars earned so far in the game, and the greater the number of stars gained, the more Magic Potions can be unlocked. These Magic Potions can be bought using coins and last for 3 plays of any level in any stage. However, only 3 magic potions can be bought at one time even though it is possible to unlock 4.

20 gives the player the option to send a gift to any friend currently playing the game, the gifts can only be Charms which need to be purchased with Facebook™ credits. 7 shows the Charms that they player has bought from the store using Facebook™ credits already by illuminating them on the screen.

12 depicts the cat 'Wilbur' which links the player to 'Wilbur's shop'. From the store, Charms can be bought for Facebook™ credits.

11 depicts 'Baroness' which allows access to the leaderboard where the player's relative position to their friends is shown. It also allows access to the story behind the game.

10 links the player to tournaments where information about how to play them and the status of the player in each tournament is displayed, along with a screen with options to choose whichever tournament the player would like to enter into.

Figure 6:
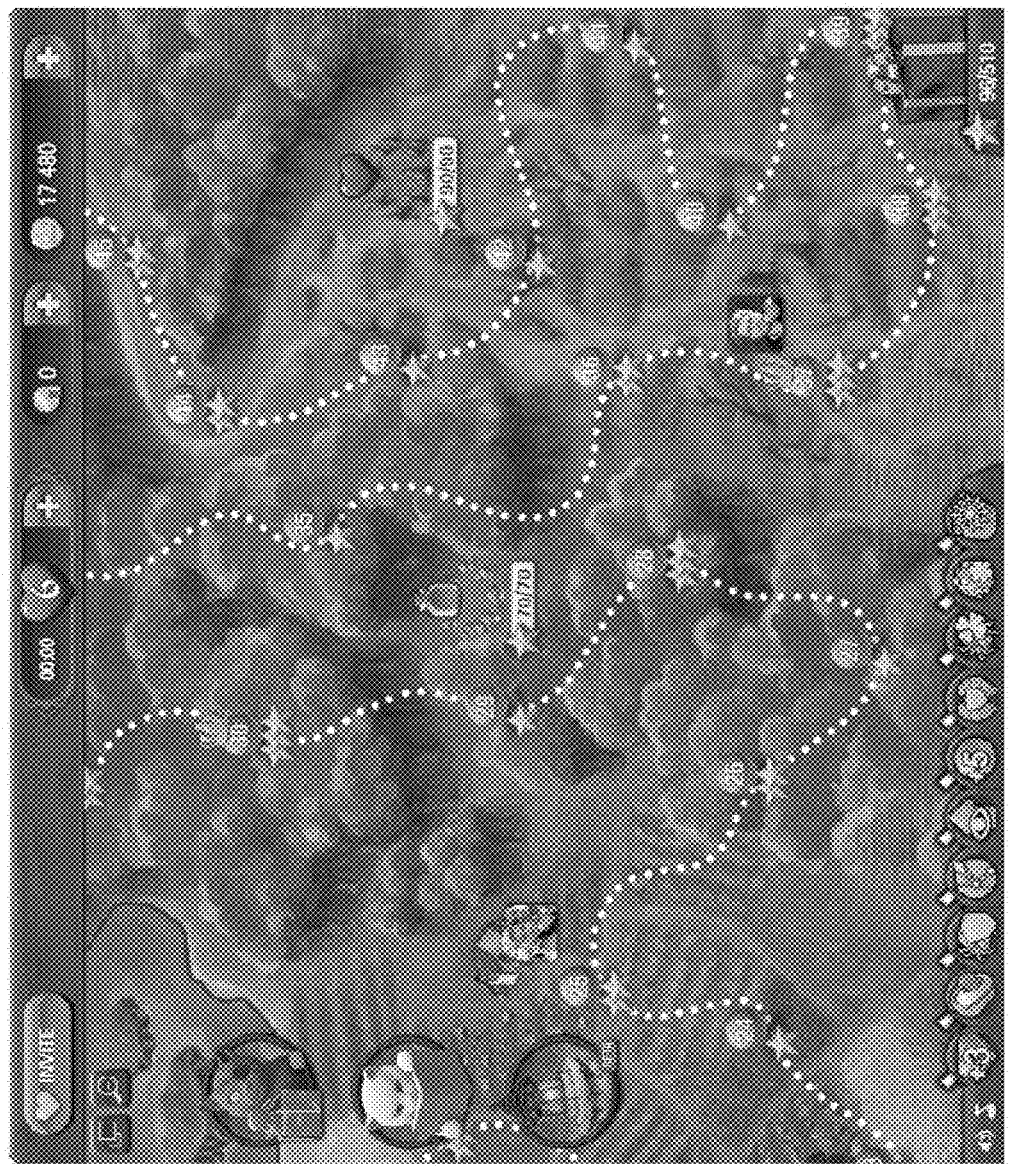
FIG. 6 shows an exemplary implementation of a virtual map.

FIG. 6 shows the map of the stages and levels as before, and it has been zoomed in for a more detailed view of a part of the overall map. The user can reposition the map with the pointing device.

1 depicts the number of stars earned on each level, from the total number of points earned by the falling bubbles into the cauldrons and hitting of spiders. These levels can be replayed an infinite number of times to try and increase the number of stars earned.

2 shows that the active player is top of the leaderboard among their friends for that particular level. They have scored the most points, from bubbles falling into the higher scoring cauldrons and hitting more spiders.

3 shows potions that have been unlocked through earning a certain number of stars, in this case 20. Potions are unlocked when 20, 50, 70, 130 stars are earned (See 4.2.1). At 90 stars earned, the maximum cap for lives is increased from 5 to 6. At 110, the maximum cap for lives is increased from 6 to 7 and at 200 stars a player is given 50,000 coins. At 250, this increases the maximum number of lives to 8. 300 stars gives the player 50,000 coins and 400 stars gives the player 75,000 coins. Potions can be bought with coins to aid the player in the completion of a level. Each of the four available potions provides a different advantage listed in 4.2.1. Only three potions can be used at one time out of the four unless a Charm has been bought from Wilbur's Shop.

The virtual map may show avatars of the player's friends also playing the game. The avatar is positioned either at the furthest level the friend has got to or their most recently played level. In the bottom right hand corner of the avatar may be heart with a '+' sign next to it. Clicking this heart will allow the player to give the friend a life, and the heart with the '+' sign will instead be replaced with a green tick.

Figure 7:
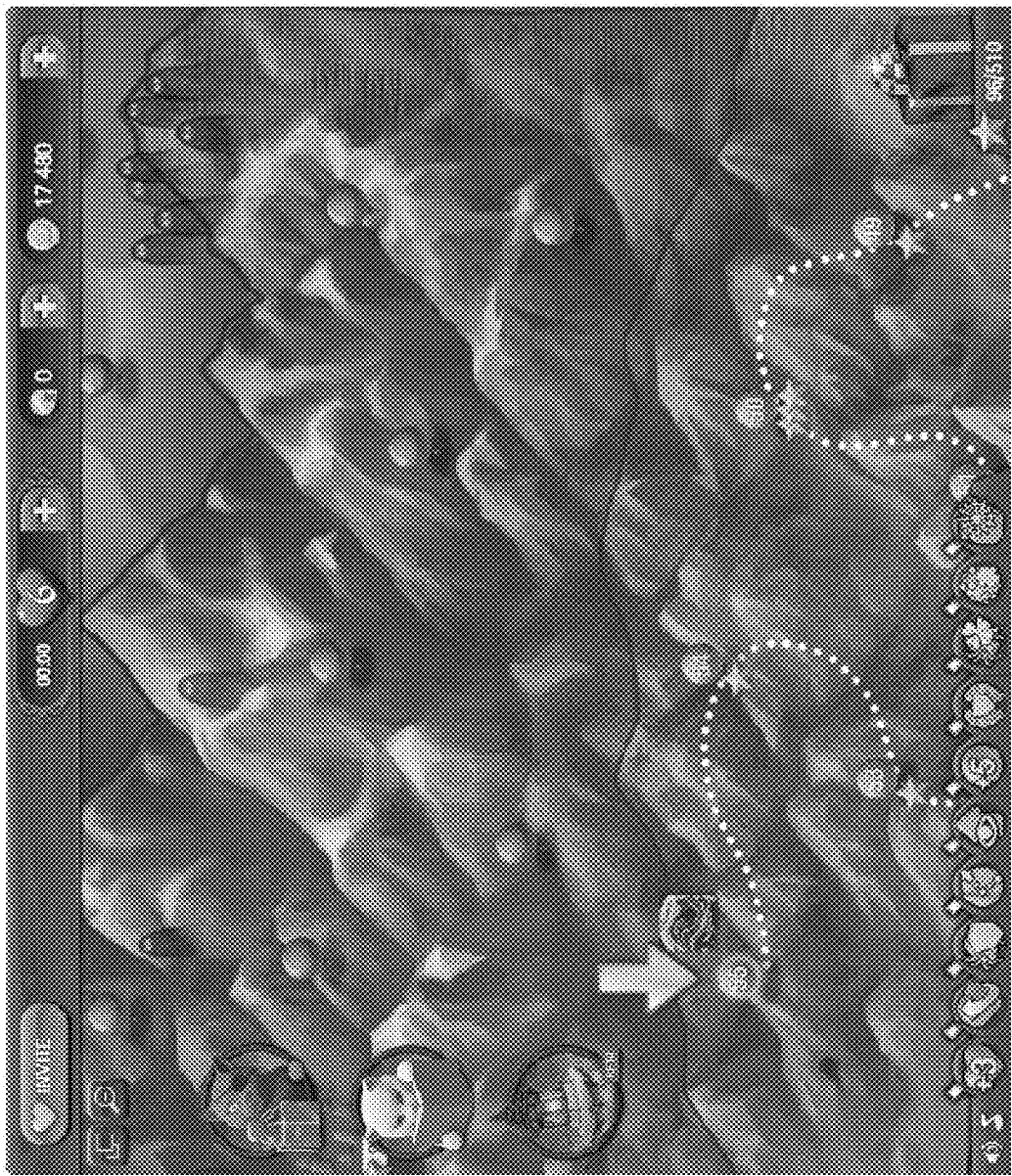
FIG. 7 shows an exemplary implementation of a virtual map.

FIG. 7 shows a zoomed in map with the levels within it visible. The arrow points at the most recently unlocked and as yet uncompleted level. The player's avatar is also displayed at this point on the map. The number of the level is hovering with a dark shadow underneath it. The dark shadow only remains for as long as it takes to earn at least one star on the level. This number can be clicked on to attempt the level. Once the number is clicked on, the option to buy potions appears along with the 'Play' button and the maximum number of stars you have earned on the level during previous attempts if these have been made. The path between the previous levels is shown with a dotted white line and any previous levels can also be replayed.

Figure 8:
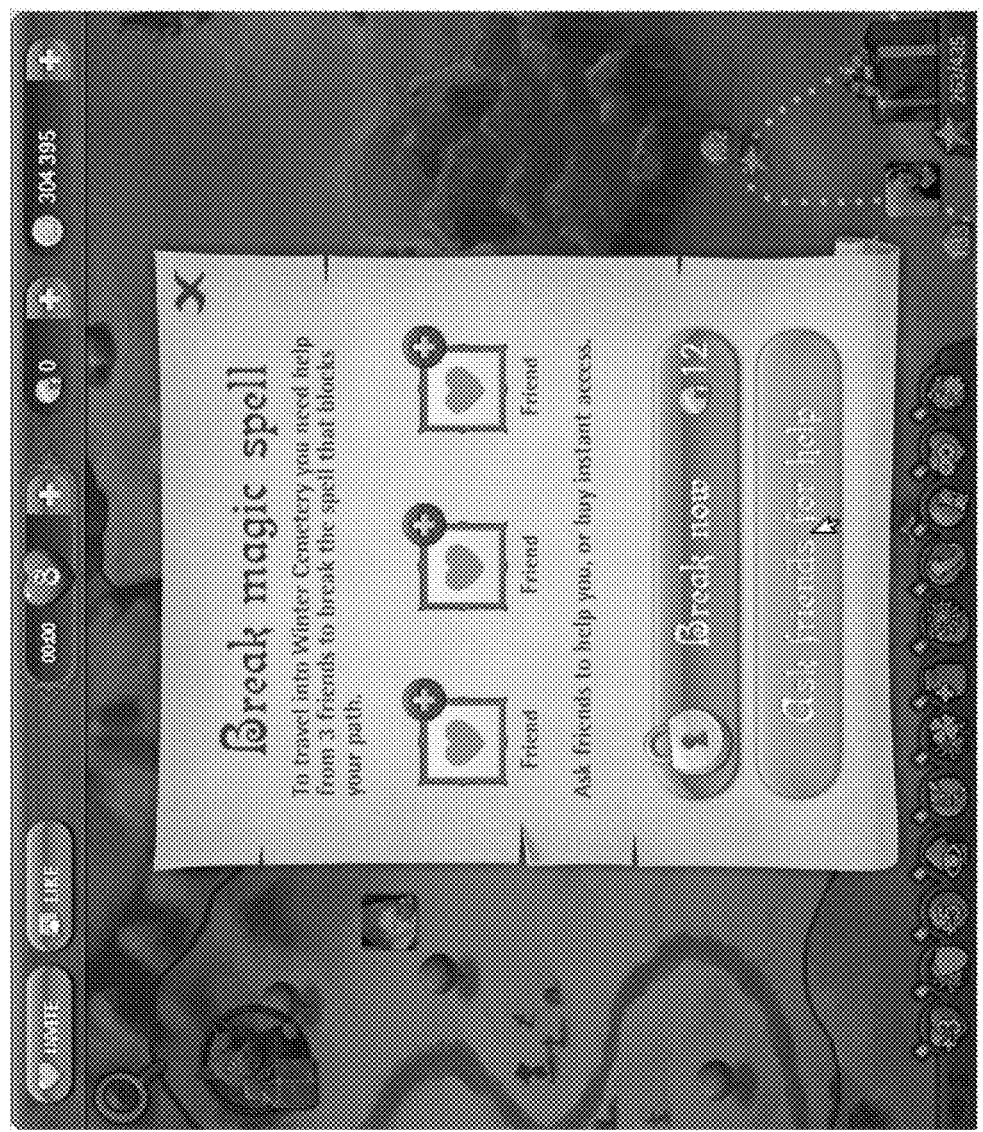
FIG. 8 shows a collaboration block.

To travel from one stage to another once all the levels have been completed on that stage requires the help of three friends. The player is prompted with a message to invite friends, an exemplary implementation is shown in FIG. 8. These friends may already be playing the game and do not have to be 'new' players. However, instant access can also be bought using Facebook™ credits. Friends can be asked for help either by clicking the 'Ask friends for help' button, or by the '+' sign to the right of the buttons. Once the stage has been unlocked with the help of the three friends, all the levels within that stage are unlocked too.

The user can choose to request help from only selected friends or to send a request to multiple friends. There can be a limit to how many friends the player can send the request to and also a limit in time before the user can send a reminder or similar request.

The request for help is sent to the friend who then has the option to accept to help or to decline to help. The request can in one implementation be sent using the social network to which the game is connected, an alternative implementation is to send the request to someone external to the game (via, text message, instant message for instance) who has to join the game to respond to the help request. This is one of the viralisation techniques implemented in this game.

Figure 9:
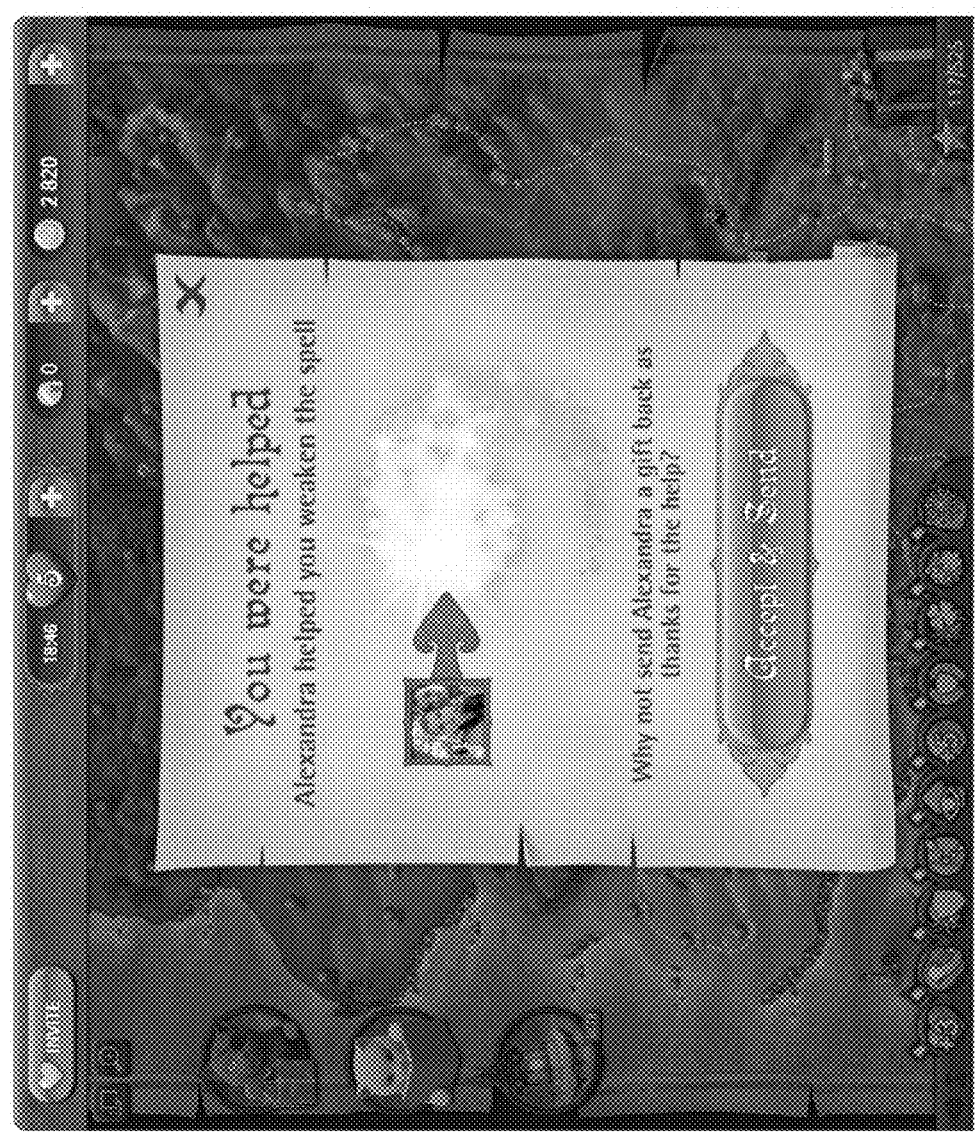
FIG. 9 shows a notification that help has been received and a gift can be sent back.

If the player's friend decides to accept and to give help, the player will receive a notification that their friend has done so. Together with this notification the player has the option to send a present back to their friend as a thank you. FIG. 9 illustrates this.

Figure 10:
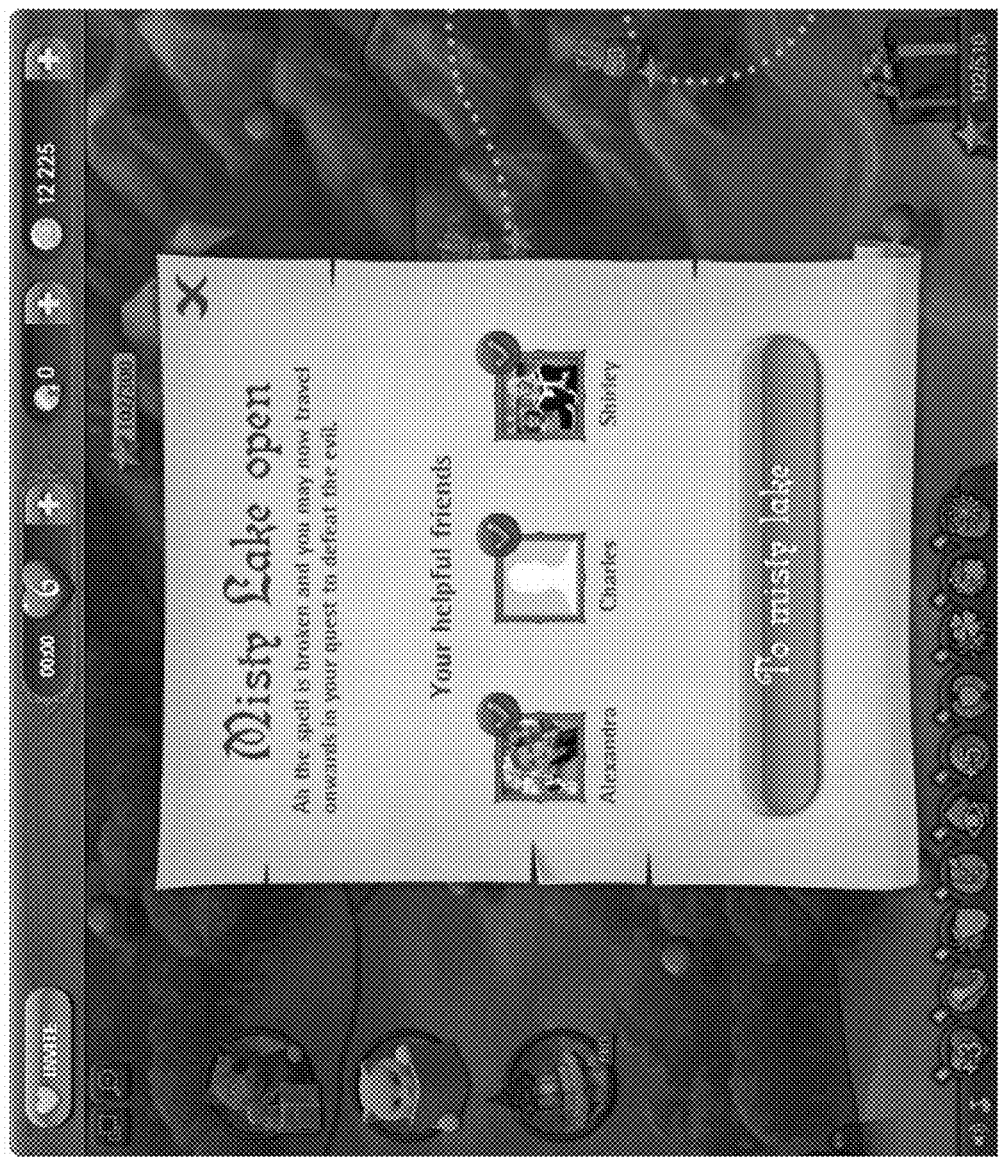
FIG. 10 shows that help has been received from three friends to unlock a new area.

FIG. 10 shows that the three friends who the player has requested help from have enabled the player to unlock a new stage. Each of the friend's avatars appear on the screen with their names underneath the avatar and a tick next to the picture to show that they have accepted the player's request for help. Another feature in the image allows the player to start playing the newly unlocked levels in the new stage.

Mystery Quests

There may be ways of getting past a collaboration block other than asking friends for help and paying for it, which are the most common ways of passing a collaboration block. This can be done through to use of 'Mystery Quests', which gives the player the option of completing one or several challenges to unlock the block. Such challenge can for instance be to play one or several past levels with modified goals in order to pass the collaboration block, for instance three levels—one for each of the locks.

These challenges may be in the form of replaying a previously completed level but with a new goal to reach, for instance a target high score. In a typical implementation, the score requirement is higher than it is for playing the level regularly, and also no other goals need to be fulfilled. For example, if the player gets to replay a level with jelly with a new target high score, the player would not need to remove the amount of jellies specified as long as the target score was reached.

Figure 11:
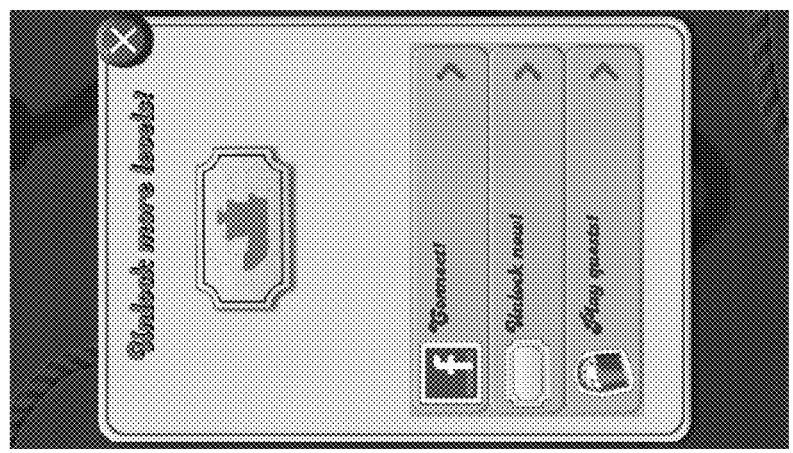
FIG. 11 shows a collaboration block pop-up showing three available options for passing.

In a typical implementation this option to pass a collaboration block in the game is available in three cases; if the player is not connected to the Internet, if the player has not connected the game to a social network, or if the player is not connected to either a social network or to the Internet. If the player is not connected to either a social network or the Internet then the other options available for passing the block, such as sending requests to friends, cannot be used. However, it is possible to have this option available to users connected to both a social network and to the Internet as well. FIG. 11 shows the three options typically available for passing a collaboration block; connecting to Facebook to ask friends, Unlock now with a purchase, or Play mystery quests.

It is possible to combine the ways of passing a collaboration block. For instance, completing one Mystery Quest could make it so that the player only has to request help from two friends once a connection to a social network has been established, or that the player does not need to pay as much for purchasing a way through the collaboration block.

In some implementations, Mystery Quests are not tied to specific collaboration blocks. For example, if the player reaches a collaboration block and completes a Mystery Quest, then connects to a social network and receives help from three friends, the player will only have to complete two Mystery Quests the next time that option is chosen to pass a collaboration block. If the player then only completes one more mission, and then goes on to receive help from friends or purchase a way through, the third time a Mystery Quest is chosen as a way to pass a collaboration block, the player only needs to complete one level.

Figure 12:
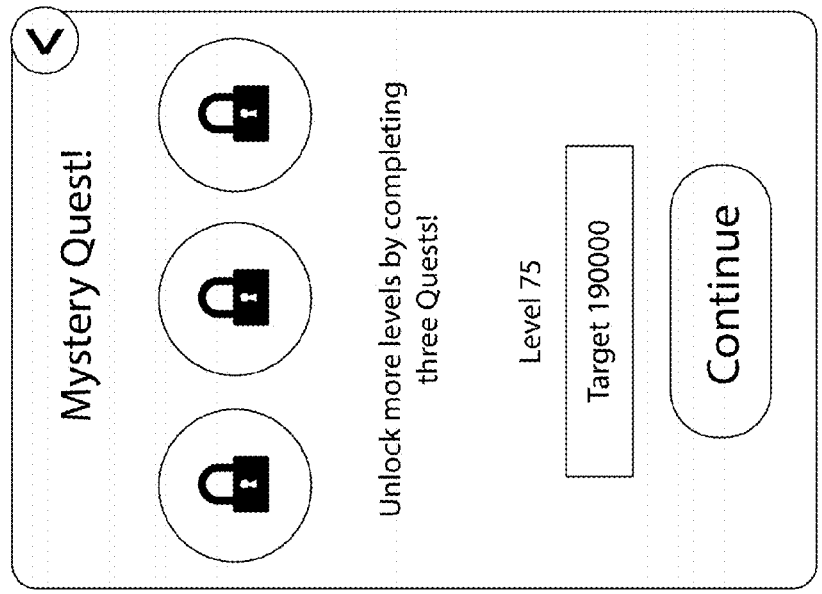
FIG. 12 shows an implementation of a main page for the Mystery Quests.

If the player chooses to play the mystery quest to pass the collaboration block, the player will be taken to a screen showing three symbols representing challenges to be completed, as well as specifications regarding which level is to be played and what score is required to pass the first challenge. This can be seen in FIG. 12. In a typical implementation, the game randomly chooses a previously completed level and increases the score required to pass it. In other implementations, the Mystery Quest levels can be new levels that the player has not completed before. Quest information for one level of the Mystery Quest is shown, specifying required score and which level will be played.

Figure 13:
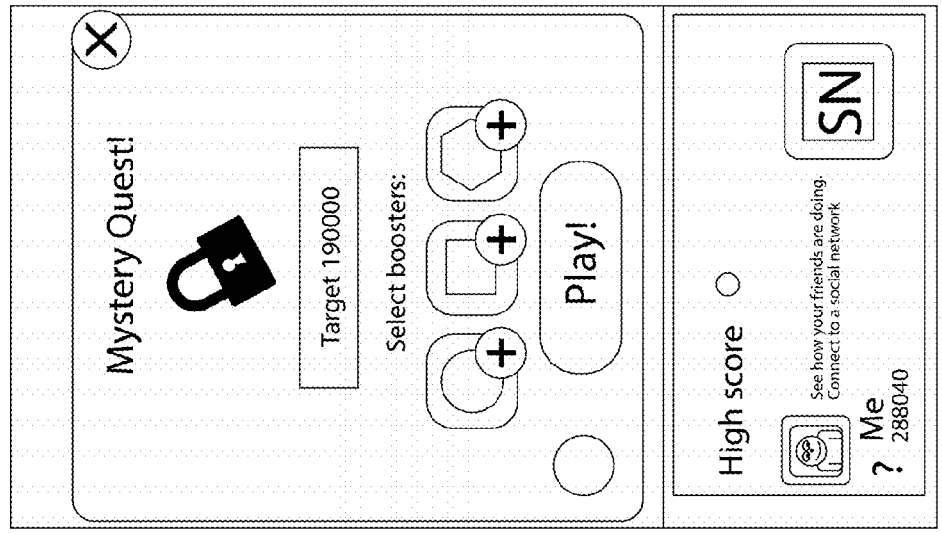
FIG. 13 shows a pre-level screen for a mystery quest level.

If the player chooses to continue with the quest, another screen is presented, allowing the player to choose boosters. This screen is very similar to a regular pre-level screen, with the difference that instead of the level number it says 'Mystery Quest', instead of three stars it shows a special padlock indicating that it is a Mystery Quest, and a special symbol in front of the target score to further indicate that it is a Mystery Quest and not a regular level. One implementation of the pre-level screen for a Mystery Quest can be seen in FIG. 13.

Figure 14:
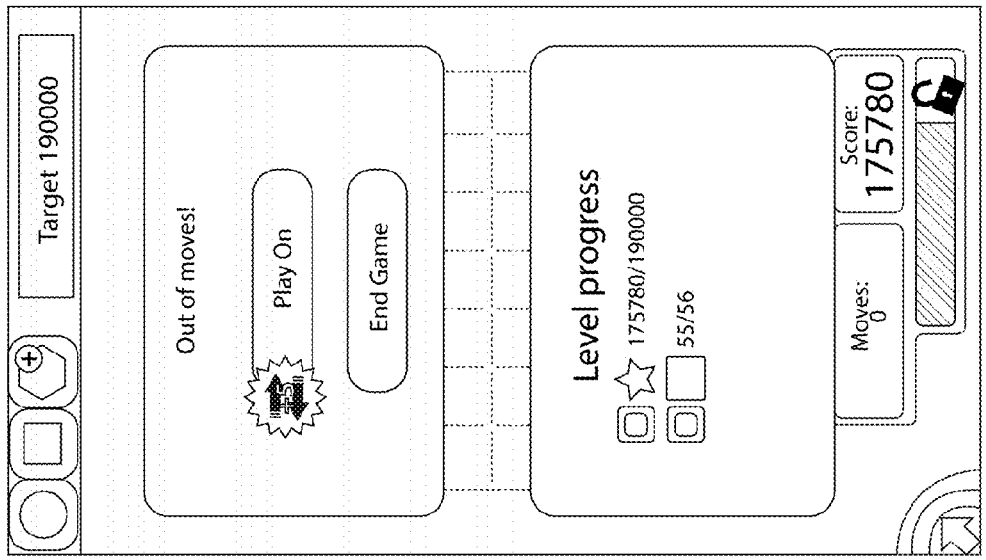
FIG. 14 shows failing to complete a mystery quest.

If the player chooses to play the Mystery Quest level, the game proceeds to the game board screen and the player can start playing. If the player fails to achieve the target score, a pop-up shows why the player failed. In some implementations using levels previously completed as Mystery Quests, the regular goals for completing the level are listed as a reason for failure as well as failing the target score, as can be seen in FIG. 14. However, even though this is shown as a reason for failing the level, the player will in a typical implementation complete the Mystery Quest as long as the target score is achieved, even if the other goals of the level are not. In other implementations, the player can be required to achieve both the target score and other goals for the Mystery Quest to be completed.

Figure 15:
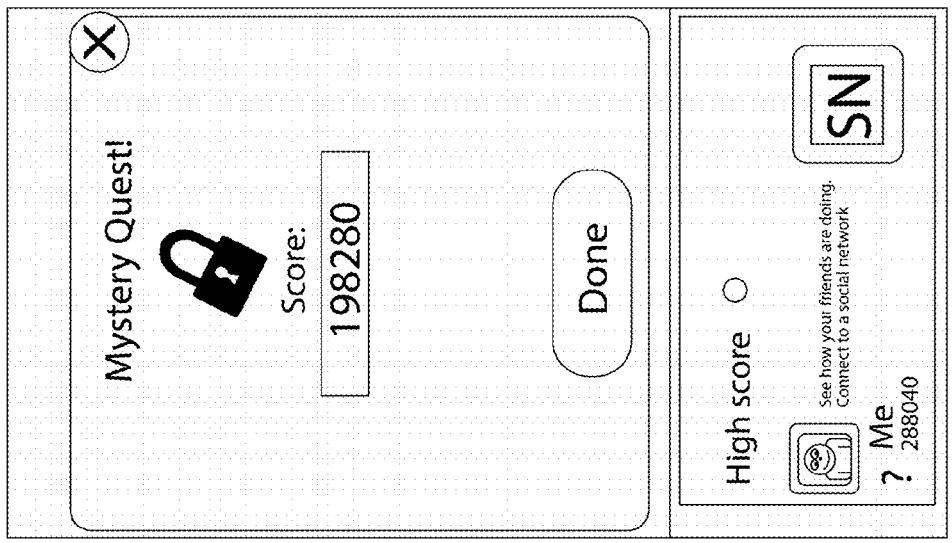
FIG. 15 showing a post-level screen after completing a Mystery Quest 1.
Figure 17:
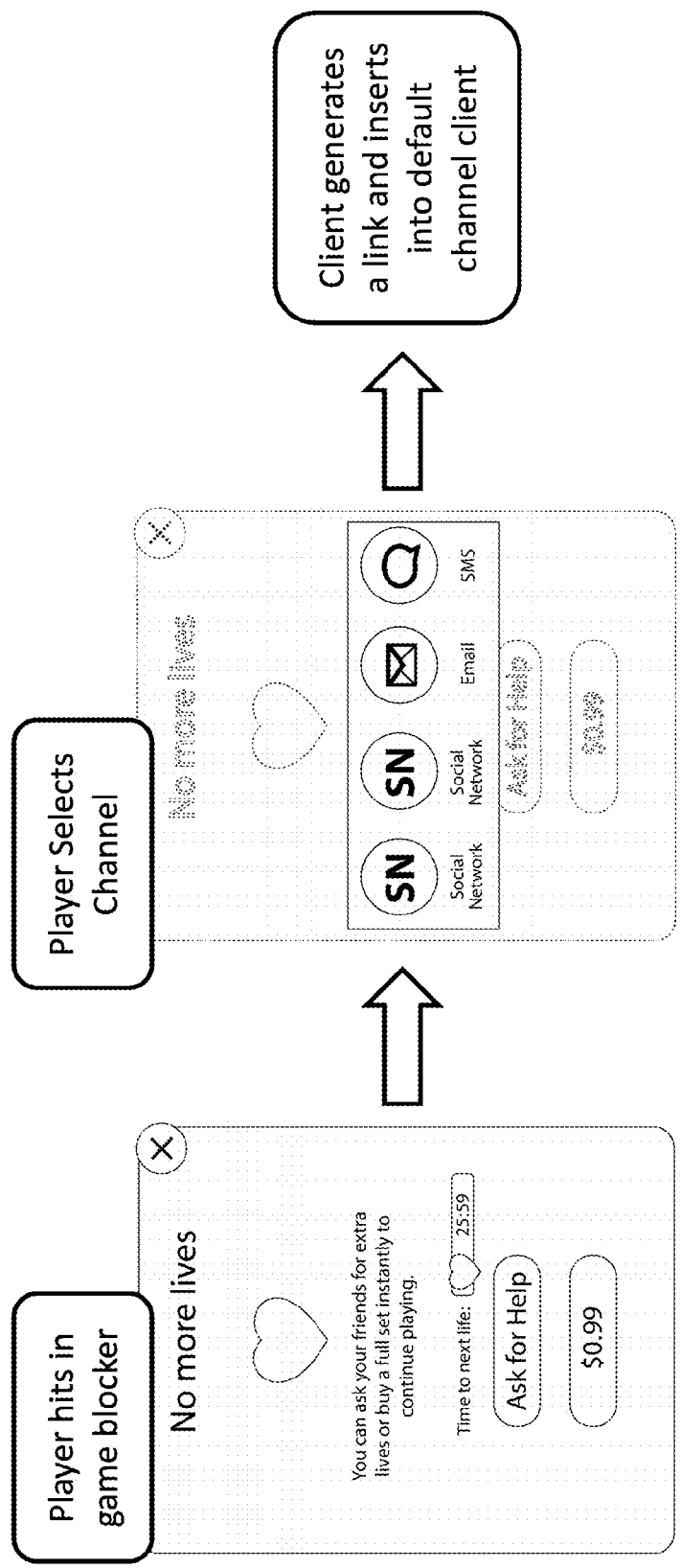
FIG. 17 An example of the flow.
Figure 18:
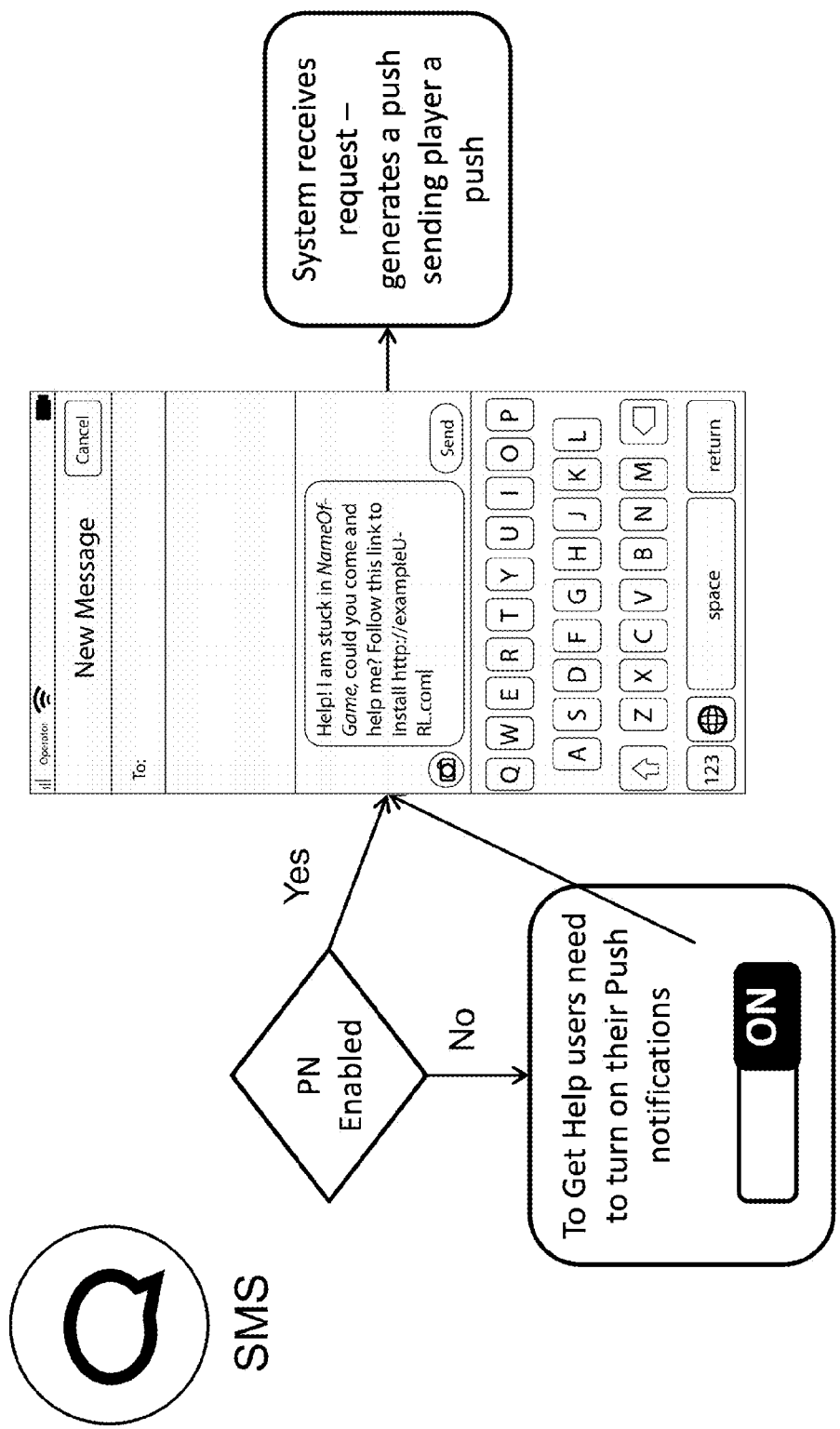
FIG. 18 A typical user flow for using SMS to end a request.
Figure 19:
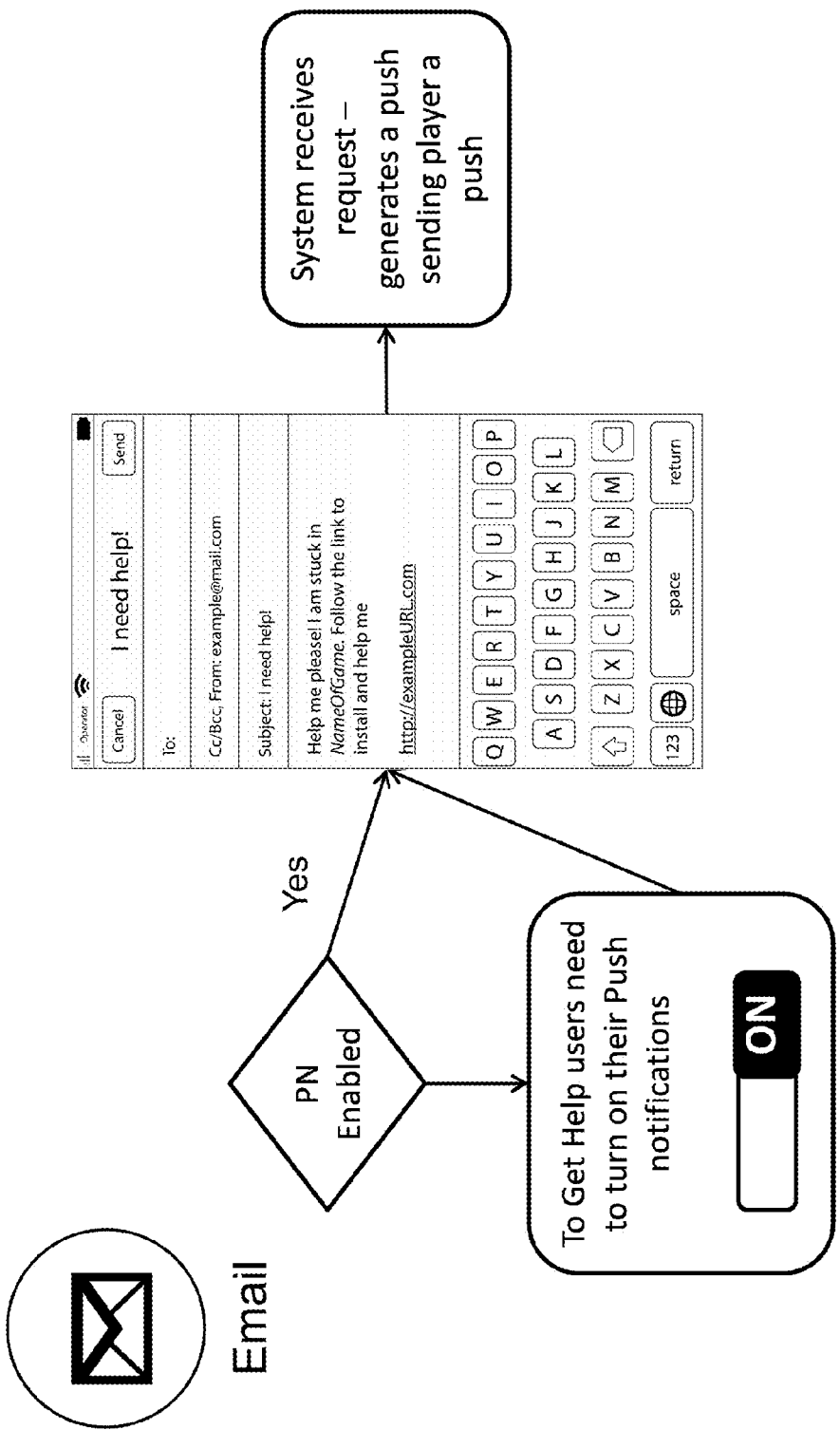
FIG. 19 A typical user flow for email.
Figure 20:
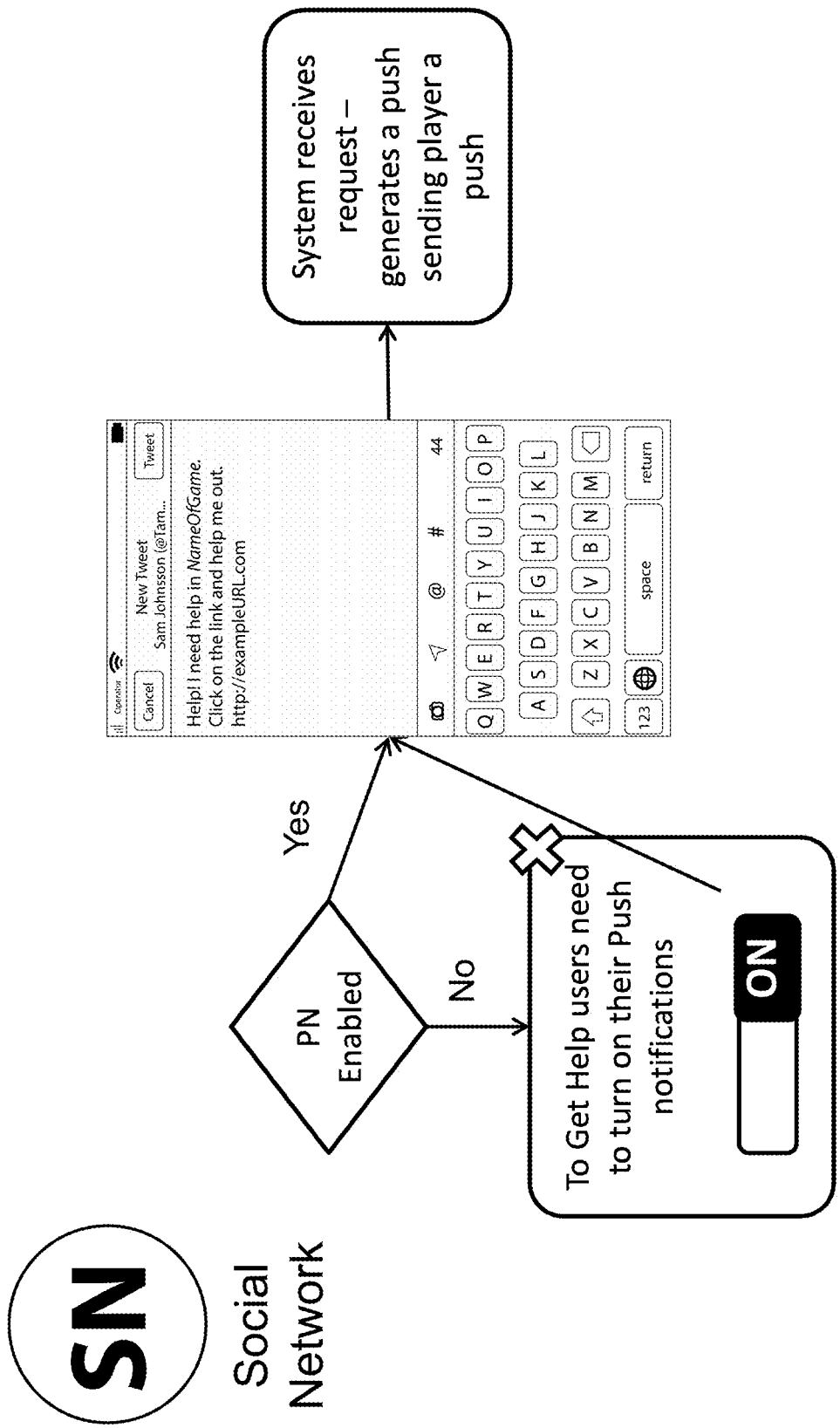
FIG. 20 A typical user flow using a micro-blogging service such as Twitter.
Figure 21:
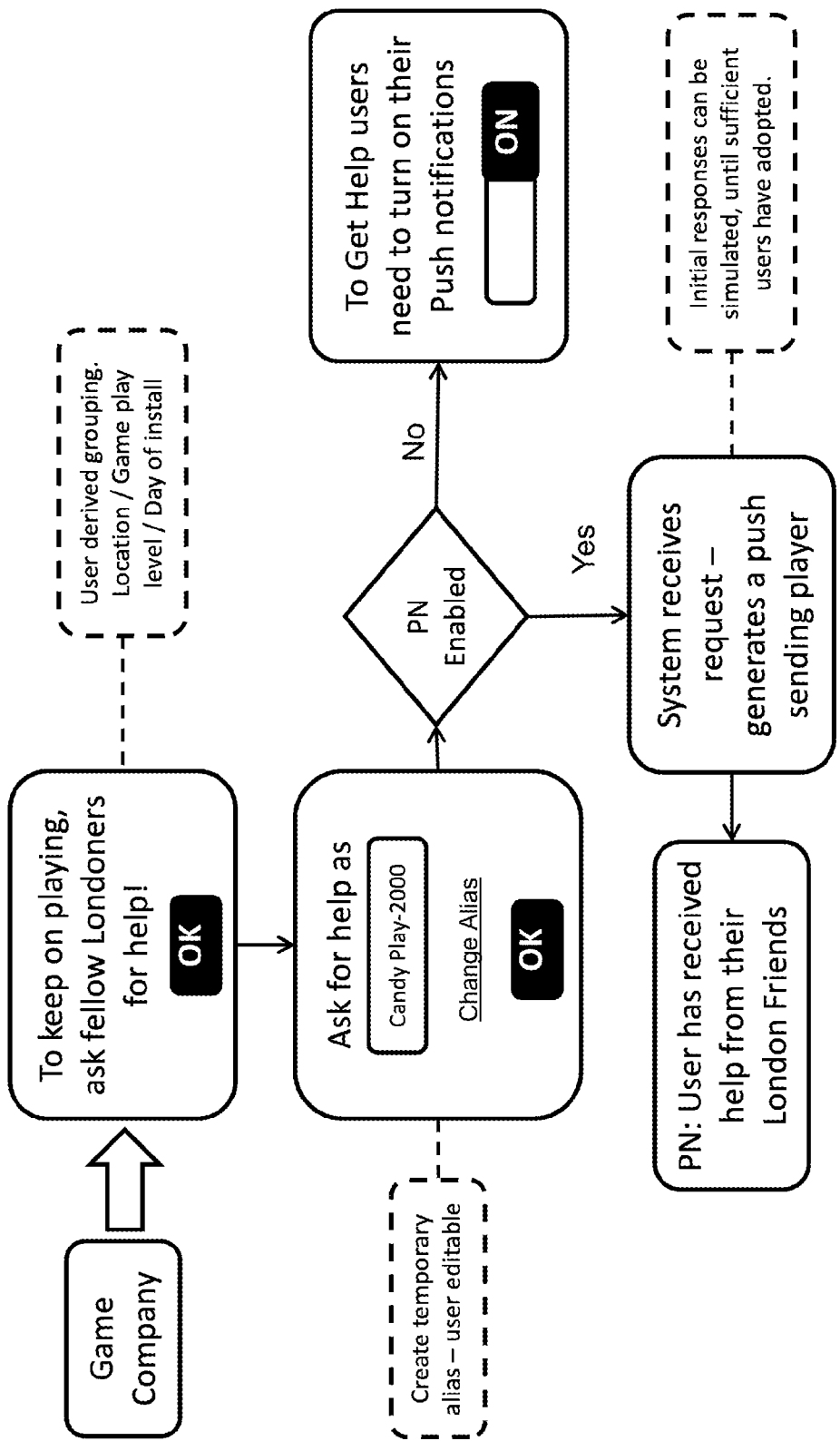
FIG. 21 Game friend—user experience
FIG. 22 Game flow help system
FIG. 23 Link recipient behaviour
FIG. 24 Help request experience.
Figure 22:
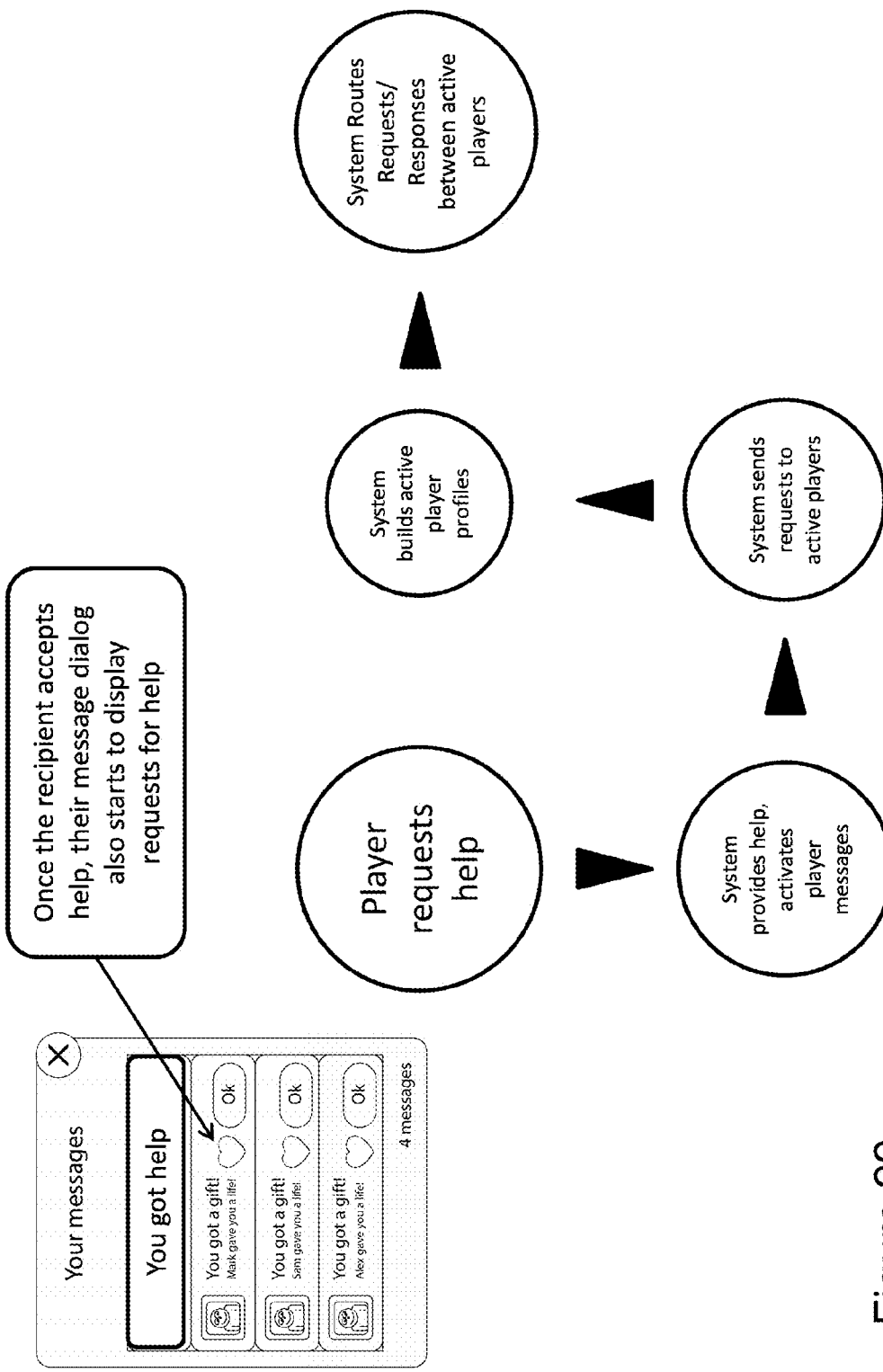

However, if the player manages to achieve the target score on a Mystery Quest, the level will be completed. Completing a Mystery Quest level will take the player to a post-level screen similar to a regular post-level screen but with the same differences as the pre-level screen. One example of such a post-level screen is shown in FIG. 15. After this there will typically be an animation to signal that the player has completed the level, such as the padlock going from being locked to being unlocked. There can be other ways to show a post-level screen after the animation of unlocking the padlock has been shown.

Figure 16:
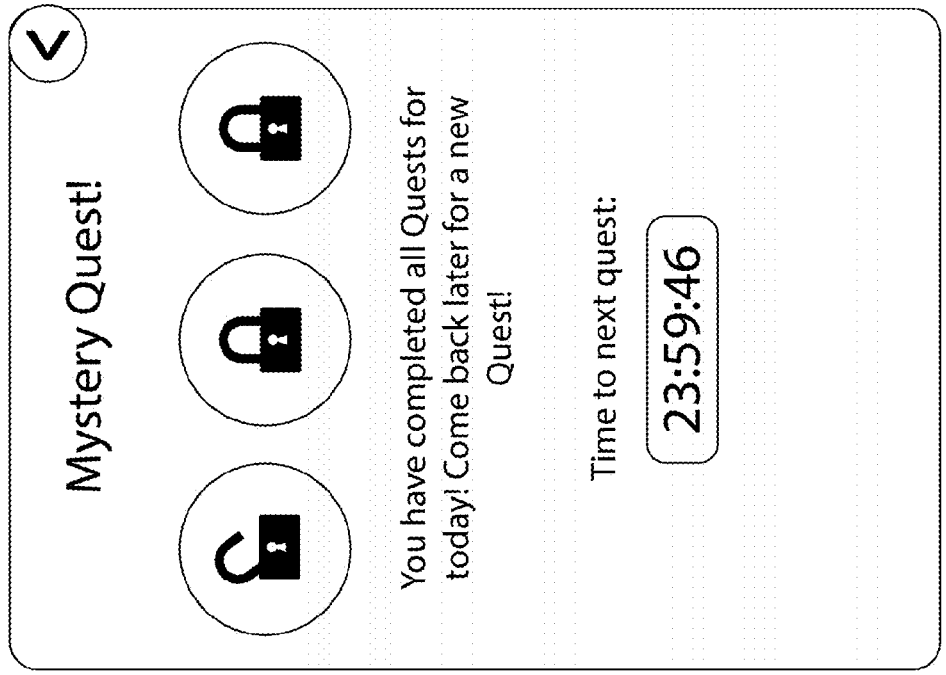
FIG. 16 showing the progress of completing all Mystery Quests.

After completing a Mystery Quest and pressing 'Done' on the post-level screen, the player is typically taken back to the main Mystery Quest screen. This screen will then show the player the overall progress with the Mystery Quest, which in a typical implementation consists of three levels. In FIG. 16 it can be seen that the player has completed the first quest, and that the next one will become available after a certain period of time, 23 hours 59 minutes and 46 seconds in the figure.

In some implementations, the player needs to wait 24 hours between completing each of the three levels of the Mystery Quest. In other implementations, the wait time could be less or none at all. It is also possible to use other criteria for accessing the next Mystery Quest, such as getting more stars on previously completed levels.

Typically the player will use a life for each failed attempt of clearing a Mystery Quest level, just as is the case with regular level. It is also possible that the Mystery Quest levels do not affect the player's life total, or that it uses up another kind of resource as such as boosters.

It is possible for Mystery Quests to be used for other reasons than to pass a collaboration block. For instance, there can be bonus levels within the game that can only be accessed through completing Mystery Quests. In some implementations, Mystery Quests can be a way for players to earn boosters in the game without having to purchase them. It is also possible that Mystery Quests are only available at certain times, such as between 9 PM and 10 PM each day or on specific days.

Alternative Ways to Connect with Other Players for Help or Other Requests

For players who are not connected to friends through a social network, or players who are connected but only have very small social networks, an alternative way is to connect them to other players (if they want) and find proxies for the social experiences that existing networks provide.

It is important to allow players who otherwise would be stuck at a collaboration block or other social interaction tools to also be able to progress in the game. This is important to minimize the churn and to allow the game to be a fun experience for a larger portion of the players.

One such implementation is to drive installs of the game using new channels—SMS, E-Mail, Twitter etc. This will boost DAU, create engagement by creating social connections and communication channels with those connections. It may also increase revenue by keeping players in the game.

Overall Structure

This alternative approach may be used for interaction for instance when a player reaches a collaboration block or runs out of lives. The game prompts player to "ask for help" from other players based on some user derived player characteristics such as location, player game experience. The player gets a prompt to get help with a generated but editable alias and they "send" the message. If the player's Push Notification (PN) settings are set to off include the requirement to turn PN on. The client registers the player request user ID with the server. Server generates a response granting the user request, on a random basis, from 5 to 55 minutes from request. And sends a PN to player. After the player has completed a single loop—request-PN-request grant. They become capable of receiving help requests when they launch the game.

Feature Description

When a standalone player (a player with no or only a few 'friends' connected to the game or to a social network) reaches a blocker in the game, this alternative approach gives them a way to extend their game play by asking for help. Players will be able to select where they ask for help from, through SMS, Email, Twitter etc.

Upon Completion of the loop, they will receive the requested help allowing them to continue in the game.

This approach can be used for collaboration blocks, that the player can request lives, request other help in the game. It can also be implemented so that the player can send invitations to the game and if the recipient will join the game then the inviting player may get a reward.

Exemplary flows and steps in the implementation can be seen in FIG. 17, FIG. 18, FIG. 19, FIG. 20, FIG. 21 and FIG. 22.

The player that receives the request for help can click on the link on for instance his mobile device or computer.

Figure 23:
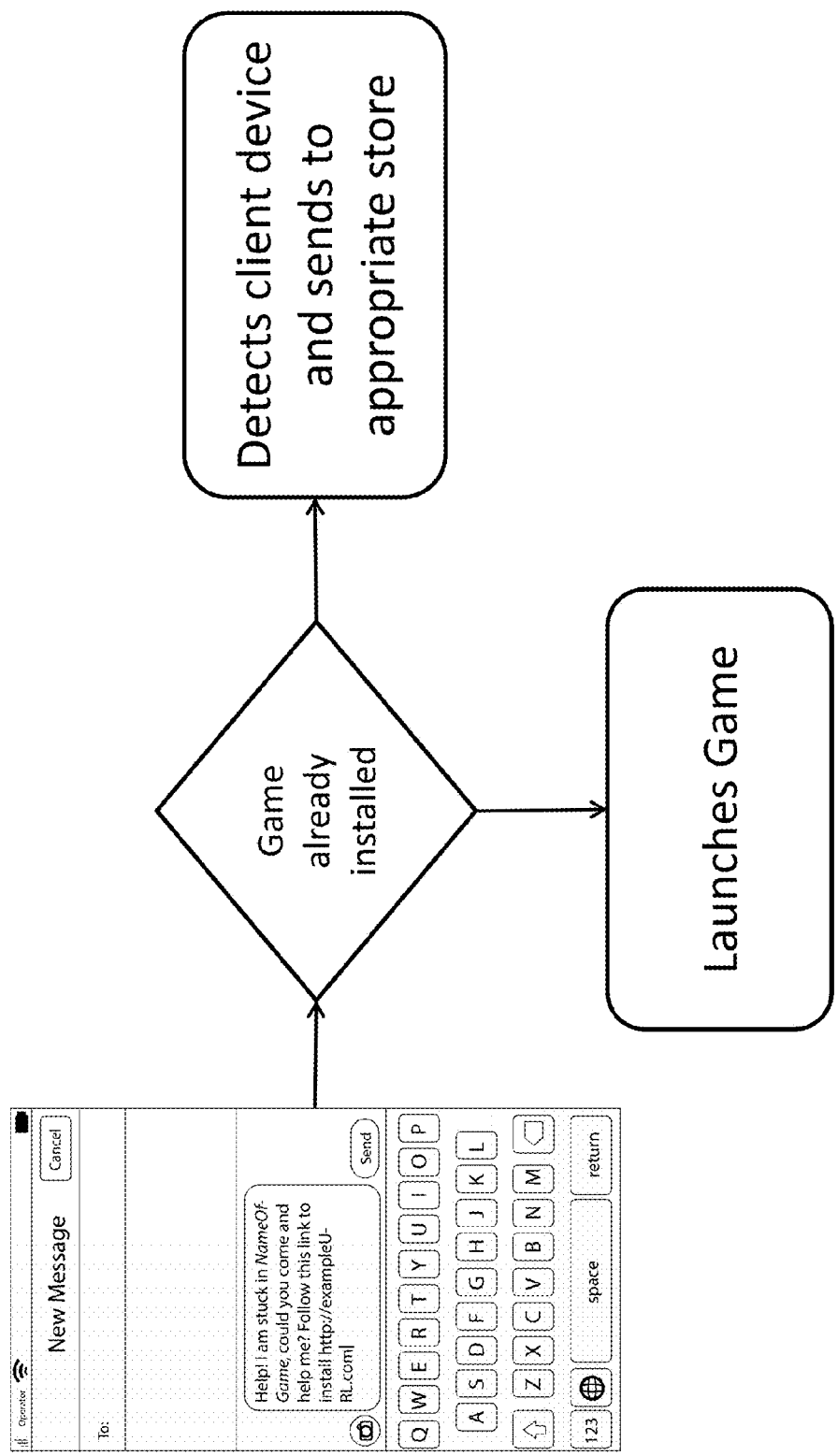

The recipient will be taken to the link destination where the client device is detected and it is identified whether the player has already installed the game on the device. An exemplary overview is seen in FIG. 23. This can for instance be done using a so called URI scheme as described below. If the recipient does not have the game already installed he is taken to the appropriate webpage or application store to download or activate the game. This can for instance be the Apple or android app stores or to the Facebook app page. There are different options available to implement this functionality and the identification of the device can be done on the specific device or on the server.

Figure 24:
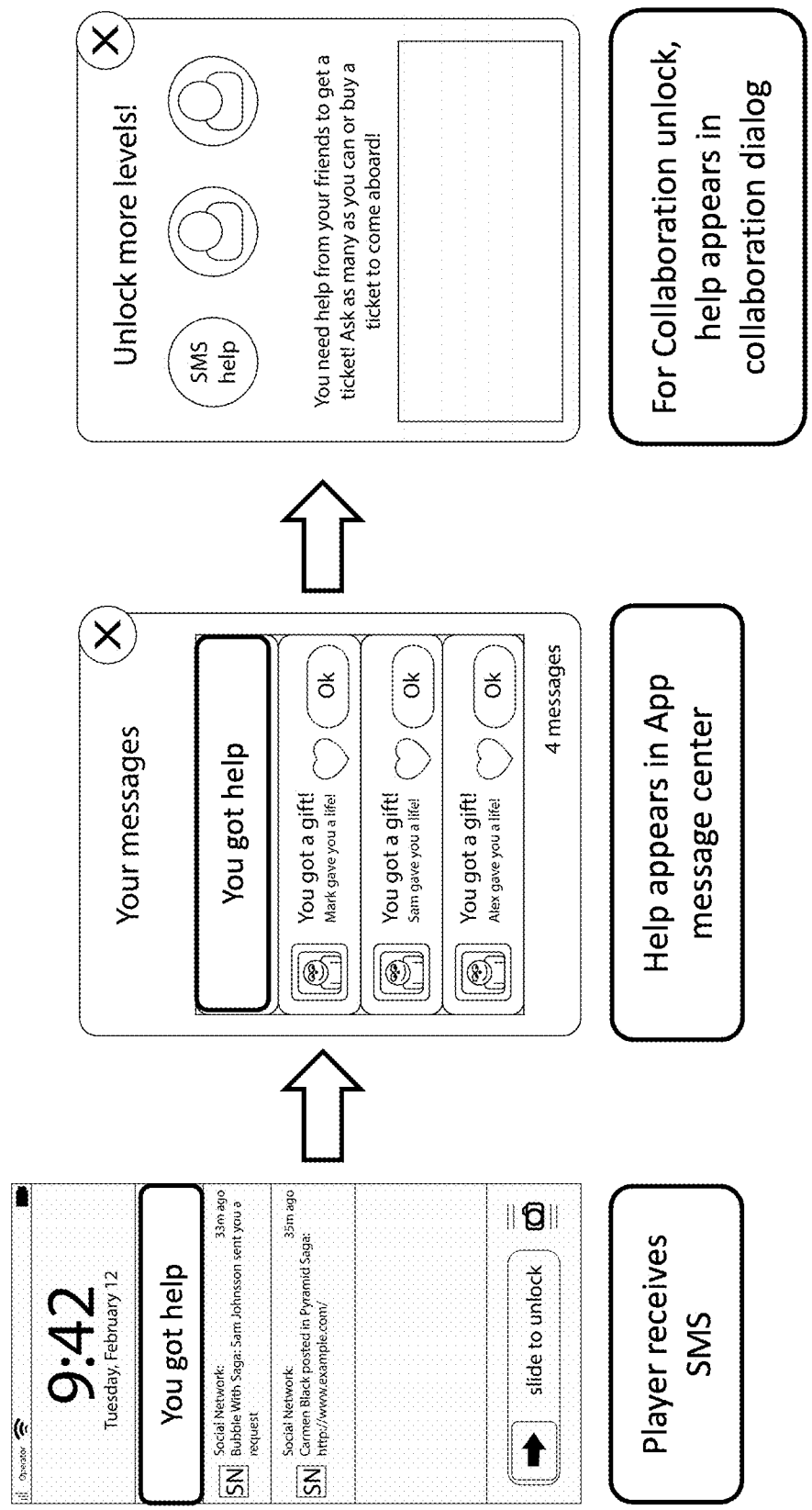

The player that has sent a help request will be notified when he has received the requested help. The help request experience can be seen in FIG. 24.

Further Explanation

When a player has run out of lives or is stuck at a collaboration block he or she can send a request for help via SMS. The SMS consists of a short message describing what help is wanted and a link. The message and link can be sent to one or more receivers. The link contains info on who sent the request, what the request was for and a timestamp. When the receiver clicks the link the required help is sent. Link usage is kept track of in the database so a link cannot be reused by the same user. If the player does not get help within a certain time span he or she gets help from themselves (looks like someone helped them). This is only to reward the behavior of asking for things and its use is limited.

The link payload consists of:
5 bytes user ID
1 byte transport medium and request type
2 bytes arguments (timestamp for life requests, episode and level index for collaboration blocks)

The data is then encoded in Base64, / is replaced by _ and = is replaced by empty string. The link is a normal http link. Nothing is stored server side until the receiver clicks the link.

Push notifications are used to close the loop and are also limited per 24 h period. In some implementations they are not needed for the help to get sent.

Invite Friends

Figure 129:
FIG. 129 shows friends that are playing the game.
Figure 130:
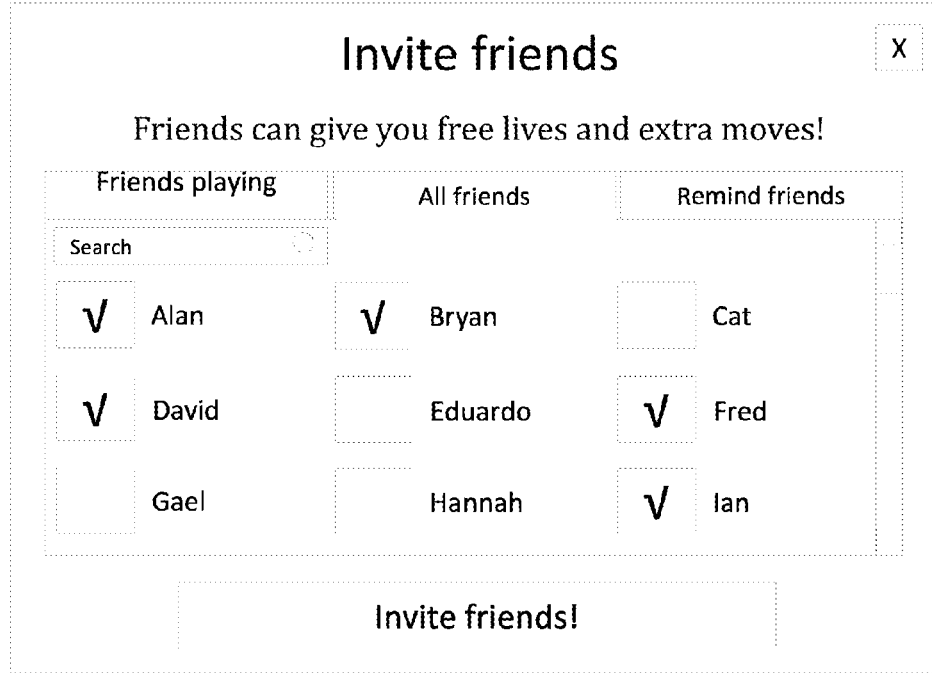
FIG. 130 shows all friends.
Figure 131:
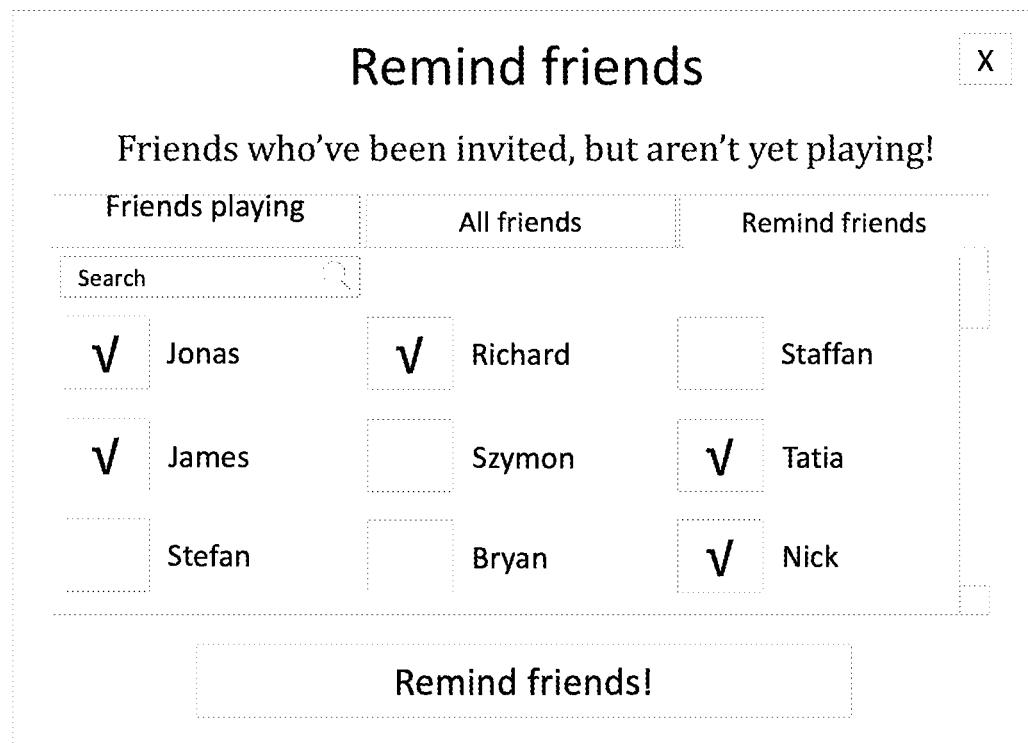
FIG. 131 shows the third tab with social network friends that have received requests or invites.

The player may in some implementations select subgroups of all available friends or filter the friends to only show the friends that also are playing the game. An exemplary implementation is shown in FIG. 129, FIG. 130 and FIG. 131.

The friend selection may appear when the player is to send requests to other player or ask for help. Exemplary implementations may include:
Send moves pop-up
Send lives pop-up
Invite friends pop-up
Other pop-ups which prompts the player to select friends By way of example one implementation where the player can select to filter the friends may be based on a certain criteria such as the level of interaction the friends have had in the past or the skill level or progress in the games. These different criteria are illustrated with a pre-filtering in three tabs in a pop-up window in the game. This popup window can be automatically initiated by the game, or requested by the player through for instance pressing a button in the game.

The list of friends may be populated from friends of the player that are also active in the game or only from friends on a social network. FIG. 129 shows the first tab open where friends from a social network who have installed the game are listed. In one implementation the default mode is that no friends have been selected. Clicking on a friend's picture or name will select that friend and a tick mar may appear to indicate that it has been selected.

Listed friends may be prioritised in the way they are shown in the list to the player. One such criteria in which the order of the listed friends show may be if they have paid for something in the game. Within that group players may be higher ranked if they have spent more money or if they have spent more money within a specific time period. Another criteria may be that the listed friends have been active in the game within a certain time period or with a certain activity level. Another criteria may be that the listed friends are ranked base don how many total game invites they have received to date, highest first.

If the user has no friends playing the game, this tab may be renamed 'Friends playing other games' and the same prioritisation may be applied to these game network players.

If the user has no friends at all playing games according to the filtering criteria then the tab may not appear.

The next tab in FIG. 130 shows all friends the player has connected with in the social network.

The third tab shown in FIG. 131 shows friends on the social network that the player previously have sent a request to. Only the friends that have not yet responded to the request are listed here. In an alternative implementation only the friends that have not yet installed the game may be presented in this tab. The player may tick some of the friends to indicate which to send a reminder to.

The friends listed in the different tabs may be prioritised further. The following refers to the tabs 'all friends' and 'remind friends' but the person skilled in the art will understand that this may in some implementations also be applied to other filtered groups.

Friends are prioritised in the following way:
1. Paying players within the game company's network, in order of CLV (customer life-time value) (highest CLV first), then in order of the invites received to date for the current game (highest first)
2. Non-paying players within the game company's network, in order of CLV (if CLV is >$x; highest CLV first), then in order of invites received to date in the current game (highest first)
3. Non-users of the game company's network (in order of invites received to date in the current game, highest first)

Ideally, this list should be easy to reorganise. E.g. in month 1 the focus might be on virality, so we would prioritise the game network's players known to be viral, but in month 2 we might want to focus on monetisation, so we would want to prioritise the game network's players who spend a lot.

Prompting invitees may be stopped at some point so that they are not being spammed. For instance, invitees who have received >10 invites should no longer appear in the list.

Customising Friend Selection Pop-Ups

Friend selector pop-ups may be customized according to two factors: (1) the user who sees them, and (2) the current priorities of the game environment where it has been implemented.

For example: the game team wants to push monetization, so in the 'Send moves' pop-up the user's friends are arranged according to their spend, and so only friends with the highest spend appear in the pop-up.

The standard implementation for showing popups is to show all friends. Reasons for customizing the popups can be several:
  Increase spend (e.g. prioritise friends with high spend/CLV)
  Increase retention (e.g. prioritise inactive friends)
  Increase requests sent (e.g. prioritise viral friends)
  Increase CTR on notifications by improving targeting (e.g. by increasing relevance to recipient)

All these give the game developer an additional tool to optimise performance of a game.

What Information can be Used for a Typical Implementation?

The players may be ranked according to a set of measures. For example:
  Spend (for example how much has this player spent on in-game items over a period of time)
  Virality (for instance how active is this player responding to notifications, help requests and other in-game viral effects)
  Activity (for instance how active this player is playing the game; when did the player last play or how many levels have the player played)

These may also be combined—e.g. if the game team wants to reactive lapsed spenders, they might want the send moves pop-up to display each user's friends in order of spend, but to display only users who have been inactive for 10+ days.

Examples of Implementation in a System

There are many possible approaches. Customisation could be approached on a game-specific basis, using only information relating to a single game (e.g. the game could customise pop-ups using only the game's data): This information is stored in the game's own database. But customisation may be much more powerful if it used data from across the games company network, using data from all games. That information is typically stored in a database.

How can we Use that Information to Support Customisation?

Customisation on a game-specific basis—the server creates the user rankings based their past behaviour in the game, and that determines which users the server sends to the client. The client would simply display the users selected.

Customisation on a game company network basis—we create user rankings based on information taken from a database, covering all their activity within the game company network. The rankings would be stored in a system, would be updated at least on a daily basis, and would be available to all games using that framework. An individual game's servers would pull the rankings out of the system, and determine which users to send to the client. The client would simply display the users selected.

Figure 25:
FIG. 25 shows a typical environment of the game Bubble Witch Saga
Figure 26:
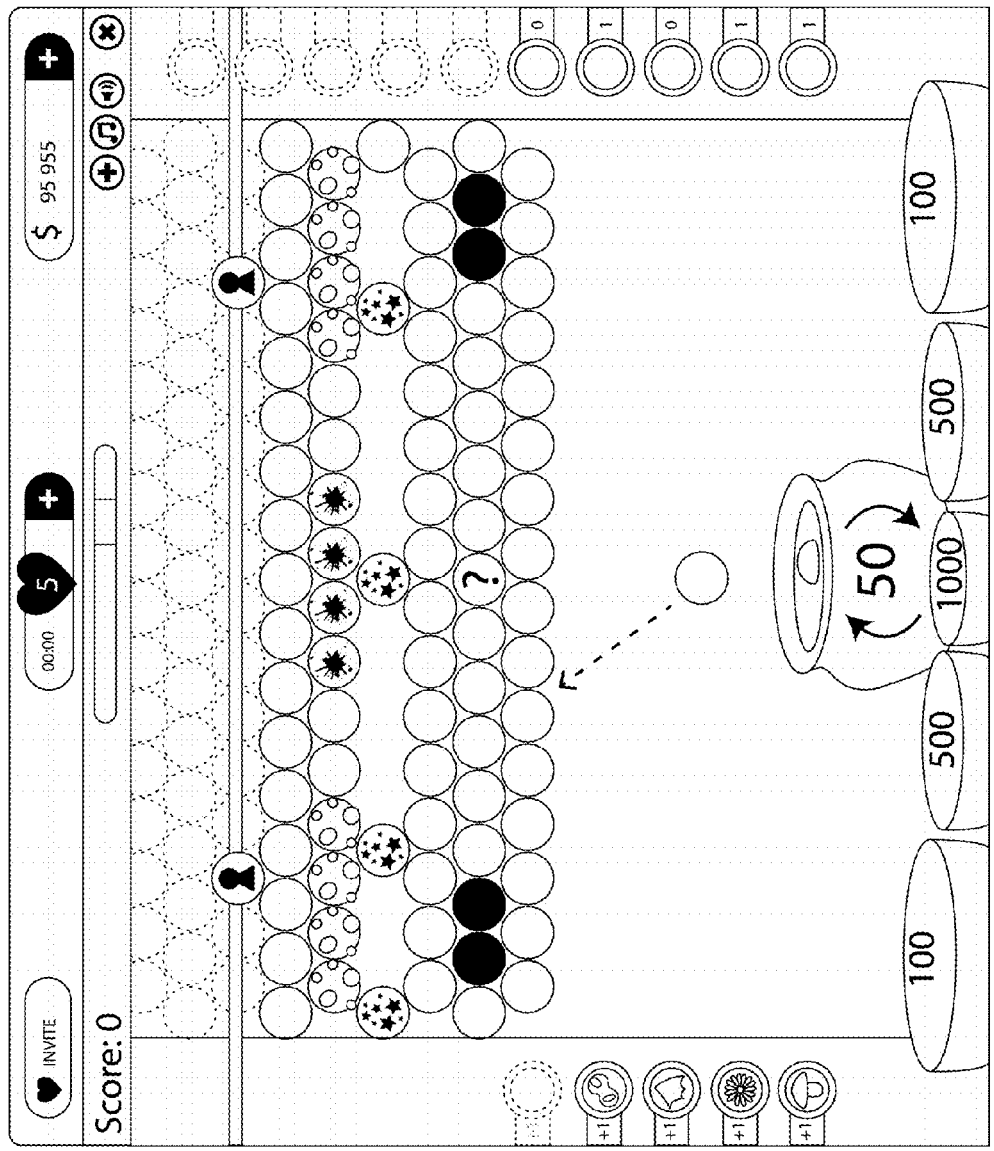
FIG. 26 shows one implementation of a bubble shooter environment

FIG. 25 shows a typical in game screenplay for the bubble shooter game Bubble Witch Saga. A similar gameplay is shown in FIG. 26, where bubbles to be popped are placed above a cauldron which in turn shows how many bubbles the player has left to shoot at the clusters of bubbles in order to match them in groups of three or more and as a result remove them. The bubble to be shot is placed just above the cauldron whereas the next bubble to be shot can be seen inside the cauldron. The player can swap between these two bubbles and choose which one to shoot first. In one implementation swapping bubbles is done by pressing spacebar. With the purchase of a Charm two bubbles can appear in a specific area on the game board, allowing cycling using spacebar between three bubbles.

Figure 27:
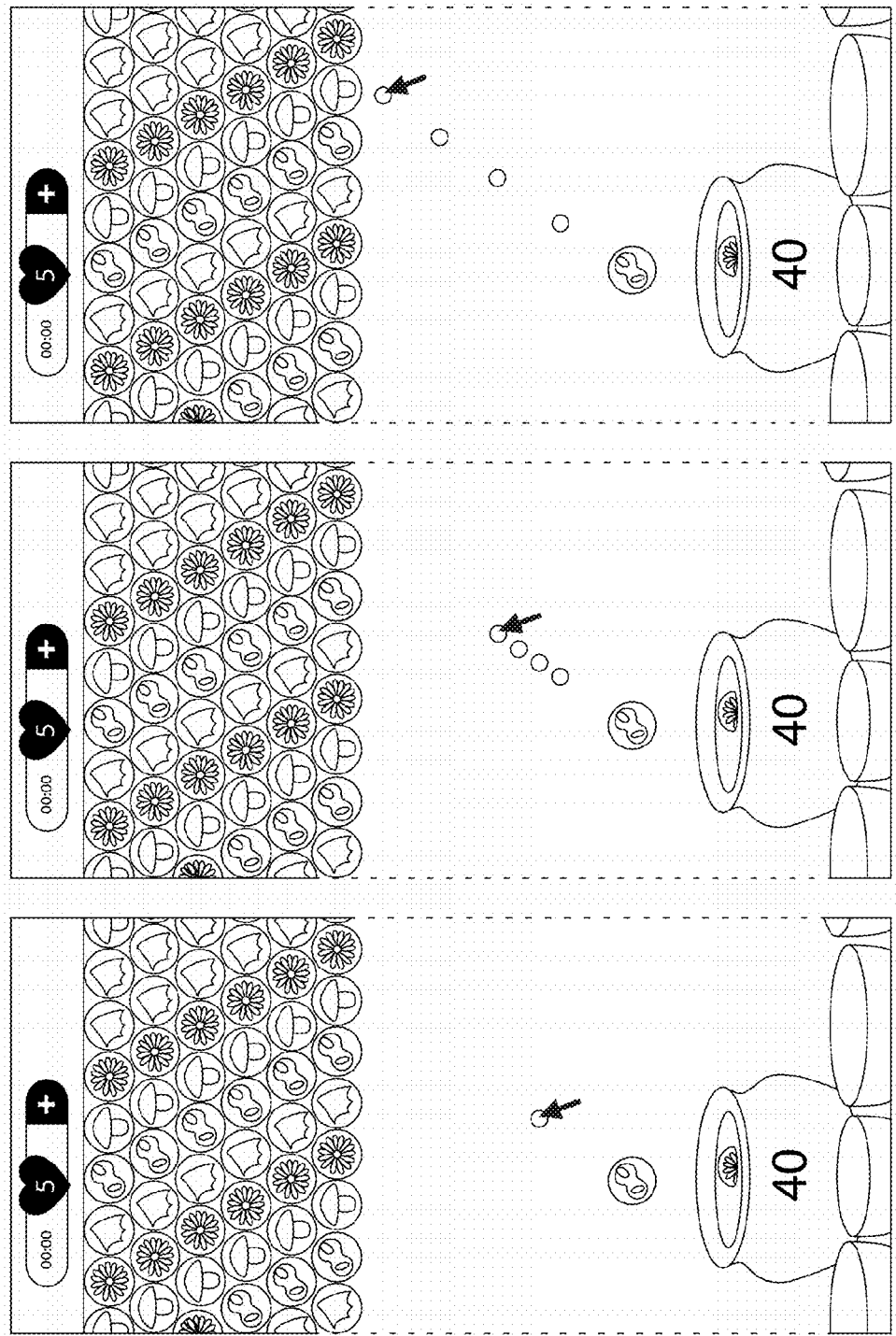
FIG. 27 shows one implementation where the trajectory of the shooter can expand.

The extended aim above the bubble can in FIG. 27 be seen as four dots, to allow the player greater accuracy in shooting the bubble from the cauldron.

FIG. 4 shows three spiders, which depending on the colour will increase player's score and so the player should aim to get bubbles to drop on this spider. The player must aim to pop at least nine bubbles on the top row of the cluster of bubbles at which point all other remaining bubbles will fall (illustrated in FIG. 28). Any bubbles left in the cauldron that were not fired will be shot out in random directions (illustrated in FIG. 30), earning the player more points. The bubbles will fall into the four cauldrons below, which are worth different amounts of points (100, 500, 1000) and bounce off the spiders. As the score increases the star meter will fill up. As well as popping at least nine bubbles on the top row, the player must fill this meter to a level where at least one star is gained, which appears to the right hand side of the star meter.

On the right side of FIG. 26, possible Wishes have a dedicated area. Wishes can be bought with Facebook™ credits for use on a particular level, the wishes with solid lines have been unlocked while the ones illustrated with broken lines are still locked. Wishes can be considered temporary Charms and they are unlocked as the player progresses through the levels.

On the left side of FIG. 26, a bubble of each colour is shown which the player can purchase, again for Facebook™ credits, if they require that particular colour for a specific shot. This can make the difference between completing or failing a level. As many of these can be bought, as the player requires, compared to the Wishes which can be only single use.

FIG. 25 illustrates the option to open the game in a pop out screen, this is seen in the top left area of the image. In the lower left part of the screen a button to quit the game is found together with sound and music on/off buttons. In the upper left of the screen there is a button allowing the player to invite friends to play the game from the entire list of their Facebook™ friends.

In the upper part of the screen there is a timer showing the amount of time left until a life will be given to the player, counting down from 30:00 to 0:00. The number of lives left is also displayed. If the counter is at 0 and the number of lives has not changed for at least 30 minutes, then the player is currently on maximum lives. This maximum life cap can be increased as the player progresses through the game and earns stars. There is also an option for the player to earn extra lives by either watching a sponsored advert, or requesting help from friends.

The amount of Facebook™ credits that the player has purchased using currency, or earned through participation with Facebook™ partner firms adverts is also displayed and shown to the player. The Facebook™ credits can be bought or earned using a designated button found in the user interface. In one implementation the button is typically found in the upper part of the screen.

There is also a dedicated area showing the player's amount of in-game coins which are earned through gaining stars on each level or are given to the player by friends. If the player so chooses there is an option allowing the player to purchase extra coins using currency or Facebook™ credits. A designated area of this can be found in the user interface and can be reached with a button typically found in the upper part of the screen.

Figure 30:
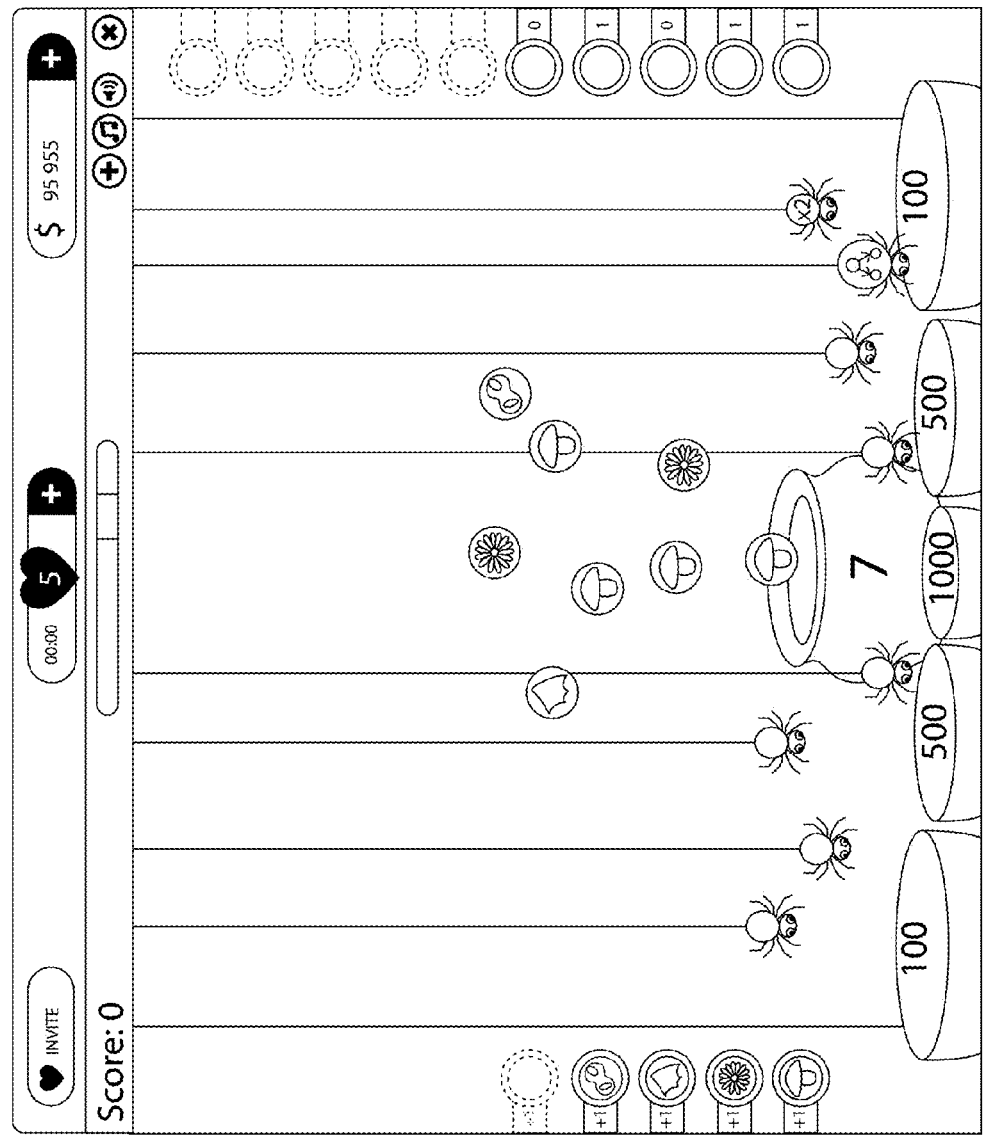
FIG. 30 shows remaining bubbles being shot.

FIG. 30 depicts the cauldron shooting out the spare bubbles at the end of the game once the remaining bubbles have fallen down after nine holes have been made in the row of bubbles immediately adjacent to the ceiling. The spiders gained throughout the game remain to increase the score accumulated by the shot-out bubbles. The star meter to the bottom right hand corner of the screen will increase when these bubbles fall into the pots at the bottom. All ten spiders can be shown here, with their relative positions against the background. Also, the value of each lower cauldron is show (100, 500, 1000).

FIG. 26 shows the starting screen for a level on Bubble Witch Saga. The bubbles that need to be popped are hanging from the edge of the upper part of the game area. Shot bubbles can bounce off edges of the game area. There is also a star meter. The points earned from popped bubbles falling into the cauldrons, which raises the star meter, is also shown. The user can use the mouse to click on the arrows located on the cauldron to switch between the bubble to be fired and the one resting in the cauldron.

Figure 28:
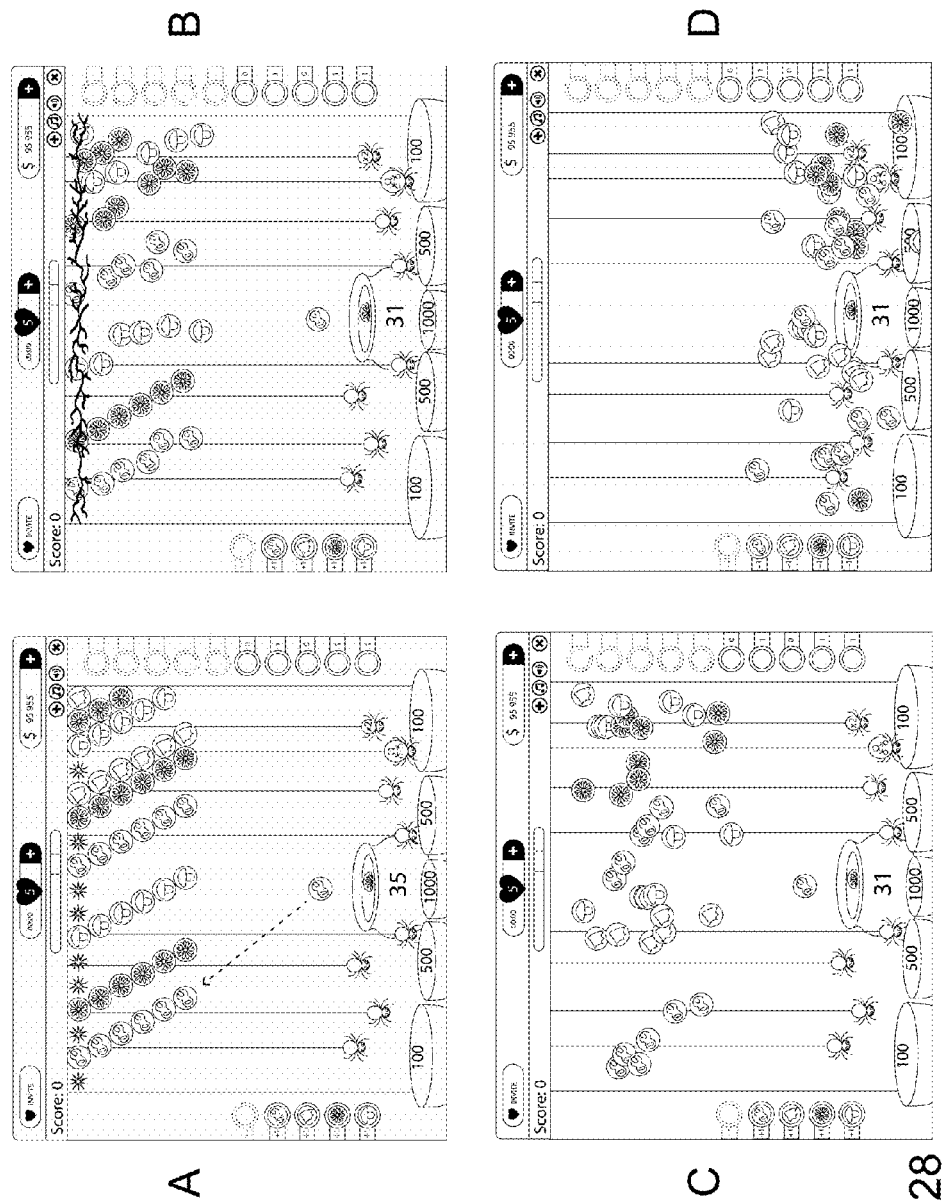
FIG. 28 shows when nine bubbles are cleared from the ceiling and remaining bubbles fall down in a cascade as the level is completed.

FIG. 28—A depicts the 'Holes by the ceiling' represented by white uneven stars where bubbles have been popped. 9 of these holes are required to make the remaining bubbles drop. In the progression of playing the level it may be seen that the star meter as well as the score is increased from bubbles being popped and bubbles falling into the cauldrons. The figure also shows that five out of ten unlocked wishes are available to use immediately or to buy with Facebook™ credits. There is an edge which the shot bubble can bounce off. The left side of the screen shows that extra bubbles of any colour can be purchased with Facebook™ credits.

FIG. 28-B continues from FIG. 28-A and shows the lightning strike, which brings down the remaining bubbles once the nine holes have been made in the row of bubbles adjacent to the ceiling. These bubbles then fall down the screen to the five virtual cauldrons at the bottom, which give different amounts of points. If these falling bubbles hit spiders before they fall into the cauldrons then the bubbles will be worth more points.

FIG. 28-C depicts the falling bubbles after the lightening strike caused by at least nine holes being made in the row of bubbles adjacent to the ceiling. The falling bubbles may fall in a layered cascade where one is in front of the other.

Figure 29:
FIG. 29 shows the extra points given when a bubble has bounced on spiders.

FIG. 28-D continues on from FIG. 28-C. Increased points may be shown here as the bubbles fall into the containers. By hitting spiders on the way down, bubbles contribute with more points. FIG. 29 shows that if a bubble has hit some spiders and fallen into for example the 500 point cauldron then the bubble has actually contributed with 1750 points instead of 500. The star meter, has filled up all the way and three stars can be seen to the right of it in the lower part of the screen. The upper part of the play area is now empty as all the bubbles have fallen down from the top of the screen. The vibrations to show the bounce off the spiders can be seen by the bubble in the bottom left hand corner.

FIG. 27 depicts the bubble to be shot against the bubbles at the top of the screen to try and match them and therefore score points and possibly cause others to fall. The next bubble is placed inside the cauldron and partly hidden. It can be switched with the current bubble if the player so chooses. They may or may not be the same colour bubble. The leftmost image shows the extended aim for the bubble to be shot, and as the mouse is pulled away to the right, the extended aim follows it and extends further, represented by the middle and the rightmost image. It can also be seen that this extended aim moves towards the position of the mouse, as the mouse moves to the position of bubbles to be matched.

Figure 31:
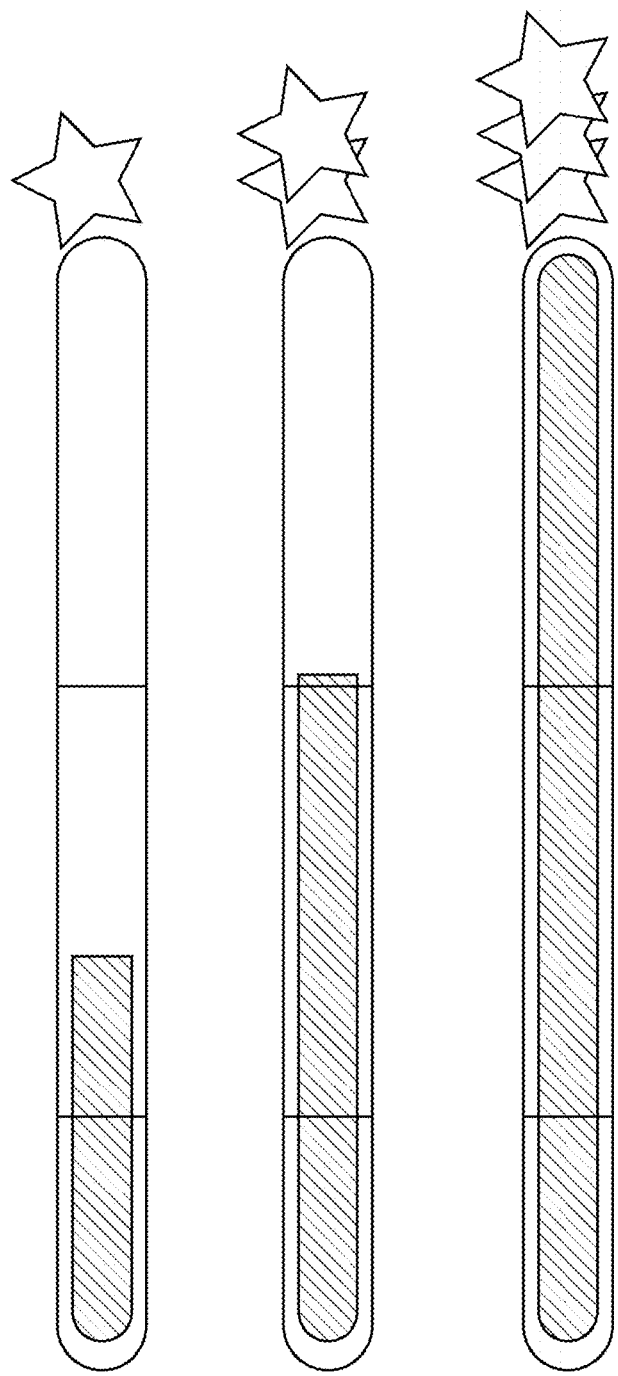
FIG. 31 shows one implementation of a star meter

FIG. 31 depicts a star meter filling up. The star meter fills up as more points are gained in the game from bubbles being shot or falling into the cauldrons. More points are gained by bubbles that hit spiders on their way into the cauldrons. The threshold values for one star, two stars, and three stars are arbitrary and vary depending on the level. The illustration shows that when each section of the star meter is full then three stars are attained. The upper star meter shows that the points are not enough to go past the two star line hence only one star has been earned so far. The middle star meter shows that as the star meter has passed the first and second line for a star, two stars have been earned. The bottom star meter shows that enough points for being awarded three stars has been earned.

Figure 32:
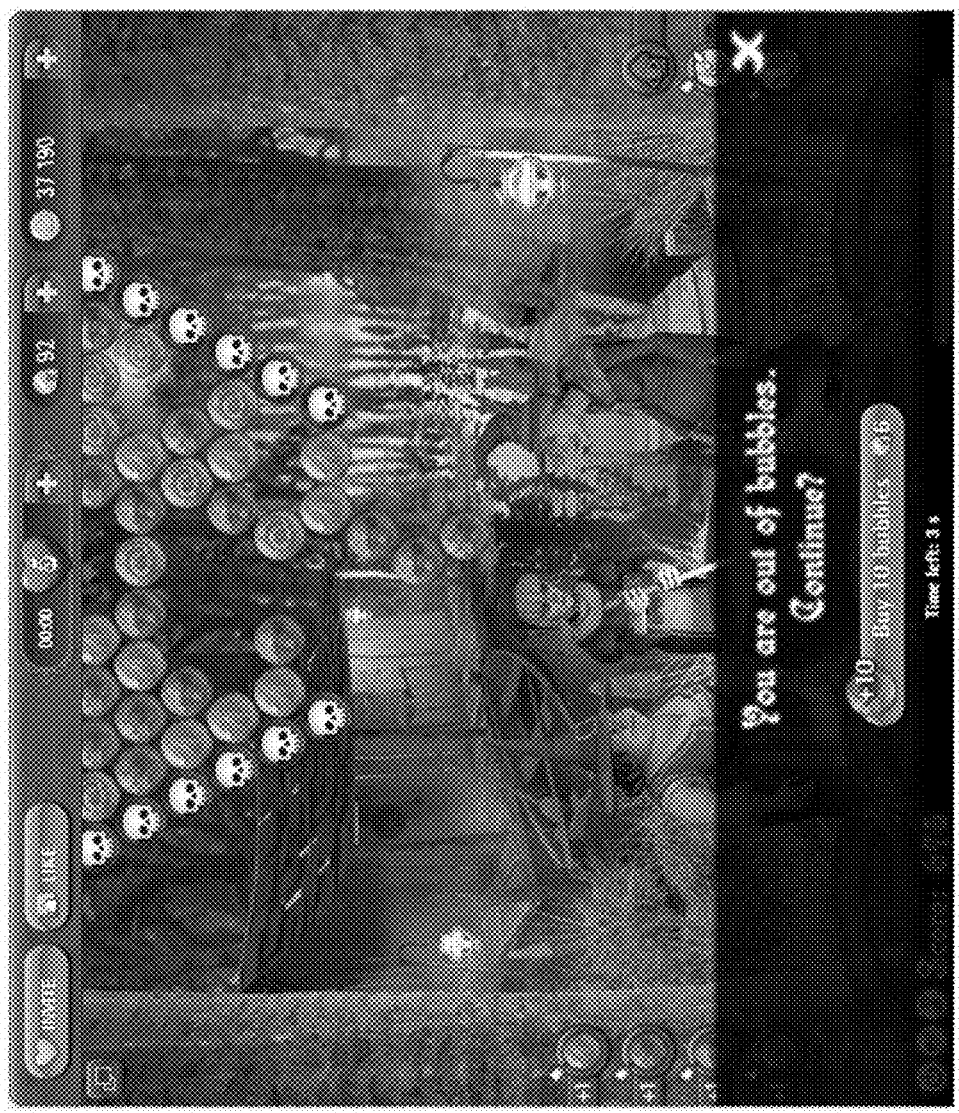
FIG. 32 shows the option to buy more bubbles.

FIG. 32 shows that if the player runs out of bubbles, the game offers the chance to buy more bubbles using Facebook™ credits. This would return the player to the game and allow the player to continue playing. However, this screen only stays active for a few seconds. If the player does not want to buy more bubbles then the cross in the corner of the pop up will return the user to the map to the next screen quicker than having to wait for the timer to count down.

Figure 33:
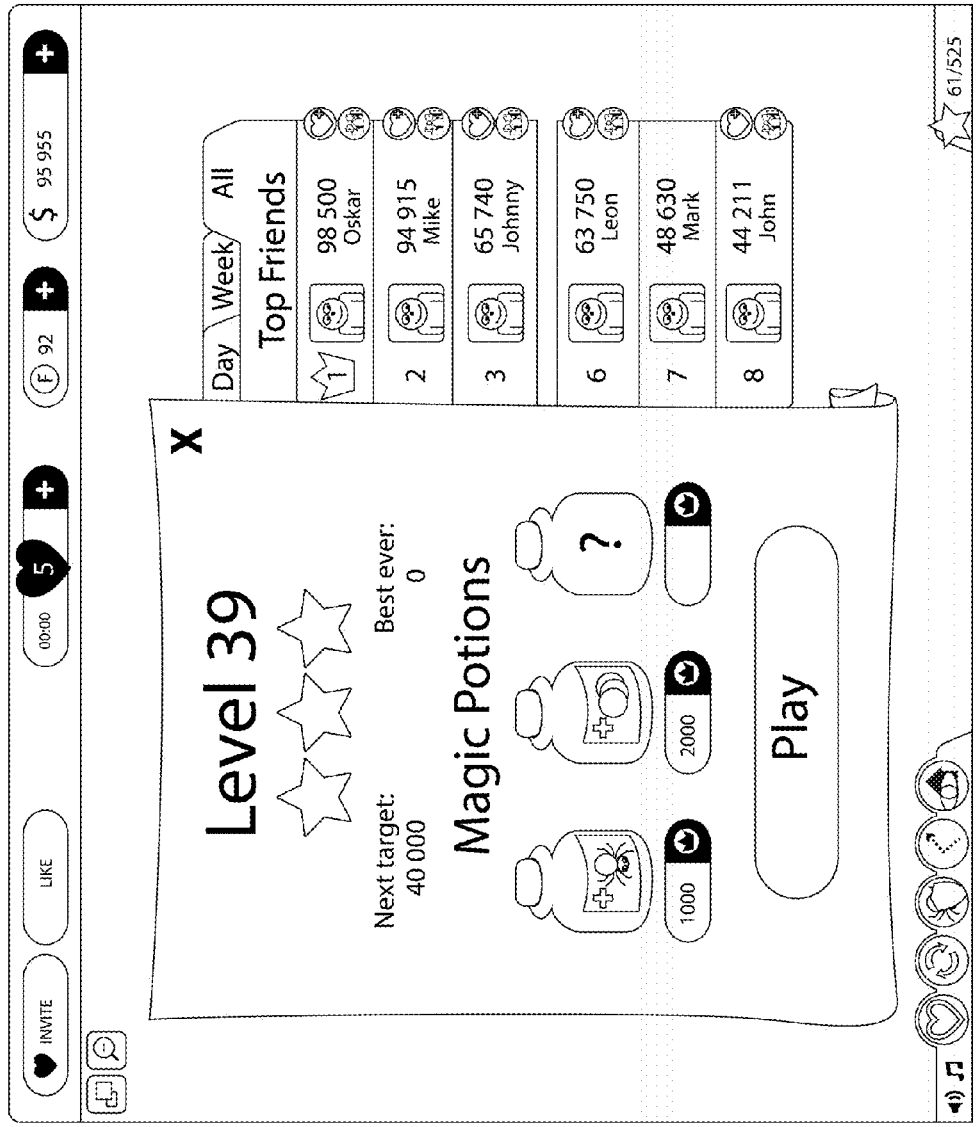
FIG. 33 shows one implementation of a pre-level pop up window.

FIG. 33 shows one implementation of the screen displayed once a level has been clicked on. The leaderboard for the player's friends is on the right hand side, with options for every friend either to send the friend a life, represented with a heart with a '+' next to it, or to send the friend a gift, which can only be in the form of a Charm, bought with Facebook™ credits. The player can also see their own personal best score received on the specific level. The screen also shows potions or boosters that may or may not be unlocked. In FIG. 33 a locked potion is shown with a question mark and the player needs to gain more stars throughout the game in order to unlock it. The left and middle potions are unlocked and they can be bought for use in the game using in-game coins. These coins can be gained through friends and earning stars. The screen also displays the number of points needed to gain the next star, in this case, 40,000 points are needed to get one star. Furthermore, from this screen the player can see the number of stars earned on the level depending on the number of points gained.

Figure 34:
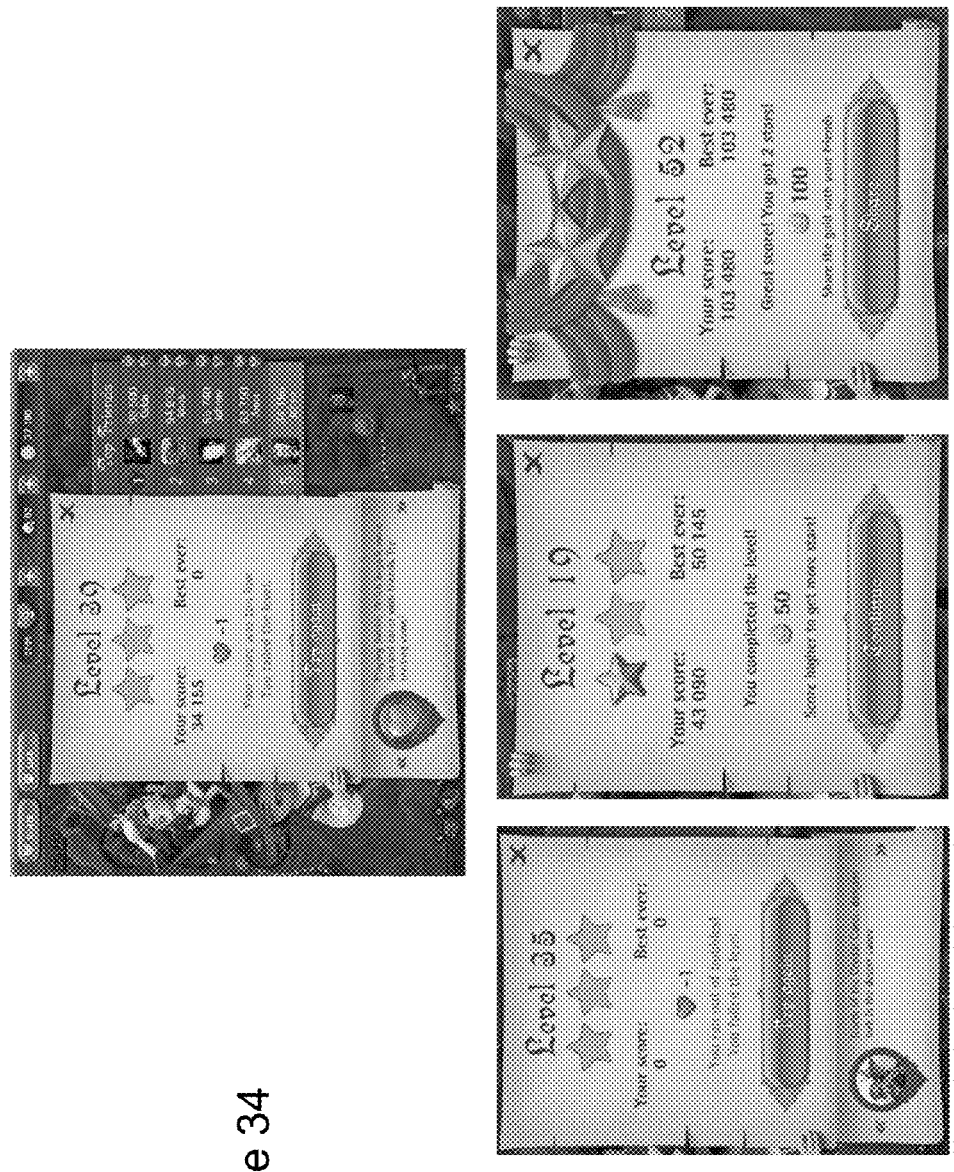
FIG. 34 shows different screens shown when completing or failing a level.

FIG. 34 shows different screens when having failed or successfully completed a level. These screens may contain advertisements encouraging the player to invite friends to the game. The score which the player has just attained is shown. If enough points have been gained to fill the star meter to the first threshold, then stars earned during the level may also be shown. In one implementation, the stars earned are downlit from the top and has defined edges on the contours, whereas the space for stars that have not been earned is dark and dull. The player can also view their best ever score for the level upon completion, so if the level is not completed, this will stay at 0. If the level is not completed, a life will also be lost, indicated by. Regardless if a level is successfully completed or failed, a leader board of all the player's friends and their respective ranks for the particular level will be shown. As in FIG. 33, both lives and gifts can be given to the player's friends through the leader board shown in the completed/failed pop up windows. In the leader board, the player will also see their own position compared to their friends. Upon a successful completion of a level, as can been seen in FIG. 34, gold is given to the player. The amount of gold given to the player is increased with the number of stars earned.

Figure 35:
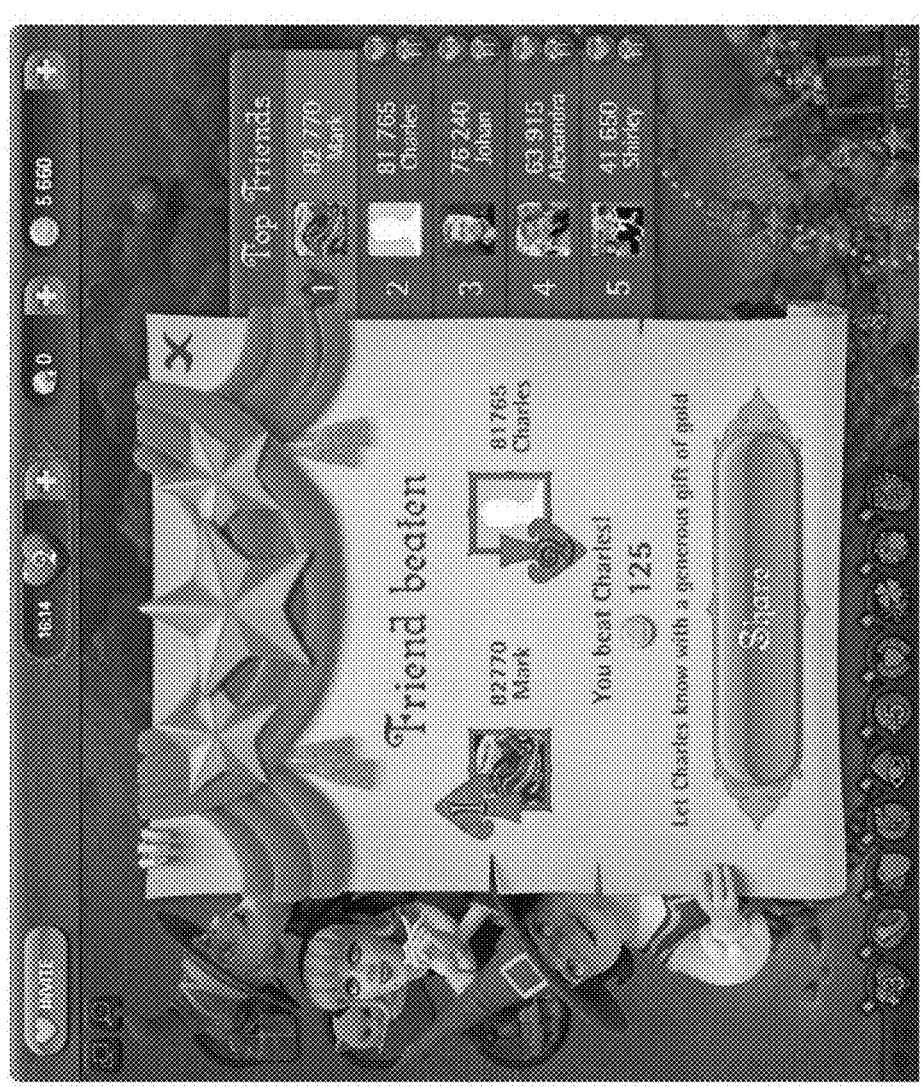
FIG. 35 shows one implementation when the player has beaten the score of a friend.

Upon playing the same level again after first completing it, if the player beats a friend on their leaderboard, the screen in FIG. 35 appears. It shows the usual completion screen but modified with larger stars and a red banner draping along the top of the scroll and the avatars of both the player and the beaten friend. When this happens, the player is rewarded with coins and these coins can also be shared with the person that the player has just beaten. On this screen the player can also see their new relative position on the leaderboard.

Figure 36:
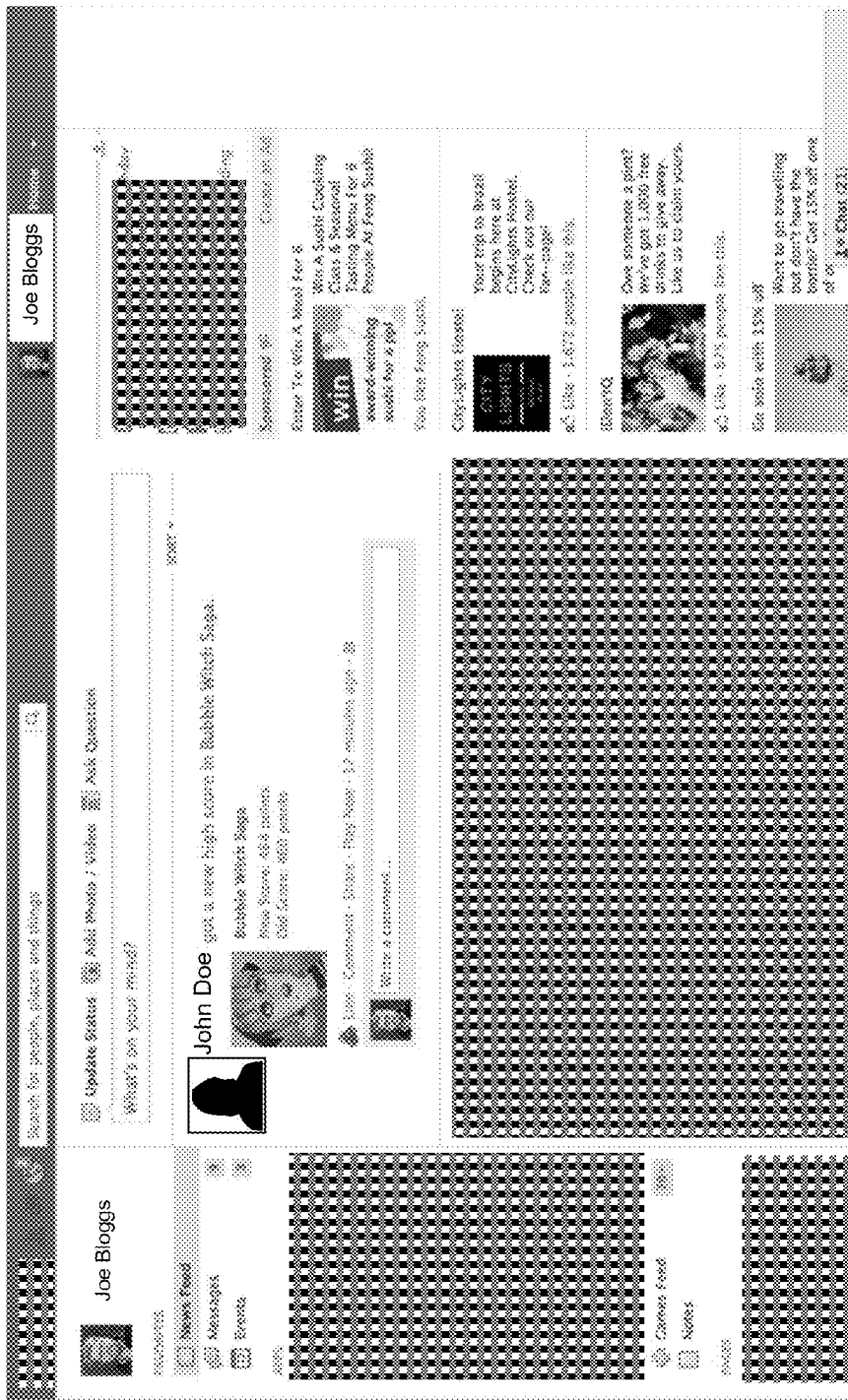
FIG. 36 Shows a social network interface.

FIG. 36 shows that Bubble Witch Saga causes notifications on Facebook™. The game can also post on the player's behalf so that certain game events will appear in the newsfeed, and on the player's timeline. On this post the details of the event or achievement are displayed to all of the player's Facebook™ friends.

Figure 37:
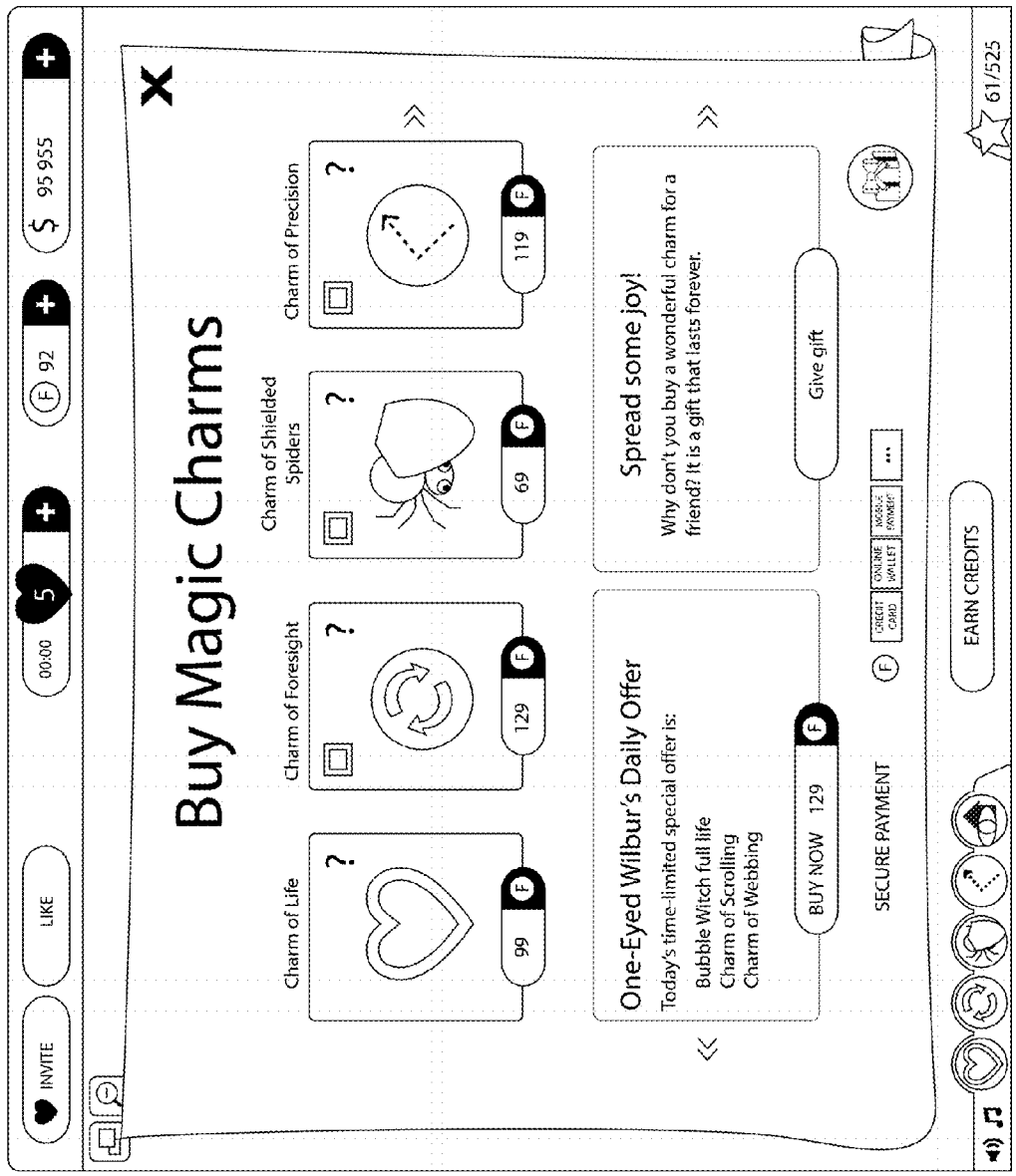
FIG. 37 shows one implementation of a virtual shop.
Figure 38:
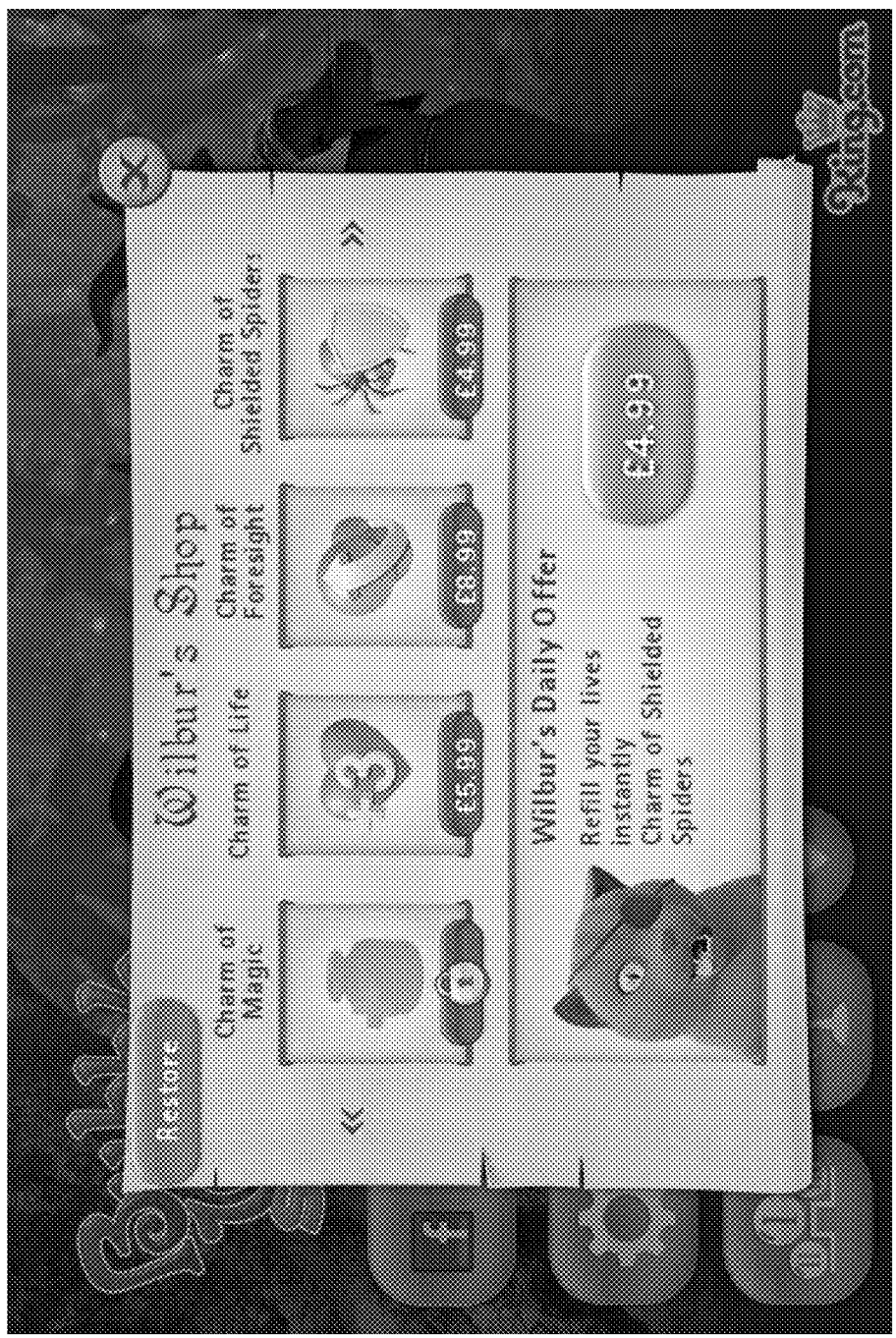
FIG. 38 shows one implementation of a mobile version of an in-game shop.

FIG. 37 displays a virtual shop, which in one implementation is called 'One Eyed Wilbur's Shop', where players can purchase Charms, with Facebook™ credits bought with currency or earned through Facebook™'s partners. The shop has four charms visible at a time but there are more available to buy which the player can scroll through. In this implementation the scrolling is done sideways. The price for each charm is show in Facebook™ credits. Most items in the shop have a '?' sign indicating that if pressed they display more information about what the items do. Some of the shop items also has a video showing visually their effects in game. In the lower right area FIG. 37 there is an icon with a present on it, this icon gives the player the option to gift any of the available charms to friends. FIG. 37 also shows that each day 'Wilbur' has a new offer for every player in the game, and that more information about the charms or offers can be attained by scrolling. FIG. 38 shows one implementation of a virtual shop where the shop is displayed in a pop up window and the background of the game can be seen behind it. FIG. 37 also shows that gifts in the form of Charms can be given to friends and the payment methods that are accepted for Facebook™ credits.

Figure 39:
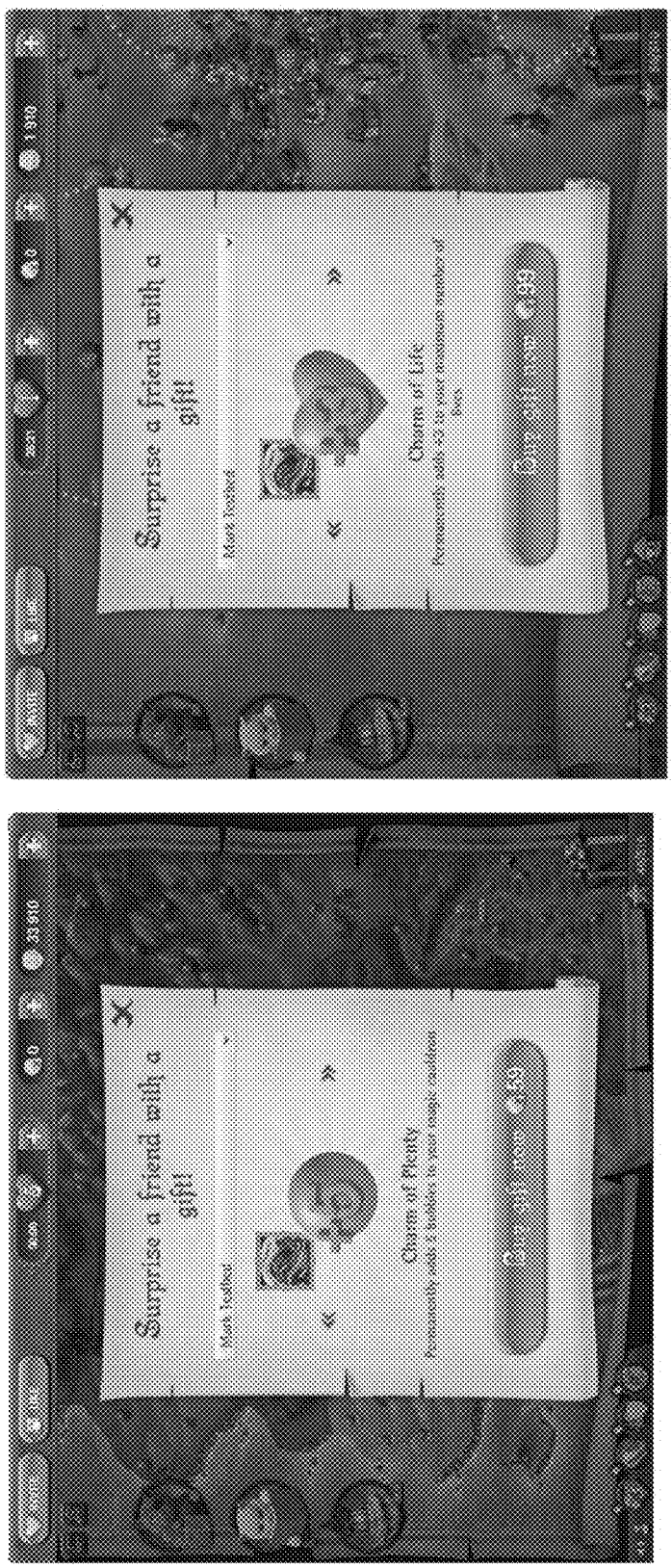
FIG. 39 shows one implementation of a spontaneous pop up suggesting to send a gift.

A spontaneous message such as the ones in FIG. 39 sometimes pops up on screen mid gameplay in the form of an unrolled scroll of paper. FIG. 39 suggests to the player that they surprise a friend with a gift (of a Charm). It allows the player to select the friend from a drop down list. The gift the player decides to send can be changed by clicking the scroll button. In order to send this gift of a charm, the player must buy it using Facebook™ credits. The scroll with the message on it can be dismissed by clicking the cross in the top right hand corner. The avatar of the friend receiving the gift is also displayed, here in a box under the receiving player's name.

Figure 40:
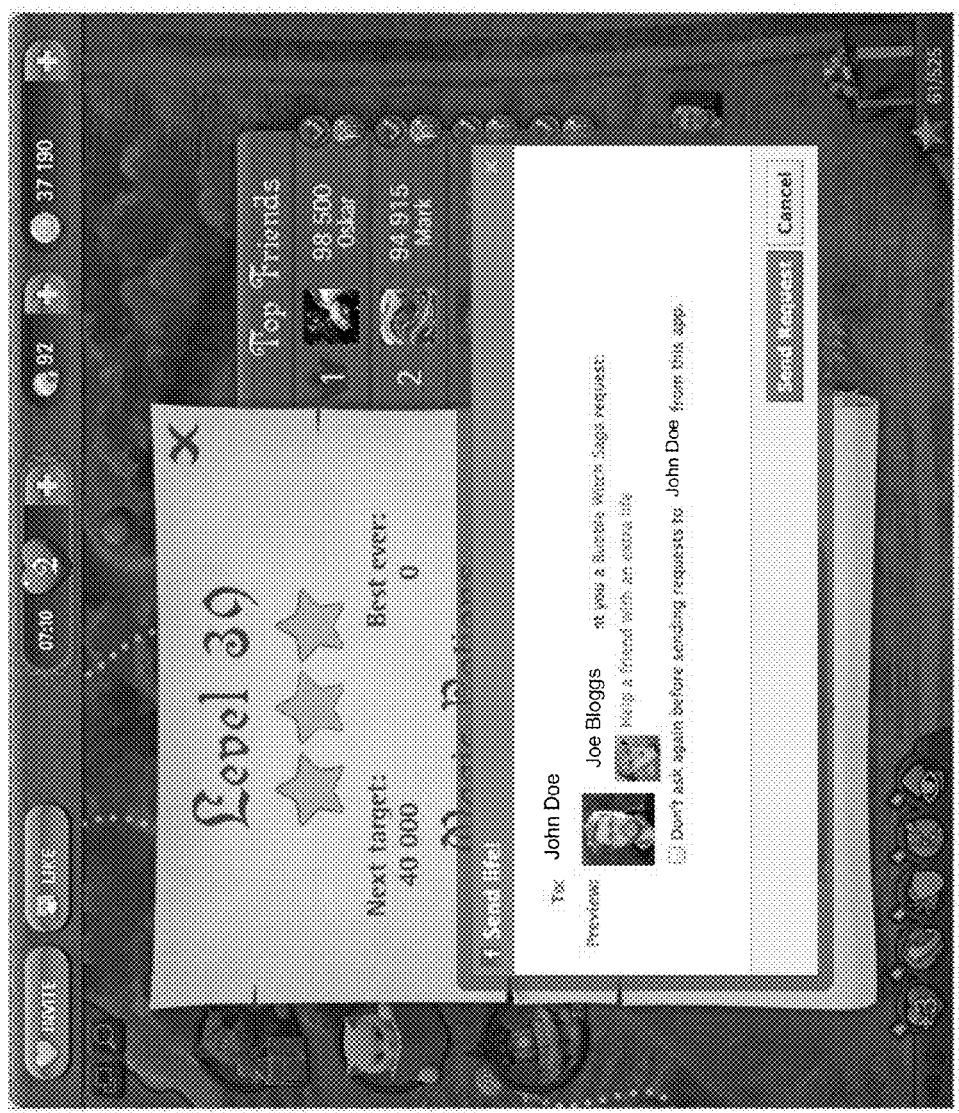
FIG. 40 Shows a popup window.

FIG. 40 depicts the prompt to the player to help a friend. The figure shows the friend and their request. There is a check box which will stop these pop ups appearing in the game when ticked, and the button labelled 'Send Request', will send the friend the help they require. This prompt can pop up at any point during gameplay. It is possible for the player to send a friend another life even if they have already given them one where the heart with the '+' has been replaced with a tick to indicate that a life has been sent. There is also the option to send a friend a gift of a Charm.

Figure 41:
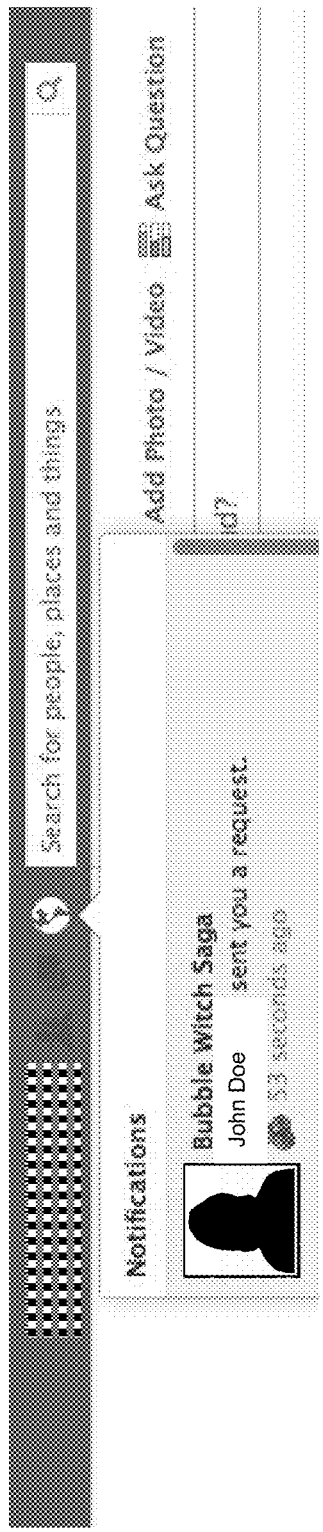
FIG. 41 Shows a social network notification.

FIG. 41 shows the request from a friend to the player via the Bubble Witch Saga game. The figure displays the notification button universal to Facebook™, and the resulting drop down list that appears upon clicking this button. The notification itself displays the name of the friend of has sent the request but does not specify the request so that the player has to log on to the game to discover what the request is. The request also shows that the notification is from the application Bubble Witch Saga.

FIG. 38 and FIG. 42 to FIG. 49 show the Bubble Witch Saga game for the iPhone™ as displayed on a handheld wireless device, a smartphone. The game can be operated with a finger or a stylus on the device's touch screen.

Figure 42:
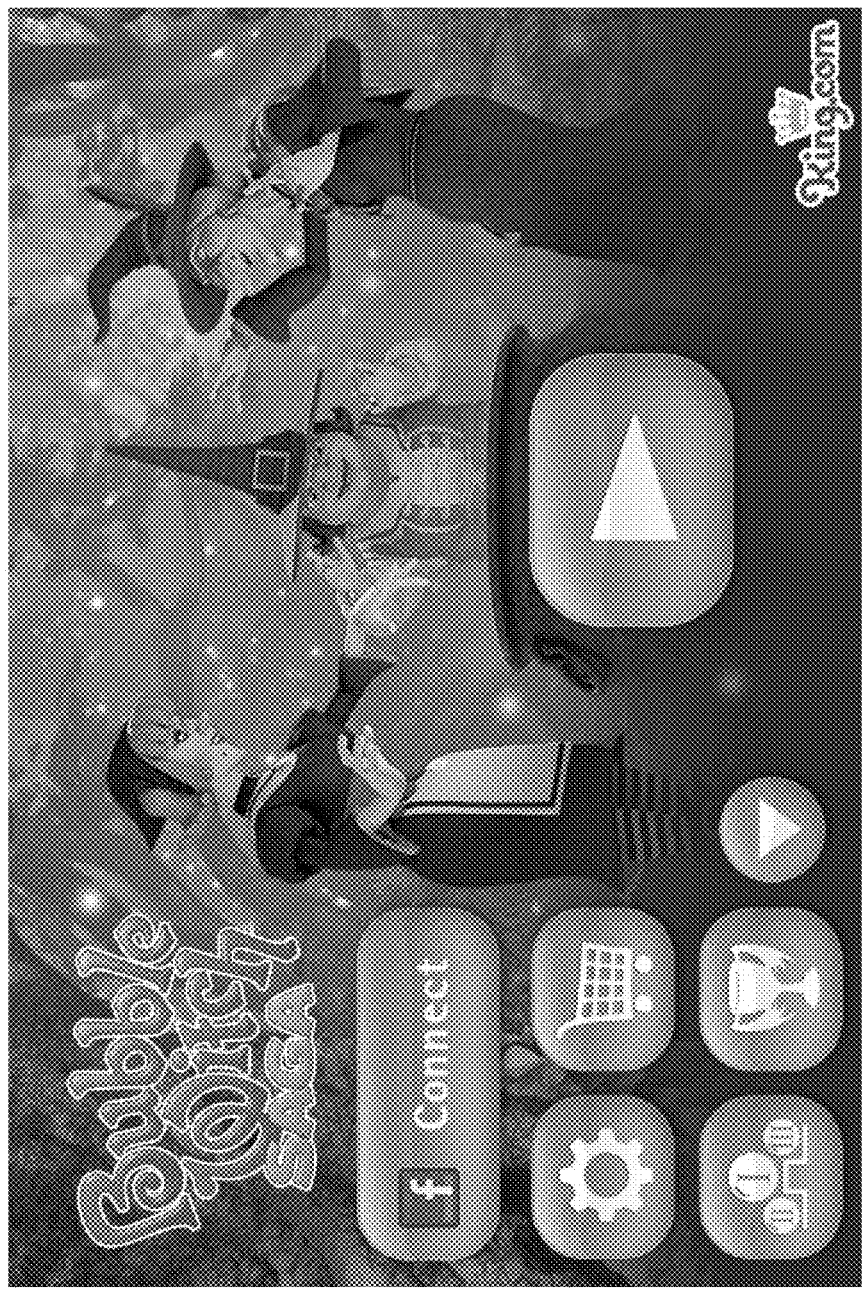
FIG. 42 shows one implementation of a start screen.

FIG. 42 show the start of the game, where the up arrow icon has been pressed to reveal more information and options. There is a button letting the user connect the game with Facebook™ to sync the game activity and retrieve the status of the game play on that platform. The user will also connect with the "friends" on Facebook™ and is able to send and receive notifications and requests from the friends.

Settings (see FIG. 43) can be reached from the screen of FIG. 42 as well as a leaderboard. The shop is also reached from the screen of FIG. 42 and is shown in FIG. 38. The player may earn achievements which again can be reached from FIG. 42 and viewed in FIG. 44. The player can choose to hide all the extra information in FIG. 42 as well as actually starting the game.

Figure 43:
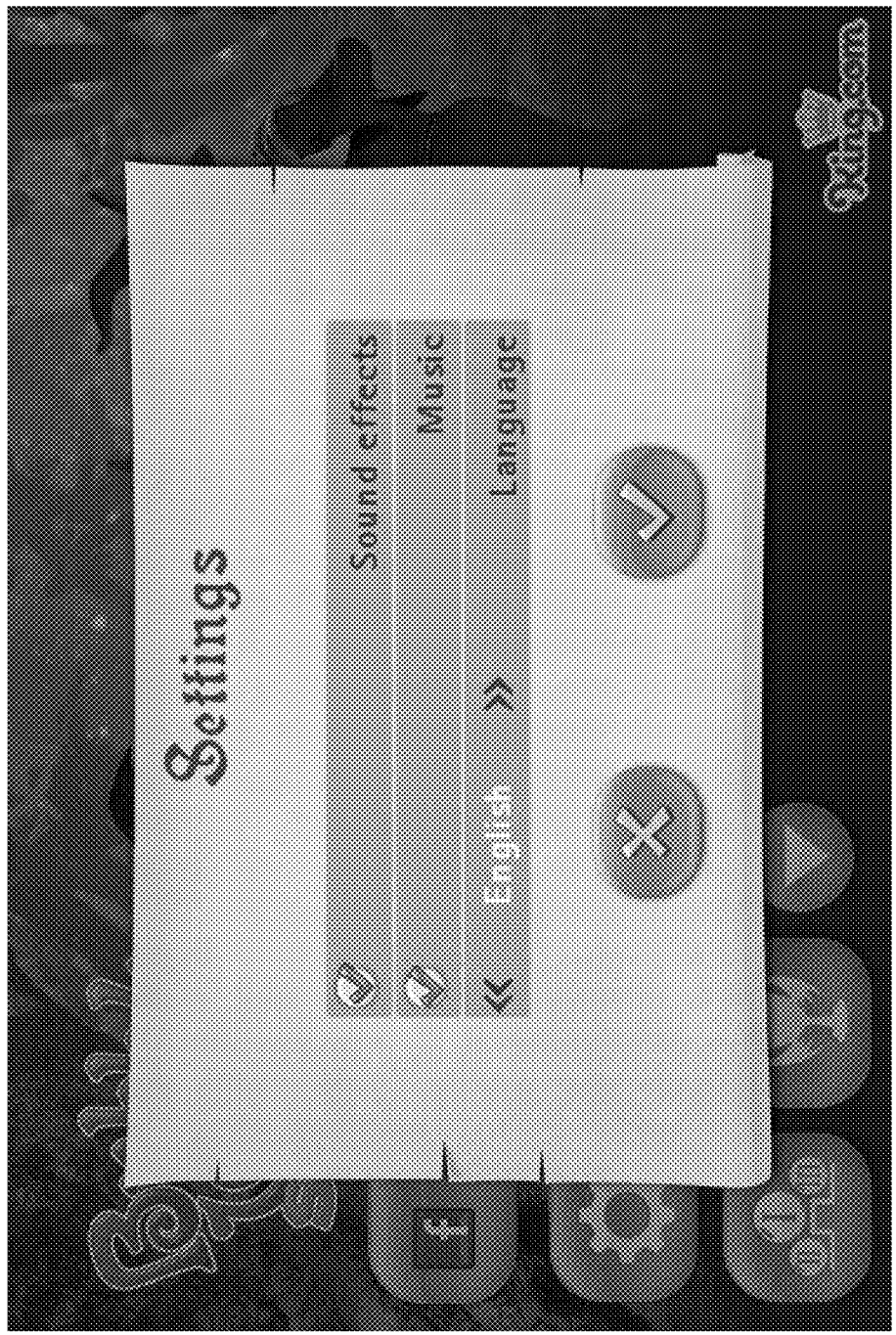
FIG. 43 shows one implementation of a settings screen.

FIG. 43 is the settings screen. The user can change settings for sound, music that is played and also language. Other settings can also be available for the user to adjust.

FIG. 38 shows the shop where the user can buy power-ups for the game. The user can pay for the power-ups with real-world money or in an alternative implementation with credits or a virtual currency. The iPhone™ implementation of the game offers the purchases to be carried out through the Apple App Store™ account. In an alternative implementation in-game currency can be purchased from the shop.

Power-ups can be unlocked by the user as he plays new levels and opens up levels or reaches goals in the game.

The power ups-purchased in the game on the handheld device can also be access if the game is played on any of the other linked platforms, such as on Facebook™

A leaderboard may show friends and other players of the game and their overall score in the game. The score shown in an example is the stars earned for each level. The user can change the time for which the score shown have been collected. The scores shown are grouped in the player's friends and all players in the game.

A leaderboard may also allow the user to rate the game in the application app store, in one case the Apple App Store™.

Figure 44:
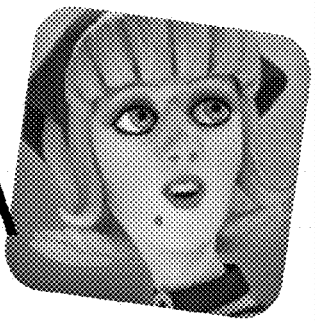
FIG. 44 shows one implementation of an achievements list.

The screen in FIG. 44 shows the top portion of the achievements screen which may be scrolled down for further displayed information. Achievements are tasks the user can solve during the gameplay. They can be to complete a certain number of levels or pop a number of bubbles with one shot. The number of achievements completed by the user so far is displayed together with the total number of available achievements.

The screen also allows the user to rate the game in the application app store, in this case the Apple App Store™.

When a user has completed achievements they may received 5 points for each achievement earned. When the user is in the progress of completing an achievement there may be a status bar showing the completed percentage of the total achievement. If an achievement has not been started then the percentage meter may not be shown.

Figure 45:
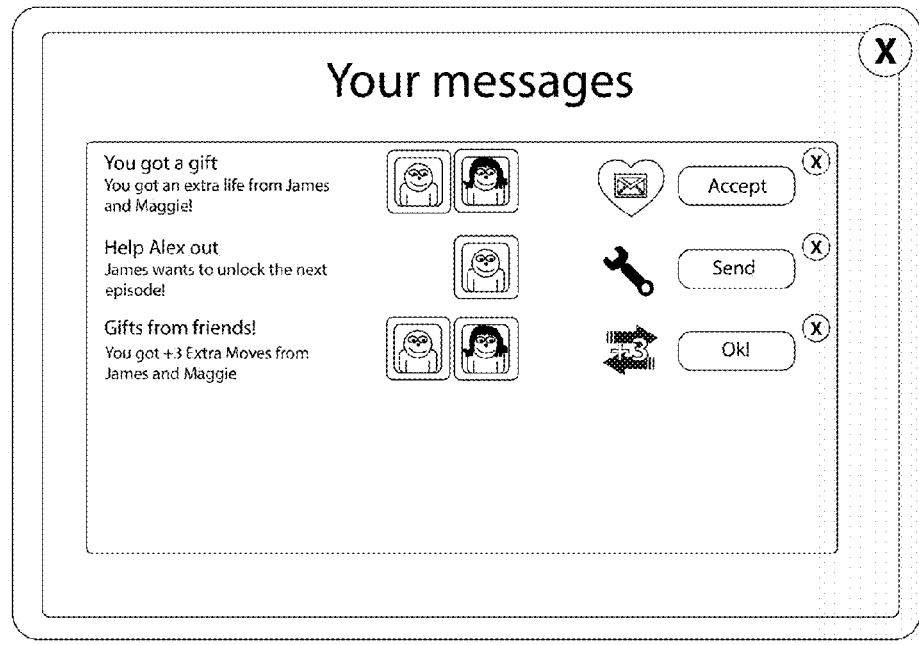
FIG. 45 shows examples of game notifications.
Figure 45:

If the user has connected the game with a social network, for instance Facebook™ then the user can receive and send requests and notifications to friends. FIG. 45 shows received gifts from two friends as well as a notification that a friend has sent a request for a life. The user can accept that request and send a life by clicking on the arrow.

Figure 46:
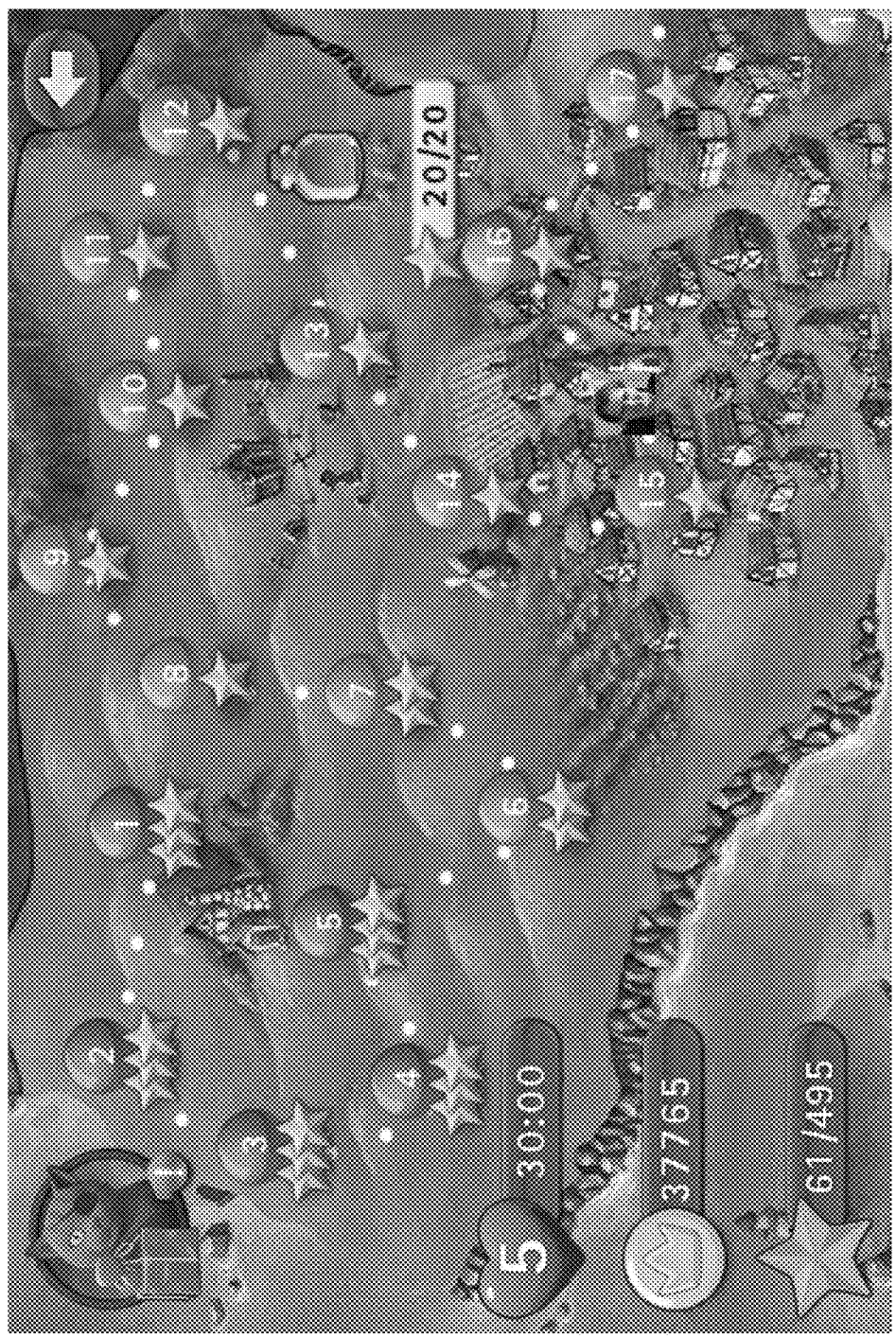
FIG. 46 shows one implementation of a virtual map.

FIG. 46 shows the map interface. The map shows where on the map friends are.

Figure 47:
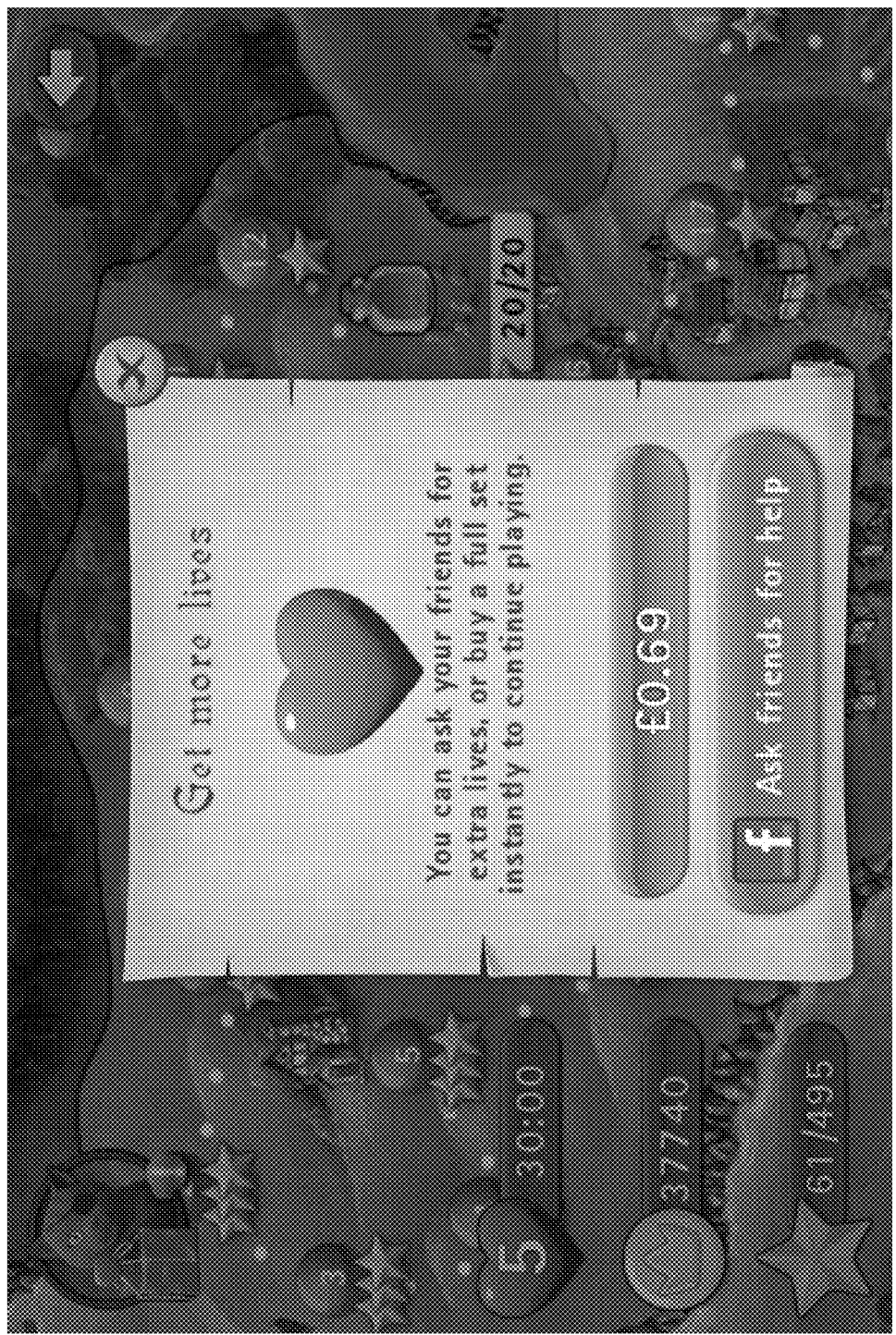
FIG. 47 shows one implementation of a pop up suggesting to buy or ask for extra lives.

FIG. 47 shows one implementation of a pop up suggesting to buy or ask for extra lives. The user can ask friends to send lives or buy lives for real money.

Figure 48:
FIG. 48 shows one implementation of the screens before and after playing a level.

FIG. 48 shows the screens before and after playing a level. Before playing a level, the user can play the game or go back to the map view. The number of stars currently earned on a chosen level will be displayed on this screen. FIG. 48 also displays a leaderboard which includes the top performing friends as well as the player himself. The high score received on the chosen level is shown on the leaderboard together with the friends' avatars. The user can send lives to friends by clicking on the heart sign next to the friend on the leaderboard.

Figure 49:
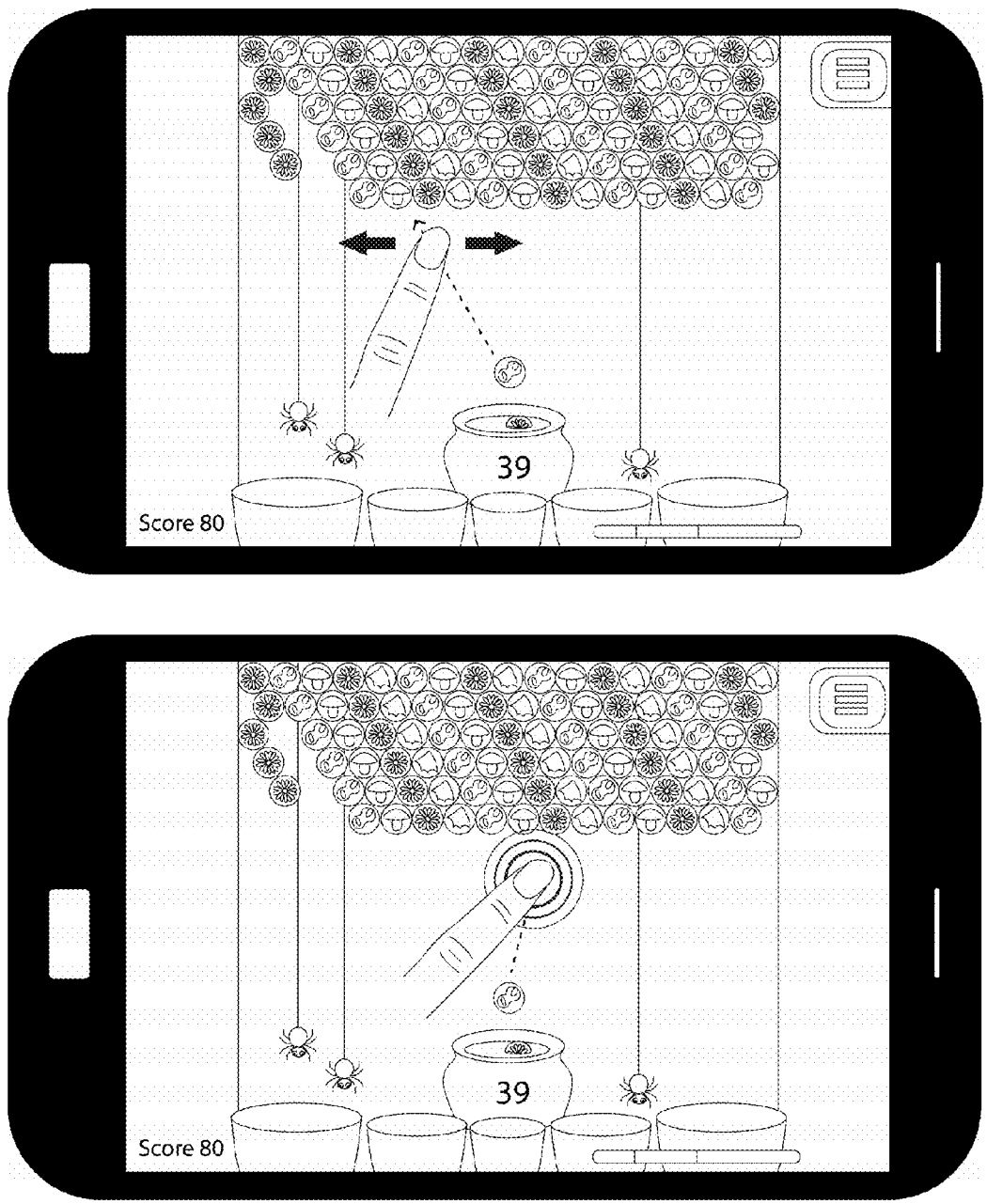
FIG. 49 shows how to aim and shoot on a touch screen device.

FIG. 49 shows the game screen as it can look on a mobile device. The game is operated with a finger or a stylus on the touch screen. The user can touch and drag to aim, tap on the screen to fire the bubble and tap on the next bubble to switch bubbles.

The user's current score is displayed on the screen as well as the "star meter" where the current score is shown in a meter where the levels for receiving one, two or three stars are marked.

When the user has completed the level he is presented with the screen in the lower part of FIG. 48. The number of lives remaining is shown and also the time until a new life is added. The amount of coins is also displayed.

The user is presented with the score for the completed level and the coins received for that level as well as the number of stars earned.

The leaderboard shows the current top scores for the level for the user and his friends. The leaderboard toggles between the names of the friends and the scores earned.

The user can navigate back to the map, replay the level or move to the next level.

Figure 50:
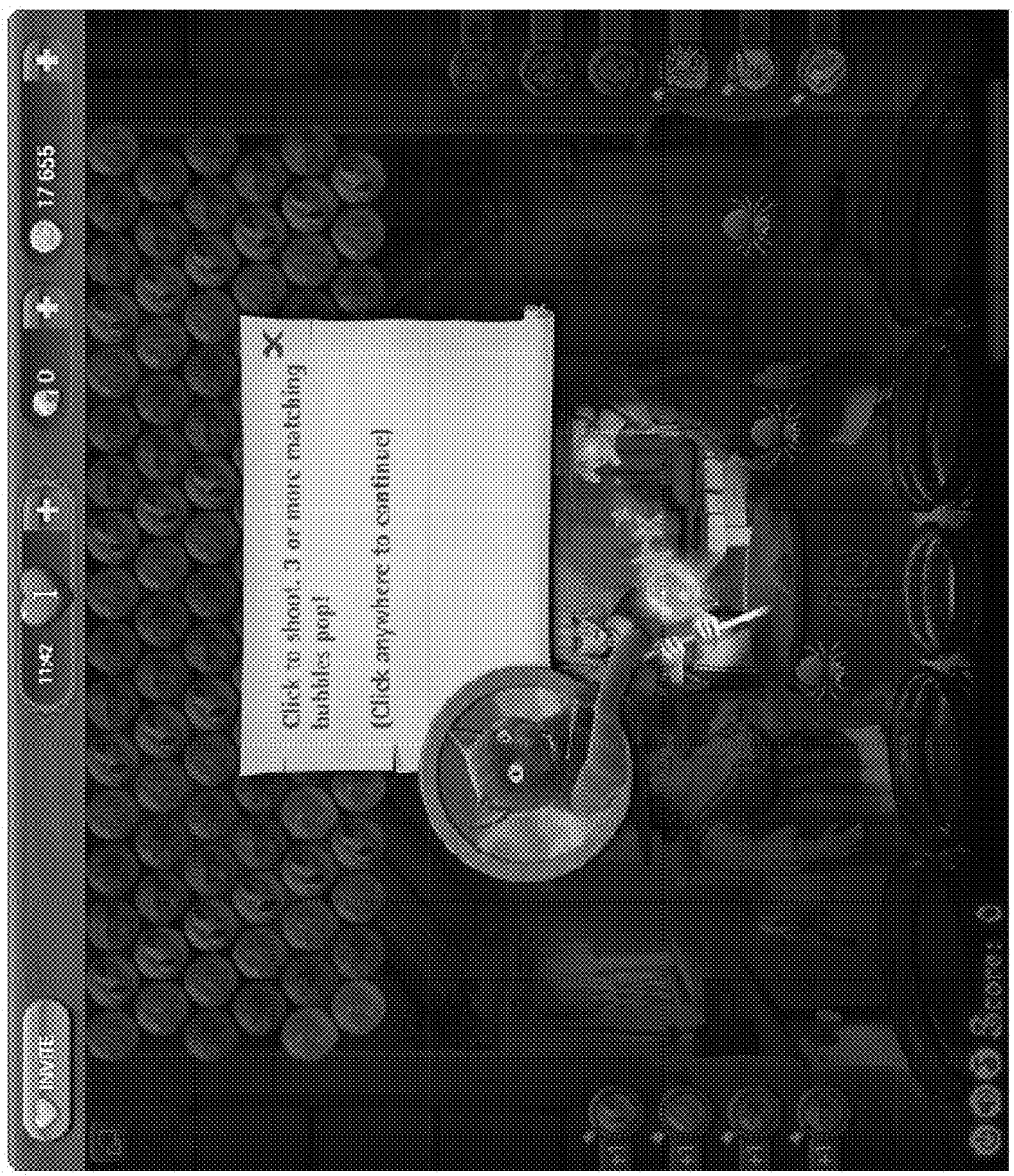
FIG. 50 shows one implementation of a tutorial.

FIG. 50 shows one implementation of a typical tutorial. In this example the screen is darkened and the player is told to shoot 3 or more matching bubbles to pop.

Figure 51:
FIG. 51 shows one implementation of a tutorial.

FIG. 51 displays a typical tutorial screen where most of the area is darkened except for the important message to be read. The tutorial explains how the space bar can be used to switch between the bubbles to shoot.

Figure 52:
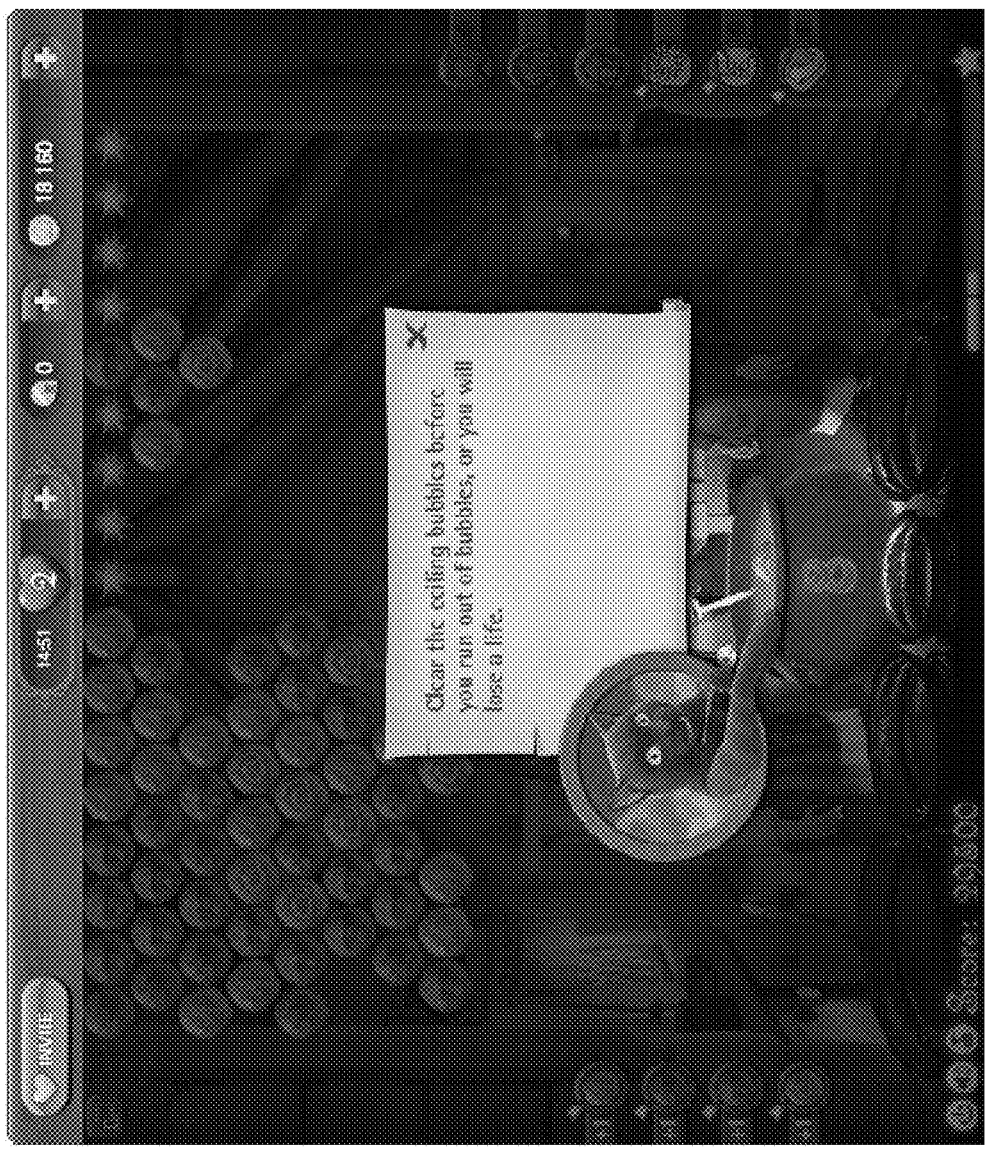
FIG. 52 shows one implementation of a tutorial.

FIG. 52 shows another part of the tutorial explaining that a life will be lost if the ceiling with bubbles is not cleared before running out of moves.

Figure 53:
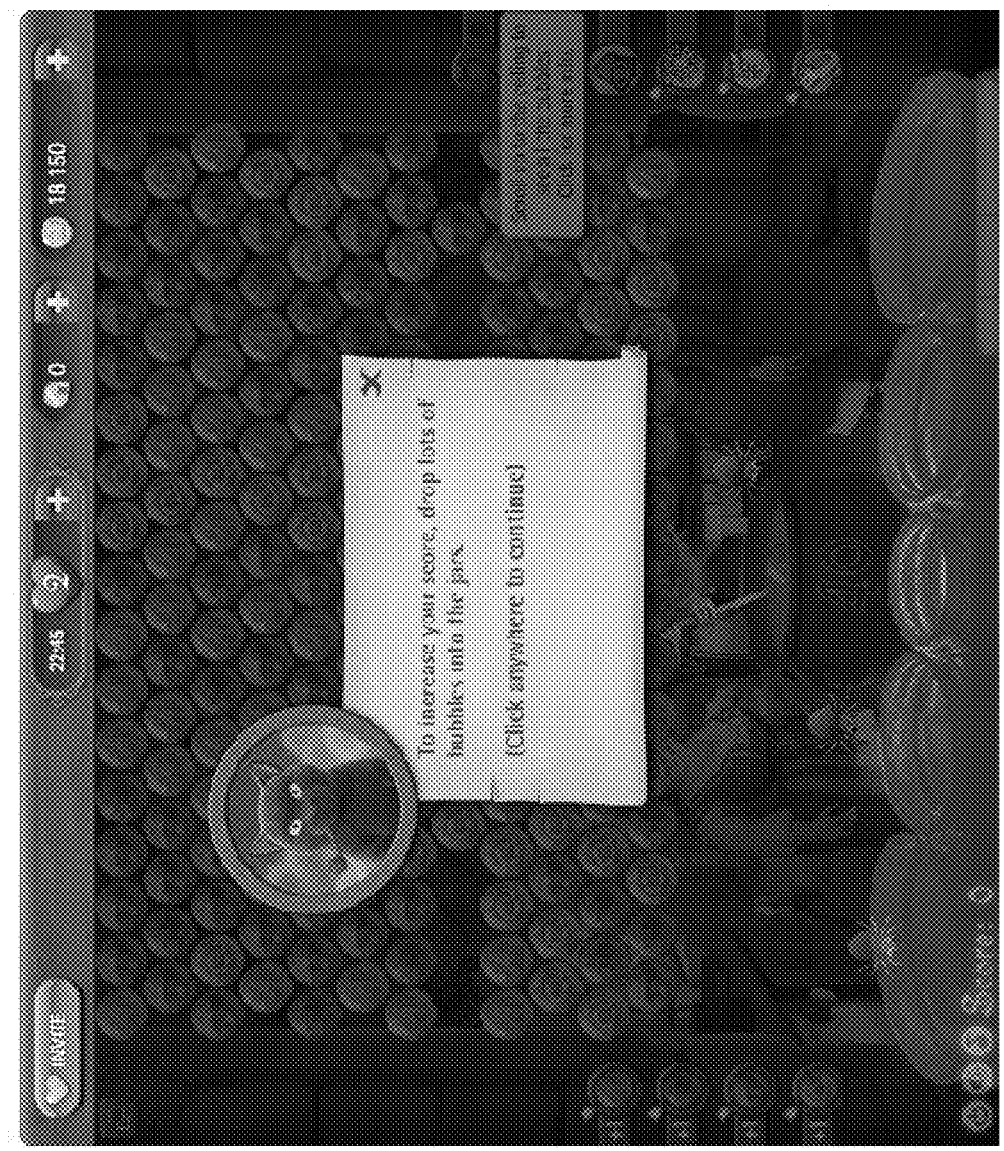
FIG. 53 shows one implementation of a tutorial.

FIG. 53 displays yet another part of the tutorial explaining that in order to gain more points, lots of bubbles should be dropped into the containers at the bottom of the screen.

Game Overview

The concept of Bubble Witch Saga is akin to that of other bubble shooter games. The player operates a bubble cannon (in this case a cauldron) containing a set number of bubbles in four colours, corresponding with the bubbles that fill the level screen. By pressing the spacebar the player can switch to the next bubble in the cauldron, but can only switch between two colours (unless a charm is bought/won/gifted allowing three bubbles to be chosen from). The player's bubble has a sight-line to guide their shot.

The aim is simple: shoot the bubble at the bubbles above and try to clear the level.

Bubble chains of three or more (in the same colour) will burst those bubbles, and any that are then disconnected from the wall or the rest of the body of bubbles will fall. These 'orphaned' bubbles then fall into jars at the bottom of the screen and earn the player more points depending on which jar they fall into (each is worth a different amount).

This is where Bubble Witch Saga is different from other bubble shooter games: when the orphaned bubbles fall, they bounce off spiders. These spiders are like 'pachinko pins'. They come in three colours and fallen bubbles that bounce against them increase in points. This is explained further on in more detail (see 2.2).

Note: the spiders do not obstruct the firing path of the bubble that the player shoots from the cauldron.

Instructions

The player aims their bubble using the sightline provided. This sightline matches the colour of the bubble in hand, and extends in line with the mouse's position. Having taken aim, the player then shoots the bubble by clicking their mouse (or other device), and is then provided with the next bubble in the cauldron.

The aim is to match 3 bubbles of the same colour to burst them, and to then work their way up to the ceiling, bursting nine of the ceiling bubbles to complete the level.

There is a set number of bubbles available to shoot—this number is displayed on the cauldron. More can be bought via Potions, Charms or Wishes (discussed further on).

Spiders

Every shot that bursts bubbles will add a new spider. If a shot does not burst a bubble, two spiders are removed.

The spiders dangle over jars at the bottom of the screen and function like 'pachinko pins'. The score for the falling bubbles increases every time they bounce on a spider:

Blue Spider=+25 points

Gold Spider=×2 of the total points

Figure 54:
FIG. 54 shows an exemplary implementation.
Figure 61:
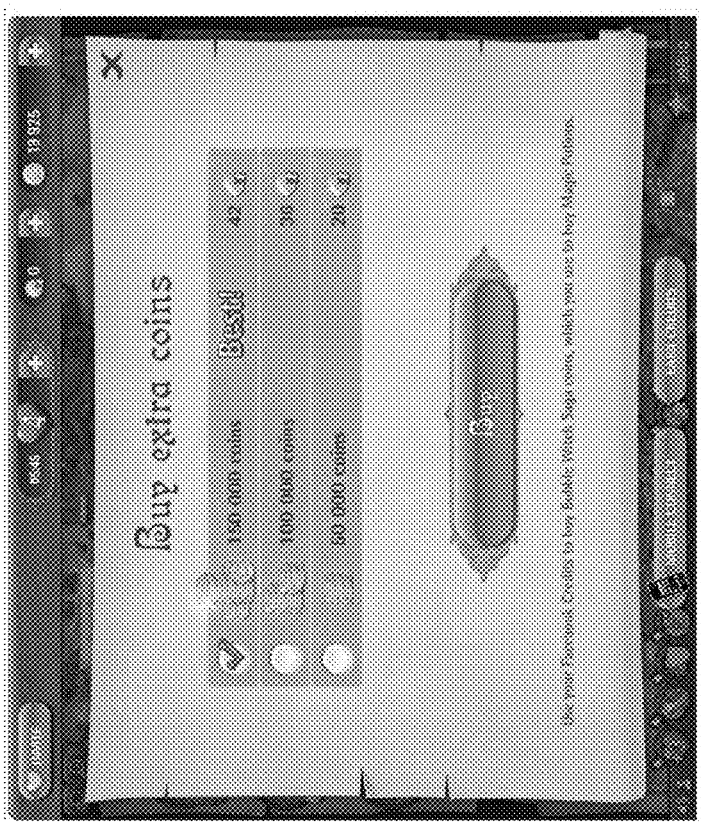
FIG. 61 shows that the player can buy coins using Credits.
Figure 61:
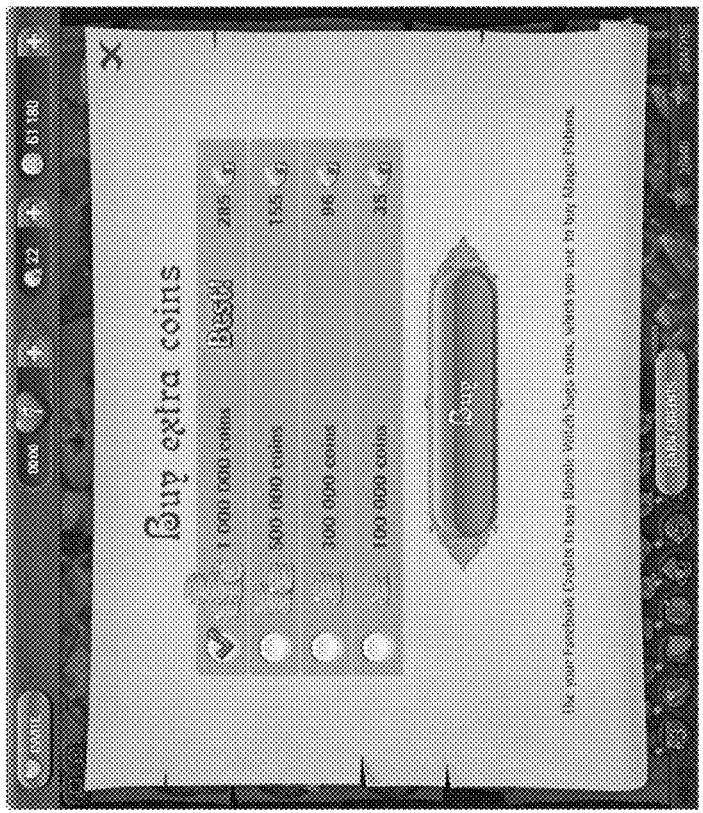
Figure 62:
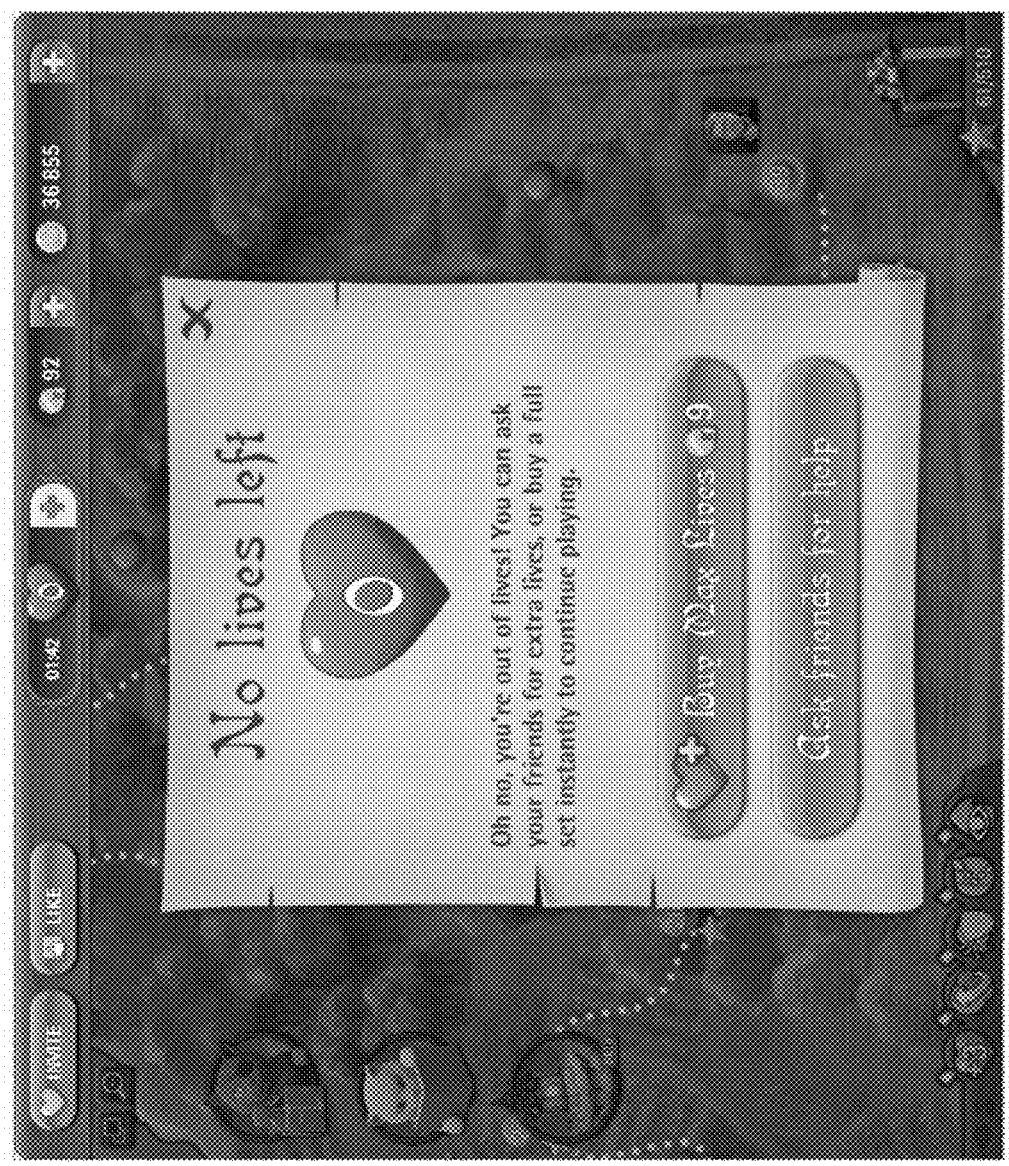
FIG. 62 shows one implementation of the alternatives when having no lives left.

Types of Spiders
There are three different sorts of spiders—blue, golden and green.
Blue Spiders
Blue Spiders are the standard spiders
Every level begins with three (unless the player buys a potion that transforms them into Golden Spiders for three games)
Every time a bubble bounces on a Blue Spider, 25 points are added to that bubble's worth when it drops into a cauldron
Golden Spiders
Golden Spiders double the amount of points earned when a bubble bounces on them
Green Spiders
Green spiders are released after five successful hits (the fifth spider will be green), or by shooting Rainbow Bubbles at the ceiling/into an obstacle (such as a Black Bubble or an Infected Bubble)
Every time that a bubble hits a green spider it splits into two bubbles
Eventually green spiders become blue again—they remain green for a maximum of five seconds
Jars
Unburst bubbles drop into the jars at the bottom of the screen and earn points.
Each jar is worth a certain number of points: 100-500-1000-500-100
When the level is completed, bubbles remaining on the screen and any unused bubbles from the cauldron will tumble into the jars, bouncing on the spiders before they do so. This is how the majority of points are earned.
Note: only half the number of bubbles remaining will fire from the cauldron once the player has completed the level (i.e. if it displays 10 remaining, only 5 will come out).
Points
Every time a bubble is burst points are earned. The number of points required to complete the level is shown on the left-hand side of the scroll screen that appears before the level begins. The points counter is in the bottom left-hand corner of the screen, and the star meter is in the bottom-right hand corner—this lights up according to how many points have been gained.
Points also increase every time a bubble hits a spider. Orphaned bubbles fall into the containers at the bottom—each one is worth a certain number of points, plus whatever has been earned from spider-bounces.
Stars
At least one star must be earned in order to pass the level. Each level contains a 3-star meter in the bottom right-hand corner, so up to three stars can be earned depending on the number of points collected. Each level can be replayed to try and get three stars
At the time of writing (Sep. 12, 2012) there are 510 stars to be earned overall in Bubble Witch Saga.
Features Unlocked by Stars
Stars unlock certain features in the game. They are as follows:
20=unlocks Golden Magic Spider Potion
50=unlocks 7 Extra Bubbles/Screen Magic potion
70=unlocks 3 Extra Ceiling Holes Magic potion
90=increases the cap from 5 to 6 maximum lives
110=increases the cap from 6 to 7 maximum lives
130=unlocks the Rainbow Bubble Magic potion
200=gives the player 50,000 in-game coins
250=increases the cap from 7 to 8 maximum lives
300=gives the player 50,000 in-game coins
400=gives the player 75,000 in-game coins Lives
In one implementation, lives are displayed as a number in a heart, at the top of the screen.
If the level is not completed, a life is lost.
Lives can be bought using Facebook™ Credits (gained by paying 'real' money or by completing surveys/purchasing something from a partner site), and can also be gifted by friends. By pressing the '+' button on the life meter, the player can ask their friends for more lives.
To begin with, the maximum number of lives is five, but this increases first to six and then to seven and eventually to eight as the player's star count grows.
Lives replenish of their own accord at a rate of one per 30 minutes, even if the player is not logged into the game.
The act of giving a friend a life does not diminish the player's own stock of lives.
When the player has no lives left (as seen in FIG. 62), they can thus either wait for the life counter to run down to zero and automatically replenish a life (the counter begins at 30.00 minutes and counts down continuously when a player has lost at least one life. In the above image, therefore, the player would have to wait on 1 minute and 46 seconds before they automatically gained a life. The counter would then return to 30 minutes and begin counting down again until rewarding the player with a second life, and so on, until the maximum life cap had been reached.
If the player is impatient, however, they can choose to buy the maximum number of lives, but this will cost them 9 Facebook™ credits. They would do this by clicking on the lime green button in the picture and then following the simple on-screen instructions.
Alternatively, the player can ask their friends for lives (only friends who have played the game though—not every single friend they have on Facebook™!). They can ask as many friends as they want, but if six friends give lives when the maximum life cap is only five, then only five lives will be given. The act of giving a friend a life does not diminish the player's own stock of lives.
Game play cannot recommence until the player has at least one life.
Lives are only lost when a level is not completed or a star is not earned.
Coins
Coins are awarded for each successful completion of a level—more depending on the number of stars won. Coins can be used to buy Potions, discussed in more detail further on.
The player can also purchase these in-game coins, using Facebook™ credits.
FIG. 61 shows that the player can buy coins using Credits. Alternatively, they can 'Earn Credits' or click on 'Mobile Connect' which will enable them to pay using their mobile phone.
Structure
Bubble Witch Saga is structured in the same way as other 'saga' games, such as Mahjong Saga. The player traverses a map, completing one stage at a time, earning at least one star in order to progress. The energy system ('lives') is only depleted if the player fails a level. At the time of writing (Sep. 12, 2014) there are currently 170 levels.
Traversing the Map
The player traverses a map by completing a level at a time, like a board game. One implementation of the map is shown in FIG. 54.
When a level is completed, the player can progress to the next level or choose to redo earlier levels again. There are currently 170 levels (Sep. 12, 2014).

Figure 57:
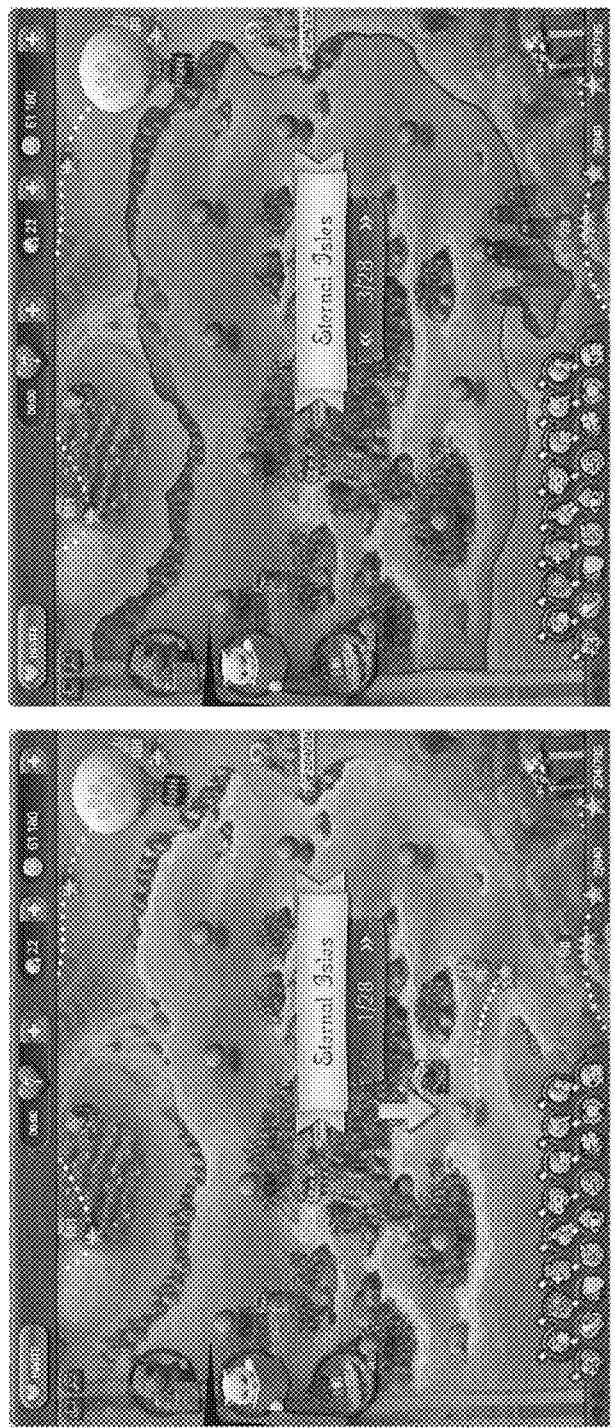
FIG. 57 shows one implementation of a separate area of levels which are not connected to the linear progression of the game.

There are also a group of levels that can be reached after having unlocked a certain level and those levels are separate from the linear progression of the map, hence the player can choose to play at different locations on the map. In one implementation this side area of levels is called the 'Eternal Isles' and over time more levels are added to this area. Figure FIG. 57 displays one example of the implementation of the extra area of levels displayed on a map.

Navigation

When navigating on a map in a game, it is sometimes difficult to find desired spot or area of the map if the map is, for example, too large. One way to solve this problem is to have mini map in an expandable tab, connected to the edge of the screen, where the player can fast jump to desired location. In this document we refer to the expandable tab and the mini map as the navigator.

Navigator Hidden

Figure 104:
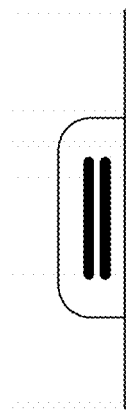
FIG. 104 shows the navigator hidden

If the player does not need to use the navigator then it is unnecessary for it to take up precious screen space. Therefore, in one implementation the navigator is only in full view when the player needs it; the rest of the time it is hidden with only a small part of it showing, see FIG. 104. Clicking on this small part will expand the navigator (see FIG. 105) and let the player use it. Clicking on the same part again will once more hide the navigator. In one implementation, when the navigator is hidden, a small tab is placed at the bottom right edge of the screen which will in turn expand the navigator when clicked on, see FIG. 106.

Navigate within an Area

When the navigator is expanded, the player is provided with a mini map showing an area of the map. The player can press anywhere on the mini map and when doing so the main view will jump to the same location. The player may also press and drag the mouse up or down over the mini map which will then simultaneously scroll the map in the main view.

Figure 107:
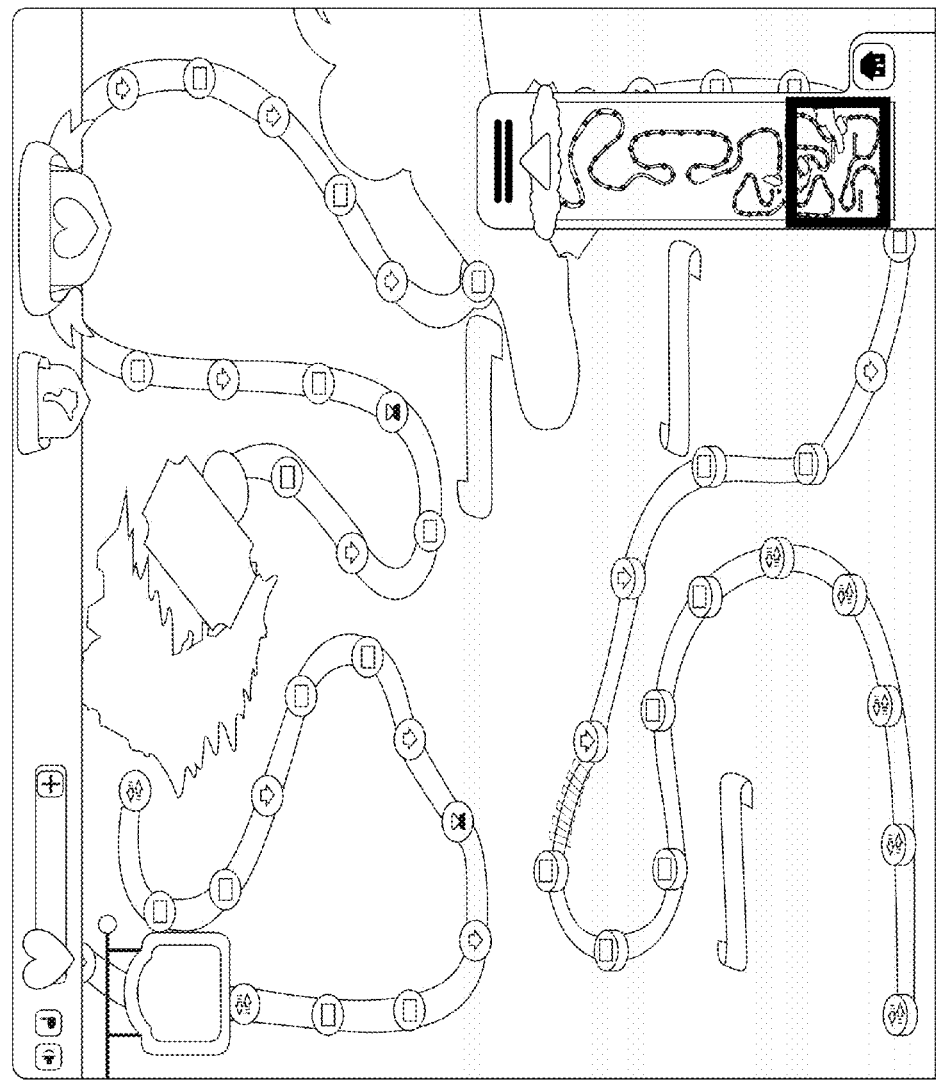
FIG. 107 shows one implementation of the navigator.

FIG. 107 illustrates one implementation of the navigator where there is no more area of the map further down but there is more to view further up (in this implementation that is indicated by a cloud). Pressing somewhere else on the mini map will jump to the same place in the main view.

Figure 108:
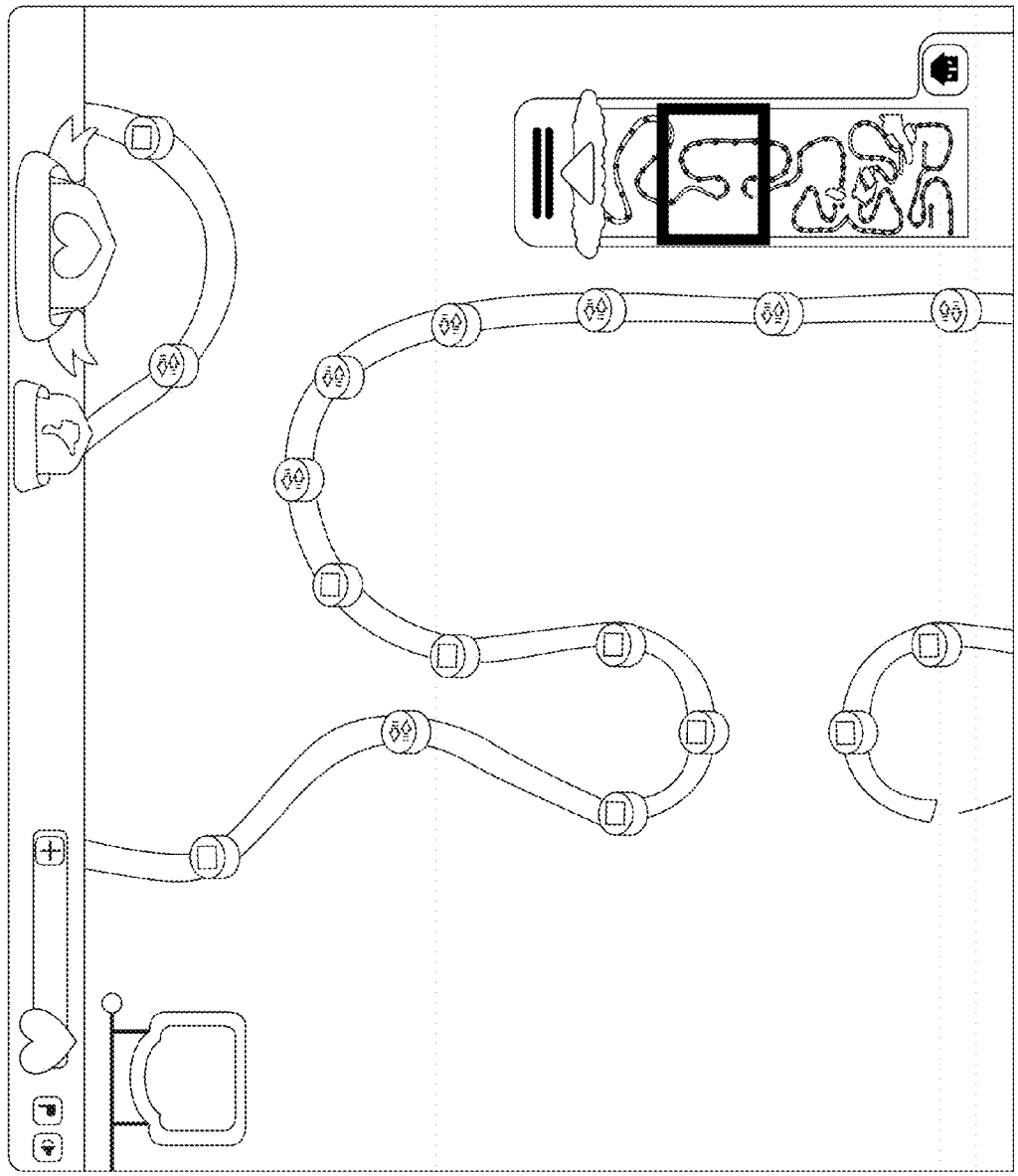
FIG. 108 shows one implementation where the player has jumped to another part of the map.

FIG. 108 illustrates how the main view has changed as the player has clicked or scrolled to a new place on the map.

Navigate Between Areas

A map may sometimes be too large to fit on a mini map, at least if the player is to make any sense of what it is displaying. One way to solve this problem is to divide the map into areas and on the mini map only show one area at a time.

Figure 109:
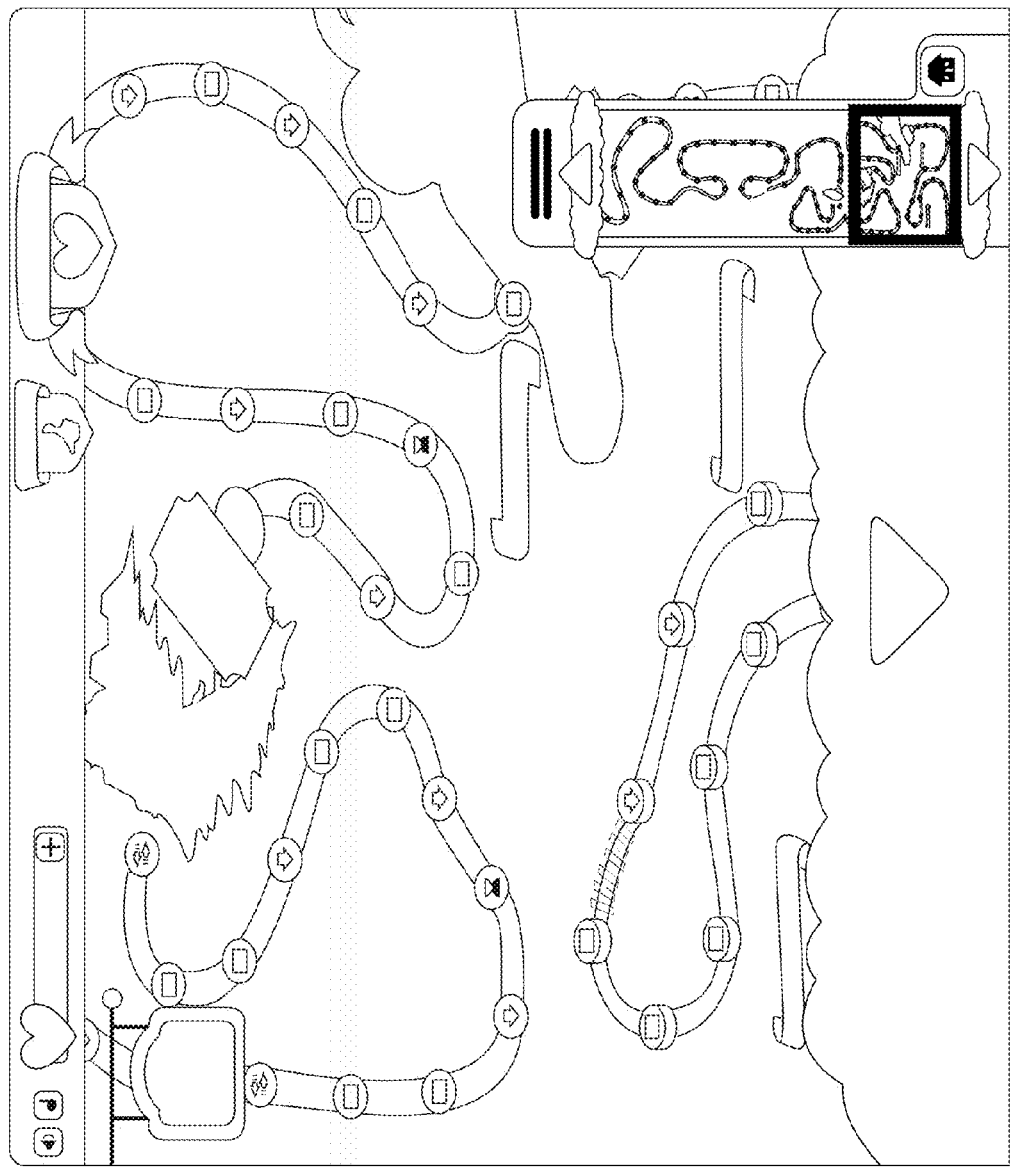
FIG. 109 shows one implementation with clouds indicating there is more to be seen.
Figure 110:
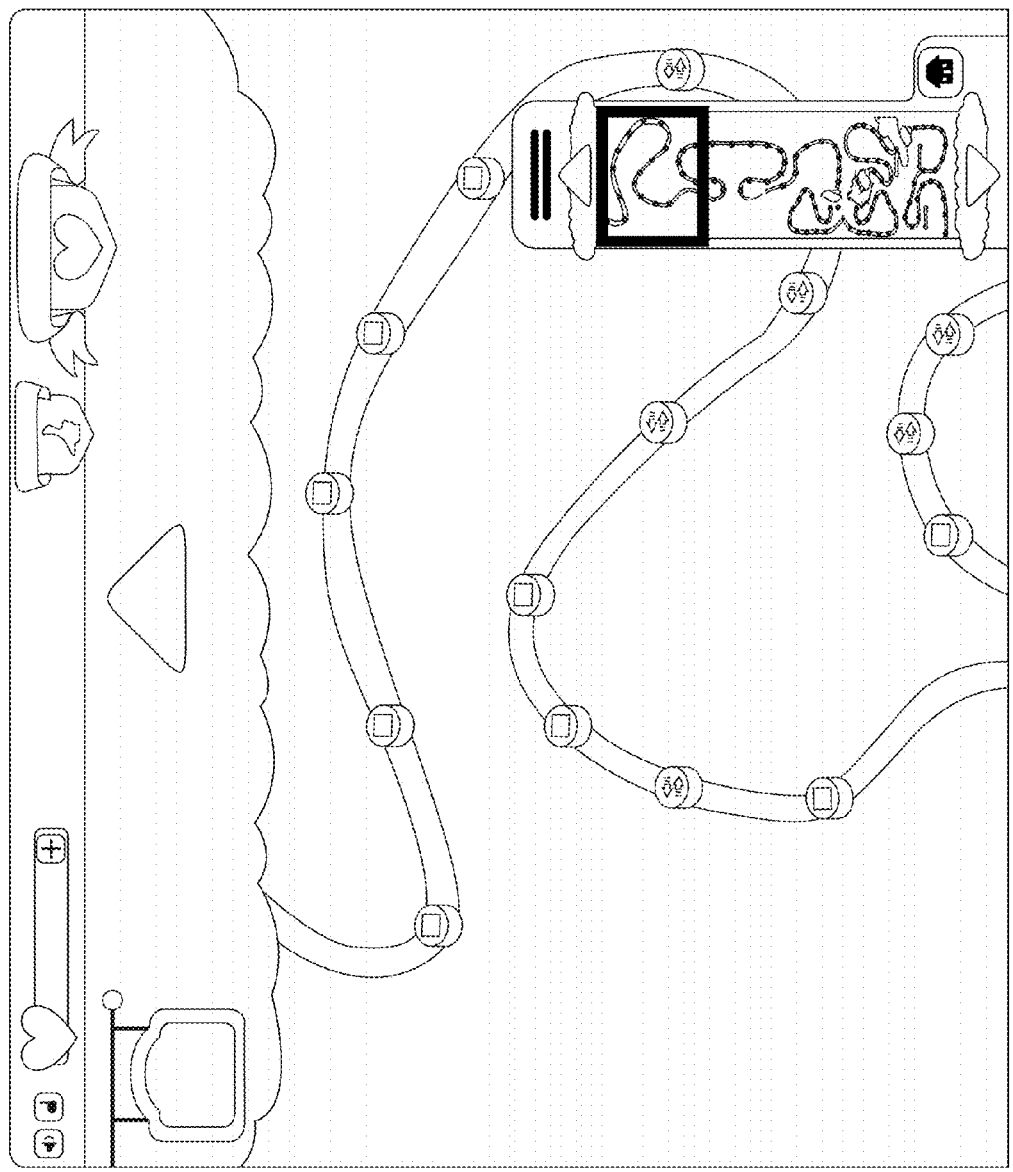
FIG. 110 shows one implementation with an arrow point up both on the map and the navigator.
Figure 111:
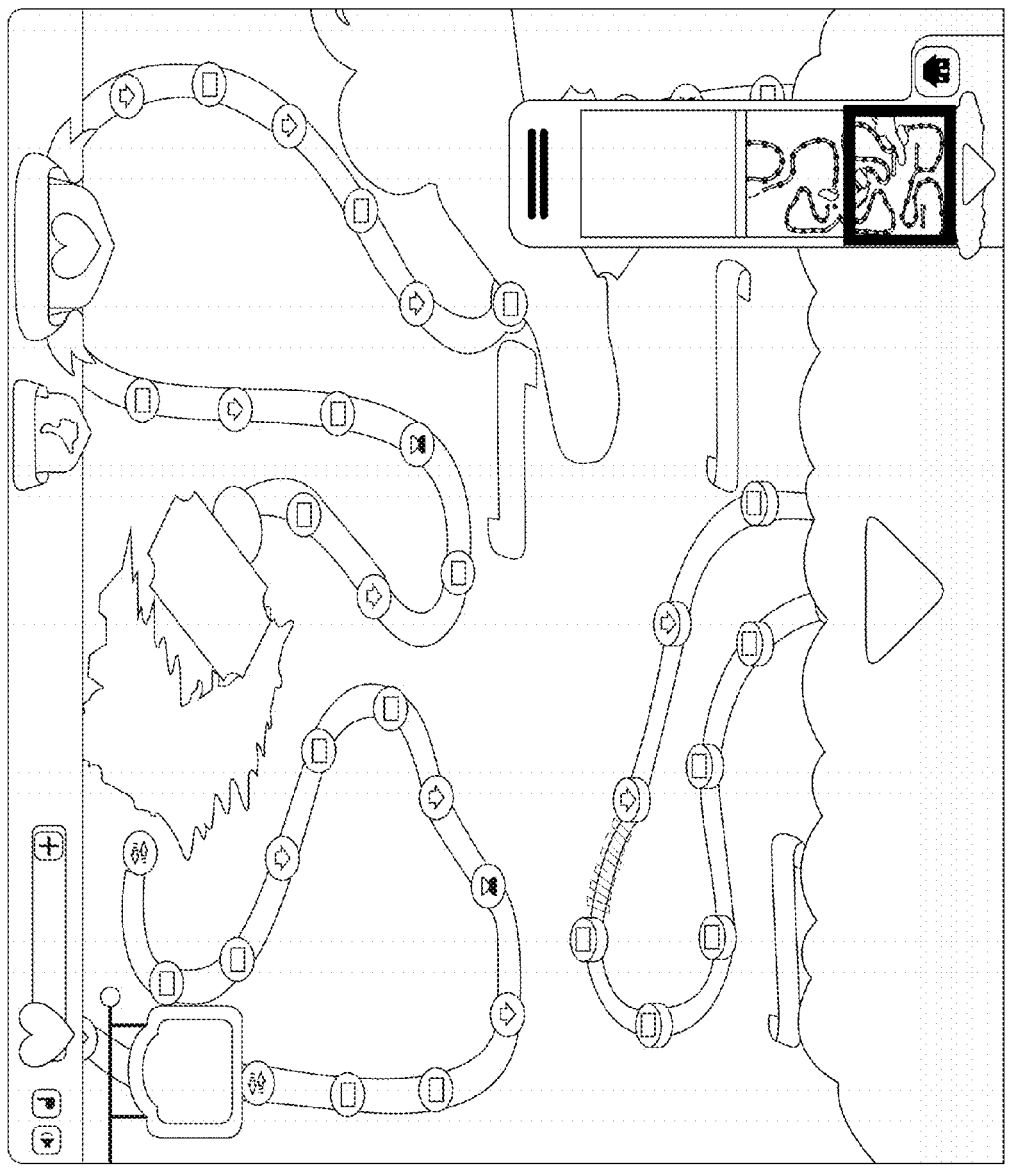
FIG. 111 shows one implementation where the navigator has reached the end of the map.

In one implementation there are clouds on the bottom and/or on the top of the mini map to indicate that there is more to be seen. Pressing one of the arrows, which are placed on the clouds, will take the player to either the next or previous area of the map. The arrow can be pressed both on the mini map and in the main view, see FIG. 109 and FIG. 110. If changing area on the mini map, the main view will also jump to the next area. If the player reaches the end of the map, unused areas of the mini map will be clearly marked and therefore indicate to the player that the map is ending. The player can not scroll past this point, see FIG. 111.

Jump to Specific Levels

Even when being able to scroll and click to desired locations on the mini map, it may still be difficult to find a specific spot on the map. There are several implementations to make it easier for the player on this point.

In one implementation, if the player for example wants to jump to the furthest reached location on the map, then there is a home button which will take the player there directly. Pressing the home button will not only take the player to the current location but will also hide the navigator, giving the player a full view. With the home button, the player can always find their active location in the blink of an eye.

Figure 105:
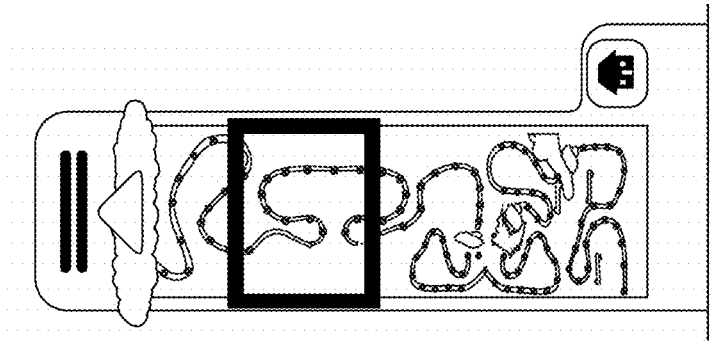
FIG. 105 shows the navigator expanded
Figure 106:
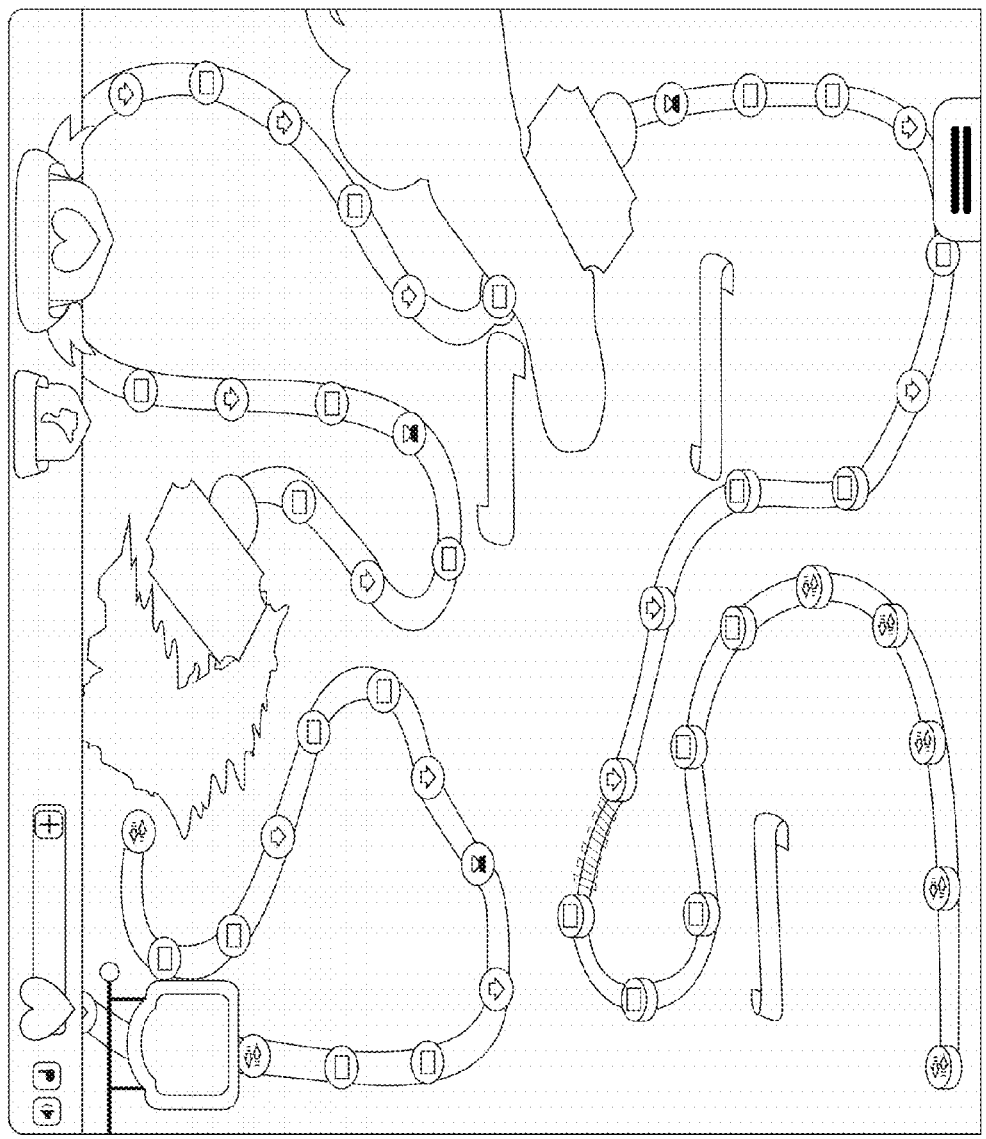
FIG. 106 shows one implementation with the navigator hidden in a map view.

FIG. 105 displays one implementation where the home button is placed in the bottom right of the navigator with a house symbol on it. Pressing the button will take the player to the furthest reached location.

Figure 112:
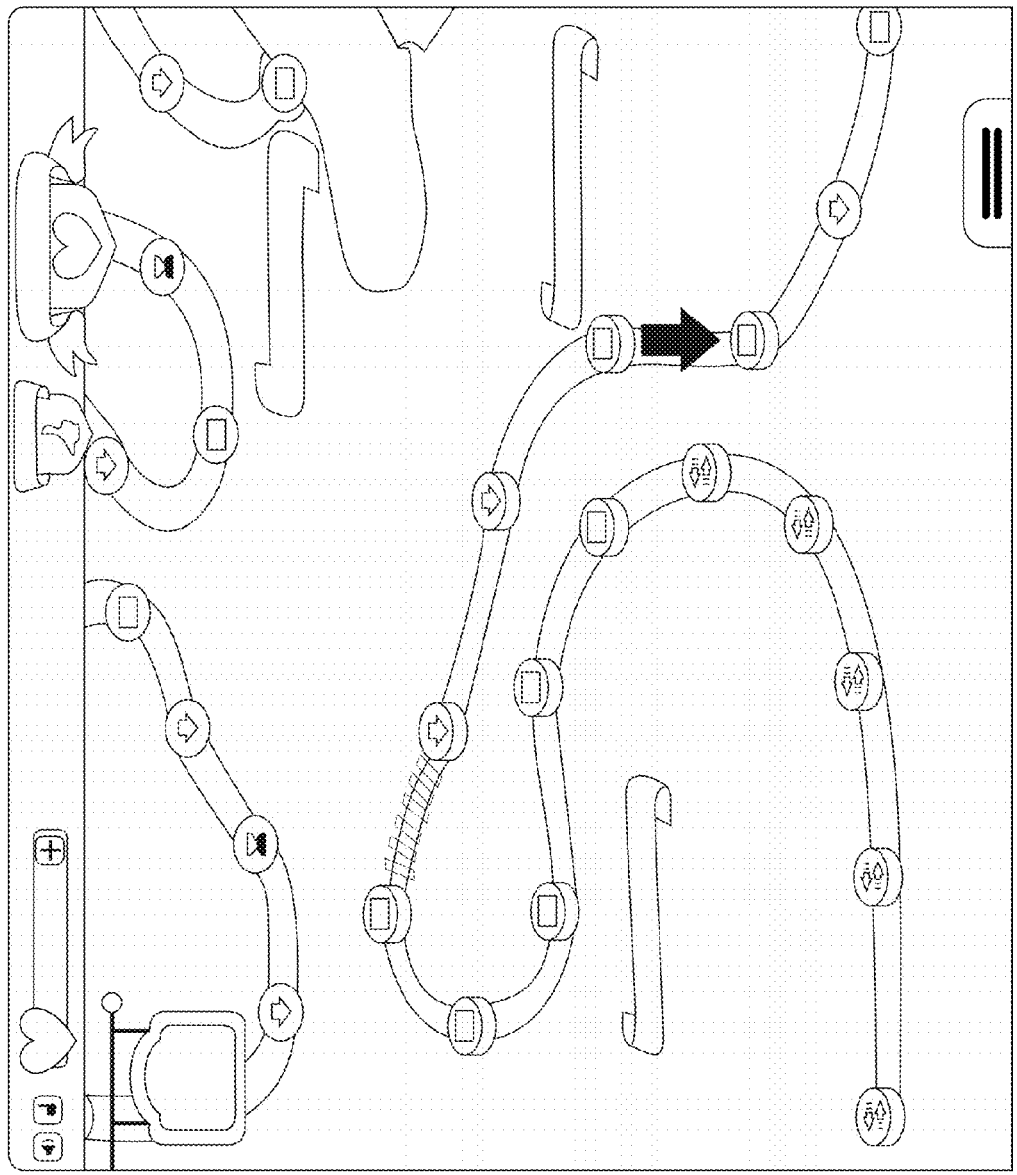
FIG. 112 shows one implementation when the home button has been pressed.

In an alternative implementation, the map will also be zoomed in when the player presses the home button and jumps to the furthest reached location; this is illustrated in FIG. 112.

Figure 113:
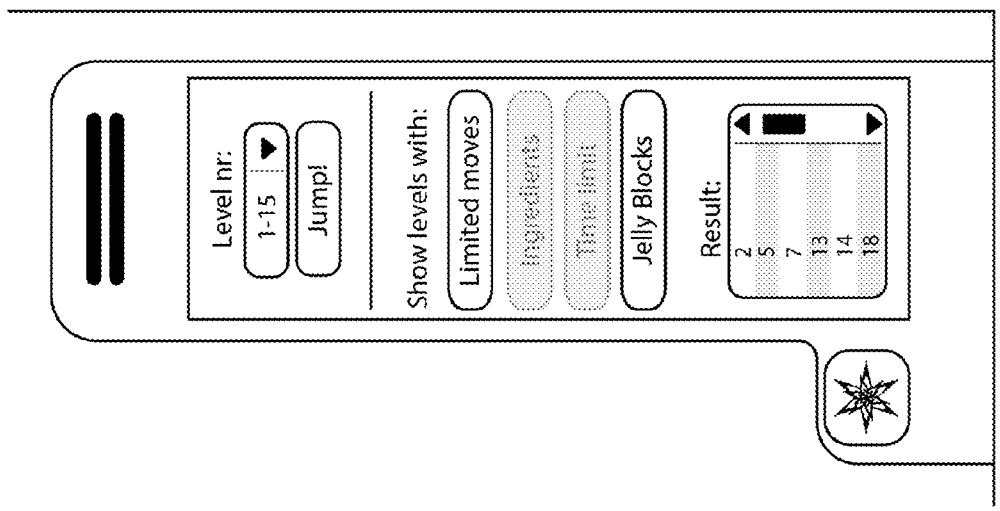
FIG. 113 shows an alternative implementation of the navigator with filters and multiple choices.

Another implementation may be to offer the player filtering and multiple choices of where to jump on the map. There could for example be an icon which when pressed lets the player choose exactly which level to jump to. There could also be an alternative to receive a list of levels the player can jump to which satisfy certain criteria, for example all levels with limited moves and ingredients in them. The filter could offer many kinds of choices. FIG. 113 shows an alternative implementation of the navigator offering multiple choices and filters.

Zooming in and Out on the Map

Figure 114:
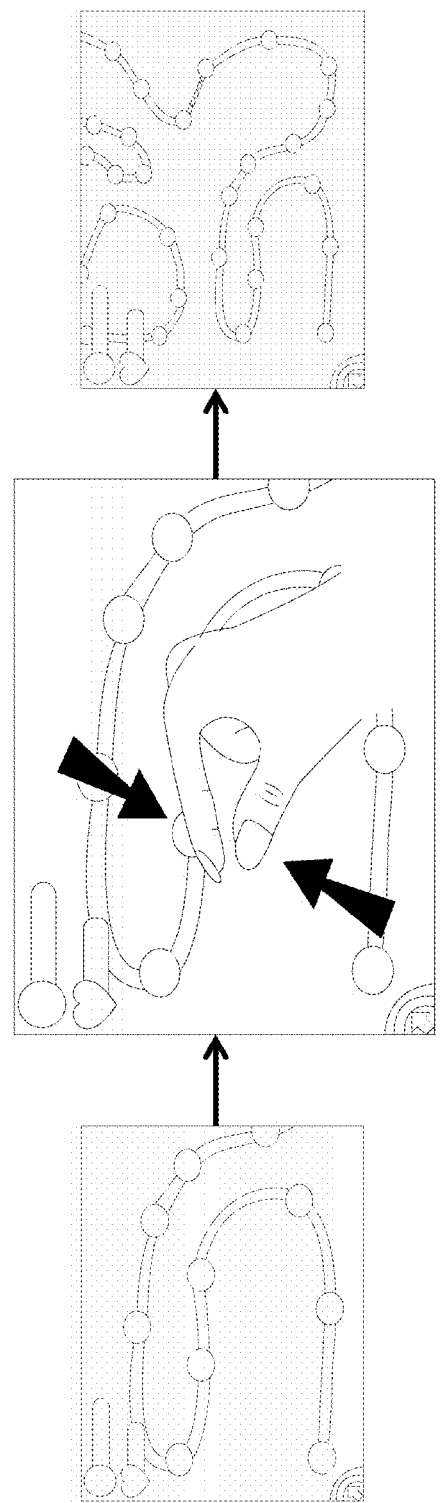
FIG. 114 shows how to zoom out on a touch screen device.
Figure 115:
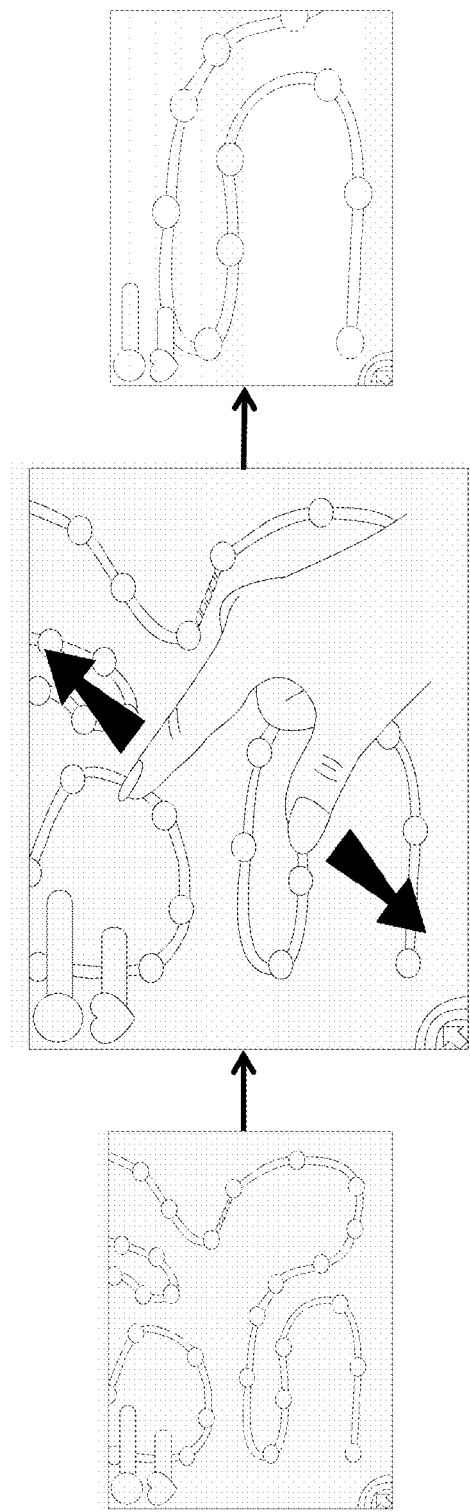
FIG. 115 shows how to zoom in on a touch screen device.

The player may not only navigate to different locations on the map but can also be presented with the possibility to zoom in and out. If playing a game on a touch screen device, pinching ones fingers on the screen would make the map zoom out, see FIG. 114. Zooming in on the map would require the fingers to spread out from each other, the opposite of doing a pinch gesture, see FIG. 115.

Having a zoom in/out function can help the player get an overview of a map while at the same time being able to see details and other various interesting parts of it which are connected to a specific area or position. Furthermore, zoom in functions on a touch screen device can be helpful if there are interactive parts that may feel to small to press properly. Zooming in makes it easier to target and interact with desired object.

Stages and Levels

The map is made up of stages/territories, each of which contains 10 levels. The first stage is made up of only five levels which is depicted in FIG. 54 where the first five levels nodes are slightly darker than consecutive level nodes.

The levels are unlocked in a linear fashion one at a time.

Replay Levels

The player has the opportunity to replay levels as many times as they wish (as many times as their lives allow!) in order to try to increase their star count and beat their friends' scores.

Social Interaction

See friends

The player's friends are displayed on the map as small icons, like pieces in a board game.

This can be seen in FIG. 6.

Crown to Show Level where Player is Top of Scoreboard

When the player has the best score out of their friends for a level, a crown appears above the level number to mark this, this is seen in FIG. 6.

If the record is beaten by a friend, the crown disappears.

Social Roadblock

Aside from the first territory (formed of five levels), each territory is made up on ten levels. Upon completing a territory, entry into the next one is prohibited until the player has paid (with Facebook™ credits) or asked three friends to help them progress further. The three friends have to approve the request for help, and they then 'weaken the spell'. Once the spell has been weakened, the player can pass through into the next territory and continue on their quest.

Bubbles
Regular Bubbles

There are five colours of bubble, but only four are present at a time in each level: Blue, Purple, Green, Yellow and Red.

Special Bubbles

Figure 69:
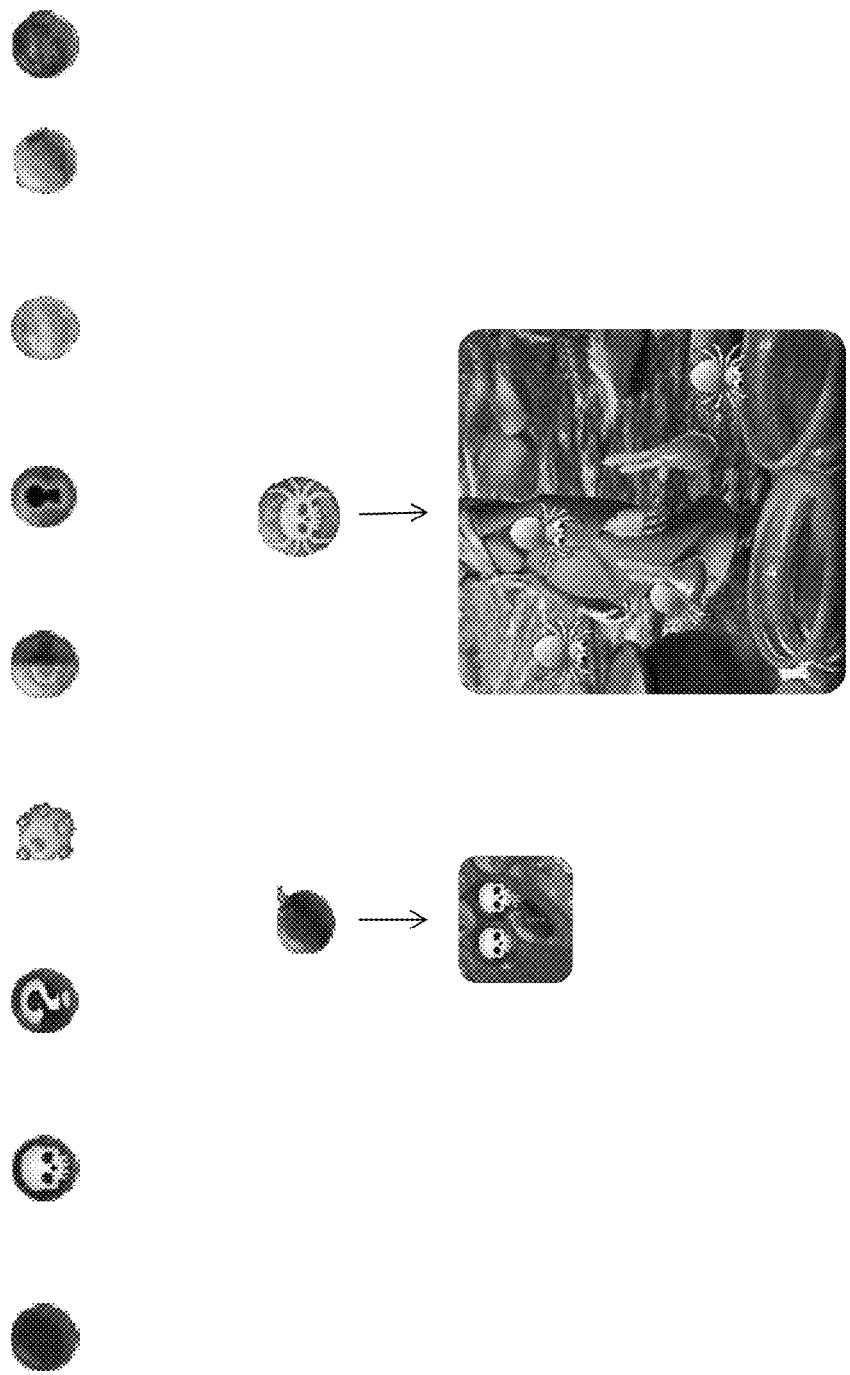
FIG. 69 shows some implementations of different types of game elements.

FIG. 69 illustrates different types of bubbles found in the game.

Black bubbles

Black bubbles are introduced at level 16

They cannot be matched/burst

Figure 71:
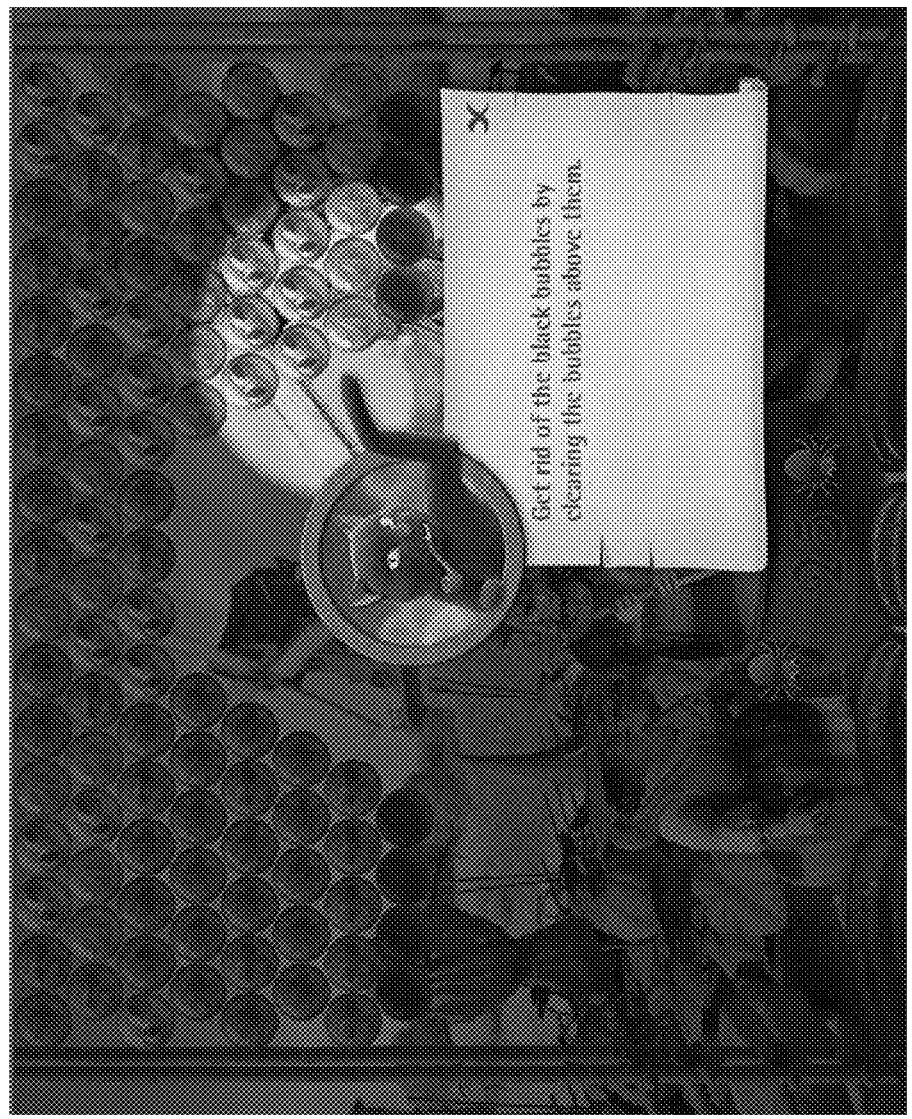
FIG. 71 shows one implementation explaining Black bubbles.

They can only be 'dropped', by bursting the surrounding bubbles so that they become 'orphaned' (i.e. not attached to anything) and so fall into the cauldrons. FIG. 71 shows one implementation of the introduction and explanation of Black bubbles.

Spider Poison Bubbles

Spider Poison Bubbles are introduced at level 26

If popped, these bubbles poison any spiders that their contents fall on (and said spider retreats). However, if they become orphaned and fall, they have no adverse effect. Spider Poison Bubbles appear in all the colours of ordinary bubbles.

Doom Bubbles

Doom Bubbles appear are introduced at level 36

Figure 59:
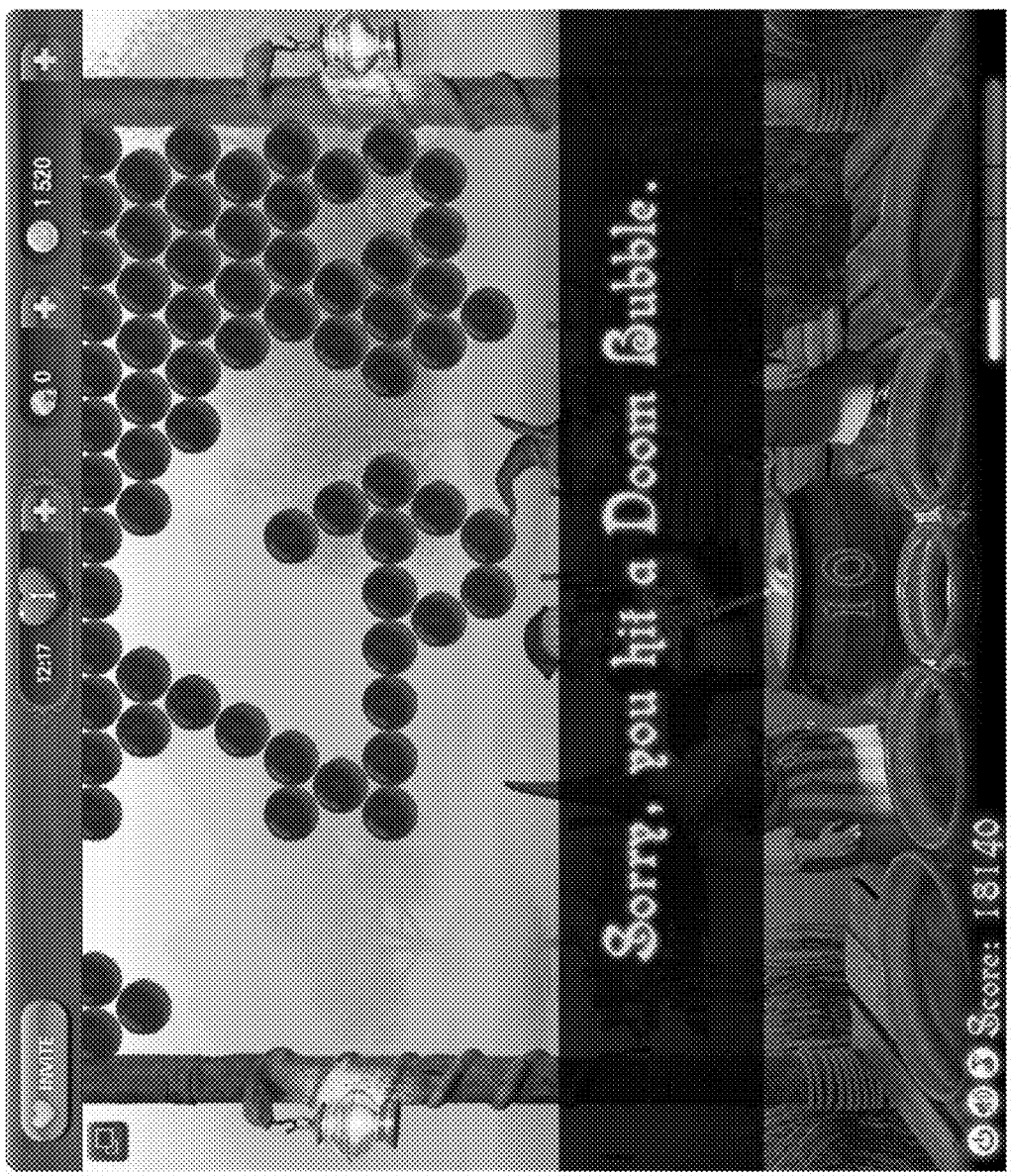
FIG. 59 illustrates when a player has hit a doom bubble.

Hitting one immediately terminates game play and the player loses a life. The 'Charm of Insurance' protects the player against Doom Bubbles. FIG. 59 illustrates when a player has hit a doom bubble and therefore failed the current level.

Infected Bubbles/Bubble Curse

Figure 70:
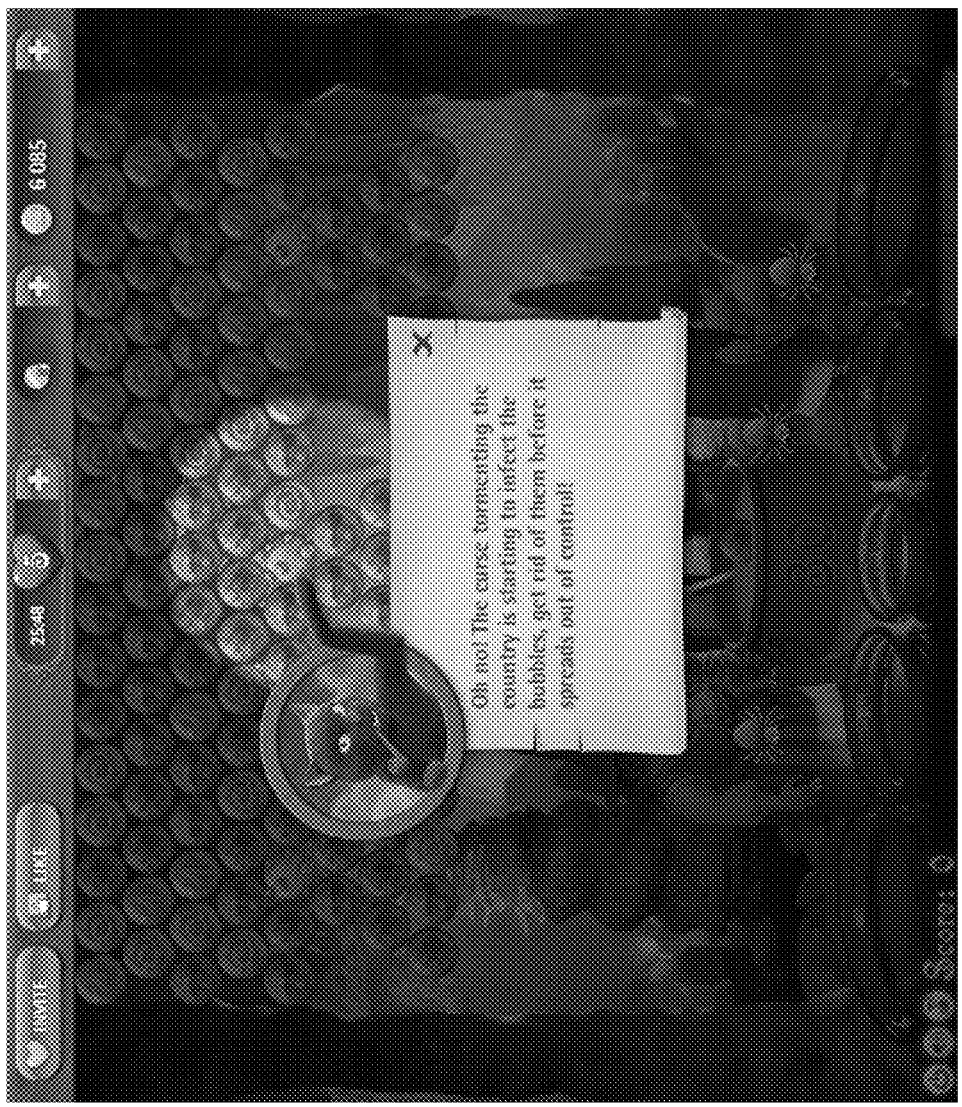
FIG. 70 shows one implementation explaining what to do with curse bubbles.

Infected Bubbles spread a bubble plague to other bubbles that they are touching—it only spreads downwards. The plague spreads at a rate of one bubble per bubble shot. The only way to stop the curse is to remove the surrounding healthy bubbles or 'drop' the bubbles at the root of the infection. FIG. 70 shows one implementation where the effect of the Infected Bubbles is introduced.

Note: there is also the 'Charm of Antidote' (and the 'Wish of Antidote') which heals the infection, for a price.

Bomb Bubbles

Bombs are introduced at level 76

Figure 60:
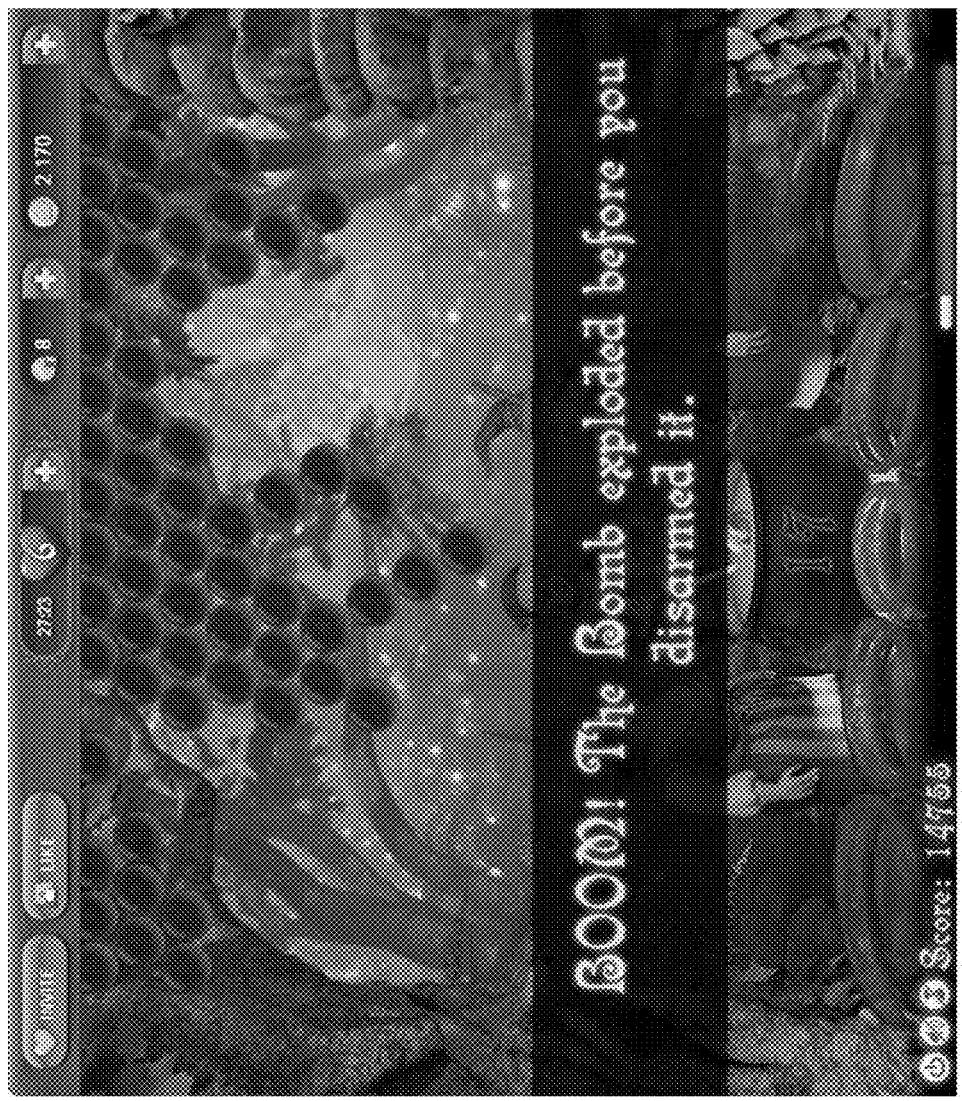
FIG. 60 illustrates when a bomb element has been triggered the level is failed.

When the player bursts a bubble that is in direct contact with a Bomb Bubble, a count-down begins. This count-down starts from 9, counting at a rate of −1 per bubble shot. When the counter reaches 0 the player loses a life. FIG. 60 illustrates when a bomb bubbles has reached zero and the player automatically fails the level.

To stop a Bomb Bubble's count-down, the player must aim a bubble directly at it—it will then stop immediately.

Crystal Bubbles

Figure 72:
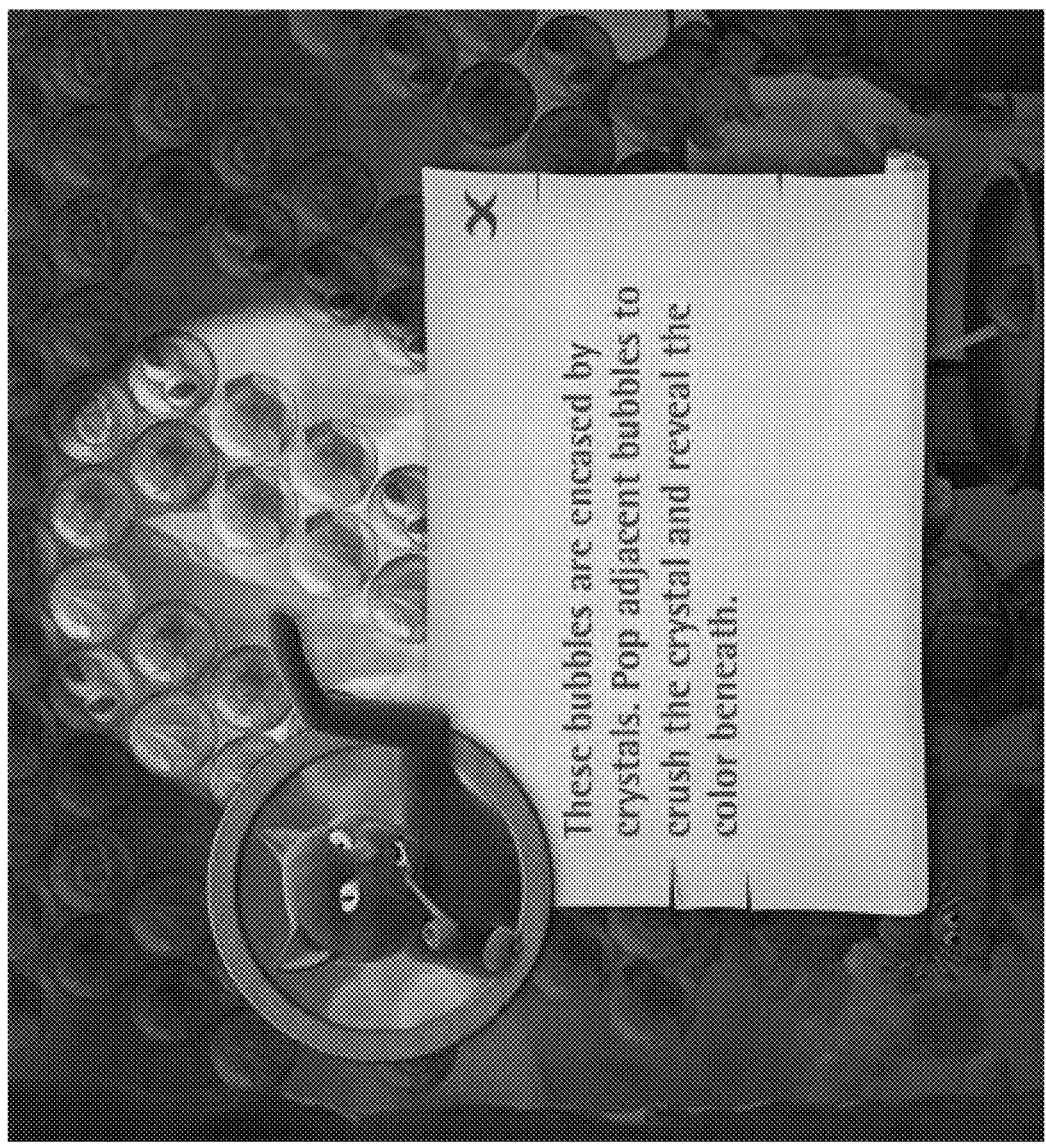
FIG. 72 shows what to do with Crystal Bubbles.

Crystal Bubbles are introduced at level 86. They have a crystal shield that has to be broken in order to return the crystal bubble to a 'normal' bubble. To break this shield, the player must burst the surrounding bubbles. FIG. 72 shows what to do with Crystal Bubbles.

Morph Bubbles

Morph Bubbles are introduced at level 106

They are 'shape-shifting' bubbles—changing colour every other shot that the player makes. The colour pair for a Morph Bubble is determined at the beginning of each level:

Blue—Purple
Blue—Yellow
Green—Yellow
Green—Red
Red—Green
Red—Purple
Yellow—Green
Yellow—Blue Morph Bubbles cannot be infected by the Bubble Curse.

Locked Bubbles

Locked Bubbles are introduced at level 116

Locked Bubbles form the keyhole part of a 'ghost chain'. There are normally more layers of bubbles to burst above the chain, but they are grey and unreachable until the keyhole (Locked Bubble) is burst.

Note: a single Locked Bubble cannot be burst using a Rainbow Bubble, but if the Locked Bubble is paired with a bubble of the same colour then shooting a Rainbow Bubble at the paired bubble will break the lock.

Mystery Bubbles

Mystery Bubbles are introduced at level 130

Only once they have been hit directly do Mystery Bubbles reveal their true nature—they could be any sort of bubble.

Shadow Bubbles

Shadow Bubbles are introduced at level 166

Shadow Bubbles spread to all normal bubbles at a rate of one bubble per shot, in any direction, but they do not spread to Spider Poison Bubbles. If a Shadow Bubble is hit with a matching bubble from the cauldron (i.e. one of the player's shots), it steals bubbles from the cauldron (i.e. from the player's arsenal).

Rainbow Bubble

Rainbow Bubbles are unlocked when the player has collected 130 stars, and they can then be purchased as a Magic Potion (cost: 2000 coins).

Rainbow Bubbles, once purchased, can be used twice per play and are active for three games. They will match any ordinary bubble and burst every ordinary bubble that they come into contact with.

Note: if the player has 10 spiders and at least one is blue, then shooting a Rainbow Bubble at an Infected Bubble, a Black Bubble, a hole in the ceiling or a Spider Poison Bubble will release a green spider.

Figure 88:
FIG. 88 illustrates one implementation of how to activate a Rainbow bubble.

FIG. 88 illustrates one implementation of how to activate a Rainbow bubble.

Croco Loco
Overview of the Game

Another implementation of the inventions herein is a game that mixes up the bubble popping with explosive bombs and other special bubbles to clear your way to the top faster. The player can in some implementations connect the bombs that are mixed into the bubbles on the game board to create long blast chains and then detonate to uncover game elements that can award the player points.

Figure 73:
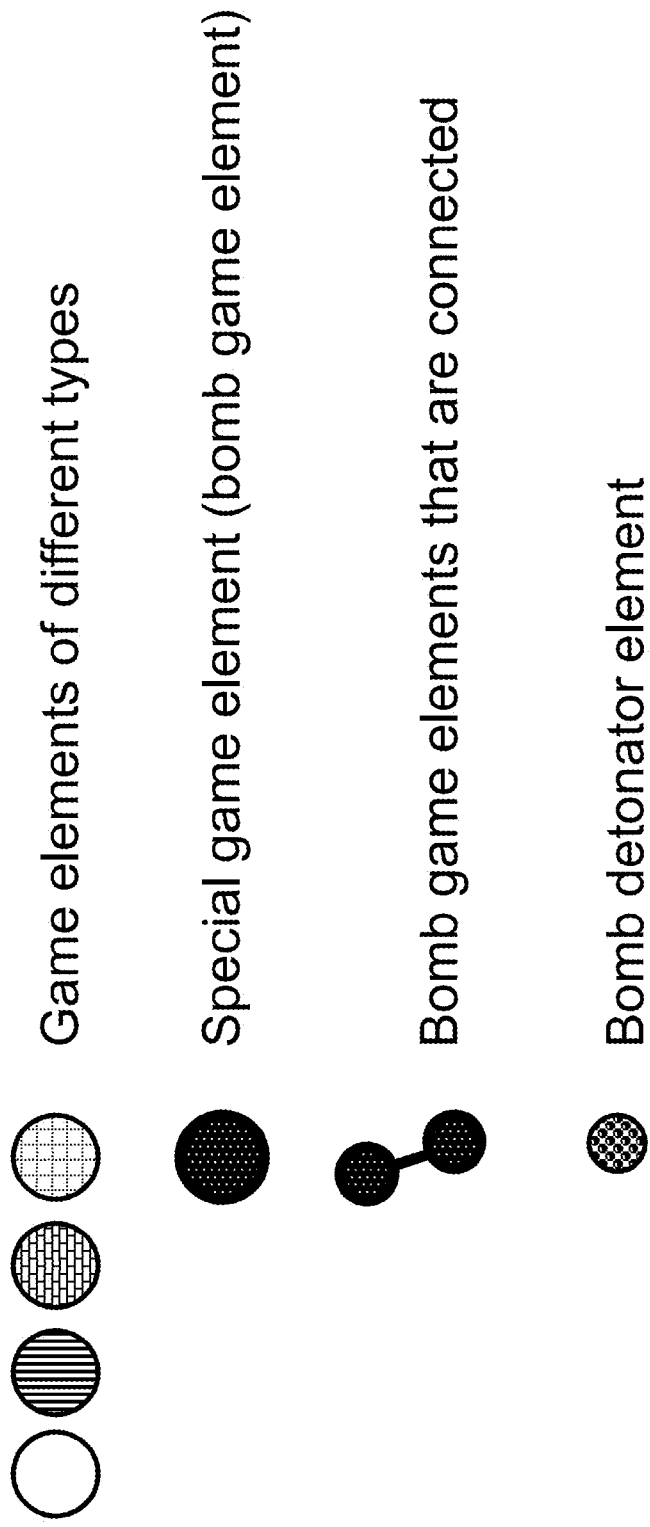
FIG. 73 shows a legend for FIG. 74 to FIG. 84
Figure 74:
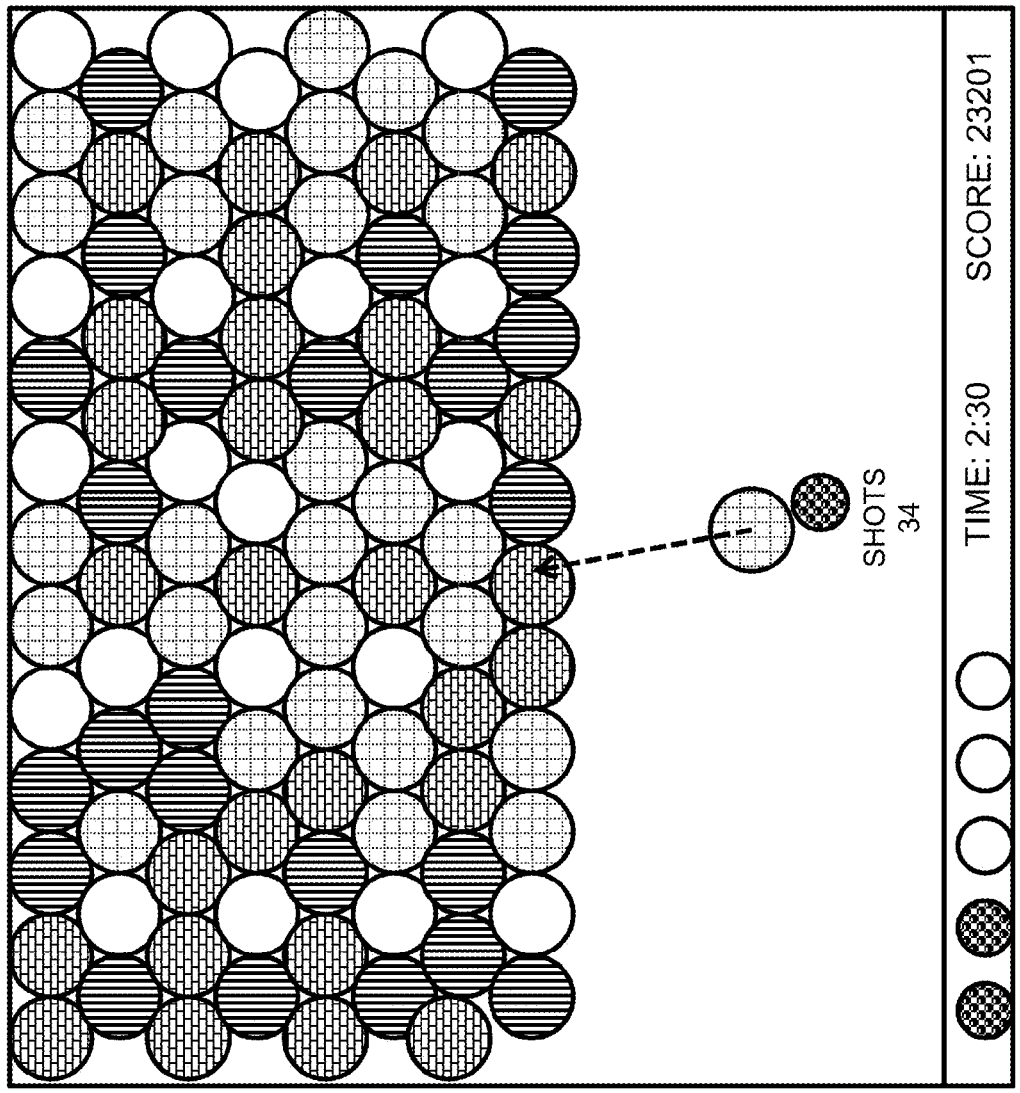
FIG. 74 shows a typical implementation of a bubble shooter game.

In a typical bubble shooter game the player operates a game element launcher that can shoot game elements in to the game board, this can be seen in FIG. 74 (FIG. 73 shows a legend for FIG. 74 to FIG. 84). The game board is typically populated with a number of game elements already. The game elements are of different types and in some implementations 4 different types of game elements are used. The number of different game elements can vary between the levels.

The launched game element will travel toward the game elements already on the game board and stick to the elements on the game board. If the launched game element hits a game element of the same type that already have another game element of the same type adjacent to it the three game elements will disappear from the game board. This can for instance be done through a popping animation. If the launched game element will cause two other game elements to pop that will leave one game element on the game board with no adjacent game element or a set of game elements that will not have a connection sequence of adjacent game elements to the top of the game board then the orphaned game element or elements will fall downwards on the game board.

The falling game elements can in some implementations land in receptacles in the lower end of the game board and in some implementations bounce off game objects that are placed on the game board.

The game elements that are launched in to the game board can be random or based on a set pattern. The player can in some implementations replace the game element to be launched with another game element, for instance the next game element in the 'launch queue'.

The game elements that are in the launch queue are typically of the same type as the game elements that are already on the game board, but the skilled person will understand that the game can be implemented in several ways.

The game element launcher can have a sight line extending in to the game board to aid the player in how the launched game element will travel in to the game board.

The game can be implemented with the game element launcher in the lower edge of the game board. The launcher can in some implementation move right and left along the edge of the game board.

There can in some implementations of the game be special game elements that when activated will destroy a number of other game elements on the game board irrespective of which type they are. Such game elements can be illustrated as a bomb and referred to as a 'bomb game element'.

Figure 75:
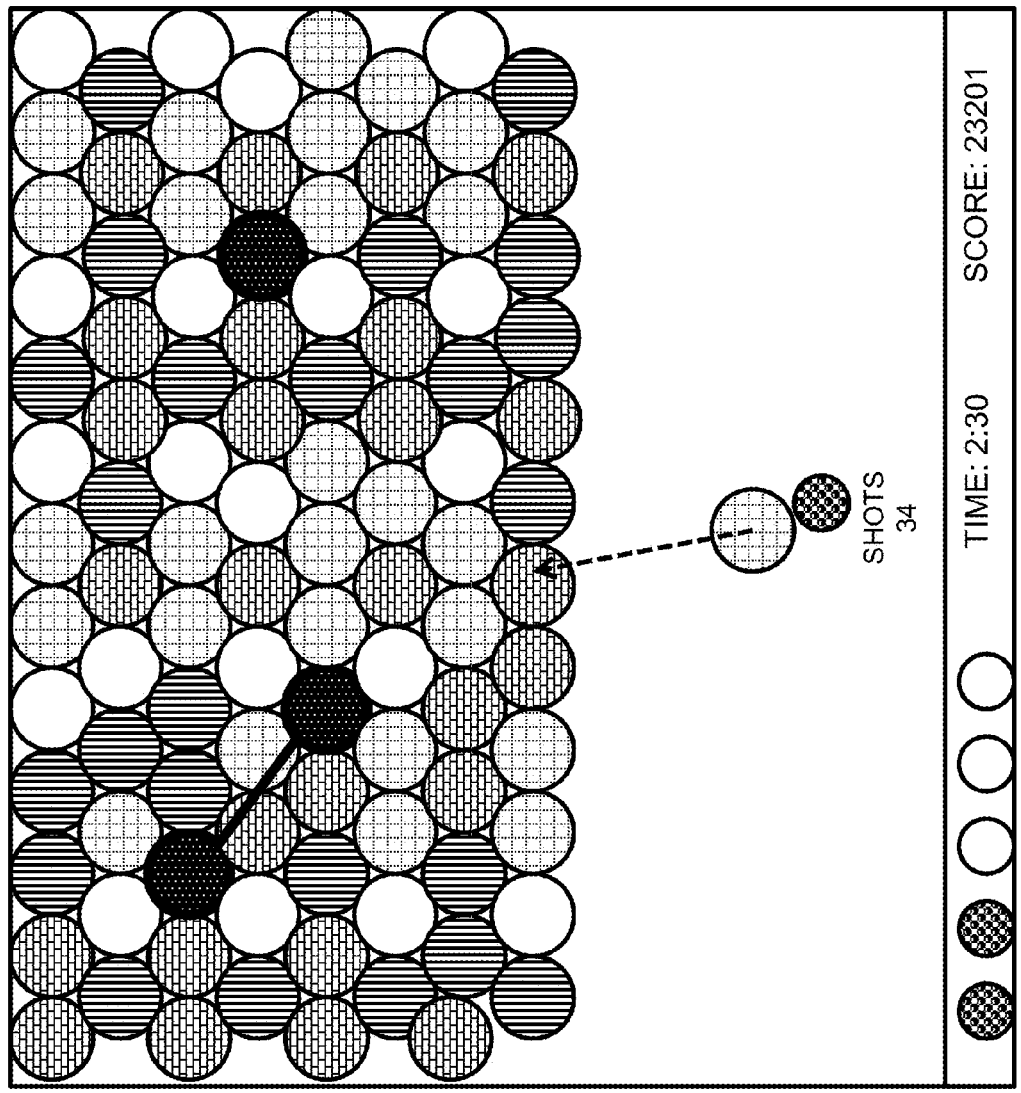
FIG. 75 shows an exemplary implementation.

The game board can have some bomb game elements already mixed into it at the start of a level or a game, see FIG. 75. In some implementations there will also be a row of connected bombs at the top of the game board that the player has to detonate to finish the level.

Figure 76:
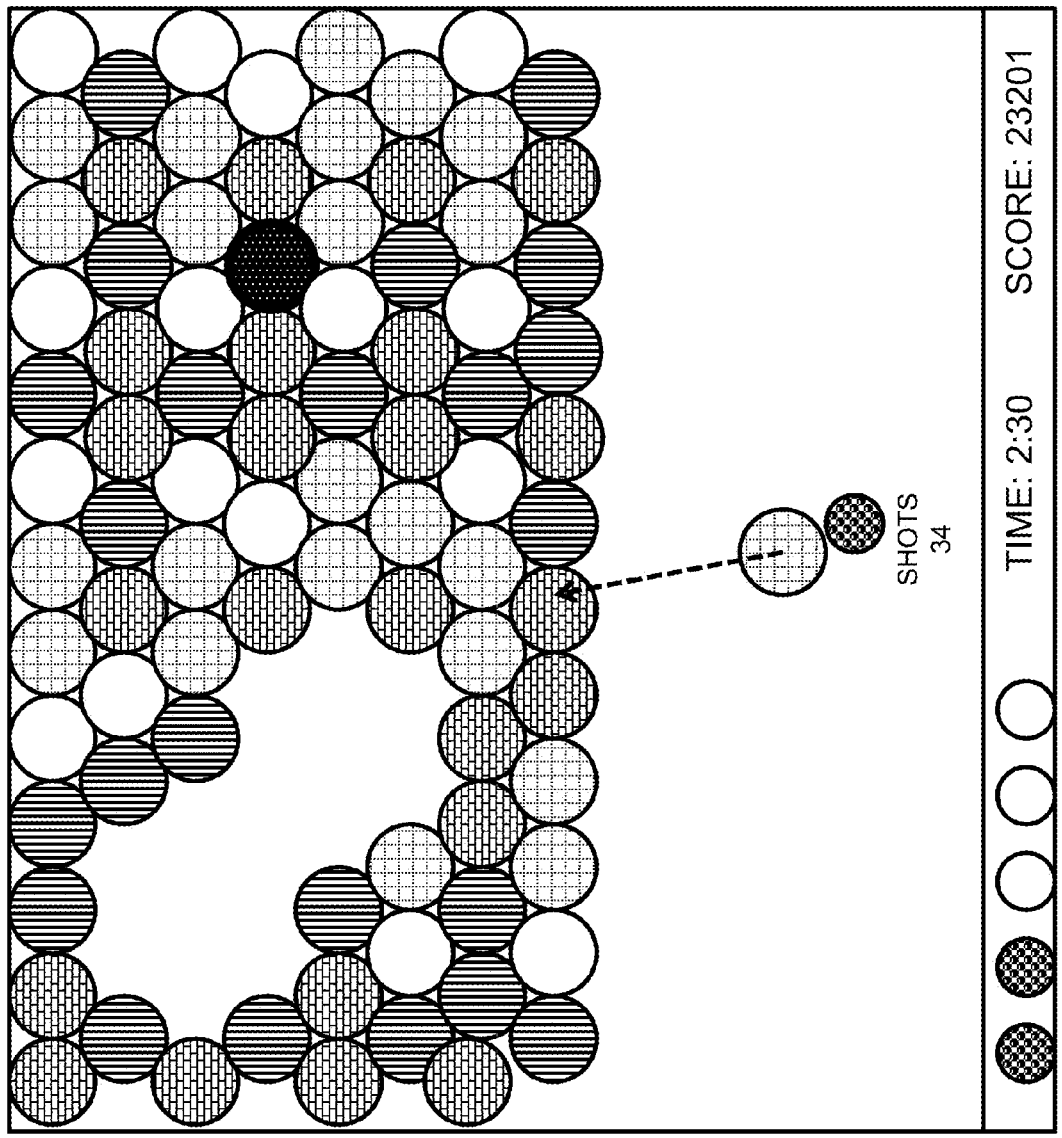
FIG. 76 shows the impact area of the two connected bombs in FIG. 75.
Figure 77:
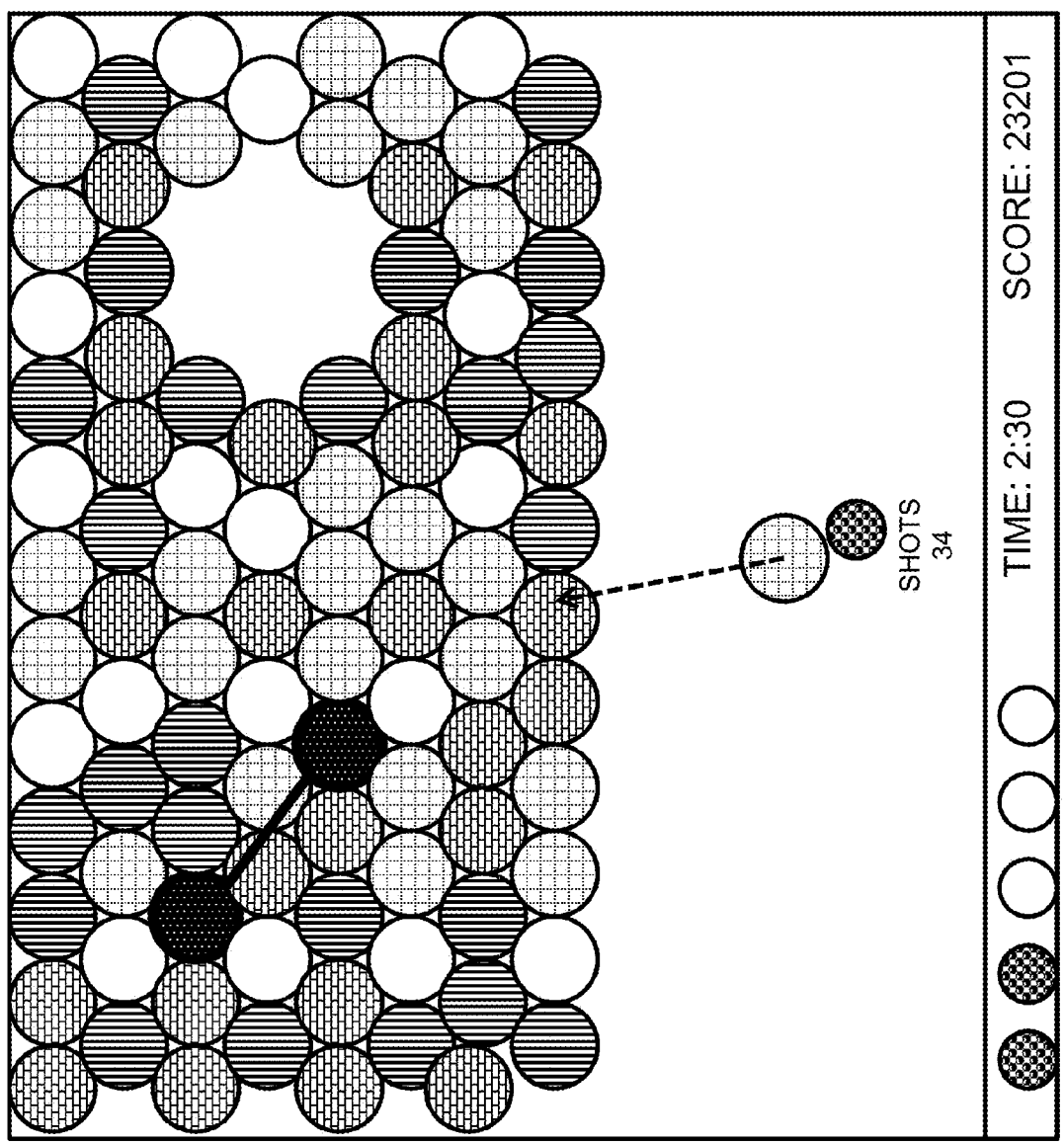
FIG. 77 shows the impact area of the single bomb seen in FIG. 75.

In some implementations, any number of bomb game elements that are placed within a set number of game elements from each other, for instance 3, become connected, see FIG. 75. That means if one of them is triggered the rest of the connected bomb game elements will also trigger. The connection can be in the form of a 'fuse' that visually connect the bomb game elements. FIG. 76 shows the impact area of the two connected bombs in FIG. 75. FIG. 77 shows the impact area of the single bomb seen in FIG. 75.

Figure 86:
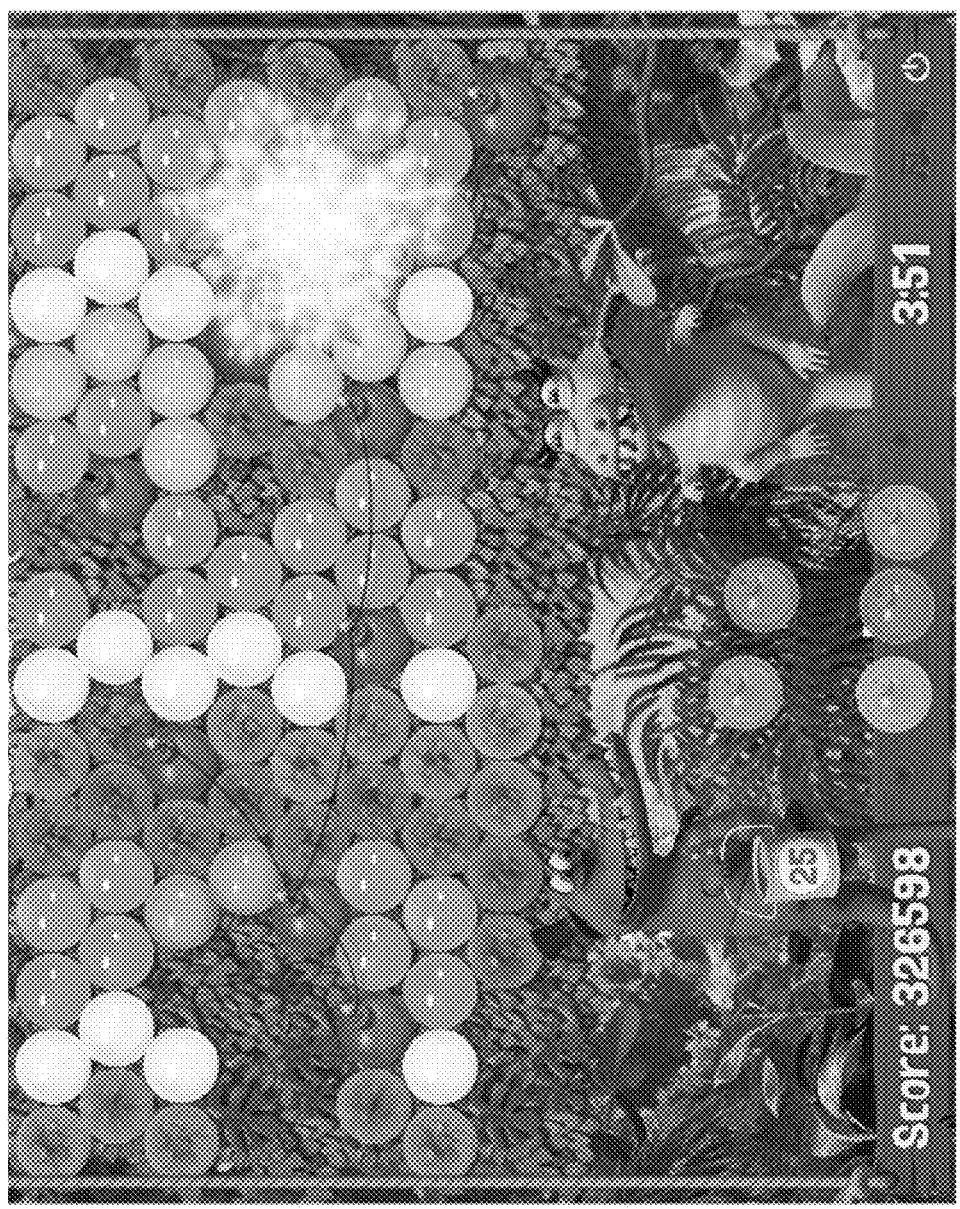
FIG. 86 shows an alternative implementation of the game where a bomb elements has been detonated.

FIG. 86 shows an alternative implementation of the game where a bomb elements has been detonated.

The player can in some implementations start with 5 explosive shots that can be used at any time to trigger explosions. The number of explosive shots can be limited.

Using the bomb game elements will help the player to complete the level fast. One strategy the player can use is to first create a long chain of connected bombs, using the 'special shots' with the bombs that exist in the field and then use one of the explosive shots to detonate the chain for game elements that give the player a reward.

Bomb game elements that are connected can also be triggered by removing the adjacent game elements. The bomb game element will then fall downwards on the game board and trigger the bombs it is connected to.

The Gameplay

The game can be implemented so that a level or a game session is completed when all game elements on the game board have been cleared. The player can have a limited time or a limited number of game elements to launch in to the game board or a combination of both.

Figure 78:
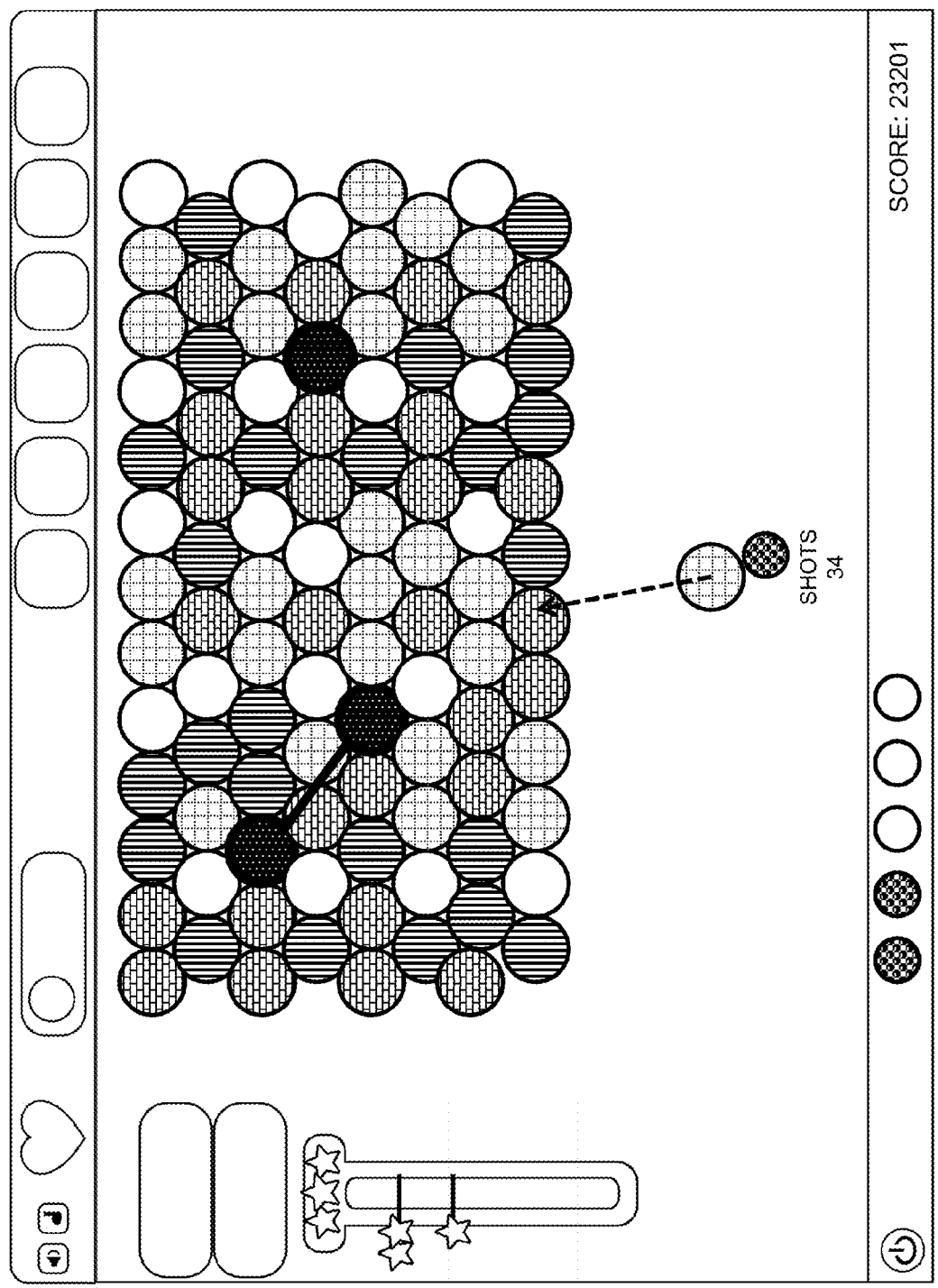
FIG. 78 shows an alternative implementation for the environment of the bubble shooter game.

FIG. 78 shows an alternative implementation for the environment of the bubble shooter game.

The player can in some implementations be awarded for good gameplay. For instance after a series of consecutive launched game elements that have caused game elements to disappear from the game board. In one implementation the player is awarded a special game element that can be launched from the game element launcher. The number of special game elements can be displayed for instance in relation to the game element launcher.

Figure 83:
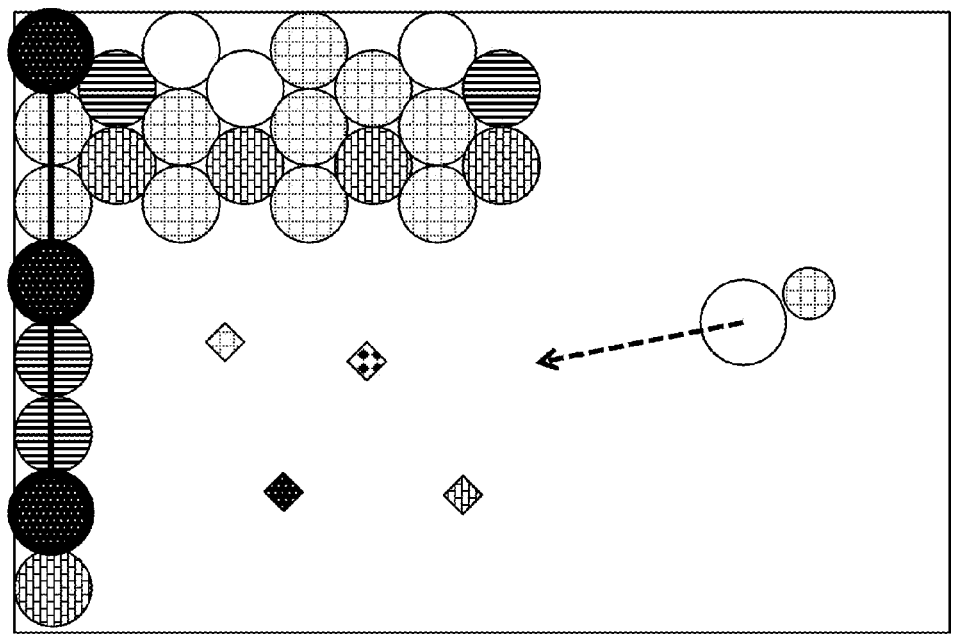
FIG. 83 illustrates a level with the top row having bomb elements that need to be triggered.

The game can in one implementation end if the player runs out of time or shots before he manages to blast the final row of bombs at the top of the level. FIG. 83 illustrates a level where the final row of game elements contain bombs that need to be triggered.

The player can be awarded for the shots not used when the final row is detonated When a bomb that is placed is connected to the last row of bombs the fuse can get a different colour to signal that the final blast is within reach.

Special Shots

Special shots can be earned from good gameplay. In some implementations the special shots can also be acquired using soft or hard currency.

The game can start a level with a set number of special shots, for instance 2. Further special shots are then awarded for good gameplay. There is however in some implementations a maximum number of special shots that can be stored at the same time, for instance 5.

To activate a special shot the player can click on a representation of a special shot to activate it for the next game element to be launched.

The special shots can be implemented to perform different functions. Below are examples of some of the possible implementations.

In one implementation the explosive shots are activated by clicking on them at the bottom of the screen. Once active they have to be used. The other special shots are active as soon as they get awarded to you and also have to be used.

Explosive Shots

When they land they blast all the surrounding balls; e.g. the 6 contact points.

Figure 79:
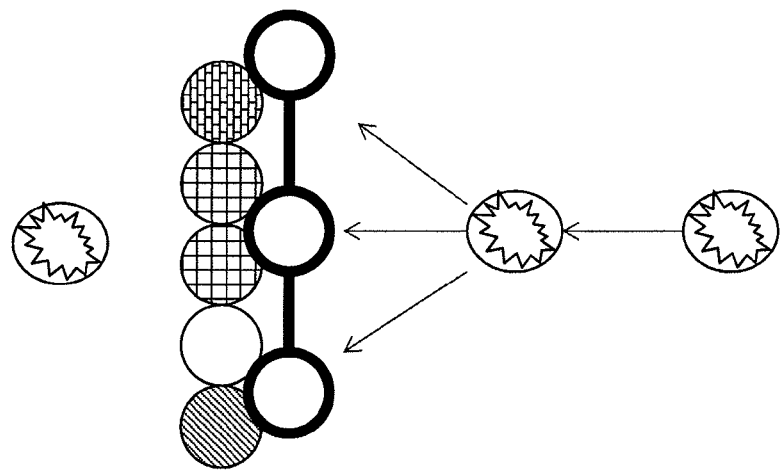
FIG. 79 shows one implementation of explosive shots.

In one implementation, the explosive shots can if the player clicks while the game element with the special shot is flying it will turn into 3 bomb game elements that land without detonating. Each is capable of blasting 6 surrounding bubbles. FIG. 79 illustrates explosive shots.

If the bomb game elements land close enough, e.g. 2-3 balls width away they become connected. The bomb game element can in some implementations only be detonated by another explosive shot later. If an unconnected bomb game element is disconnected from the adjacent game elements it falls from the game board without being triggered.

The explosive shots can be used in 2 ways and act as the main detonator of chains of bomb game elements.

Ghost Shots

Another special shot is the 'ghost shot'. The shot will be of a predefined game object type, in some implementations the type of the ghost shot will be defined by the type of the game object that is next to be launched on to the game board.

The ghost shots pass through all game elements on the game board except the ones of the same type as the ghost shot.

Figure 80:
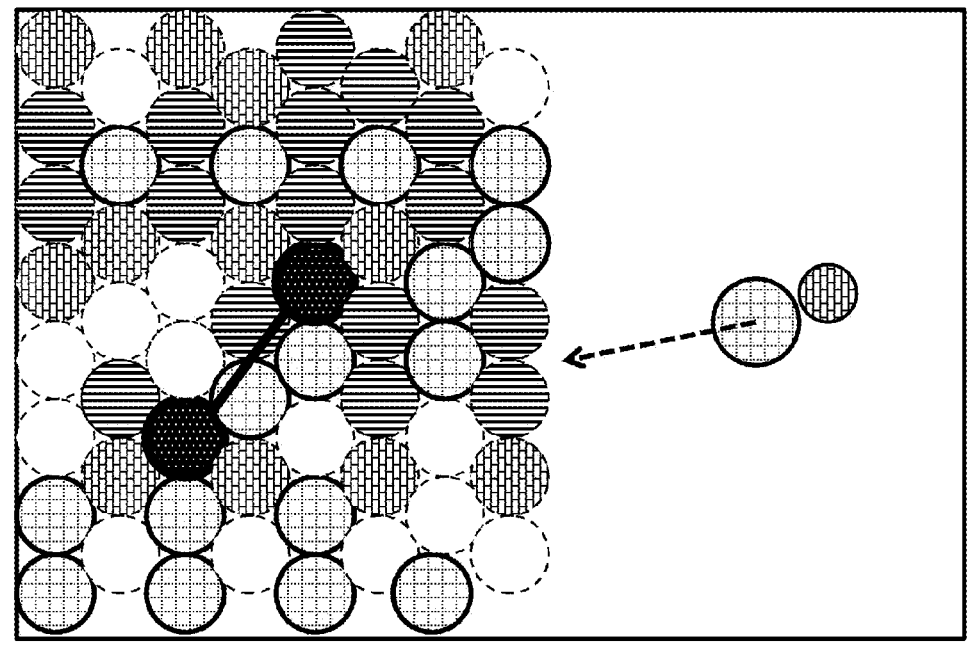
FIG. 80 illustrates Ghost shots.

When the ghost shots are launched they will behave like only the game elements of the same type as the ghost shot are present in the game board, so the ghost shot may wall bounce etc, but the shot only stops once it touches a game element of its own colour. FIG. 80 illustrates a Ghost shot.

The ghost shot will upon impact of another game object replace that hit game object with a bomb game element. This way the player may place a mine far into the game objects on the game board.

Bomb Dropper Shot

This special shot allows the player to drop bomb game elements that will replace other game elements on the game board. The special shot can for instance allow the player to place three bomb elements on the game board.

The bomb dropper shot can act as any other shot but will only bounce on the game board edges and travel over the game elements on the game board. The shot will disappear from the game board at the top edge of the game board. The bomb game elements that have not been placed on the game board are then lost. The player can release bomb game elements through for instance clicking the mouse. In some implementations the bomb game element will disappear from the game board if it is released in an area on the game board where there is no game element.

In some implementations if a bomb game element is released where there already is a bomb game element in the game board both bomb game elements will be triggered and destroy the game elements around them.

Figure 81:
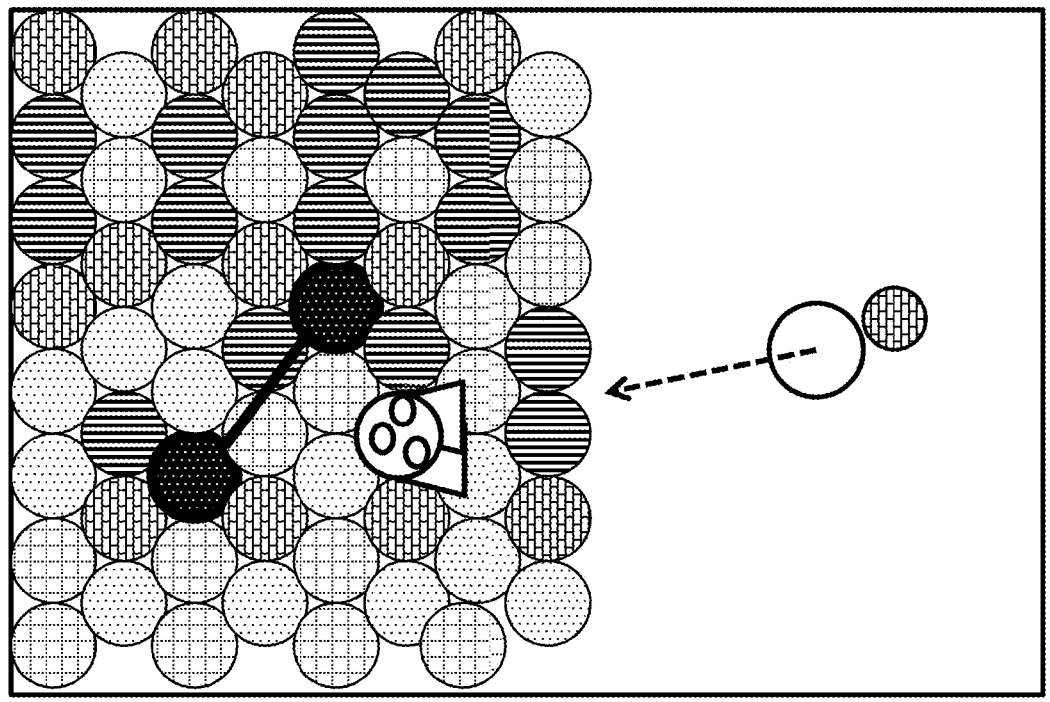
FIG. 81 illustrates a Bomb dropper shot.

FIG. 81 illustrates a Bomb dropper shot.

Game Elements

The elements and objects on the screen are exemplified in FIG. 73 to FIG. 84

The game board has a number of game elements of different types aligned in rows. The Game elements on the game board can have 6 contact points with other game elements. There can be empty spaces on the game board where there are no game elements. There can also be other game objects on the game board that are not game elements and in some implementations that cannot be removed.

The game field can scroll vertically so that the player in some levels do not see the whole game board until the game elements below are cleared.

Game Elements can be Removed from the Game Board in Three Main Ways

Pop the game element through combining it with two other game elements of the same type.

Clear game elements above it so that it has no connections to game elements that are connected to the top of the game board. This will cause the game element to fall downwards on the game board and be removed from the game board. Blast the game element with an explosion from a bomb game element.

The effects of clearing a game element is different:
Popping it makes no special impact
Making it fall down gives a better score
Explosions clears bigger fields and can reveal treasures that can give the player a reward, for instance better score or a collectable in the game such as soft currency.

Bonus Game Elements

Apart from clearing the field of game elements fast the explosions also impact the wall behind the game elements.

The wall is mostly blocked, but behind the game elements there are jewels of different value locked into the wall.

Figure 82:
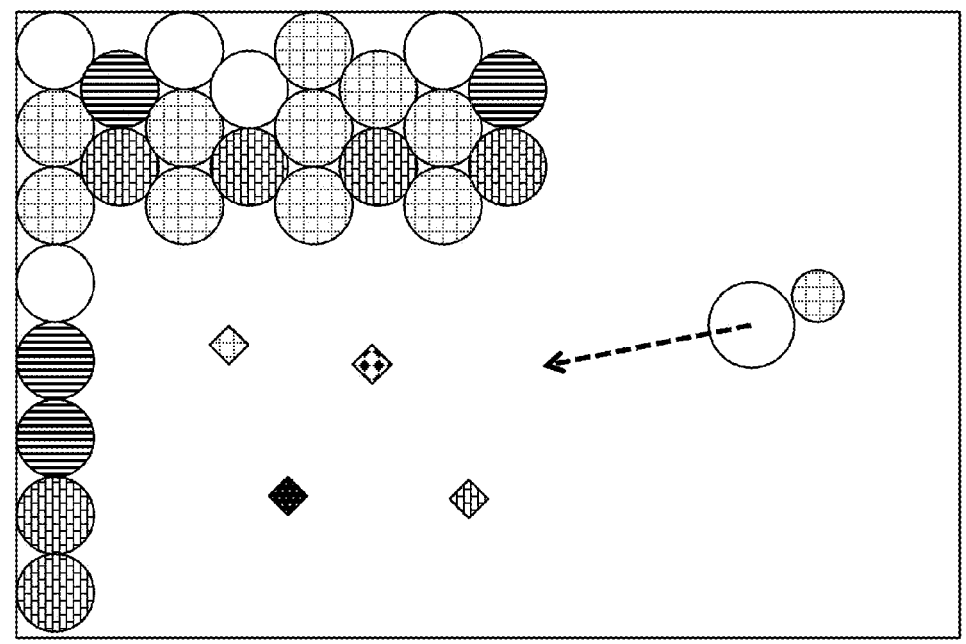
FIG. 82 illustrates released bonus items.

When an explosion is set off, any jewel that lies behind the explosion is released Once the wall is shown, it is too late to unleash it So the exact treasure the player will get should never be known The treasure exists in 5 value levels FIG. 82 illustrates when bonus game elements have been released.

Special Game Elements

Figure 84:
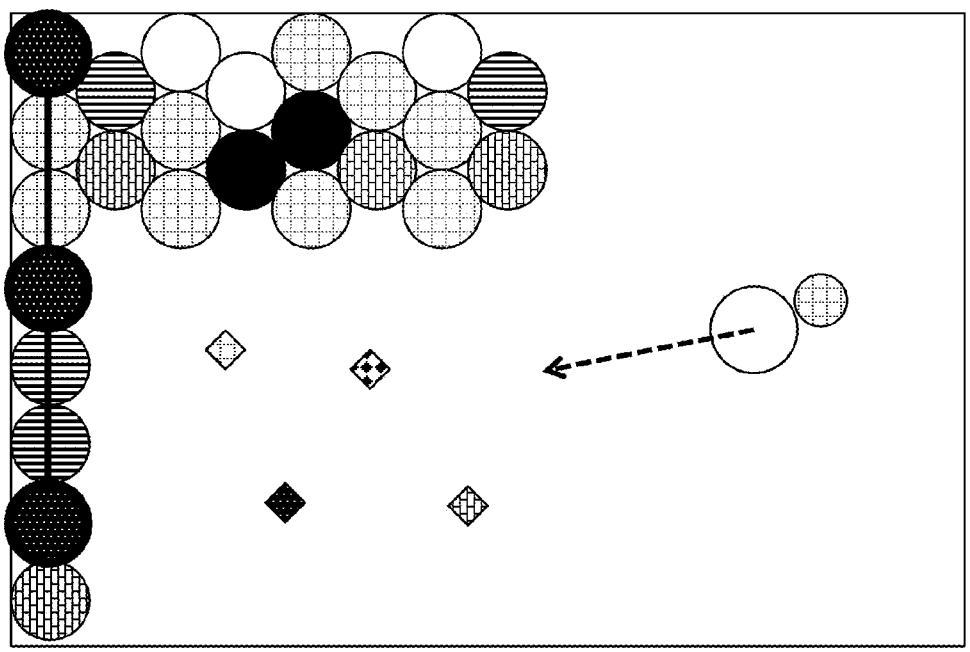
FIG. 84 illustrates non-matchable game elements.

There can in some implementations be special game elements that change the gameplay for the player. There can for instance be 'Black game elements' that cannot be matched with other game elements. These game elements can only be removed from the game board with a blast or when they are dropped down from the game board. FIG. 84 illustrates non-matchable game elements.

Boosters

The player can in some implementations enhance the gameplay by using boosters. The boosters can be awarded to the player or seeded in any number of ways. The player can also purchase the boosters before or during the game using soft currency collected in the game or hard currency bought for real money. It is however understood that the payment options implemented in the game can vary.

Examples of boosters that can be implemented in the game are:
To add time to complete the level, for instance +15 seconds.
Start the level with 5 extra shots.
Receive an extra 'special shot'.
Change colour of game elements.
Add bomb game elements in various positions on the game board (for instance 5).
Pop the game element that a launched game element lands on irrespective of the type of game element.
Re-shuffle all game elements.
Remove all game elements of a specific type.
Freeze the time.
Add time.
Slow down time.
Add game elements to be shot.

Game Play

In one implementation the game is played with a limited amount of time to complete a long level, such as 2-3 screens high. The levels can be designed to have different visual appearance. Apart from time the player also has a limited set of shots to complete the level.

The level can be completed in different ways.

Set off the explosion of the top level of bomb game elements on the game board for an extra bonus with a super jewel that falls down, the size and or amount of roof jewels are based on the number of shots saved.

Or run out of shots before you do this. Then all placed bomb game elements will explode for a final effect, but of the roof is not uncovered and you do not get the special roof jewel Running out of time ends the level prematurely Also other ways of playing a level can be implemented.

Scoring

Scoring in the game can be implemented as follows:
Popped Game Elements
3 game elements: 20 points per game element
4 game elements: 30 points per game element
5 game elements: 40 points per game element
And so on with +10 per game element in the group Sequence Bonus Making shots that pop or explode game elements in a row increases the score:
2 shots in a row: +5 points per game element
3 shots in a row: +10 per game element
And so on with +5 for each consecutive shot until you reach +25 which is the maximum sequence bonus per game element.

Falling Game Elements

Each falling game element is worth 2× the score of a popped game element from the shot.

Exploded Game Elements

A game element you blast away in a bomb explosion is also worth 2× of a popped game element for the same shot.

Bonus Game Elements

Bonus game elements can be in 5 sizes and give a score bonus of: 1000 points, 2500 points, 5000 points or 10000 points.

Bonus for Saved Shots

You also get 1000 points for any saved shot, and 5000 for any saved explosive shot.

Figure 85:
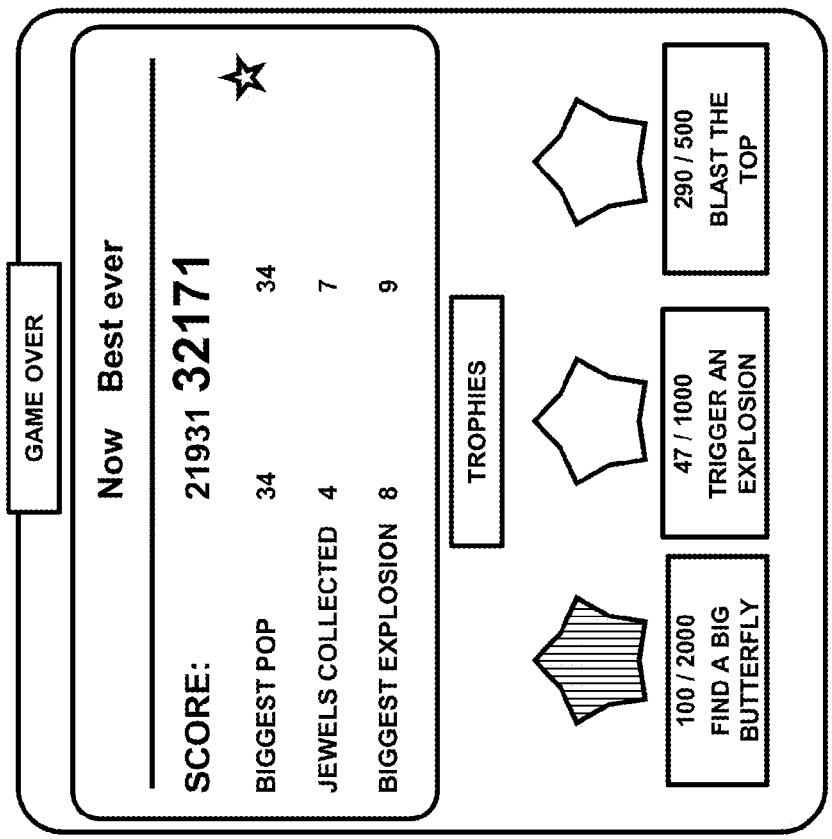
FIG. 85 shows one implementation of a result screen.

When a level is finished, a summary of the result may be displayed. FIG. 85 illustrates an example of this.

Achievements

The game can be implemented so that the player can earn achievements for tasks completed in the game. Below are examples of such achievements.

Complete the level

Diploma hunts

Make a game elements fall

Trigger an explosion

Connect 2 bomb game elements

Lay a bomb game element

Unlock a treasure from the wall

Collect a special shot

Use a ghost shot

Split a blast shot

Get a final roof explosion

Charms, Potions & Wishes

The player can purchase in-game power-ups to aid them on their quest. These are available in the form of charms, potions and wishes. Charms are permanent aids with unlimited use, and are thus the most expensive to buy. There are (at the time of writing—14 Sep. 2012) currently fourteen charms available for purchase. Charms are bought using Facebook™ Credits, or gifted to other friends (again, for Facebook™ Credits). Wishes are charms that can be used for one game-play only and, as such, are cheaper. Potions are bought using in-game coins, last for three game-plays, and offer different benefits from Charms and Wishes.

All power-ups are unlocked one by one as the player progresses in the game.

Charms

The player can buy charms using Facebook™ Credits. Once bought, they are permanently added to the player's inventory. At the time of writing (Sep. 12, 2014) there are fourteen charms currently available. There are daily offers for cheaper prices if charms are bought in bulk. It is possible to play the game and never buy a charm, but they do have obvious benefits and significantly speed up a player's progress in the game.

Different Charms

Figure 87:
FIG. 87 illustrates one implementation of the different Charms available.

FIG. 87 illustrates one implementation of the different Charms available and described below.

Charm of Life

Unlocked at level 8 once 20 stars have been obtained

Adds 3 to the maximum number of lives, each time the game is left the number of lives can recharge to this larger number. It is worth bearing in mind that the maximum life cap updates to 8 anyway when the player collects a certain number of stars.

Charm of Foresight

Unlocked at level 14

This Charm allows the player to choose their shot from three bubbles in the cauldron instead of two. This allows better tactical planning of shots, which becomes increasingly important as the level progress and are more difficult.

Charm of Shielded Spiders

Unlocked at level 15

This Charm removes only one spider (instead of two) if the player makes an unsuccessful shot. This promotes point scoring via spider bounces.

The Charm of Precision

Unlocked at level 19

This Charm permanently extends the player's aim—helpful for when bouncing bubbles against the wall as it enables the player to see the potential trajectory before shooting.

Charm of Scrolling

Unlocked at level 24

This Charm allows the player to scroll up to see the higher levels of bubbles three times per game. In later levels this is very useful when planning tactical shots.

Charm of Plenty

Unlocked at level 40

This Charm adds five extra bubbles to the player's starting number of bubbles in the cauldron each game on every level. It is worth bearing in mind that there is a Potion that does this (except it adds seven bubbles), that only need be paid for using in-game coins. However, that Potion lasts for only three turns at a time, whereas the Charm is permanent. Naturally, if both are used together then the player gets a total of twelve extra bubbles. This is of course useful, but it is also perfectly possible to complete levels with nothing but a bit of patience.

Charm of Fortune Spiders

Unlocked at level 49

This Charm 'glues' two spiders in place above the jars so that they never retreat. These spiders can change colour depending on how many shots you make, but they never disappear. This is very useful for boosting point scores.

Charm of Antidote

Unlocked at level 51

When activated this Charm will heal Infected Bubbles once per level, but it does not remove the original infection. This means that, after healing, the virus will start spreading again, and although it is a permanent aid the Charm can only be employed once per level.

Figure 89:
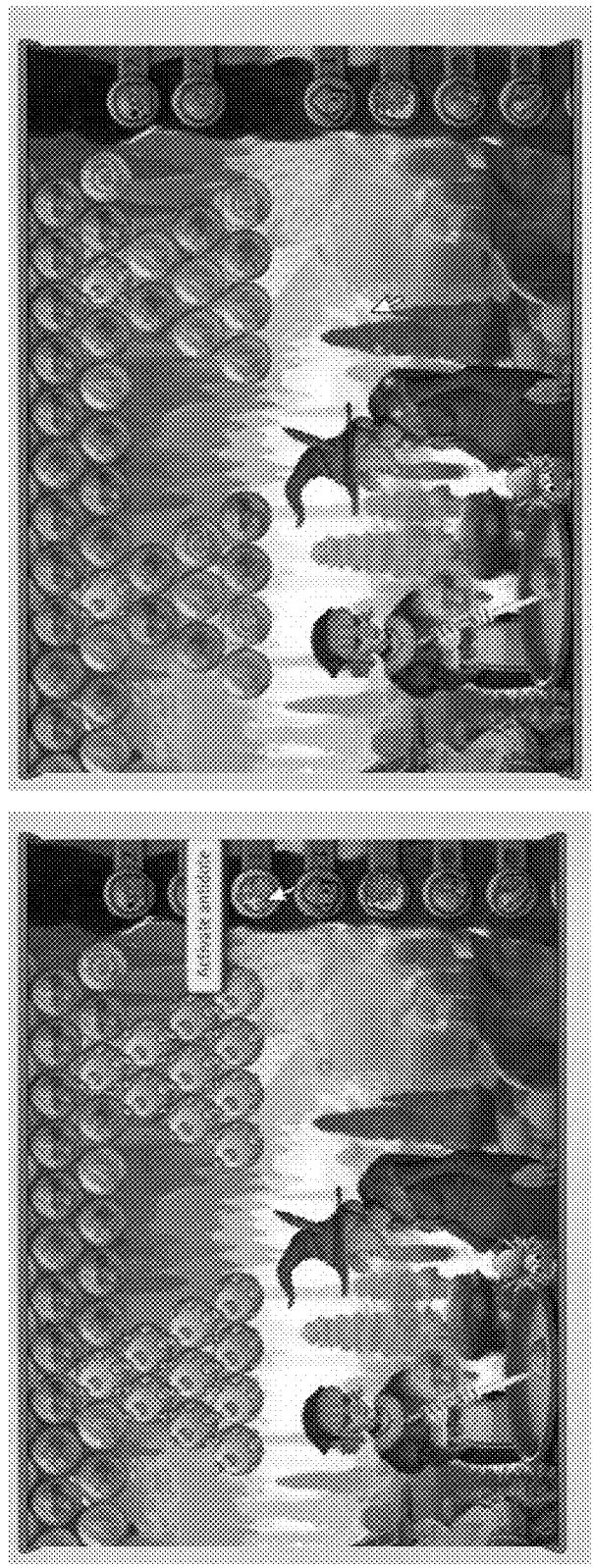
FIG. 89 illustrates how to active the charm of Antidote and the result of having used it.

FIG. 89 illustrates how to active the charm of Antidote and the result of having used it. As can be seen, the bubbles on the left image are all bubble and infected. The bubbles in the right image do not have strange bubbles on them anymore but instead look like standard bubbles, hence the charm has healed the bubbles.

Charm of Webbing

Unlocked at level 53

This Charm places a spider web over the two largest (and lowest scoring) jars, so that any bubble that falls on them bounces up to hit the spiders again. This lasts for thirteen bounces, at which point the web then dissolves.

Figure 90:
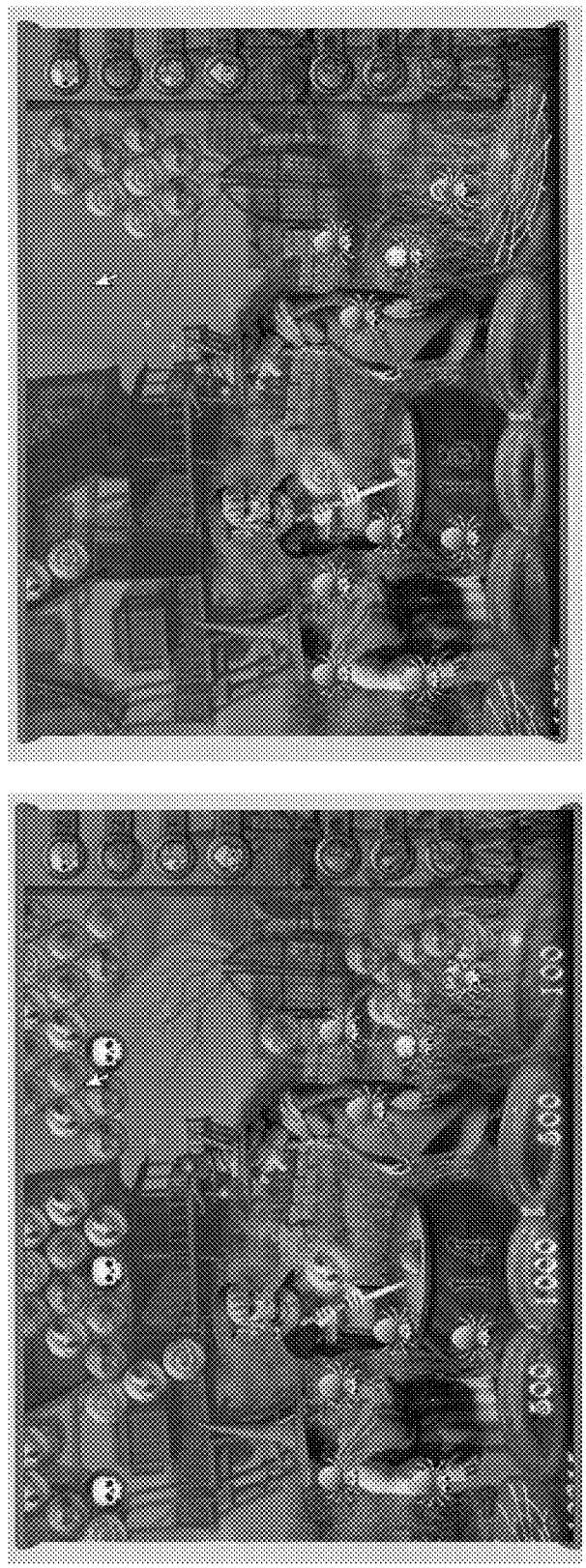
FIG. 90 illustrates the use of the charm of Webbing.

FIG. 90 illustrates the use of the charm of Webbing. In the left image the charm has not yet been used so the containers catching the bubbles look like normal. On the right image the charm of Webbing has been used and therefore one of the containers, in this case the furthest container to the right, has been covered with a web.

Charm of Immortality

Unlocked at level 71

This valuable Charm provides the player with unlimited lives, forever—an excellent feature for the hard-core gamer.

Charm of Disarm

Unlocked at level 78

Figure 91:
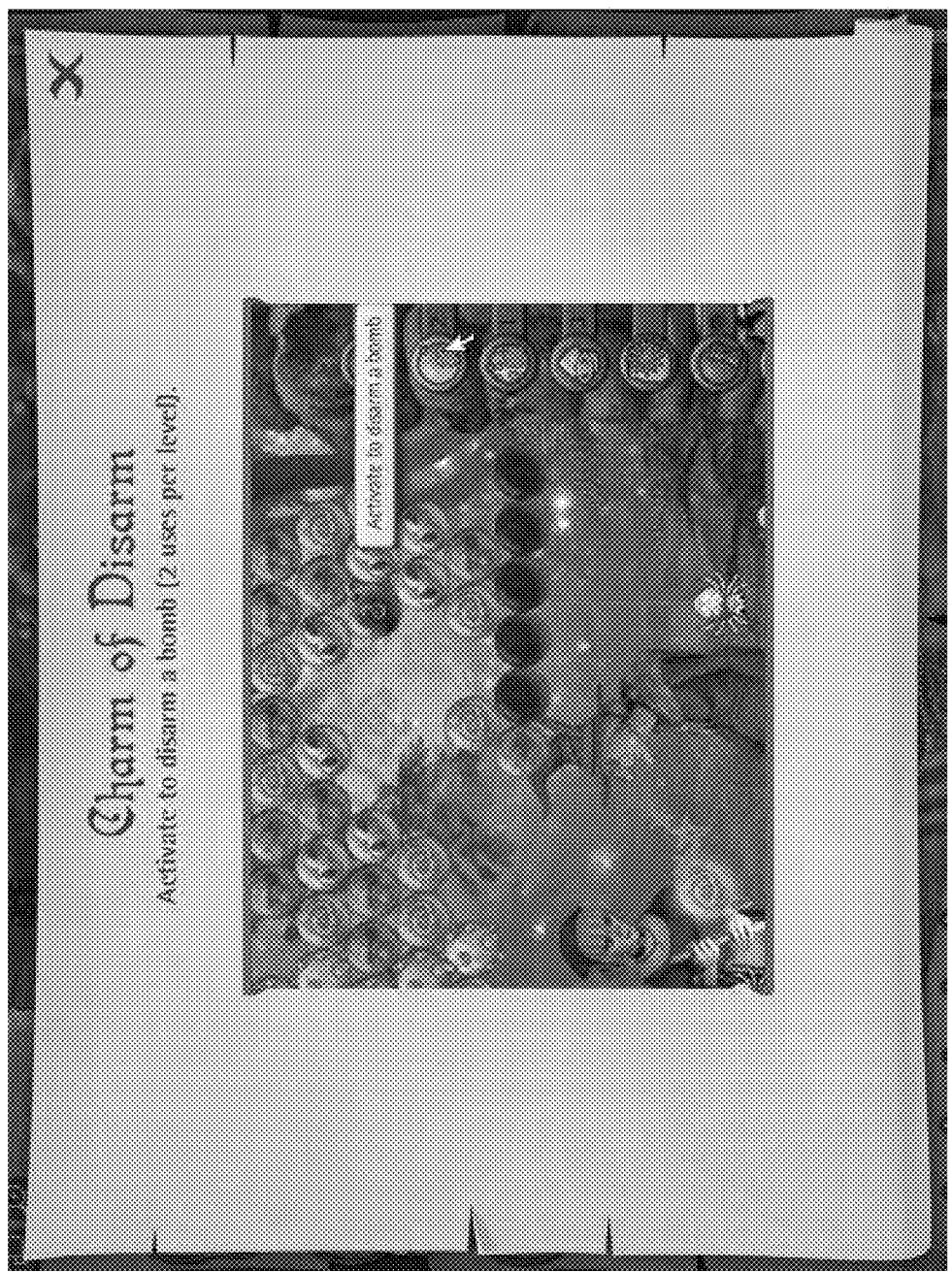
FIG. 91 illustrates how to use the Charm of Disarm.

This Charm allows the player to disarm Bomb Bubbles twice a level. It is a permanent Charm, but it can only be employed two times in a level. FIG. 91 illustrates how to use the charm of Disarm.

Figure 63:
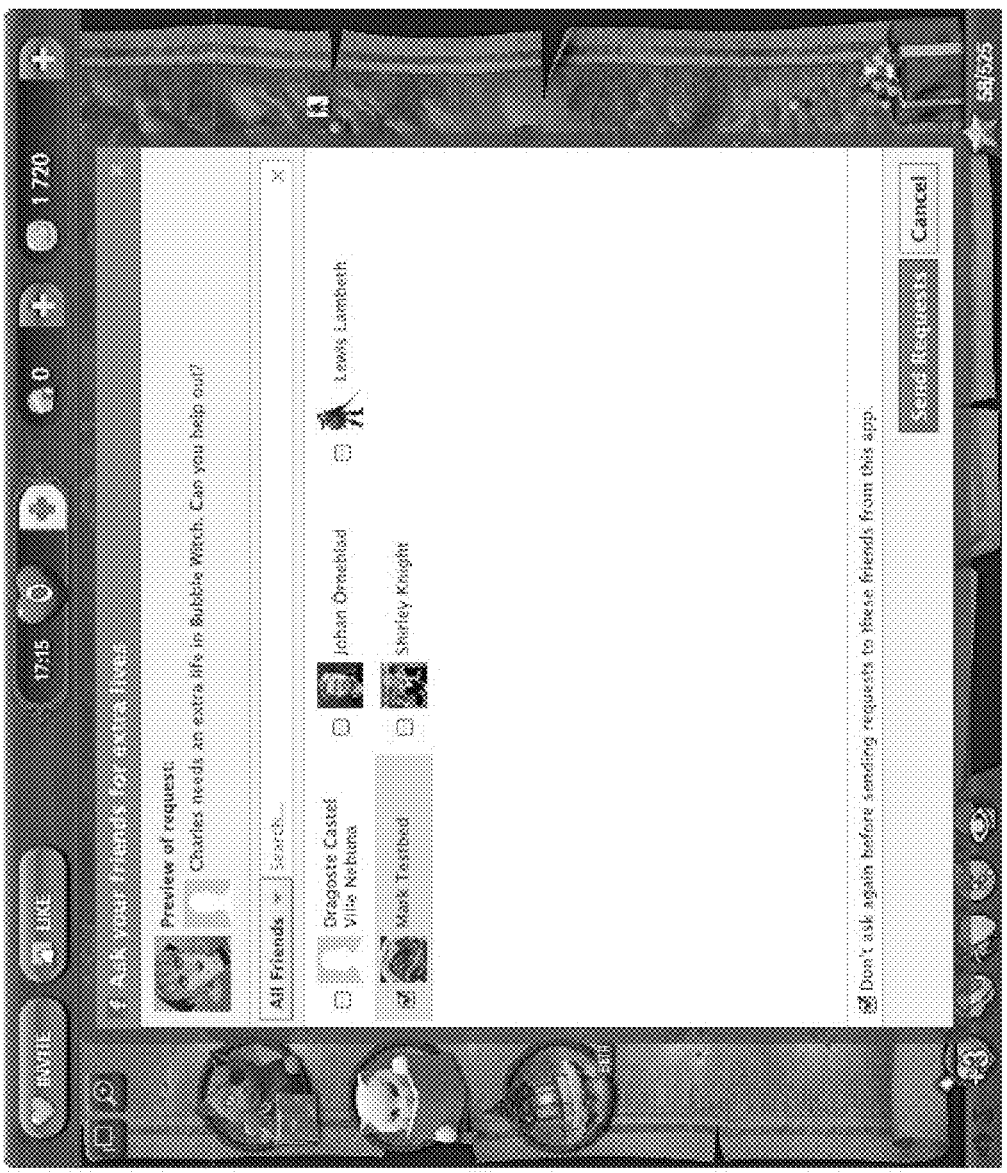
FIG. 63 shows one implementation when selecting friends to ask for lives.
Figure 64:
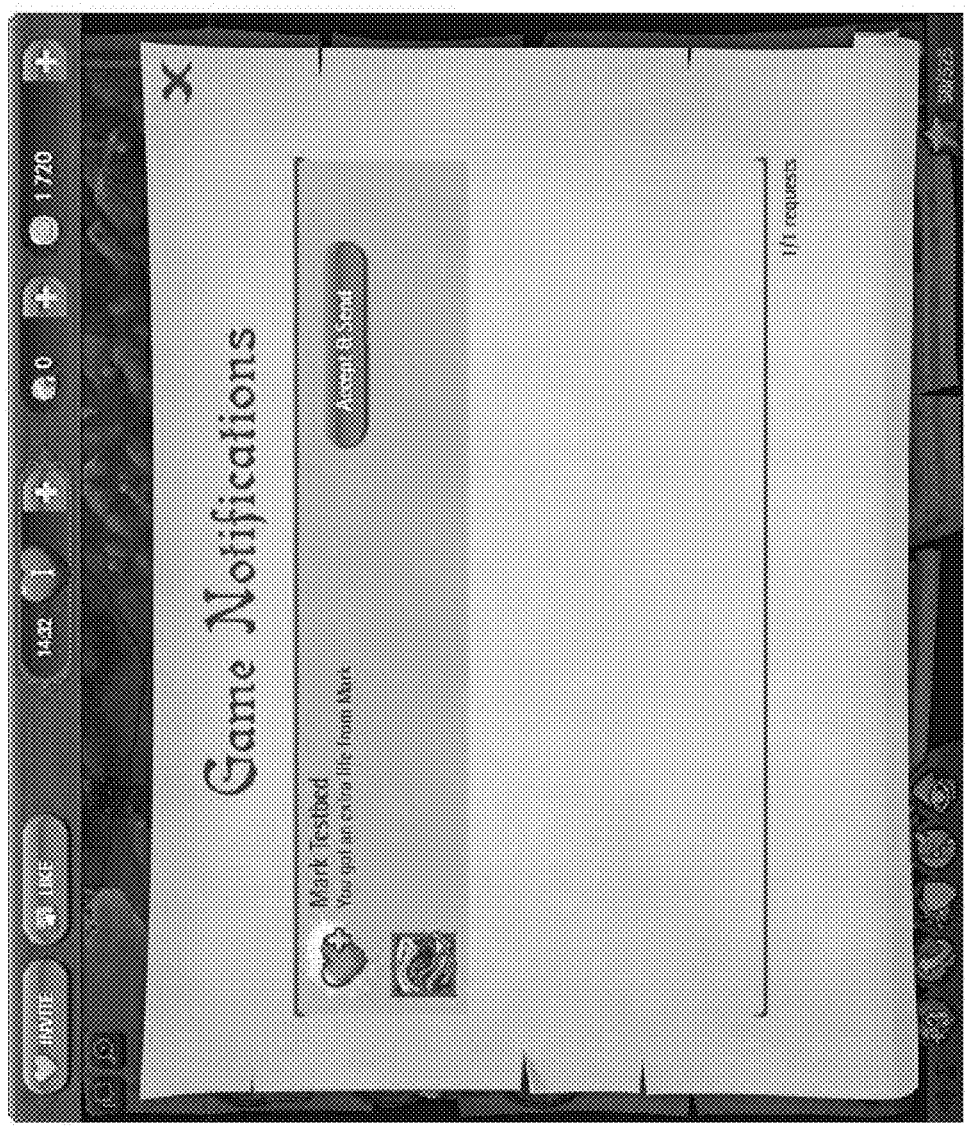
FIG. 64 shows one implementation when having received a life.
Figure 92:
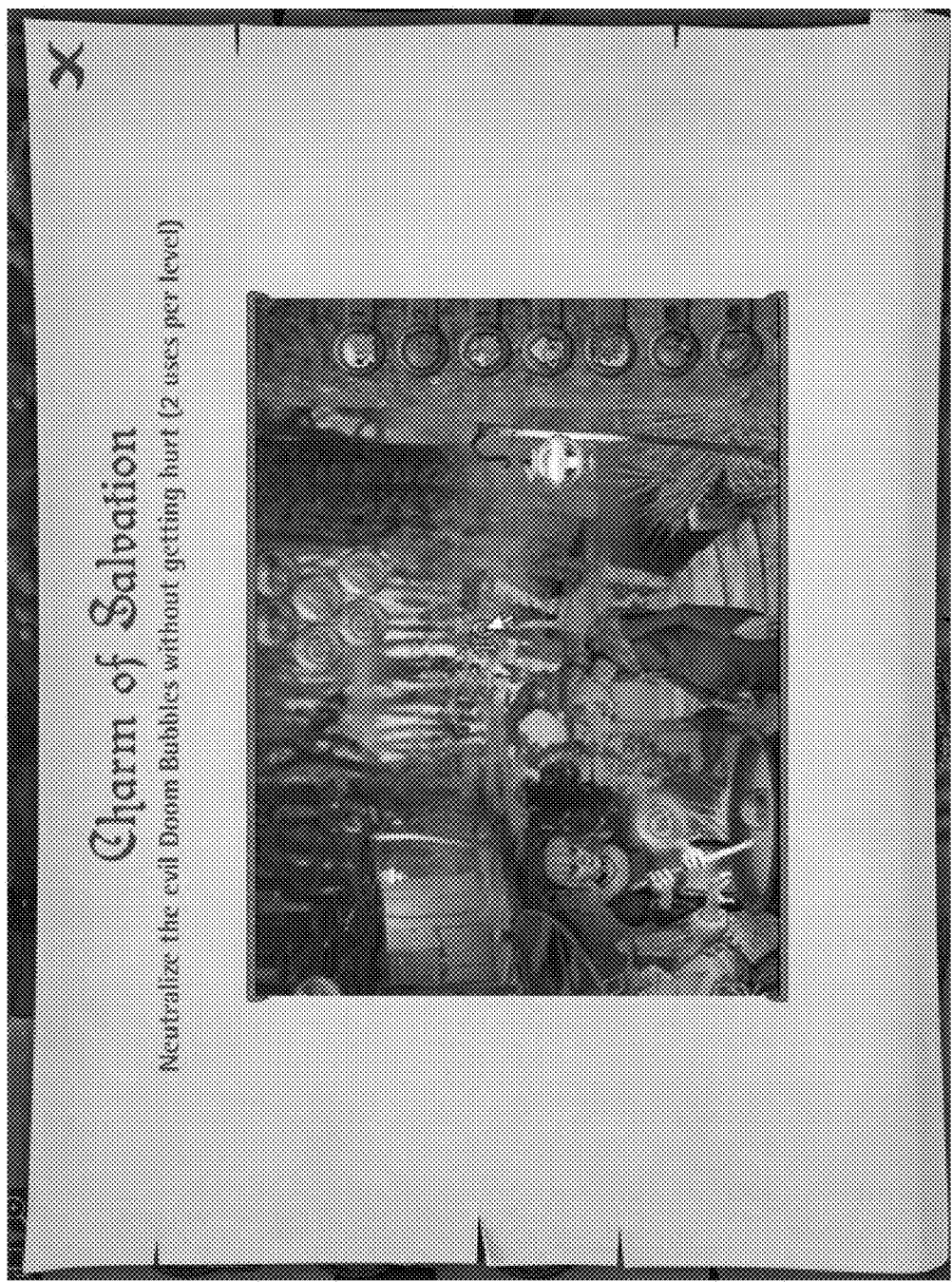
FIG. 92 shows one explanation of the Charm of Salvation.
Figure 93:
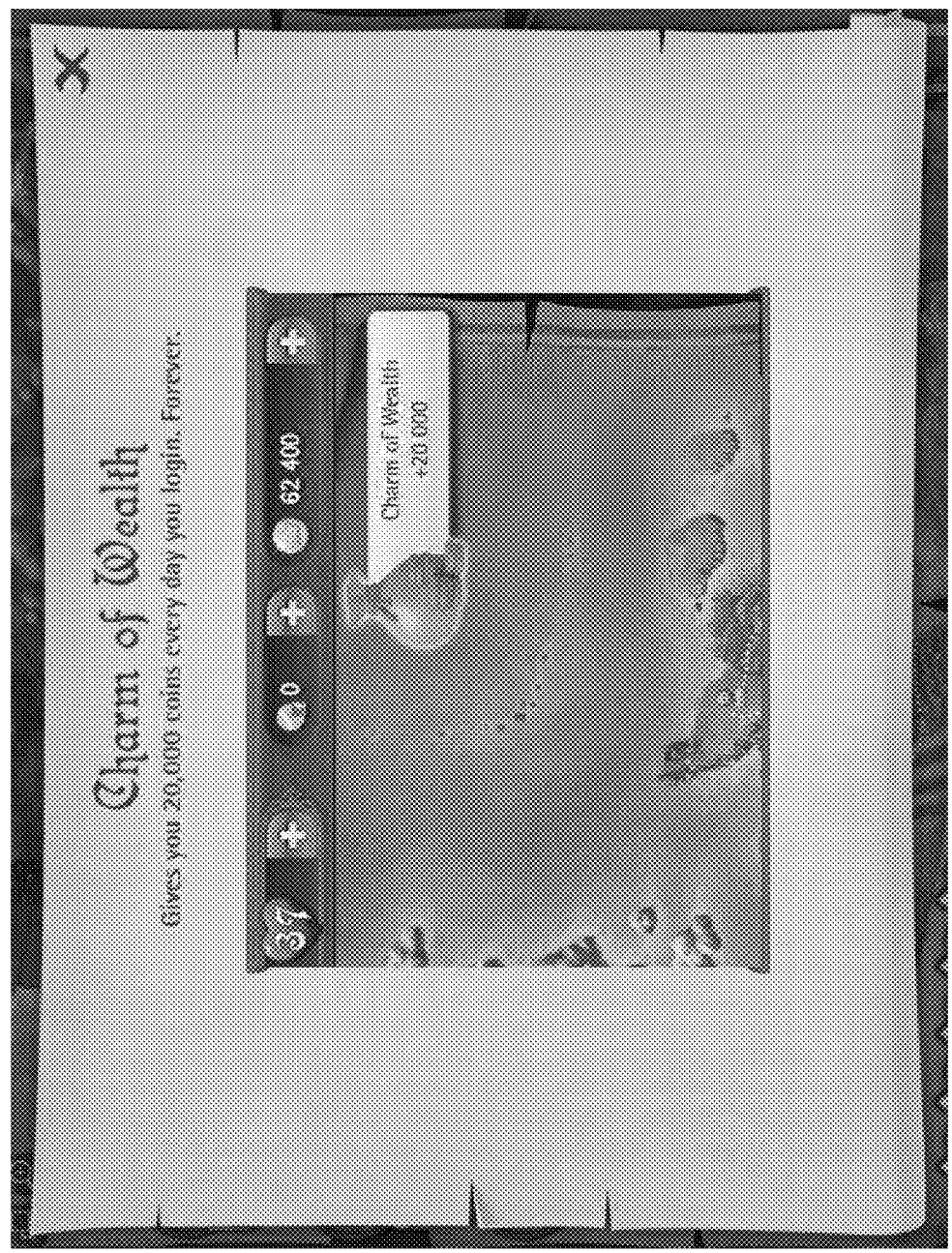
FIG. 93 illustrates the charm of wealth.
Figure 94:
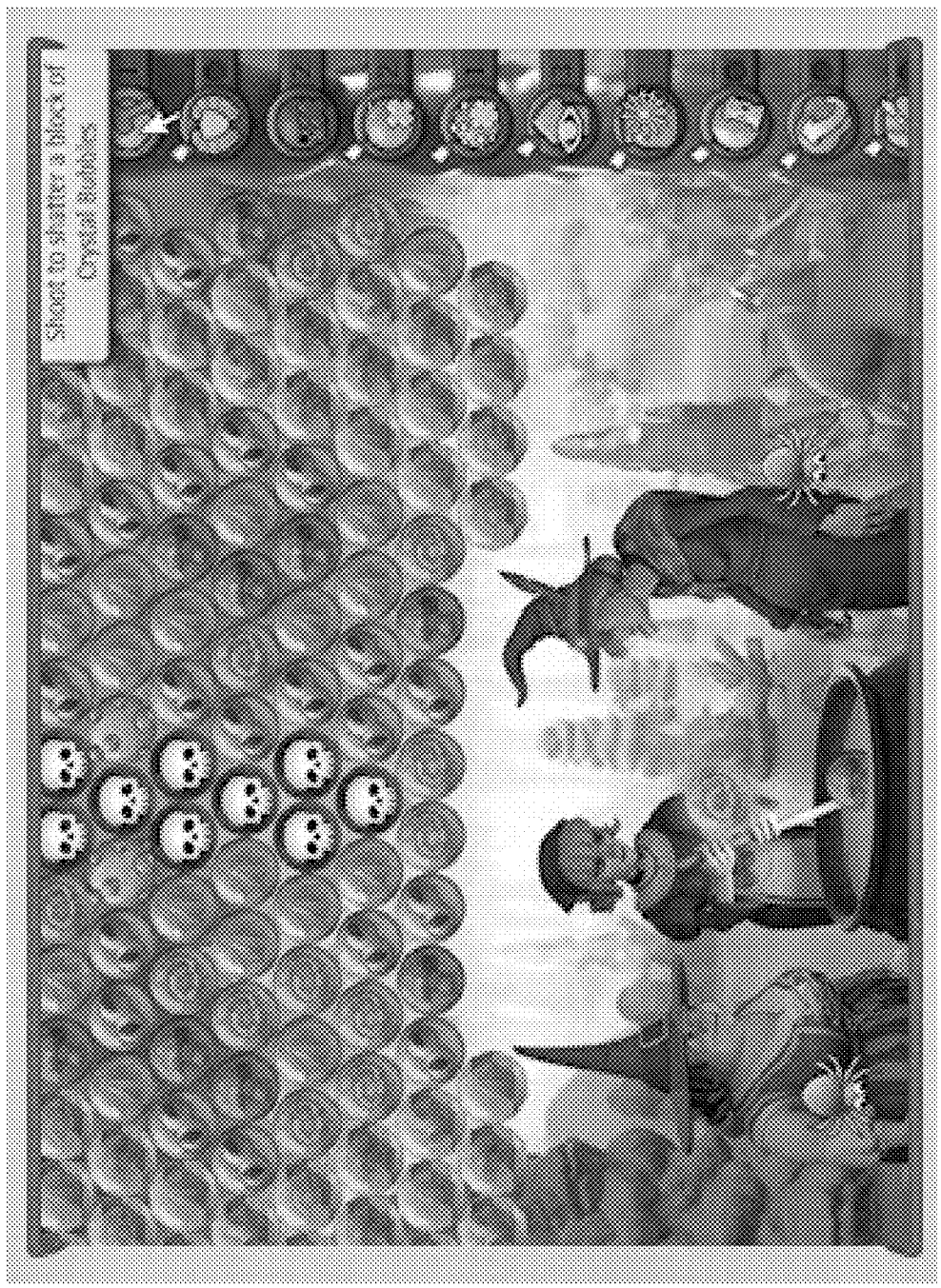
FIG. 94 shows one illustration explaining the Charm of Shattering.
Figure 95:
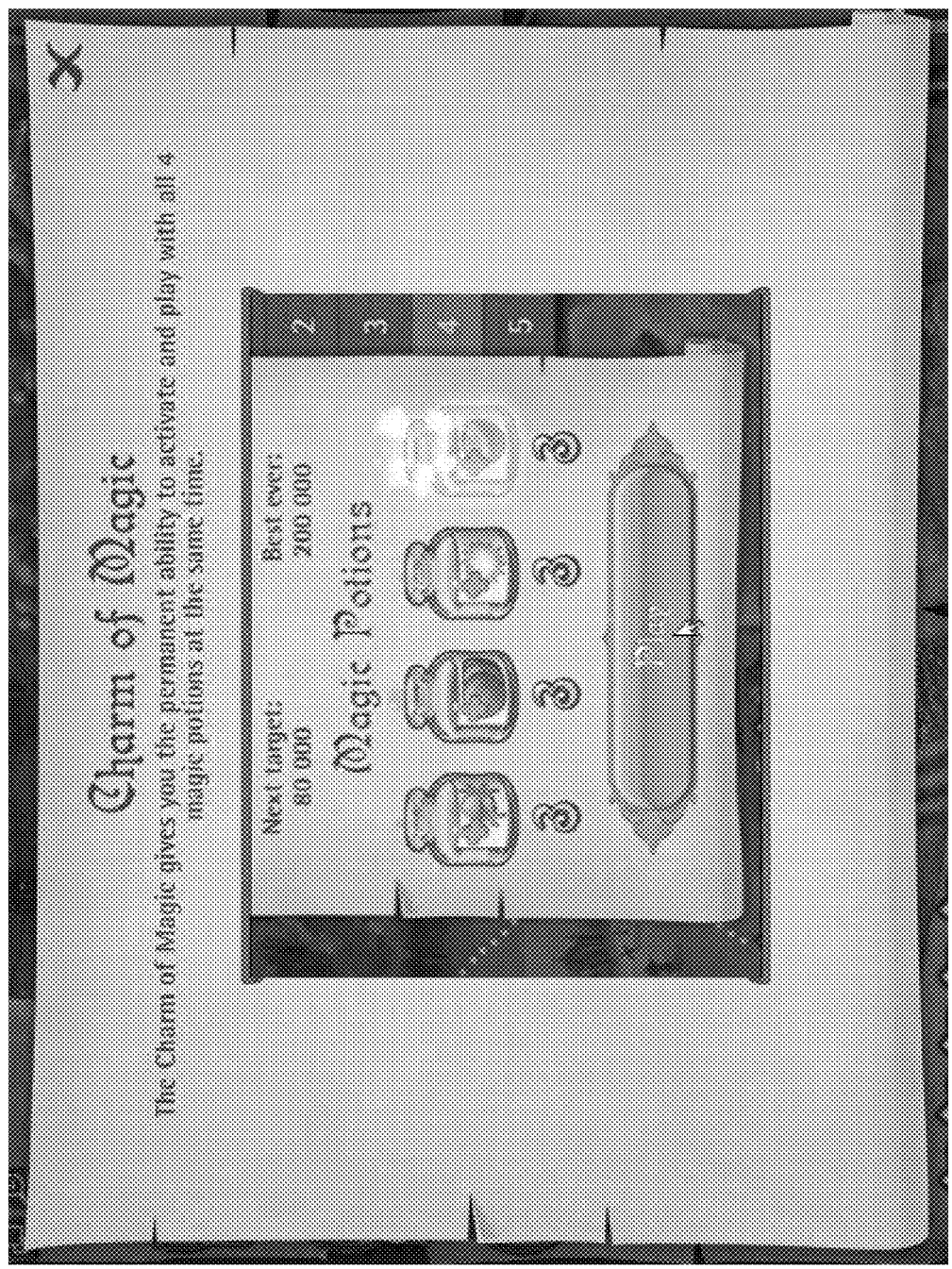
FIG. 95 shows one illustration explaining the Charm of Magic.
Figure 96:
FIG. 96 shows one implementation of the Charm of Insurance.
Figure 97:
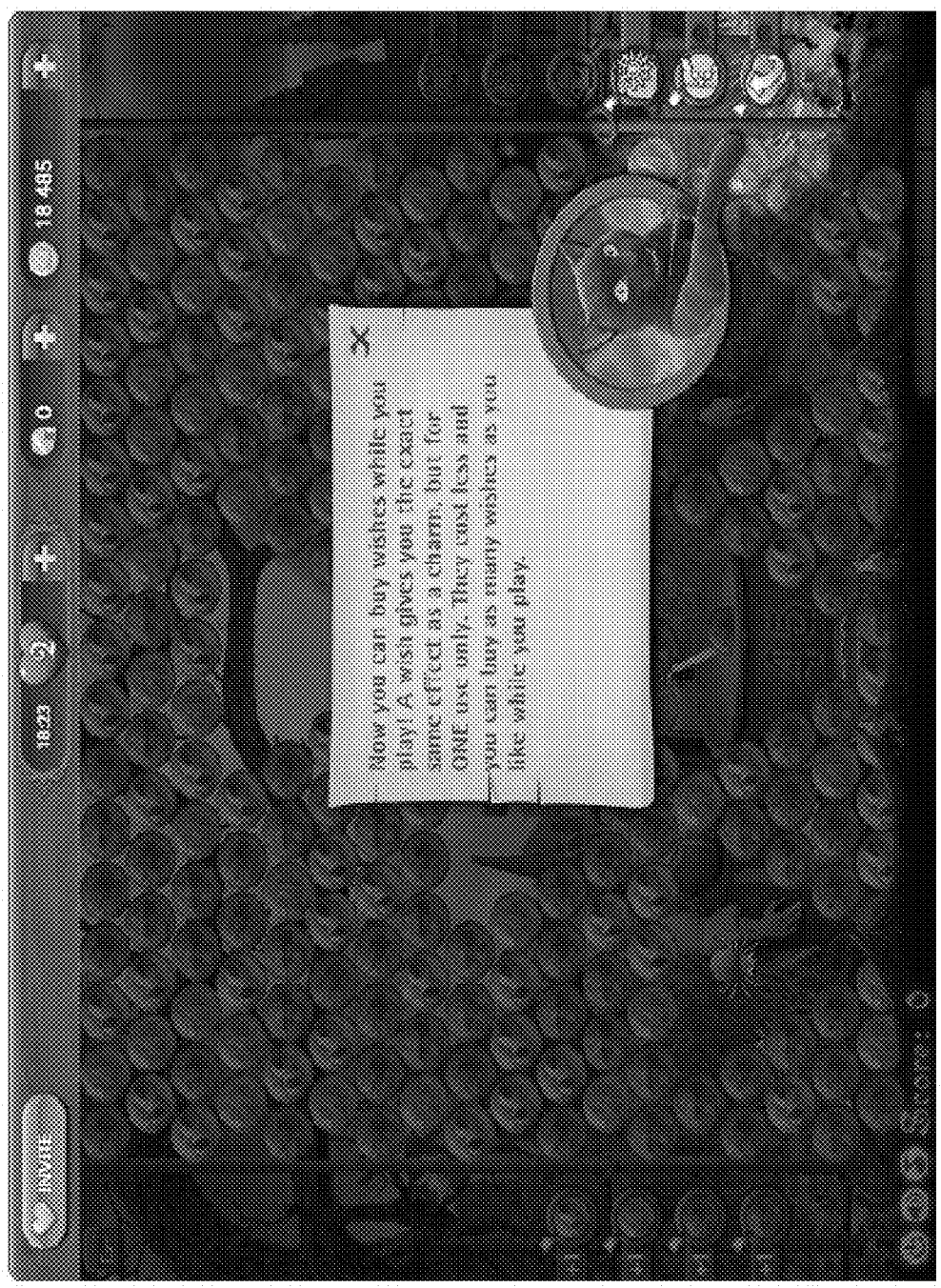
FIG. 97 shows one implementation explaining the use of Wishes.
Figure 98:
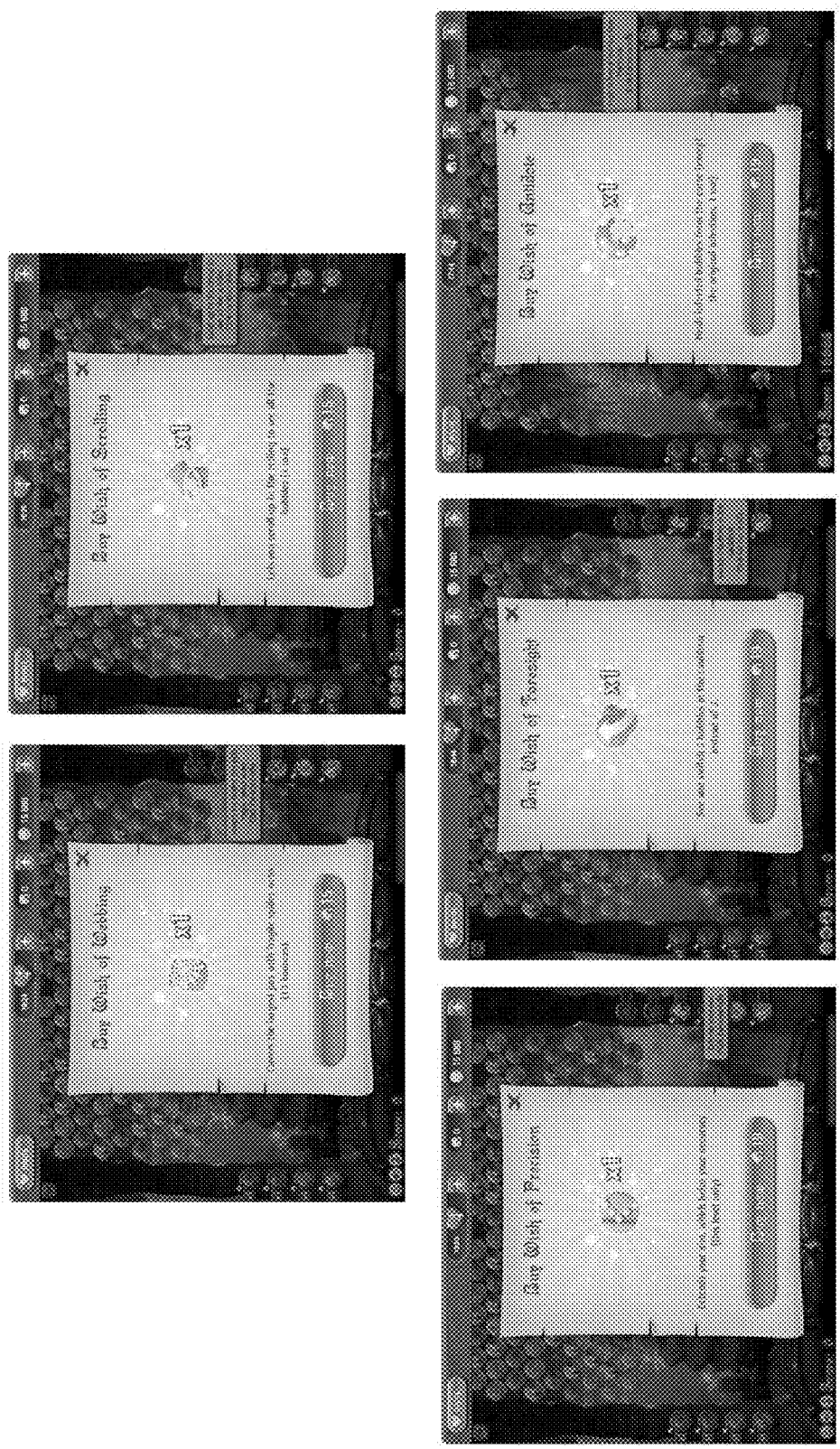
FIG. 98 illustrates various Wishes available.
Figure 99:
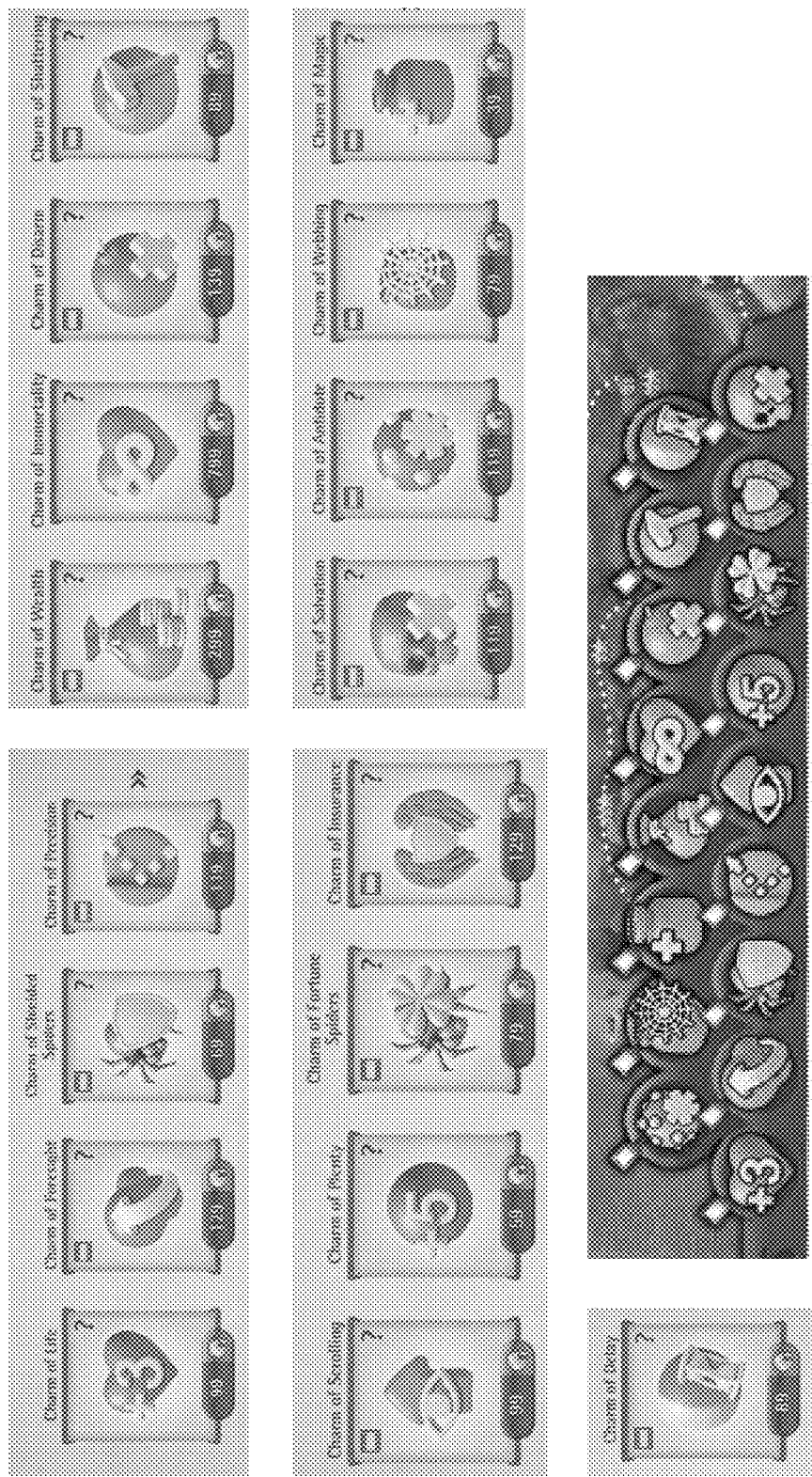
FIG. 99 shows one implementation of different charm icons and their names.

Charm of Salvation
   Unlocked at level 83
   This allows the player to neutralise one cluster of Doom Bubbles twice per level—a very useful feature. FIG. 92 shows one explanation of the Charm of Salvation.
Charm of Wealth
   Unlocked at level 86
   The Charm gives the player 20,000 coins every day they log on to play. FIG. 93 illustrates the charm of wealth.
The Charm of Shattering
   Unlocked at level 89
   This Charm enables the player to shoot and shatter crystals bubbles, but only once per level. FIG. 94 shows one illustration explaining the Charm of Shattering.
Charm of Delay
   Unlocked at level 106
   This Charm delays the Morph Bubbles so that they change every other shot the player makes, instead of every shot.
Charm of Magic
   Unlocked when the player gains 130 stars
   This Charm enables the player to purchase and use four potions at a time, rather than three. The potions still last for three plays. FIG. 95 shows one illustration explaining the Charm of Magic.
Charm of Insurance
   Unlocked at level 43
   This Charm allows the player to hit a Doom Bubble once per level and not lose a life or end the game. A very useful Charm. FIG. 96 shows one implementation of the Charm of Insurance.
Potions
   There are four different kinds of Magic Potions, functioning as boosters that last for three plays. They are bought using in-game coins, and are thus much more accessible to the average player.
Types of Potions
   There are four types of potions, as described below. All of them last for three turns.
   Start level with extra virtual elements [spiders]
   Unlocked at 20 stars
   This potion awards the player golden spiders (two at the beginning, three at the end). On the more advanced levels in particular it can be difficult to make enough successful shots to gain the extra point-scoring golden spiders, so this potion can make the difference between completing the level with enough points to earn a star and failing the level due to insufficient points.
Extra bubbles
   Unlocked at 50 stars
   This potion gives the player 7 extra bubbles in their cauldron, which is often invaluable. If the extra bubbles are not shot, they bounce around on the spiders at the end anyway and so increase the player's point score.
Extra Holes in the Ceiling at Start
   Unlocked at 70 stars
   This potion puts three random holes in the ceiling at the beginning of the level. The result of this is that the player need only clear six ceiling bubbles, rather than nine. This is perhaps the most useful of the potions—particularly on the later, more advanced levels.
Rainbow Bubble Magic Potion
   Unlocked at 130 stars
   This potion activates 2 Rainbow Bubbles, described in detail in the 'Bubble' section.
Wishes
   Wishes are temporary charms, used for one turn only. They are bought with Facebook™ Credits, not coins. At present (Sep. 12, 2014), the pricing is different for different players. Those who have bought Charms in the past can purchase a Wish for 19 Credits, whereas those who have not need to pay 25 Credits.
   Wishes are portrayed as light blue icons, located along the right-hand side of gameplay and more are unlocked as the player progresses through the game.
   FIG. 97 shows one implementation explaining the use of Wishes.
   FIG. 98 shows one implementation of different Wishes available showing their names, explanations what they do, and how much they cost to buy as well as the option to buy them.
   FIG. 99 shows one implementation of different charm icons and their names.
The Store
Currency
Facebook™ Credits
   Facebook™ Credits function like token at an arcade or amusement park. They are a secure way to play games and buy virtual and digital goods on Facebook™. Credits can be bought using a credit card, a PayPal account or a mobile phone, or they can be earned through promotions with companies affiliated with Facebook™, such as Boots, Netflix and LoveFilm. Credits can then be used to purchase everything in the Bubble Witch Saga, including what can be bought with in-game coins as the coins themselves can be purchased too.
In-Game Coins
   These are earned by gaining stars on each level—the more stars gained, the more coins awarded. They can also be gifted to other players if the player decides to broadcast the game on their Facebook™ Profile. Also, when lives are gifted to another player, there is the option to accept coins in return.
Social Interaction
Request/Send Gifts to Friends
   The player can contact friends who are playing the game and ask them for help. Once one life has been lost, a '+' option becomes available next to the life/heart meter—by clicking on this, the player can ask any number of their friends (who are also playing the game) for an extra life. In this way, the player themselves can also be asked for help by their own friends.
Lives
   Having asked a friend for an extra life, the player is then prompted to send a life or coins back in return. Whenever a friend asks for a life, the player is notified by way of a standard Facebook™ notification. Also, whenever the player signs into the game they are prompted to send their friends lives, regardless of whether or not they have been asked to do so.
   FIG. 63 illustrates the screen displayed when the player asks friends for a life. It is possible to select as many friends as desired. Thus, if the player has 0 lives and three friends agree to help, the player will then receive three lives. However, if six friends are asked and six friends respond when the life cap is at five, then the player will only receive five lives.
   FIG. 64 shows one implementation when the player has received a life from a friend and can choose to accept and send a life back to their friend.
Charms
   The player can 'surprise a friend' by giving them the gift of a Charm. This costs money (Facebook™ Credits), but is currently a cheaper way of buying Charms than buying them for personal use. It is yet another way in which the game encourages social interaction.

Help

At the end of each territory (every 10 levels), the player's path is blocked by ghosts and a spell. In order to progress to the next stage, the player can either pay 3 Facebook™ Credits or ask for help from three friends. If friends agree to help (all that is required is that they click 'Help [name] break the spell', then the player receives a notification when each friend accepts the request for help. When three friends have provided help, the spell is weakened sufficiently and the player can progress.

The Scoreboard

Figure 68:
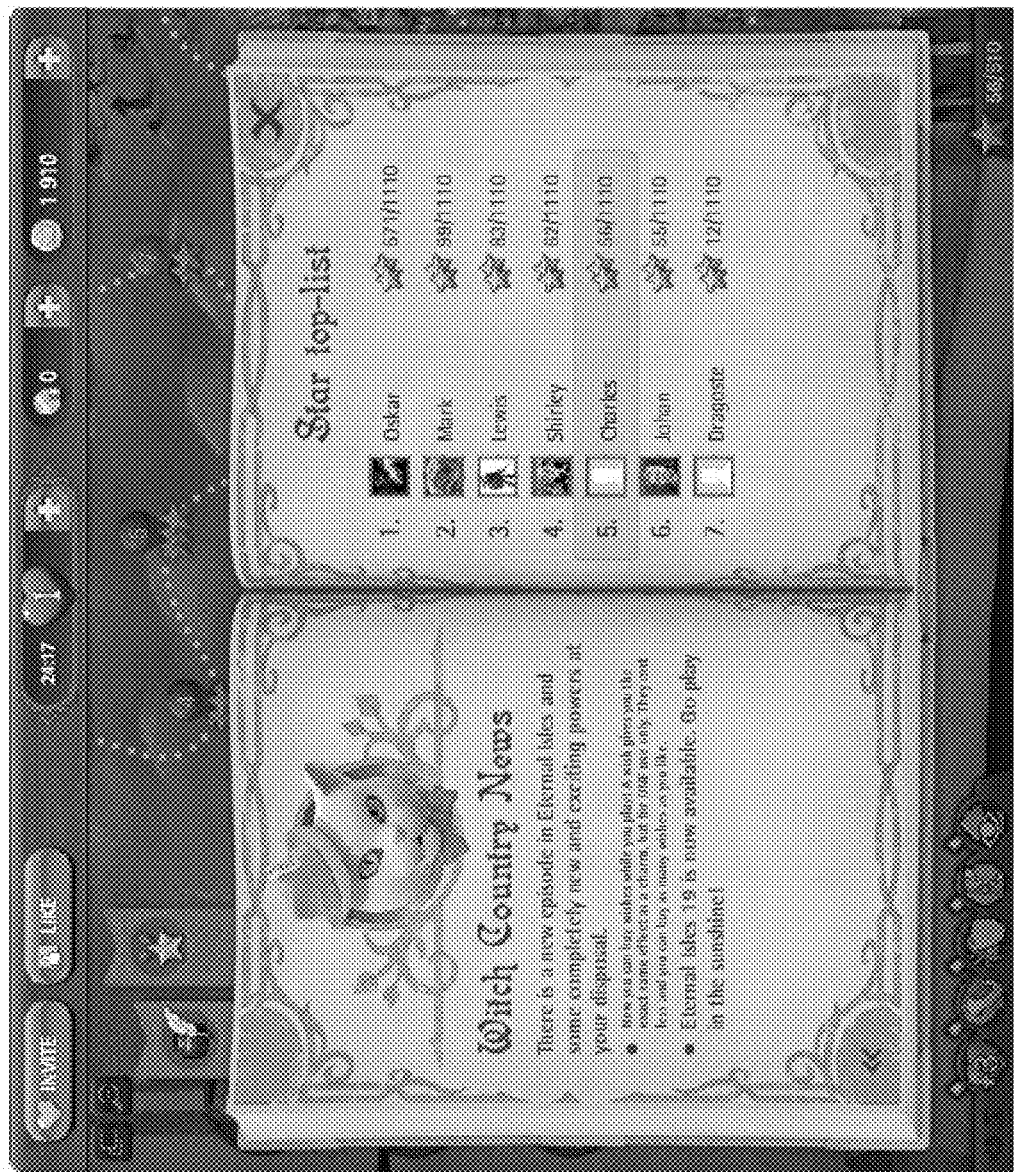
FIG. 68 shows one implementation displaying Star top-list and new.

The scoreboard facilitates in-game competition between the player and their friends who are playing the game. The main scoreboard (or 'Star Top-List') is accessed by clicking on 'Baroness' (the white cat on the left-hand side of the map screen, see for example FIG. 5). This gives an overview of everyone's star progress in the game. FIG. 68 shows one implementation of the view of the 'Star Top-list'. The same view also displays news.

There are also leader-boards displayed at the beginning and end of each level, depicting the player's own position on it alongside that of their friends (in terms of points scored on that particular level. If the player surpasses their friend's score and thus moves up the Level Scoreboard, an option will appear to tell that friend by 'giving them a generous gift of gold'.

Posts from the Application

The Facebook™ application posts messages to let the player's friends know that their score has been beaten or their position in the game has been passed. In this way, friends are all kept abreast of where each other is and competitive play is fostered.

Broadcast Messages from in-Game

Figure 65:
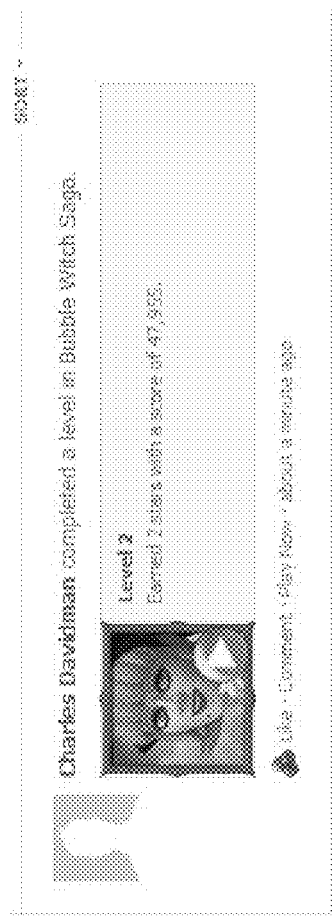
FIG. 65 shows an example of a newsfeed message.

By choosing to play the game, the player has to consent to allowing the Bubble Witch Saga to access their personal information and post on Facebook™ on their behalf. Such posts in reality rarely appear without the player's consent by way of a tick-box, but other screens—such as when the player completes a level (as in FIG. 65)—tend to appear without warning on the player's personal Facebook™ profile. This is all a means of promoting the game.

Figure 66:
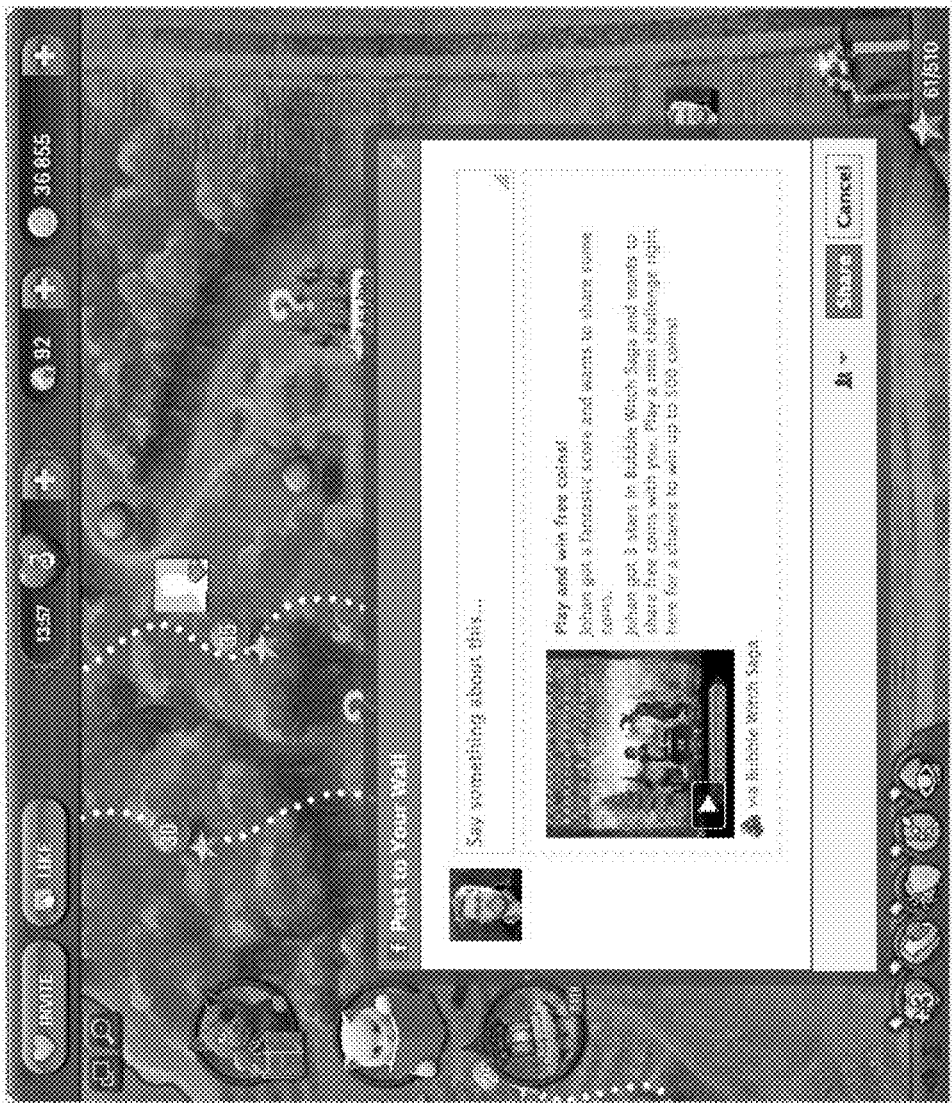
FIG. 66 shows an example of a message ready to be posted on social network.

The application occasionally prompts the player to share some of their coins with their friends, as depicted in FIG. 66. When faced with that screen, if the player clicks 'Cancel' then nothing will be posted, but if they consent by clicking 'Share' then the post pictured will appear on their profile, encouraging others to play the game.

Figure 67:
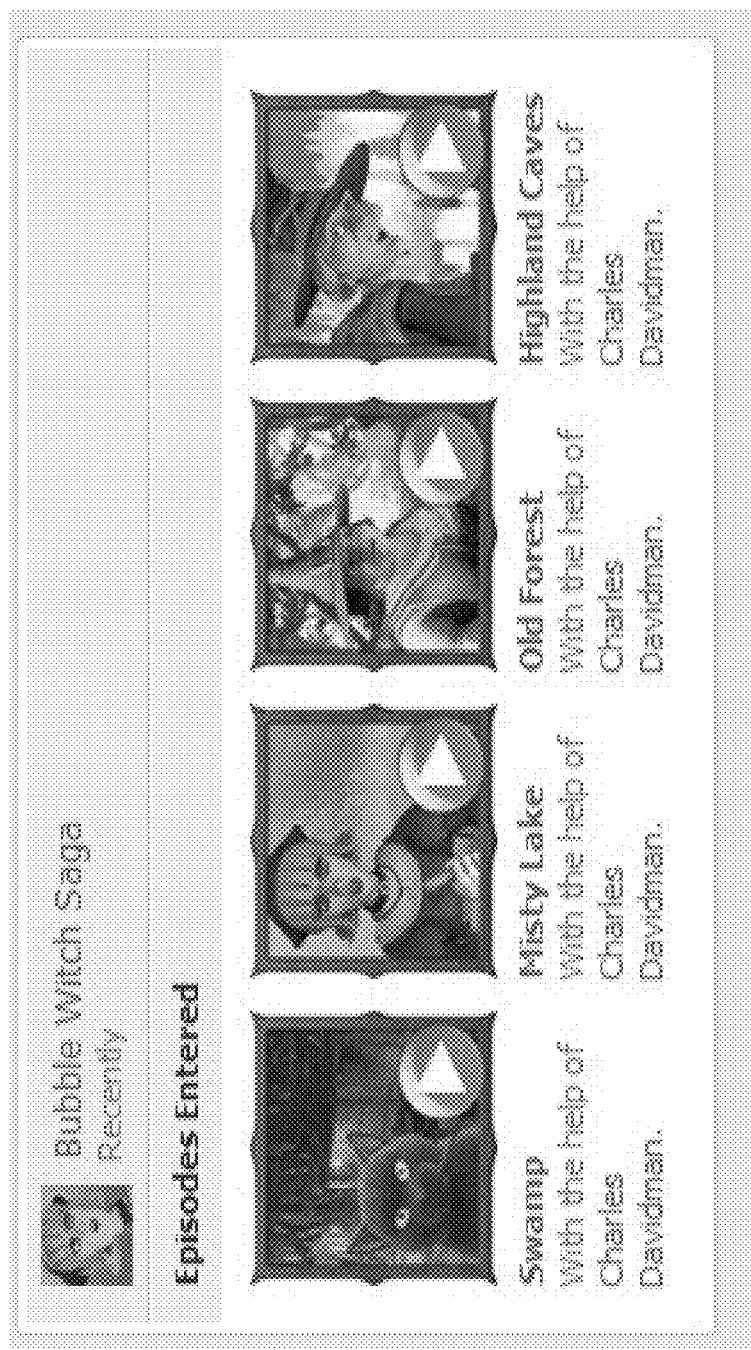
FIG. 67 shows an example of a social network posting when having accessed a new area in the game.

The application will also post on the player's timeline when they enter a new territory ('episode'), as shown in FIG. 67.

These wall posts and messages to friends function as a means of advertising the game and encouraging people to play.

Winner in a Level

The player is informed of when they have beaten a friend on a particular level, and asked if they want to tell this friend and give them some coins—this encourages the competitive social gaming aspect of Bubble Witch Saga. The player would click 'Share' to share coins and let the other player know, or click the 'X' (top right of scroll) to proceed without this social aspect.

Competitions

There are tournaments that the player can enter in order to try their hand at winning a charm. To play, the player must click on the Lighthouse in the bottom left-hand corner of the screen.

In each tournament there is a total of 25 players, comprising anyone who is online and wants to play at the time. This means that the player will be interacting with and playing against gamers who are not (necessarily) their Facebook™ friends.

Figure 100:
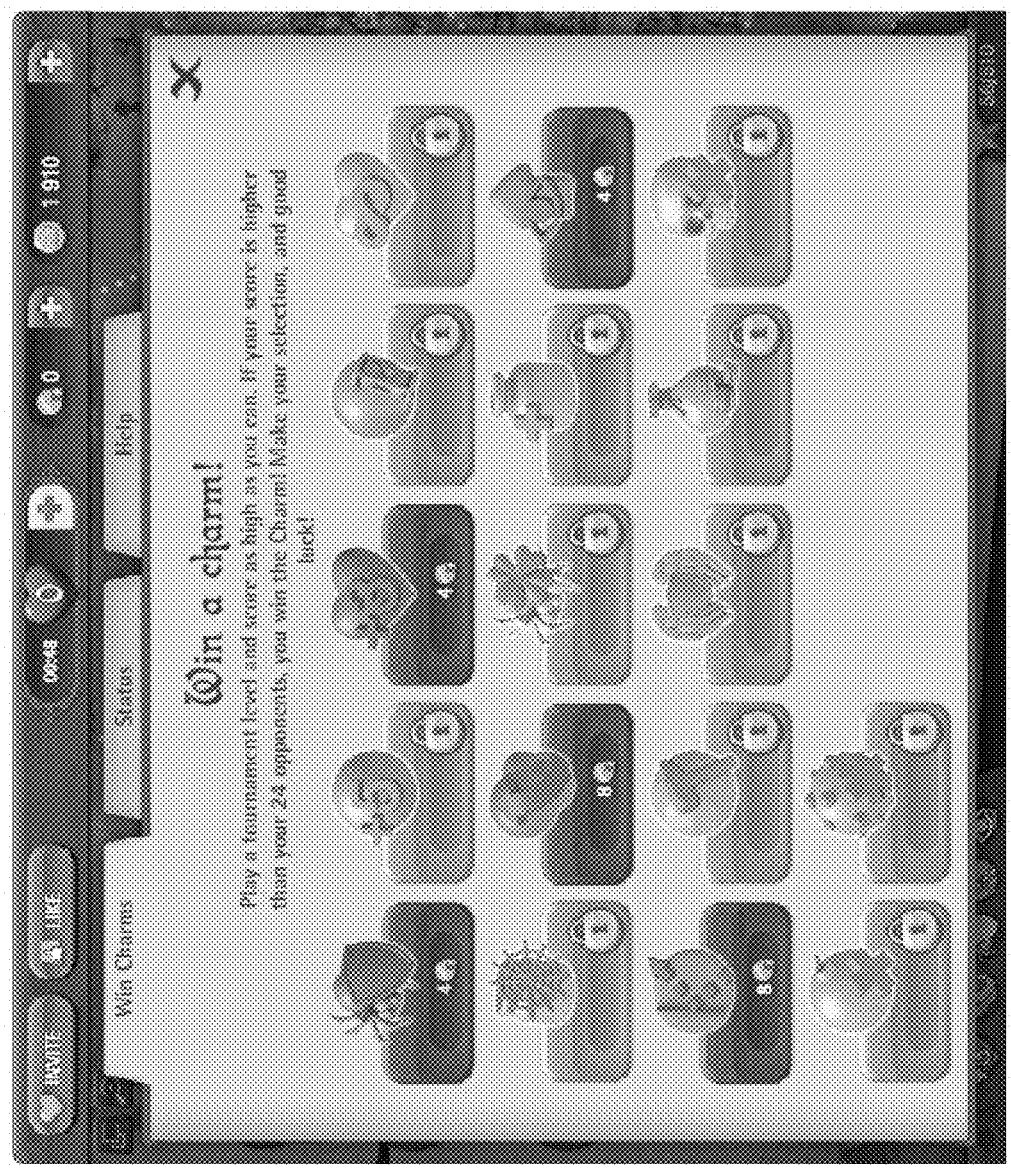
FIG. 100 shows one implementation with charms available to play for in tournaments.

If the player wins, they win the charm that they selected to play for upon entering the tournament. Different charms cost different amounts to play for, as shown in FIG. 100.

The price of entering the tournament is paid in Facebook™ Credits. Charms can be won for a lot less than they retail for (example: 4 credits instead of 99), but it all hangs on whether or not the player wins the game. The player only gets one chance at playing the level, and has eighteen minutes in which to complete it. Levels are decided at random, and are thus different every time a tournament is played (but each player in a tournament plays the same level, obviously).

Figure 101:
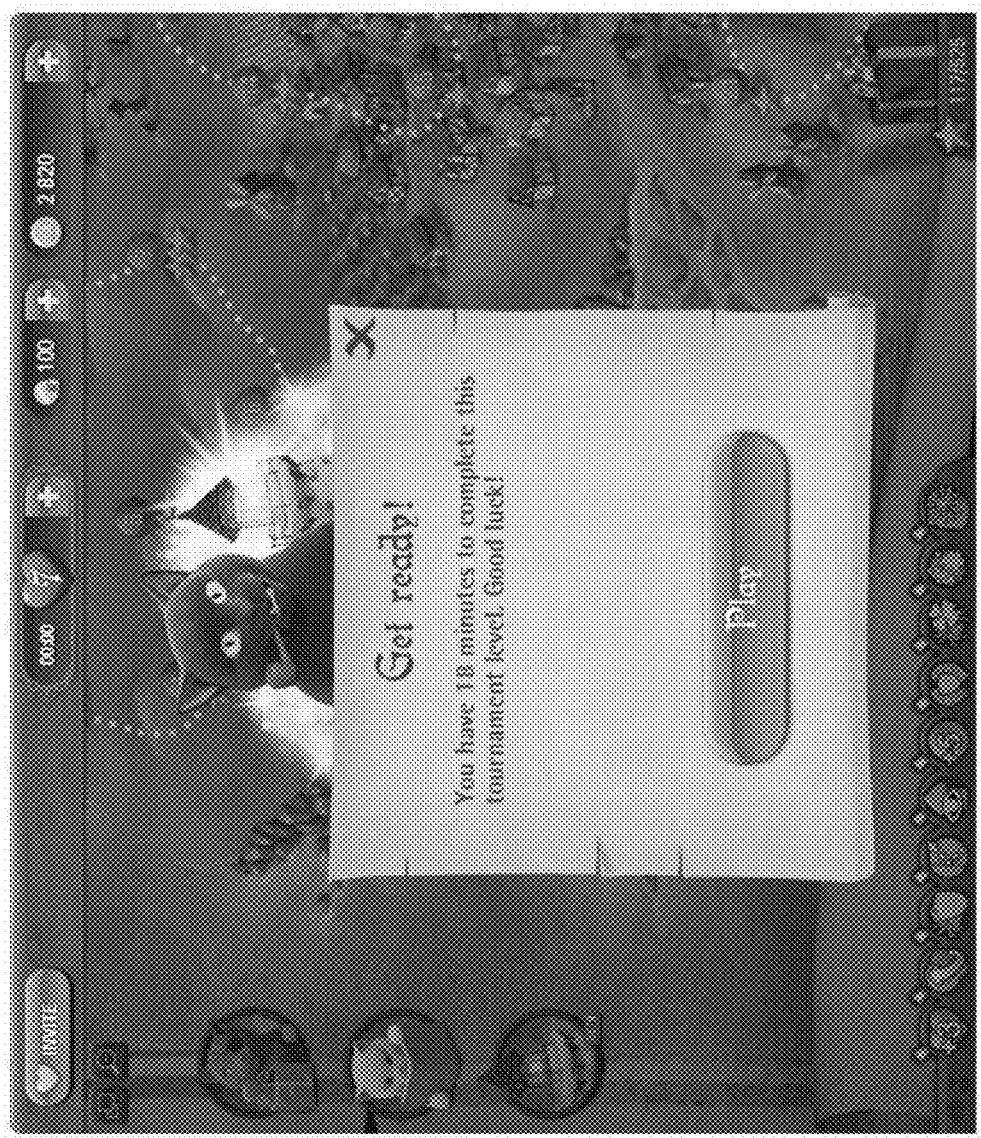
FIG. 101 shows the amount of time a player has to complete a tournament level.

The player has eighteen minutes in which to play their tournament level, this is shown in FIG. 101.

The tournament game play screen (shown in FIG. 25) differs from the normal play screen in that there is a timer in the bottom right corner rather than a star meter. The bubble layout of the level is different every time, so success is fairly heavily influenced by the bubble layout that the player is given—some are harder than others. Similarly, the actual level that the player is presented with is different in each tournament, so a player cannot become an expert and predict the bubble layout or level layout and thus monopolise the tournaments.

Figure 102:
FIG. 102 illustrates one implementation of a League table displaying the current stats of the tournament.

A league table is presented when the player has completed the tournament level, displaying their position in the running for the prize, FIG. 102. Displayed is the player's score and ranking, subject to change as the other results come in. When the tournament ends the player is notified by means of a Facebook™ notification, and if they win they are awarded the pre-selected charm.

Figure 103:
FIG. 103 shows one implementation of the list of currently active tournaments.

It is possible to play many tournaments at a time. These are kept tabs of in the 'Status' screen, seen by clicking on the lighthouse icon on the map (bottom left-hand corner, see FIG. 5). To see their score and ranking, the player can then select one of the tournaments in which they have partaken and view the league table. FIG. 103 shows one implementation of the list of currently active tournaments.

Social Aspect

Connection to a Social Network

Games created using the invention described herein can be connected to or linked with a social network such as Facebook™ or Google+™ or a games platform with different players who can interact and see each other's progress. It is common that the users on such networks have avatars with for instance a photo of the user and/or the user's name. Such avatars can for instance also be a sign or a figure.

The social network can be located on a server that is different from the server on which the game is located, the game and the social network can also be located on the same server. In some implementations there is a direct live connection between the social network and the game platform that continuously synchronise them, in other implementations the two platforms synchronise at certain intervals, such as when the player logs into the game. The players progress when having played in offline mode (for instance completed levels and score), for instance if the player is travelling in a tunnel, can be synchronized when the player is connected to the internet.

The user and his friends' avatars can be displayed in the game or in relation to different levels in the game to show the player's progress. The avatars can also be shown in relation to indicators of the player's skill level or high score. In some implementations the avatars can be derived from a social network to which the game is connected, in other implementations they can be derived from a database related to the game. It is possible for the avatars related to users to change depending on the overall progress or performance in the game. For instance, an avatar can become larger or more visually advanced as the player plays the game for a longer time.

The user can connect with other users of the social network, either as "friends" on the social network or as "friends" within the game environment. The player can interact with other players he is connected to on the social network or who are playing the same game.

The game can be implemented to synchronize game state information and/or retrieve and connect to the social graph information and user profile of the player on a social network. It can also be connected to a proprietary network related to the game or the game developer.

The game can also be implemented so that it is connected to a plurality of social networks. The user can be given the option to select what information that can be derived and shared with which social network.

One example of how the game can be connected to a social network is the Facebook™'s Open Graph API allows websites and applications to draw and share information about more objects than simply people, including photos, events, and pages, and their relationships between each other. This expands the social graph concept to more than just relationships between individuals and instead applies it to virtual non-human objects between individuals, as well. A game can typically share in-game events such as that a level has been completed, that a player has passed a friend in the game or beaten a friend's high score on a level. The game can also post events, such as that a player has purchased objects in the game or received objects from other players of the game.

Ways of Playing the Game

Web-Based

One way of implementing a game using the techniques described herein is through a web site with a plurality of casual games. This platform can be used as a basis to test the performance of the game and how it is perceived by players. In some web-based implementations the game is implemented to be played in head-to-head tournaments, has a limited number of levels and no external social network connection. In some implementations the players can play the game against other players on the platform.

If a game proves to be successful in a web-based implementation, it can be further adapted to another type of implementation, based on a virtual terrain in which the player progresses. This implementation typically has a connection to an external social network, and can have multiple game modes such as asynchronous and synchronous tournaments and single player mode. The nodes on the map in the game are typically different levels that the player can play.

The two implementations described above can be part of a modularised approach to developing games, which help streamline and facilitate the process of producing as well as further developing new tides.

Virtual Map

The game can be implemented so that a player progresses through multiple levels of changing and typically increasing difficulty. FIG. 3 shows a virtual map layout. shows an implementation of the game with a virtual map layout of a game environment, displayed on the screen of the computing device used by the game player. As the player progresses through the levels in the game, his progress is represented as a journey along a path on the virtual map. Representing progress in this manner provides an additional layer of engagement for players, and also opportunities for viralisation and monetisation.

The virtual map consists of stages 1, 2 with varying number of levels 3, 4 represented by nodes on the virtual map. The user travels between levels and completes the levels one by one along a path by playing the associated game. When the player reaches the goal of a level, the next level on the path is unlocked and the player can play that level in the game. The number of stages and levels can vary depending on the implementation.

In some implementations of the game, the player will be introduced to the game by tutorials explaining the fundamentals of the game. One way of doing tutorials is to force the player to make certain moves, for instance in the first level of a game the player might be prompted to make the most basic move possible without the option of doing any other move. The tutorials will in most cases be concentrated to the first levels of the game, but they can also be used at later stages to explain newly introduced elements and objects.

The levels can be numbered consecutively throughout the game or they can be numbered within a stage, it is also understood that other ways of identifying the stages and levels can be implemented. New stages to the virtual map 12 can be added by the game designers at any time—so a game may be launched with say 20 levels, and after a number of weeks, there may be fifty or sixty levels present.

Stages in the game can be both locked or unlocked. In most implementations, the majority of levels start out as locked and are then unlocked as the player progresses in the game. Unlocked stages can typically be replayed at any time. One way of unlocking new stages is to complete the last level on the latest stage. The user is sometimes faced with other challenges to unlock the next stage in the virtual map.

In some implementations, certain levels and stages are locked based on other criteria than the player's linear progression in the game. Such levels can for instance be based on the total score the player has achieved on all levels, the average performance on levels or on the number of friends that the player has invited to play the game.

In one implementation, one challenge 7 to unlock a stage arises when traveling from one stage to another once all the levels have been completed in that stage. The levels in the stage to which the player is travelling is typically locked by default, and the player must unlock them. This requires the help of for instance three friends. The player can ask friends for help by sending an in-game message within the game environment or for instance through a social network that the game is connected to. The friends can already be playing the game and do not have to be 'new' players, but they can be friends not already on the same social network.

The player can also pay to get instant access to the locked stage. The currency used for paying can vary between different implementations, for instance it can be hard or soft currency, or it can be based on score achieved in the game. It is possible for the currency to be associated with a social network to which the game is connected, or it can be associated with another platform related to the game. The player can use a combination of help from friend and payment to unlock the new stage. The cost for unlocking can in some implementations be lowered as a fraction of the total number of friends needed when help from some but not all needed friends have been received.

There can be ways of getting past a collaboration block other than asking friends for help and paying for it, which are the most common ways of passing a collaboration block. This can be done through to use of 'Mystery Quests', which gives the player the option of completing one or several challenges to unlock the block. Such challenge can for instance be to play one or several past levels with modified goals in order to pass the collaboration block, for instance three levels—one for each of the locks.

These challenges are typically in the form of replaying a previously completed level but with a new goal to reach, for instance a target high score. In a typical implementation, the score requirement is higher than it is for playing the level regularly, and also no other goals need to be fulfilled. For example, if the player gets to replay a level with jelly with a new target high score, the player would not need to remove the amount of jellies specified as long as the target score was reached.

The request for help is sent to the friend who then has the option to accept to help. The request for help can in some implementations be sent using the social network to which the game is connected; an alternative implementation is to send the request to someone external to the game (via email, text message, instant message for instance) who has to join the game to respond to the help request. It can be understood that there can be variations between implementations in regards to how players respond to requests from other players. In a typical implementation, a link will be provided to the player who has been requested to help. This link can be related to a social network to the game is connected. This is one of the viralisation techniques implemented in this game.

In addition to the virtual map layout in FIG. 3, there can also be other levels or stages that are not part of the progress along the path in the virtual map. Such stages or levels can be present in the game associated with the virtual map at all times or can be unlocked when the user reaches a certain in-game achievement. This in-game achievement can for instance be completing a specific level, reaching a predetermined high score (for instance, collecting a specific number of stars when completing a level—highly skilled gameplay can win the user three stars) or paying virtual currency to unlock the stage or level.

The map layout in FIG. 3 can be used in games connected to or linked with a social network or in a game with a user database. It is possible for users to have an account in the game or on the social network. It is common that the users on such networks have avatars with for instance a photo of the user and/or the user's name. Such avatars can also be a sign or a figure. The user's avatar is displayed on the map layout alongside the level where the user is 6. It is understood that there are different implementations of showing where the user currently is on the map. This can for instance be the latest level the user completed, the level where the player has achieved the highest score or the last completed level along the traversed path.

The user can in some embodiments be given the option to select which users should be shown on the virtual map. The users to choose from can be friends on a social network, or the user can get suggestions to show friends which meet a certain criteria, for instance friends which the player has interacted with the most in the past or friends living in the same geographic area as the player. The user can get the option to choose from other people not being friends on the social network, but that meet other certain criteria.

The user can play any of the unlocked levels on the map, so the user can go back and replay already completed levels to get a better score or beat friends' high scores.

The player is in some implementations of the game rewarded for good gameplay of a level, for instance reaching a target score or completing the level in a short time. In some implementations the user has to reach a certain number of points to complete a level, reaching this target score can be represented with a symbol such as a star. In one implementation a star is lit when the user reaches a certain number of points in a level. The user can earn more than one star on each level and the levels are re-playable to get a higher score. In some implementations the indicators representing the players' performance can be related to other goals, such as completing levels within a certain amount of tries.

The player's total number of stars collected in the game can in some embodiments unlock features. The unlocked features can for instance be power-ups, in-game currency or bonus levels. After being unlocked, such features can typically be accessed by the player in the game. Some unlockables might be given to the player while others require a purchase to be accessed.

The symbol representing how well the user has played on each level can be displayed alongside the level on the map 8, 9, 10.

Figure 128:
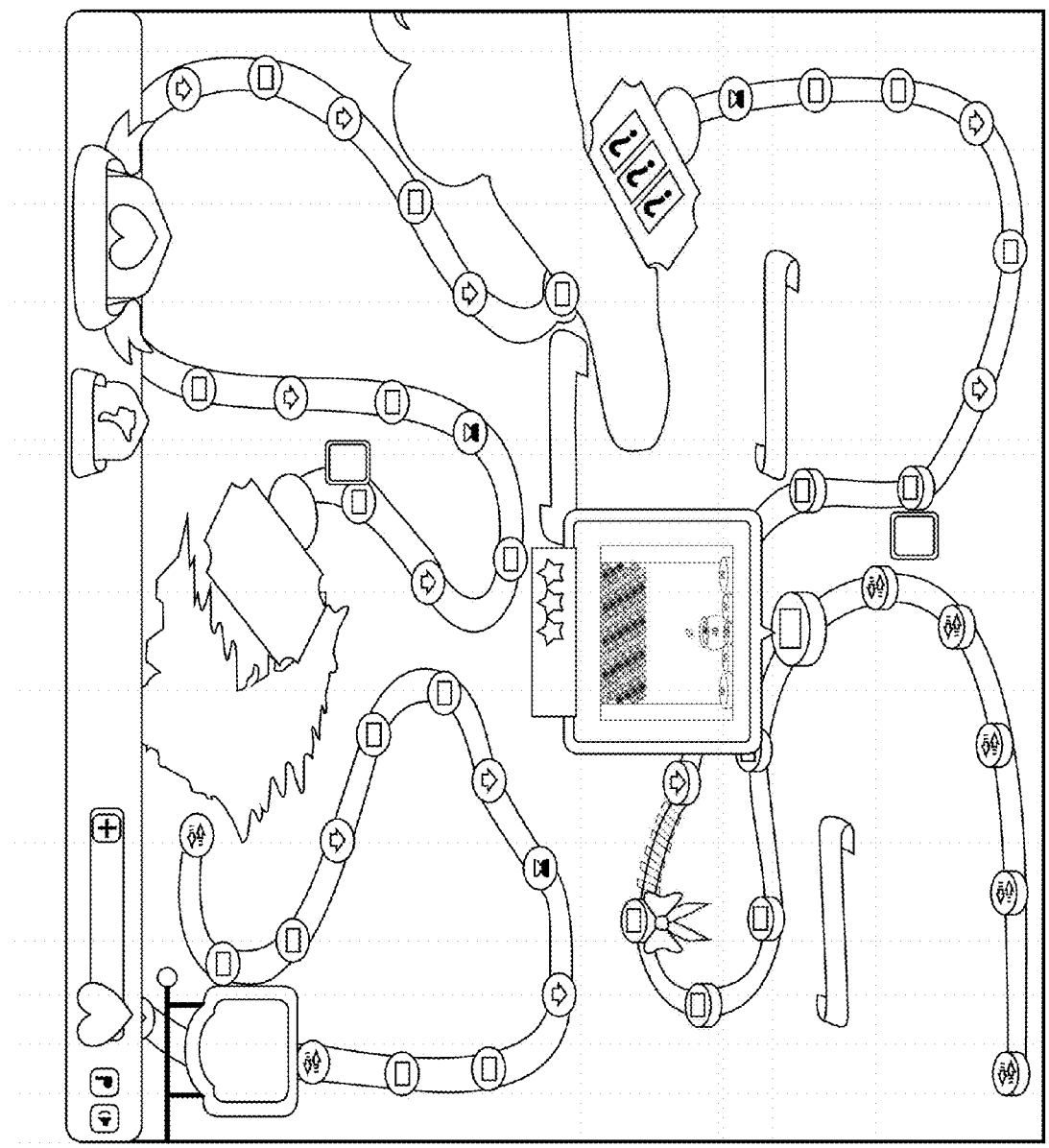

In the map view, the player can hover over an unlocked level to display a thumbnail version of it. This makes it easier to find specific already completed levels, and can also give the player an idea of what to expect before actually starting a level. In a typical implementation, thumbnails cannot be displayed for levels that have not yet been unlocked. If trying to view one of these a symbol of a padlock will be in the place the miniature version of the level is supposed to be. FIG. 128 displays one implementation of what the thumbnail may look like.

The thumbnail can also display how well the player has done on the level if he has played it previously. This can for instance be represented with the number of stars the player has received on that level, the actual score or some other indication.

The thumbnail can also display the player's position on the high score table in relation to the player's friends or showing what friends are on the high score table. This can be a driver for the player to replay the level to beat one of the friends.

If the game is connected to a social network or the user has connected with other players in the game, the levels can present a leaderboard showing who among the user's connections, or among a subset of the user's connections, that has the highest score. There can in some embodiments be a notification 11 shown on the map if the user that has the highest score among the friends connected to the game. Such a notification can be in the form of a message sent through for instance through the social network or an in-game message.

The type of game mode or game goals for a level can be displayed on the map as a symbol, for instance it can be a symbol for the level itself, or it can be shown in proximity to another symbol for the level. Such a symbol 3 can for instance be in the form of an object related to the game goal, such as an hourglass representing a level with a time constraint.

Animations and Interactions on the Virtual Map

The landscape of the virtual map will typically have animated sequences which give a feeling of the map being alive and dynamic. For example, trees on the map can sway in the wind, animals can move around and the player progressing from one level to another can be accompanied by an animation of a player-associated character moving on the map.

In some implementations, it is possible for the player to interact with objects on the map in such a way that animations are triggered. For instance, clicking on a bird can make it fly into the air and hovering over water can make waves appear.

It is also possible to have any combination of a map that is static but reacts to player input, a static map that does not react to player input, a dynamic map that reacts to player input and a dynamic map that does not react to player input.

Figure 116:
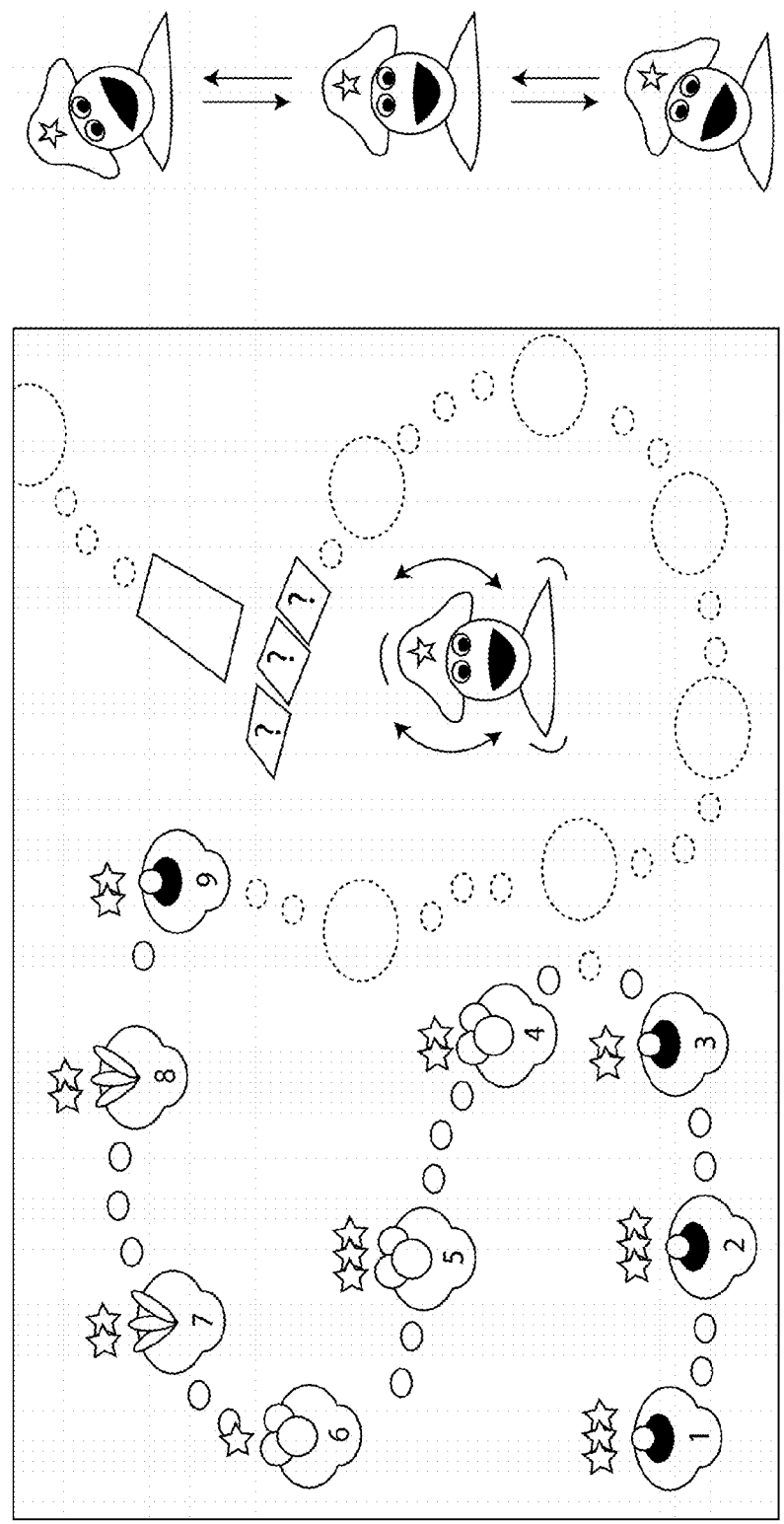
FIG. 116—Animated sequences on a virtual map 1

One example of how the virtual map can be dynamic and moving is shown in FIG. 116 where as an example, a coconut character moves slightly from side to side. A collection of subtle as well as less subtle animations throughout the map will together make the map appear moving and alive.

Pre- and Post-Level Screens

Before starting a level, players have to select which level to play from the map view. When selecting a level, the player is shown information about the level, such as the amount of points needed, the available boosters that can be used, the goal of the level and also the highscores of friends who have previously played that level.

Figure 117:
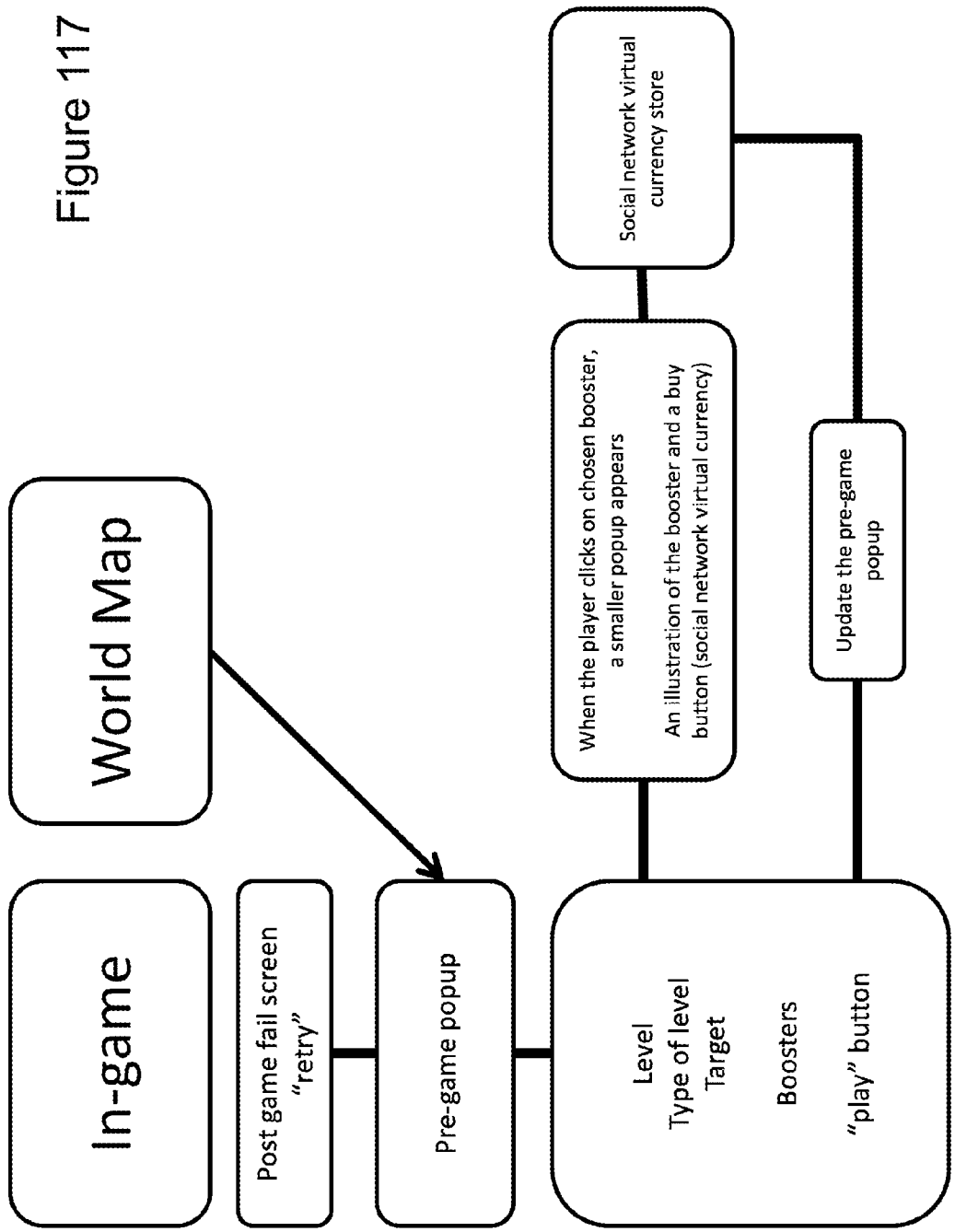
FIG. 117—Pre-level game progression

FIG. 117 shows one implementation of the game flow before starting a level, including which screens are shown to the player. When choosing to play a level, either after having previously failed it or after having selected it from the map mode, the player is shown a pre-level screen. Through this screen the player can choose to purchase boosters. By doing so, the player can be transferred to another screen representing the in-game shop, or the purchase can be performed while still in the pre-level screen. If the player has no currency available, it is also possible for a screen related to acquiring currency to be shown.

Figure 118:
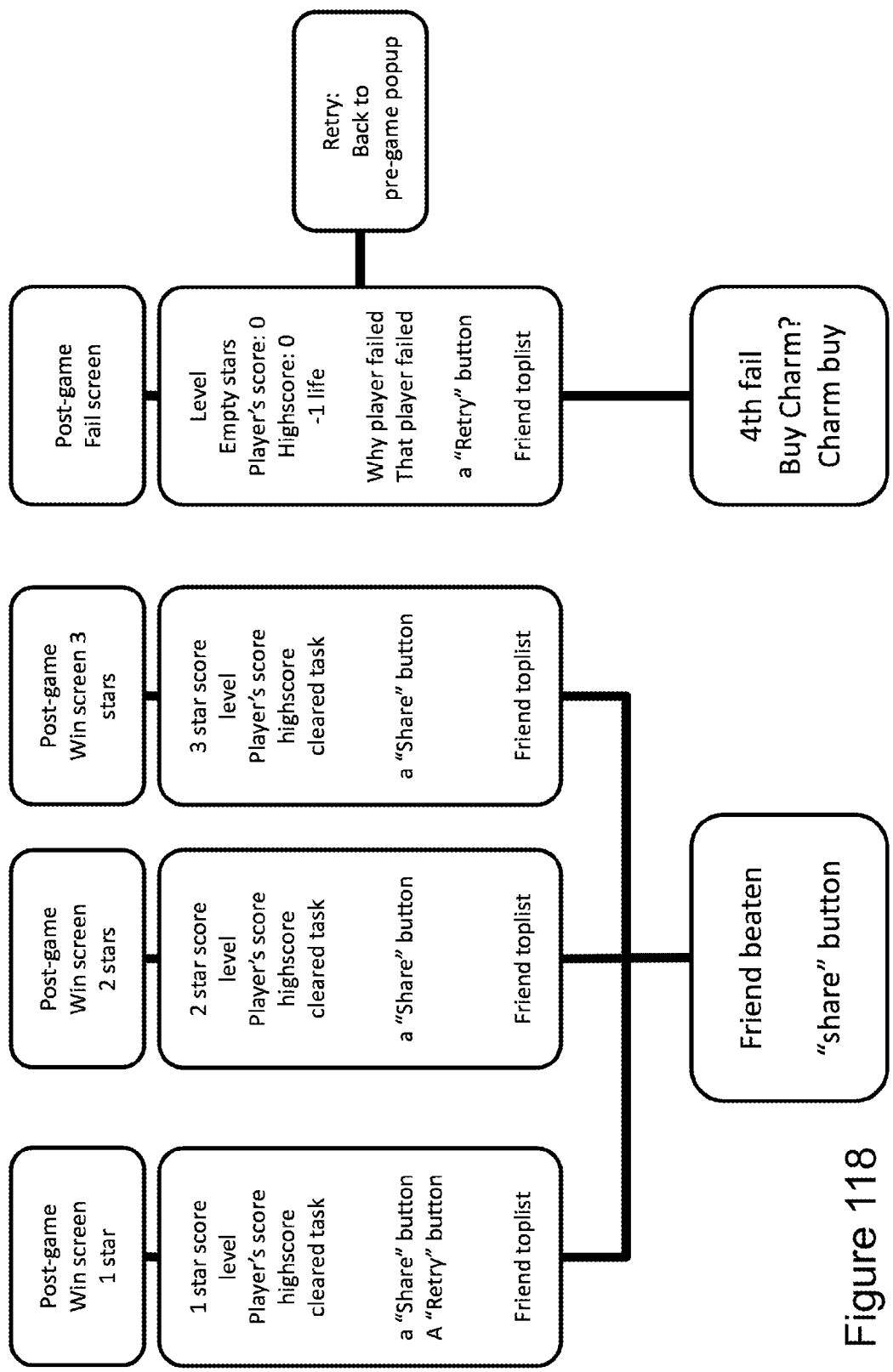
FIG. 118—Post-level game progression

After completing a level, the player is presented with a screen that shows the amount of points gained, the amount of stars achieved and also the previous highscores of friends. One implementation of the game flow related to the post-level screen is shown in FIG. 118.

Both of the post-level screens discussed present the player with an option to share this information. The sharing part is done on a social network to which the game is connected. By sharing information such as which friends the player has beaten, competition is encouraged and the viralisation of the game is increased, due to people not playing the game also being able to see such messages.

The player can also be presented with another screen related to the performance on the freshly completed level. This screen shows how good the player scored in relation to friends' highscores, together with a message about which friend(s) that have been beaten.

High Score List

When showing the pre-level screen, players are presented with the highscores of friends. This gives an opportunity to know beforehand what to aim for, and is something that increases the competitive element in the game. The information about friends' scores can be derived from a social network to which the game is connected, it can also be retrieved from a database related to the game. It is important for further increasing the engagement and of players and to some extent viralisation, since players are constantly being reminded about the performance of others, which can incentivise players to try harder and subsequently play more.

In some implementations, each area in the game or certain groups of friends or players can have a 'Champion', 'King' or similar, meaning the player within a network of players that has the best performance on the levels in that area.

Friends' Highscores on Score Meter

In some implementations, there are indications of the performance of other players displayed during the play of a level. This information is often based on data from previously completed levels, but it can also be related to levels that have been attempted and failed by other players. Performance information can for instance be derived from a social network connected to the game or from databases more directly related to the game. In some implementations, players can see the score of other players in real-time, thus increasing the competitive element of the game. The other players whose performance will be displayed is sometimes chosen by the player, sometimes automatically derived from a social network of the player, and other times it can be based on other elements, such as the performance of all players of the game.

Figure 119:
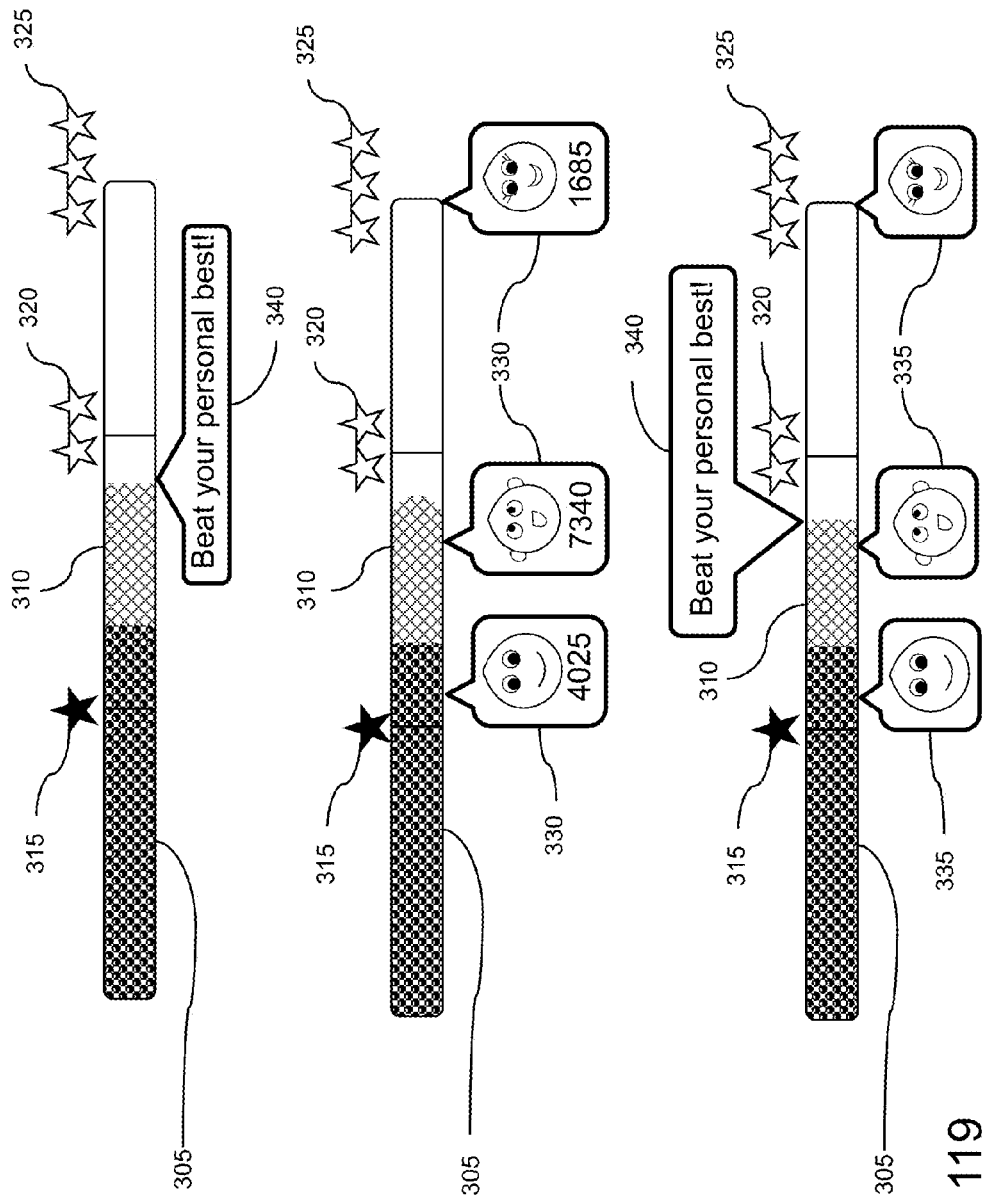
FIG. 119—Different ways of implementing a score meter and the results of other players

In some implementations, the player can see indications of the previous high score achieved on a level while playing it, shown by 310 in FIG. 119. It is also possible that no indication of the player's own previous score is shown.

In some implementations, the indications of the performance of other players are shown in relation to the score meter. It can be both absolute and relative indications. The indications can be in the form of pictures associated with the players, as shown by 330 and 335 in FIG. 119. When the player passes the score of another player or the previous best score the player has achieved, a message can be shown to encourage the player and denote the accomplishment. One example of such a message is illustrated by 340 in FIG. 119.

It should be understood that the invention is not limited to using stored scores to show the performance of other players. In one implementation, players can see the scores of other players currently playing the same level while they are playing it, making it so that the indications of other players' scores can be moving in real time during the play of a game.

The score comparisons presented to the player can be given in percentages, points and when applicable other indicators, for instance time played or number of attempts on a level.

Friends' and Player's Progress Showing on Virtual Path

Another feature in the game that increases the competitive element is that friends' progress on the virtual map is shown. Even if the player has not unlocked or reached the areas in which friends are playing, their progress can still be shown by means of a picture associated with the player being displayed next to the level they are currently at.

It is also possible to invite new players to play the game. These can be invited through the game platform or through a social network to which the game is connected. In some implementations, the game suggests which players to invite. This suggestion can for instance be based on if the players have played other games from the same developer, if they are active on a social network or if they seem to like other games in the same genre. It is also possible for the suggestions to be based from data related to a social network, such as how often they interact with other players or how often they log in to the social network.

One aspect that increases the competitive element of the game is that messages can be sent to friends, for instance related to beating their scores or passing them in terms of overall level progression. In some implementations, the game prompts the player to send a message to signal that a friend has been beaten. This message can be edited by the player, or it can be a pre-defined version suggested by the game.

The messages can be generated on a server hosting the game or on a server hosting a social network to which the game is connected. Information used in the message can for instance be derived from one of the databases to which the game is connected or from databases related to networks to which the game is connected.

Lives

In a typical implementation, a player of the game has a certain amount of lives that are used as the player attempts to complete levels. If the player starts a level but does not complete it, a life is lost. When having no lives left, the player cannot play the game anymore.

Regeneration of lives can be done automatically or manually. In some implementations, the player will regenerate lives over time, for instance by replenishing one life every 30 minutes. In other implementations, the player can only regenerate lives by performing certain actions, such as playing other games from the same developer or by making a purchase related to the game.

Notifications

Players can choose to be notified of certain events in a game. The notifications may be both 'pushed' as well as only available once a player logs into the game. Notifications can be sent on both stationary computers and mobile devices, depending on the players platform of choice. It is also possible to have notifications that stretch across multiple platforms, for instance they can pop up on both Facebook and on a mobile device at the same time.

Figure 120:
FIG. 120 shows a banner notification.

'Push technology' and subsequently 'push notifications' describes communications in which transaction requests are initiated by a publisher or central server, as opposed to 'pull technology' in which the receiver or client initiates a transaction requests. Typically the player can configure in which way push notifications should be received from a range of available options, such as:

Banners—Notifications are shown at the top of the screen and automatically disappear after a set period of time, typically a few seconds, unless the player interacts with them. A typical implementation of a banner notification can be seen in FIG. 120. Banner notifications can state information regarding the notification, or it can simply state which game the notification is coming from. It is in a typical implementation possible to interact with banner notifications, for instance by clicking on them. Typically clicking on a banner notification will bring the player into the game.

Alerts—Notifications require interaction from a player before disappearing, typically they appear in the middle of the screen. A typical implementation of an alert notification can be seen in FIG. 124.

No notifications—The player can also choose to turn of notifications altogether.

Figure 121:
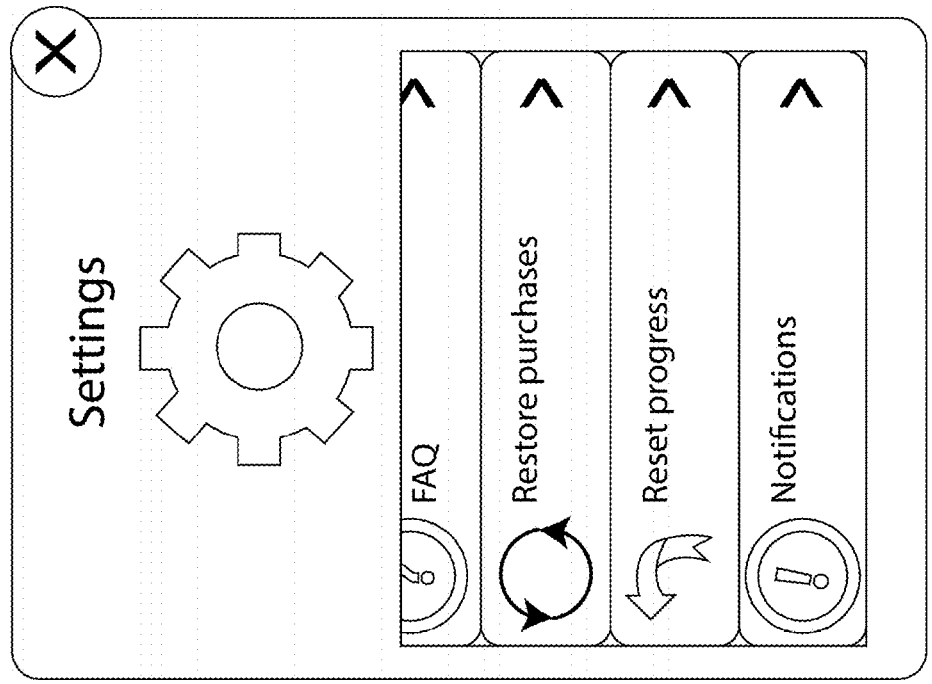
FIG. 121 shows a notifications tab in settings.

In a typical implementation the player can choose which events to be notified about. FIG. 121 shows the settings where a player can choose to be notified about certain events. In some implementations, the player can be choose to be notified when a new Mystery Quest is available, or when the player has full lives. In other implementations, the player can choose to be notified regarding a variety of different events, such as the following:

When a friend passes them in the level progression.
When their score is beaten on a specific level or on any level.
When new levels have been added to the game.
When help has been received.
When help has been requested.
When a new friend, either from a social network or from a game platform, starts playing the game.
When they have not played for a certain period of time.
When the game has been updated.
When new games from the same developer have been added to the application store.
When there are special offers in the in-game shop.

Figure 123:
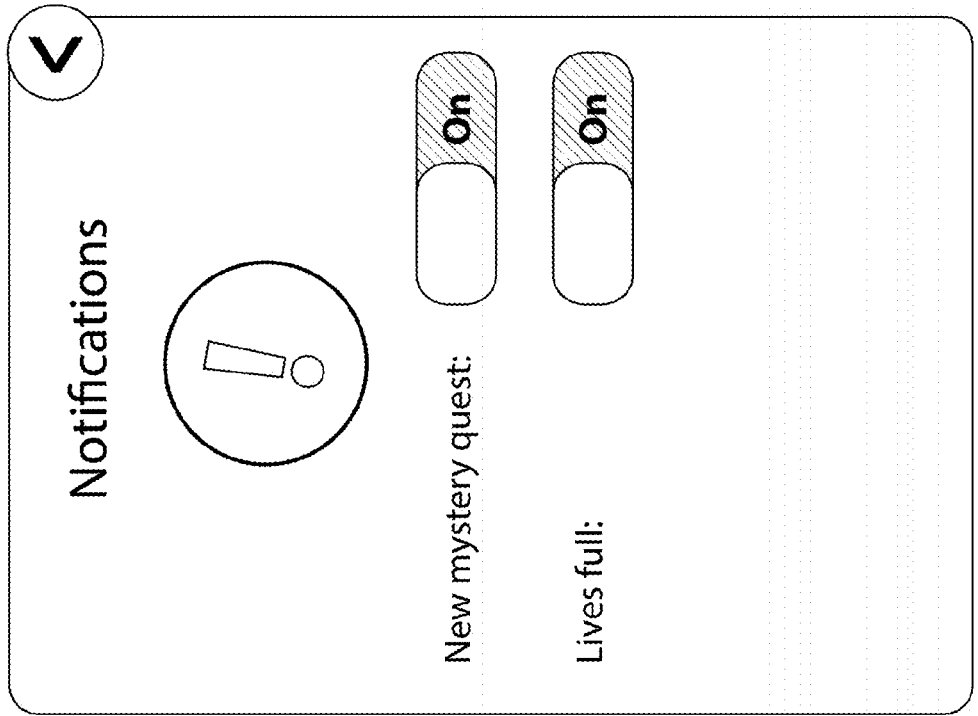
Figure 122:
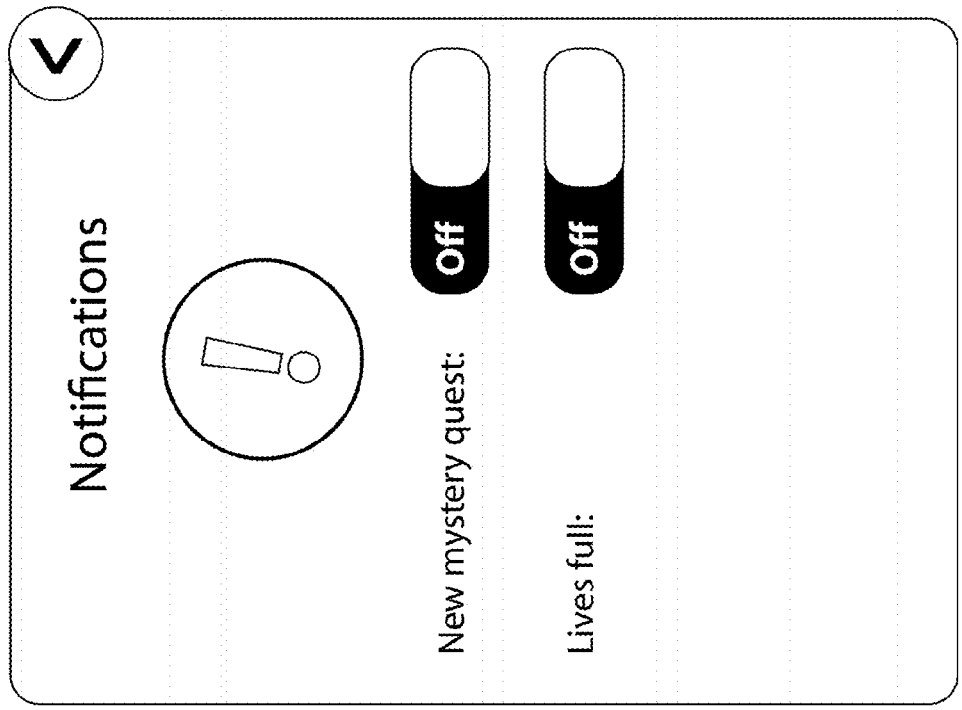
FIG. 122 shows notification settings turned off.

FIG. 122 shows one implementation in which the notification settings are turned off and FIG. 123 shows a similar implementation where notifications are turned on.

Figure 124:
FIG. 124 shows an alert notification.

In a typical implementation, the player can choose to interact with notifications in various ways, some of these are shown in FIG. 124, for example:

Silence the notification temporarily but keep it available.
Dismiss the notification entirely so that it is removed and cannot be seen again.
Go directly to the game and start playing. This can in some implementations be done by automatically starting a specific level, for instance in the case a friend has beaten the player's score on a level or if the player has been passed.
Directly respond to the notification, for instance if a friend has requested help, the player can respond directly by one click that allows them to send help without actually going through the game interface.

In some implementations where notifications are pushed, the player will only get the first notifications pushed, subsequent ones will not be seen until the player chooses to acknowledge the first one. This is because players should not feel irritated or overwhelmed by notifications.

Notifications can also be implemented so that they synchronise across platforms. For instance, if a player has been notified about an occurrence it can be sent to both a mobile device and the Facebook platform, but after acknowledging the notification on one platform it also disappears from other platforms. Notifications can be sent in various ways, for instance:

Email message
Message sent through a social network to which the game is connected
Through a message sent on the game platform
Through a text message, for instance sent to a mobile device
Phone call Sending Gifts One aspect of the game that increases the viralisation and engagement of players is the ability to send gifts to other players, which help them in the game. It is possible to give certain gifts for free, such as extra lives.

The option to send free lives is available for instance through the pre-level screen and the post-level screen. Which players and/or friends that are displayed as suggested recipients of gifts can be dependent on variables such as how many times they have been attempting a level without succeeding or how long they have played the game in total. It can also be related to data from a social network to which the game is connected, such as how many interactions the player has had with different other players.

Figure 125:
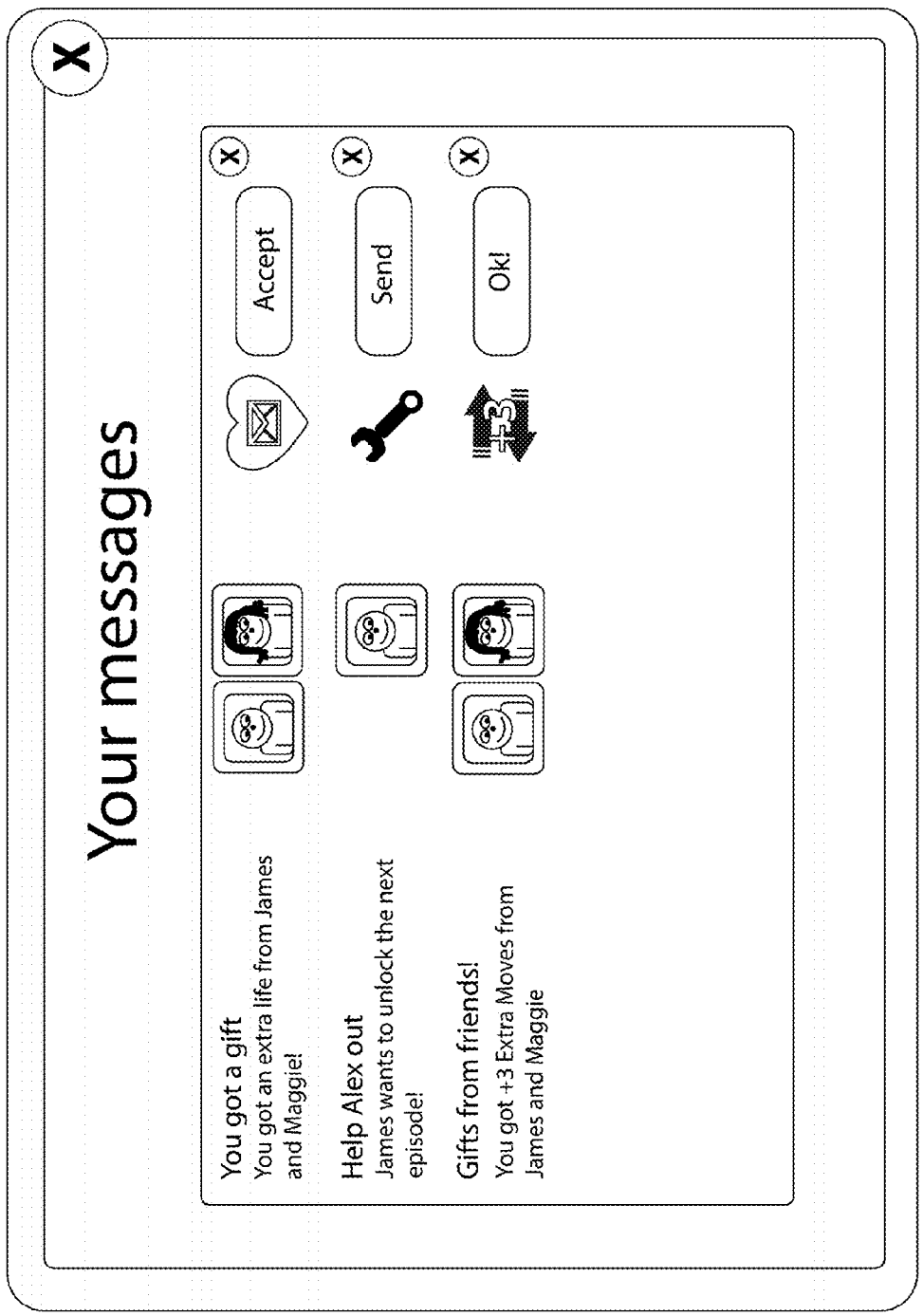
FIG. 125 shows one implementation of how lives and other gifts can be sent and received.

When starting the game, the player can be presented with a list of friends to send lives to. Another screen that can be presented when starting the game is one showing new messages. Gifts sent from other players can be displayed under messages, and certain free gifts such as lives can easily be reciprocated for free. Other gifts that cost money to send cannot always be freely reciprocated. In some implementations, the player can send a life back by just clicking a single button. The life can for instance be sent via the game platform or via a social network to which the game is connected. FIG. 125 shows one example of an implementation in which the player is prompted by the game to send lives to friends.

In some implementations the game prompts players to send lives to other players that have run out of lives. When a player completes a level after receiving help from a friend, a 'thank you'-message can be sent to that friend, either automatically or manually. This message can contain an item of value. In some implementations the player helping another player can get other benefits, such as special symbols or marks being displayed next to their names. Recognition is another benefit that can be awarded to players who help others.

In some implementations, lives that are received in the form of gifts have slightly different characteristics than lives that are gained by other means, such as time-based replenishment. For instance, lives in the form of gifts can make it possible for a player to have more than the otherwise maximum amount of lives. As an example, if the maximum amount of lives is five and the player gets sent an extra life, the player can have access to six lives. However, once the lives are reduced below the standard maximum threshold they will not automatically replenish above that, unless another gift is received.

Figure 126:
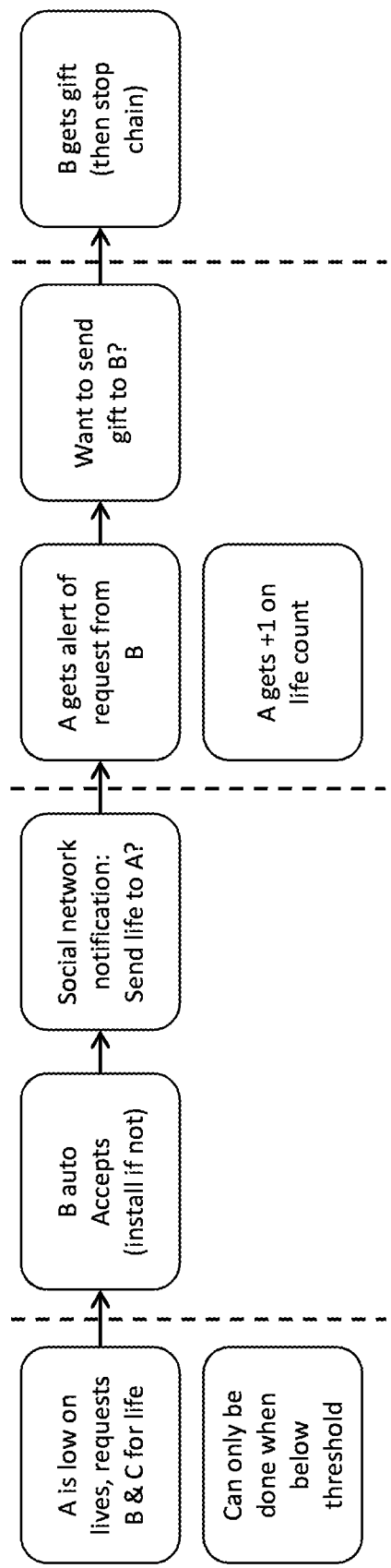
FIG. 126 shows one implementation of the chain of events when requesting and sending lives.

In the mobile version of the game, the player is presented with messages when logging in. Messages that are presented can be related to the player receiving lives and friends requesting lives. This is shown in the figure below. After receiving a life from a friend, the player is asked to send a life back. If choosing to send a life back in response, the friend who originally sent it will not get a request to send back yet another life. So, this chain of events has two steps if a player starts out by sending a life without request; step 1 is sending a life and step 2 is the recipient sending a life back in response or thanking the sending player in other ways, such as a thank-you message or by sending in-game currency. If a player starts with requesting a life, the chain of events has three steps; step 1 is requesting a life, step 2 is receiving a life, step 3 is sending a life or a thank-you message back in response. One implementation of this chain of events is illustrated in FIG. 126.

It is also possible to buy gifts in the in-game shop and send these to friends. Such gifts are in the form of boosters that can be used either during a level or before a level.

Sending help to other players in the form of for instance extra moves and extra time Another way of helping friends is to send items that provide in-game benefits, such as extra moves or extra time depending on the level requirements in the game. In some implementations, certain criteria must be fulfilled in order to send such help. The criteria can be related to how long a player has been stuck on the same level.

A list of friends playing the game can be presented, with suggestions of which ones to help. Some of these friends might have been stuck on a level for an extended period of time, and the player then has an option to help these players by sending extra moves or extra time, free of charge. This can be different from boosters that give extra moves or time, for instance by only being usable and available on a specific level. This can be a way of facilitating the harder levels of the game by receiving help from friends, increasing player engagement and viralisation.

It is also possible for the game to prompt the player to send help to friends that have been stuck on the same level for an extended period of time. In some implementations, this period of time is two days. In other implementations, the criteria for a player being stuck is related to the amount of times they have tried and failed a level.

Figure 127:
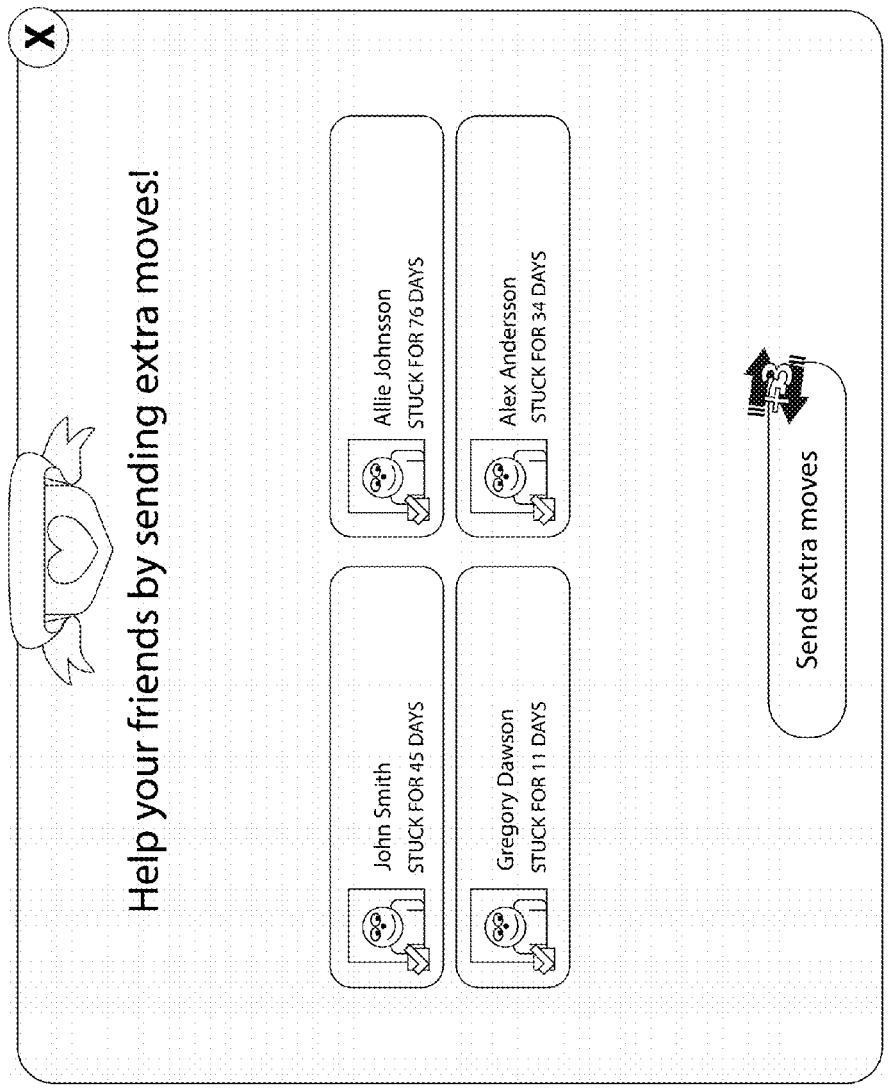
FIG. 127—The game prompting the player to help friends that have been stuck for an extended period of time FIG. 128 displays an exemplary view of an embodiment of a thumbnail version of an unlocked level.

The prompting from the game can happen at different points in the game, for instance when a player logs onto the game. Such prompting is illustrated in FIG. 127. The prompting increases engagement by increasing the likelihood of someone providing help to players when the game is particularly difficult, and also adds a sense of collaboration and community among players. When a player has received extra moves, it can be indicated by a symbol next to the level in which the moves can be used.

In some implementations, the player can receive help from multiple friends. Help from multiple friends can be used at the same time or distributed over multiple occasions. When a player completes a level after receiving help from a friend, a 'thank you'-message can be sent to that friend. This message can have different implementations, such as the ones described in the passage above about a thank-you message related to sending lives.

Head to Head Tournaments

The game can also be implemented to be played in a tournament mode with a limited time or limited number of moves or both over a consecutive set of levels. The score can be collected over the several levels to give the player a score for all the levels completed. The tournament mode can in some implementations be played with a virtual map, in other implementations the game has a special interface for head to head competition. One such implementation can be a split-screen mode where each player can see what the other player does in real-time.

The player can in some implementations play the game in head to head tournaments against one or several other players. The player with the highest collective score over the number of levels will be the winner in the tournament. In some implementations the tournaments are played with real time comparisons of players' scores, in other implementations the scores of players are compared after finishing a level.

The game can also be played in tournaments with jackpots where the player plays the same level where the same types of game elements are used. Jackpots can be absolute or they can be given as a multiplier of a stake that the player can input.

The game can also be played in an elimination competition against other players.

Rewards and Bonuses

The game can have schemes for giving rewards and bonuses to players. One reason for giving out rewards is to increase player engagement, and to some extent to help with monetisation. Players can for instance be rewarded for playing. Criteria can include playing for multiple days in a row, playing a certain amount of games within a certain time frame, playing a certain amount of games per day, achieving a certain score per day, etc. This is something that awards persistence and dedication. In other implementations, there is a daily bonus available that is gained by every player playing the game online during that day, or to players passing a certain secret location during that day.

Figure 55:
FIG. 55 shows an exemplary implementation.
Figure 56:
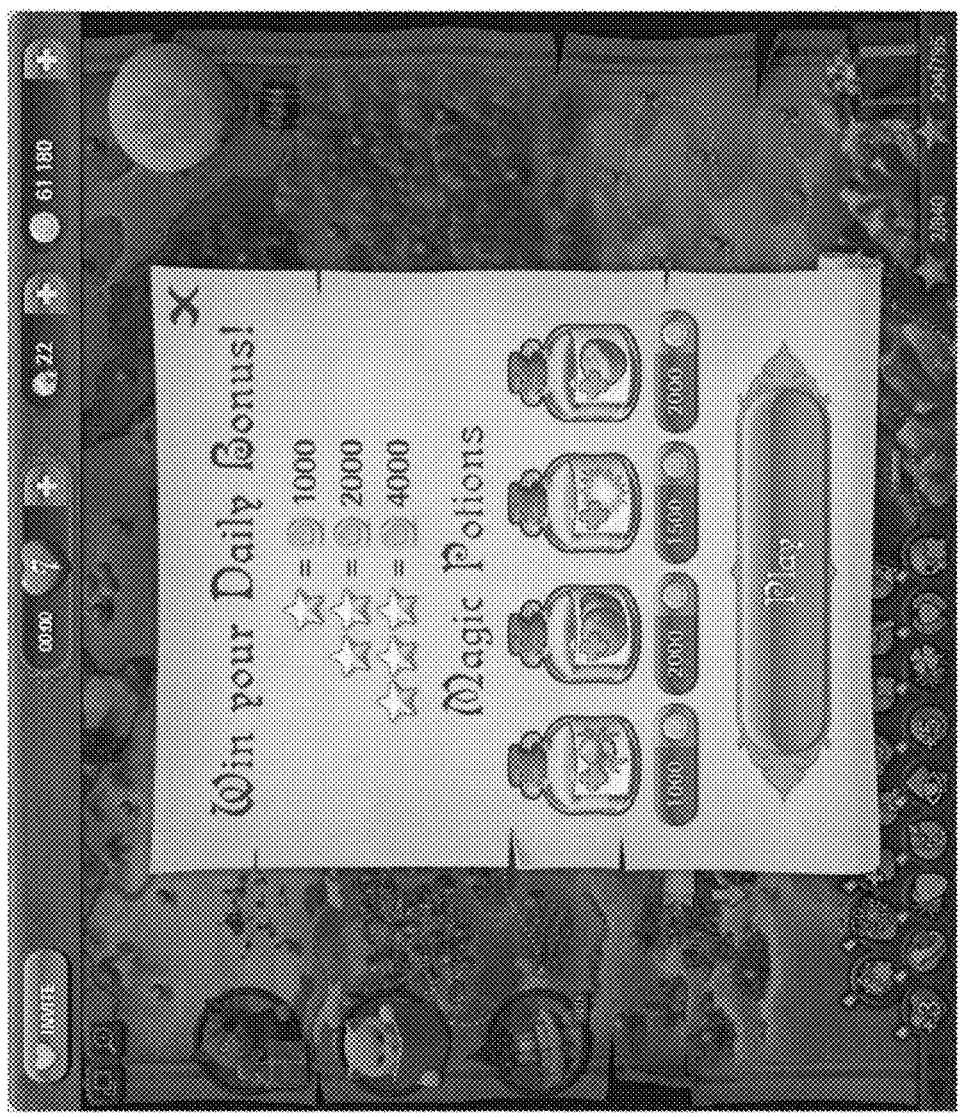
FIG. 56 shows an exemplary implementation.

FIG. 55 displays one implementation where a daily level can be found by clicking the hot air balloon in the upper right corner. Playing and completing daily levels unlocks bonuses. FIG. 56 displays the bonuses available in one implementation where the number of stars earned on the level decides what the bonus will be; in this example the bonuses are different amounts of in-game currency. The figure also shows that boosters can be selected before playing the daily bonus level, just as when playing a standard level.

By giving players samples of existing boosters, they are given a free preview of purchasable items that potentially can lead to sales in the long run, which helps monetise the game. Some implementations contain boosters that regenerate over time, for example a booster that can be used once every two days.

Purchasing and in-Game Shop

It is possible for players to make purchases in the game or through a social network connected to the game. One way of making such purchases is through the in-game shop. The shop is accessible for instance through the virtual map screen, but depending on the implementation it can be available from any screen in the game. From the shop it is possible to buy permanent as well as non-permanent boosters. These boosters can be used to gain benefits in the game, or they can be sent to friends as gifts.

The player does not always have to enter the shop in order to purchase boosters. The pre-level screen is one example of where the player is presented with the option to buy boosters without first entering the shop. A person skilled in the art will understand that this is just one example, it is possible to have purchasing options available from any screen in the game. The purchases can be made through a game platform or through a social network to which the game is connected.

In one implementation, the game platform communicates with the social network platform to indicate that a player is interested in buying an item in the game. The player is then directed to a purchasing window associated with the social network to which the game is connected. This window can be within the social network interface or it can be related to a third party service that provides payment options. In the purchasing window the player can choose to pay with a currency associated with the social network, or with a corresponding amount of hard currency if the player does not have any stored currency associated with the social network.

In some implementations, the player is given the option to purchase certain boosters when failing a level. Specific boosters that are particularly effective on a certain level can be suggested. This is done to increase monetisation and help players overcome difficult levels.

It is also possible to have offers directed at specific groups of players, such as the ones who have not previously purchased anything. In some implementations, players who have not purchased anything will get an initial offer that is discounted from the standard price, in order to incentivise them to start making purchases in-game.

The currency used for purchases can be hard currency, soft currency or it can be based on in-game score. The currency can be associated with a social network to which the game is connected.

Cross-Device and Cross-Game Functionalities

Some implementations of the game allows for the game state and for instance results of past levels and score to be synchronised between different devices or platforms. The synchronisation can happen while playing the game, if the player is connected, or it can be synced at certain times when the player chooses to connect to the game server. It is also possible for the player to play the game entirely in offline mode, but in that case there won't be real-time data available that relates to for instance the performance of other players. In a typical implementation, synchronisation of game progression between platforms can only happen when the player is connected to the game server.

The game can for instance be played in an offline mode on a handheld device using locally stored information on the handheld device. The device can store all or some of the levels that are available for the player to play in the game. Some of the features in the game can be locally run on the device and dependent on the local machine. Other features, such as data related to other players, will not be available in real time when playing offline, but rather gathered a certain points in time. One example of a locally run feature can for instance be that if the game is implemented to regenerate lives after a certain period of time, then the time can be locally decided based on the clock on the device. In some implementations, the central game server clock can override the local clock when the local device is or has been synchronised with the server.

A game can be implemented so that the player knows if it has synchronised the available data with the central server or servers. This can for instance be through a coloured symbol or a check mark that indicates that the information is up to date. The servers with which the game can synchronise include but are not limited to; a server running the game, servers hosting a social network to which the game is connected and a server hosting other games the player is active on.

The game can also indicate if it has been able to establish a connection with the central server for synchronisation or if for instance the network connection is down. That the device is offline can for instance be illustrated with a greyed out icon.

In some implementations, players can be rewarded for playing the game on multiple platforms. For instance, players that active on a computer-based platform could get a bonus for also installing the game on a handheld device. Such bonus may for instance be in the form of in-game currency, a booster to be used in the game or other in-game valuable object.

Players can also be rewarded for playing multiple games that are related, for instance games from the same developer. When choosing to play a new game, the player can receive bonuses in another game. This can be triggered by using a link from one game to the other, or by games sharing information between one other so that it automatically detects a player that is playing more than one game and subsequently rewards them. One way of rewarding players that play multiple games and/or play games on multiple platforms can be to give access to certain missions that are only available after fulfilling certain such criteria.

It is also possible that games may have elements in common that enables certain objects, for instance boosters, to be usable in multiple games. These games can be located on the same or on different servers. In some implementations, a booster bought in one game can be used in another game that shares certain features with it.

One example of an implementation with synchronisation across platforms is as follows: A first server, for instance one hosting a social network, with a first data store storing data relating to the state of a game. The first server is configured to communicate with a first plurality of devices, such as mobile phones or personal computers, through a first application programming interface, where the first plurality of devices is related to a first computing platform.

A second server, for instance one hosting a game platform, with a second data store storing data relating to the state of the game. The second server is configured to communicate with a second plurality of devices, such as mobile phones or personal computers, through a second application programming interface, where the second plurality of devices is related to a second computing platform.

A third server with a third data store, configured to communicate with the first and the second server. The three servers are configured to synchronise the three data stores in such a way that when synchronized, the first, second and third data store all relate to a synchronised game state.

Localisation and Updates

It is possible for implementations of the game to vary depending on the location of the player. For instance, the language can be adapted and translated into different languages. It can also be so that updates of the game are incorporated at different times in different locations, in order to not interfere with for instance the times of the day that players are as most active.

If trying to access the game online, as opposed to starting a local version that is saved on the device, while updates are being made, the player can be met by a message saying that the game cannot be accessed right at that moment.

An Alternative Platform to Play the Game

The game can also be implemented to be played with a limited time or limited number of moves or both over a consecutive set of levels. The score can be collected over the several levels to give the player a score for all the levels completed.

The player can in some implementations play the game in head to head tournaments against one or several other players. The player with the highest collective score over the number of levels will be the winner in the tournament.

The game can also be played in tournaments with jackpots where the player plays the same level where the same types of game elements are used.

The game can also be played in an elimination competition against other players.

Concepts

The following inventions are disclosed:

Note that all ideas and the subsidiary 'Other features' can each be combined with any other idea and 'Other feature'.

| High level idea | Detailed Idea |
| --- | --- |
| Pachinko pins in a social network based bubble shooter | A skill based bubble shooter type computer game played by a user, the game running within or reached from a social network application or environment accessed by a computing device, in which the computing device or a server to which the computing device is connected causes the computing device to display a number of virtual bubbles in a virtual scene and a virtual shooter that the user can control to shoot down the virtual bubbles, and the game provides for a number of virtual elements to be displayed on screen and positioned in the path of falling virtual bubbles, and if a falling virtual bubble hits one of the virtual elements, then the game automatically increases the user's score.<br>Other features:<br>Virtual elements are of different types or colours, each associated with different bonus scores.<br>One type of virtual element, if hit by a falling bubble, splits that bubble into two bubbles.<br>Virtual elements can be present on the screen when the game is started.<br>Virtual elements are removed from the screen if the user does not achieve a desired result with a shot [pop bubbles].<br>Additional virtual elements appear on the screen if the user achieves a desired result with a shot [pop bubbles].<br>The type of virtual element depends on the gameplay of the user [the more consecutive shots with bubbles popped leads to a virtual element with higher bonus scoring potential]<br>If the maximum number of virtual elements are shown and the user's gameplay would cause a new spider to appear if the maximum number was not displayed, then one of the existing virtual elements is upgraded.<br>Virtual elements are spaced apart a sufficient distance so that virtual bubbles can pass freely between them.<br>Virtual elements do not have to be static on the screen.<br>Move up and down<br>Move sideways<br>Follow the aim of the shooter<br>Follow the bubble(s) |
| Scoring containers in a social network based bubble shooter | A skill based bubble shooter type computer game played by a user, the game running within or reached from a social network application or environment accessed by a computing device, in which the computing device or a server to which the computing device is connected causes the computing device to display (a) a number of virtual bubbles in a virtual scene and (b) a virtual shooter that the user can control to shoot down the virtual bubbles and (c) one or more virtual containers into which a falling virtual bubble may drop to earn points or scores.<br>Other features:<br>Three or more containers, each associated with a different score. |
| Bubble rain in a social network based bubble shooter | A skill based bubble shooter type computer game played by a user, the game running within or reached from a social network application or environment accessed by a computing device, in which the computing device or a server to which the computing device is connected causes the computing device to display (a) a number of virtual bubbles in a virtual scene arranged below a virtual ceiling and (b) a virtual shooter that the user can control to shoot down the virtual bubbles and where, if there are fewer than X virtual balloons remaining immediately adjacent to the virtual ceiling, then all of those remaining virtual balloons fall from the ceiling.<br>Other features:<br>Bonus bubbles cascade up and out from the mouth of the shooter once you've triggered the bubble rain; the number of these bonus bubbles depends on how many shots remain unused. [all bubbles or can be capped] |
| Collaboration block: at the start of some levels, you need to either (a) ask your friends for help and if enough friends 'help you' then you can continue or (b) pay to continue | A skill based computer game played by a user, the game running within or reached from a social network application or environment accessed by a computing device, in which the computing device or a server to which the computing device is connected causes the computing device to display a virtual terrain, including a path corresponding to a progression of the user through the skill levels in the game, and the computing device or server is programmed, when the user has completed a predefined level, to give the user the option, in order to progress to a higher level, to send a message to one or more friends of the user, those friends being listed as friends of the user in a database running on a remote server hosting the social network application or environment, and one or more of those friends sending a reply message via the remote server agreeing to provide help. |
| Collaboration block follows immediately after the tutorial stages | A skill based computer game played by a user, the game running within or reached from a social network application or environment accessed by a computing device, in which the computing device or a server to which the computing device is connected causes the computing device to display a virtual terrain, including a path corresponding to a progression of the user through the skill levels in the game, and the computing device or server is programmed, when the user has completed a predefined level, to give the user the option, in order to progress to a higher level, to select a function or option displayed on the computing device that sends a signal that is interpreted by a remote server as an instruction to debit an account of the user with a sum of money. |

| High level idea | Detailed Idea |
|---|---|
| | Other features:<br>The predefined level follows the tutorial levels of the game, in which the user learns and practices the basic skills of the game<br>Sending the request for help to a friend on the social network.<br>Sending the request for help to a person not signed up on the social network. |
| Charms/boosters/ potions, but deployed in the social network saga or linear progression context | A skill based computer game played by a user, the game running within or reached from a social network application or environment accessed by a computing device, in which the computing device or a server to which the computing device is connected causes the computing device to display a virtual terrain, including a path corresponding to a progression of the user through the skill levels in the game, and the computing device or server is programmed, to display icons representing functions that assist or enhance game play and if the user selects an icon, that sends a signal that (a) is interpreted by a remote server as an instruction to debit an account of the user with a sum of money and (b) is interpreted (optionally by a remote server) as an instruction to provide the user, with the function that assists or enhances game play.<br>Other features:<br>The charms/potions/whishes include the following:<br>Charm of Life<br>Charm of Foresight<br>Charm of Shielded<br>Charm of Precision<br>Charm of Scrolling<br>Charm of Plenty<br>Charm of Fortune Spiders<br>Charm of Antidote<br>Charm of Webbing<br>Charm of Immortality<br>Charm of Disarm<br>Charm of Salvation<br>Charm of Wealth<br>Charm of Shattering<br>Charm of Delay<br>Charm of Magic<br>Charm of Insurance<br>Start level with extra virtual elements [spiders]<br>Extra bubbles<br>Extra holes in the ceiling at start<br>Increase the cap for maximum lives<br>The functions that assist or enhance game play can be permanent, to be used for a limited time, on one level only or a specified number of times.<br>The functions that assist or enhance game play can available to the user from the start of the game, unlocked based on the progress of the user [number of levels/total score/number of total stars] or bought. |
| Death bubble and other special function bubbles, like infected bubbles | A skill based bubble shooter type computer game played by a user, the game running within or reached from a social network application or environment accessed by a computing device, in which the computing device or a server to which the computing device is connected causes the computing device to display a number of virtual bubbles in a virtual scene and a virtual shooter that the user can control to shoot down [or pop] the virtual bubbles, and in which the game is adapted to generate and display special categories of virtual bubbles that do not behave in the same way as ordinary bubbles and the user has to play with greater skill in relation to those special virtual bubbles.<br>Other features:<br>More on the different types of special category bubbles<br>Black bubbles<br>Spider Bubbles<br>Doom Skull Bubbles<br>Infected bubbles<br>Bomb Bubbles<br>Crystal Bubbles<br>Morph Bubbles<br>Locked Bubbles<br>Mystery Bubbles<br>Shadow Bubbles<br>Rainbow bubble<br>and whether you can buy charms to counter-act them. |
| Providing the user with a set number of bubbles, showing how many bubbles the user has left, but not using a timer | A skill based bubble shooter type computer game played by a user, the game running within or reached from a social network application or environment accessed by a computing device, in which the computing device or a server to which the computing device is connected causes the computing device to display a number of virtual bubbles in a virtual scene and a virtual shooter that the user can control to shoot down the virtual bubbles, and the game provides for each level a fixed number of bubble to |

| High level idea | Detailed Idea |
| --- | --- |
| | shoot out from the shooter, irrespective of the time taken by the user to shoot out those bubbles from the shooter.<br>Other features:<br>Indication that the number of bubbles are close to zero [the color is changed at 10 bubbles left]<br>Provide the option to buy more bubbles<br>Continuously providing the option to buy additional bubbles<br>Bubbles of specific color<br>Bubbles with specific features significant for the game<br>The virtual shooter that the user can control to shoot down the virtual bubbles displays a [trace/aim] in the color of the bubble to be shot. |
| Real time collaboration | Seeing in real time what levels the other players are playing (the avatar is presented on the map where the user is currently playing)<br>Other users can connect and play head to head<br>Other users can play the same level as the other player - either in real time or time shifted, if time shifted then with some indication of how far the other player had come at a certain stage in the game (could be time, or bubbles popped or score at certain levels).<br>The players can collaborate in real time, sending bubbles or other in-game elements, messages etc. |
| Head to head tournaments | The social platform where the option also is to play head to head or tournaments with "non-friends"<br>Playing against non-friends to win in-game rewards (charms, points, etc.) |
| Playing on a handheld device | Touch screen interface and controlling the BWS with one finger.<br>Touch screen interface for the map interface<br>Having the map interface on a handheld device<br>Using the map interface offline on a handheld device (need to conform with the previous filing) - this could be to see other players and also to send messages or stuff to the other players. |
| Comparing your score to your friends' scores | A skill based computer game played by a user, the game linked to a social network application or environment accessed by the user with a computing device, in which the computing device or a server to which the computing device is connected, causes the user's score or level in the game to be displayed on the computing device, together with the score or level of other users that are designated as friends of that user on the social network application or environment.<br>Other features:<br>The game is running within, reached from, connected to or integrated with the social network or social network platform.<br>[The user's and the user's friends'] score or level is displayed before starting a new level in the game<br>The score needed to complete the level is displayed before starting a new level in the game<br>Score or level is displayed when a level in the game has been completed.<br>Remote server tracks networks of friends and distributes their scores or levels in a given game to each of the computing devices to which those friends are logged on as users.<br>Game is a bubble shooter type of game<br>Game is a switcher type of game<br>The computing device or a server to which the computing device is connected causes the computing device to display a virtual terrain, including a path corresponding to a progression of the user through the skill levels in the game, and the computing device or server is programmed to track the score or skill shown by the user in completing a level<br>A virtual representation of the user is moved along the path as the levels are completed.<br>A virtual representation of the friends' locations [completed levels/scores/etc.] on the virtual terrain.<br>A virtual representation of the progression of non-friends on the virtual terrain. |

Concepts in Relation to an Implementation with Bombs

Any of the ideas above and below may be combined.

A computer-implemented method for playing a game comprising:

a plurality of game elements placed on a game board;
said game elements being from a plurality of different types;
receiving input from a user of the game to launch an additional game element in to the game board, said new game element being of the same type as one of the plurality of game elements that are already placed on the game board;
the launched new game element moves on the game board until reaching a position adjacent to at least one other already existing game element;
upon a match of at least 3 adjacent game elements from the game element type those matched game elements are released from the other game elements on the game board;
receiving additional input from the user to convert one of the game elements on the game board in to a game element that when triggered can remove game elements in a shape around that game element;
connecting a plurality of such converted game elements so that upon activation of one game elements the other game elements are also activated.

The matched game elements disappear.

The matched game elements are released and can be received by receptacles on the game board.

The shape that the converted game element can remove is a circle around the game element.

The shape that the converted game element can remove is also all game elements of the same type adjacent to the initially removed game elements.

A special game element that can pass through other game elements that are not of the same type.

Another special game element that can pass through certain game elements and replace existing game elements with bomb game elements.

Idea from Navigator

Having a tool for helping players to easily navigate and jump between areas on a map with as little effort as possible. One implementation is to have an expandable mini map which the player can scroll or click on to jump to desired location, or press a button which instantly takes the player to the furthest reached location on the map.

Having a tool that helps players getting an overview of a map either by the help of a special designed mini map or with a zoom in/out function.

Concepts for Mystery Quests

A skill based computer game played by a user, the game running within or reached from a social network application or environment accessed by a computing device, in which the computing device or a server to which the computing device is connected causes the computing device to display a virtual terrain, including a path corresponding to a progression of the user through the skill levels in the game, and the computing device or server is programmed, when the user has completed a predefined level, to give the user the option, in order to progress to a higher level, to send a message to one or more friends of the user, those friends being listed as friends of the user in a database running on a remote server hosting the social network application or environment, and one or more of those friends sending a reply message via the remote server agreeing to provide help.

A skill based computer game played by a user, the game running within or reached from a social network application or environment accessed by a computing device, in which the computing device or a server to which the computing device is connected causes the computing device to display a virtual terrain, including a path corresponding to a progression of the user through the skill levels in the game, and the computing device or server is programmed, when the user has completed a predefined level, to give the user the option, in order to progress to a higher level, to select a function or option displayed on the computing device that sends a signal that is interpreted by a remote server as an instruction to debit an account of the user with a sum of money.

Other features that can be combined with each other and/or with the ideas above:

The predefined level follows the tutorial levels of the game, in which the user learns and practices the basic skills of the game Sending the request for help to a friend on the social network.

Sending the request for help to a person not signed up on the social network.

Instead of sending a message to a friend to unlock the next stage, completing one or several challenges.

The challenges can be to complete a number of levels.

The challenges can be limited in time so that the player can only do one challenge within a set time, for instance 24 h.

The invention claimed is:

1. A computer implemented method, performed on a computing device, for displaying computer game graphics on a display, comprising:

controlling, with a processor, the display to display, for a level of said game, a game area having a plurality of game objects, said game level having at least one of a predefined time limit and a predefined move limit;

determining, with a processor, whether at least one of the predefined time limit and predefined move limit have been reached;

controlling, with a processor, said display to display a message if it is determined at least one of the predefined time limit and predefined move limit have been reached and start a timer when said message is displayed;

receiving, with a processor, user input associated with said message;

in response to said received user input, at least one of:
(a) enabling gameplay to continue by extending at least one of said predefined time limit and predefined move limit and (b) causing said message to stop being displayed; and determining, with a processor configured to calculate elapsed time of said timer, if said message has been displayed for a predefined period of time without user input associated with said message and in response thereto stopping, with a processor, said message being displayed.

2. The method of claim 1, wherein said one or more processors are further programmed to: generate the message and control the display to display the message when the player has moves left.

3. The method of claim 1 further comprising, in response to said user input associated with said message, sending a signal to a remote server, said signal comprising an instruction to debit an account of the player with a sum of money and an instruction to extend said predefined limit so as to enable a player of game to carry on playing the game.

4. The method of claim 1 in which the processor controls the display to show a gameboard with multiple game elements that are removed when matched or switched by a player.

5. The method of claim 1 in which the game elements are one or more of: candies, bubbles, flowers, animals, fruits, vegetables, toys.

6. The method of claim 1 in which the processor controls the display to show a current game level position and highest scores for each completed level, for both the player and also some of its friends on a social network application or environment.

7. The method of claim 1 in which the processor controls the display to show which of a player's friends on a social network are currently playing the game and the level at which they are playing.

8. The method of claim 7 in which a player can collaborate with friends in the social network.

9. The method of claim 1 further comprising making in-app purchases using real or virtual currency in response to user input associated with an icon of a purchase shown next to a gameplay board shown on the display.

10. The method of claim 1 in which functions and features relating to sharing players' game state information, including levels and achievements, on a virtual path or other virtual world with that player's social network friends is continuously or regularly optimized for engagement and monetization by monitoring and analyzing player behavior and interaction.

11. The method of claim 1 in which a single user database tracks metrics for players, said metrics including game state information, and the single user database is accessible by several different games.

12. The method of claim 1 in which every change in the game state, and every consequential change in every game piece on the game board, is accompanied by sound and/or visual feedback to provide immediate, positive gratification to the player.

13. The method of claim 1 in which a player's score and game level position and the scores and game level positions of social network friends of said player also playing the game, are fully sync'd across different platforms and there are sections of the game that must be unlocked through either help from those friends or through a purchase.

14. The method of claim 1 further comprising transmitting gifts, boosters, extra moves, in-game currency, or extra lives to a further player of the game.

15. The method of claim 1, in which the processor controls the display to:
    show a game level position of a player and game level positions of one or more social network contacts of said player on a virtual path or other virtual world; and
    show a visual prompt if a score of said player exceeds that of one of said social network contacts, the prompt enabling the player to send a message to said one or said social network contacts.

16. The method of claim 1, in which the processor controls the display to show a game level position of a player and game level positions of one or more social network contacts of said player on a virtual path or other virtual world, wherein the player can play the game in offline mode on one platform and device and the progress in the game and other game state information is synchronised with a remote server when the device is online again and the player can continue playing the game on another platform.

17. The method of claim 1, in which the processor controls the display to show a game level position of a player and game level positions of one or more social network contacts of said player on a virtual path or other virtual world, wherein the game enables the player to buy a permanent booster which can be used without limit in time.

18. The method of claim 1 in which the processor controls the display to show a game level position of a player and game level positions of one or more social network contacts of said player on a virtual path or other virtual world, in which successive levels have different difficulty rankings.

19. The method of claim 1 further comprising transmitting a message to a player of a further device prompting the player of the further device to assist a player of the computing device once the player of the further device has played, but not completed, a level, for more than a predefined time or predefined number of attempts.

20. The method of claim 1 in which the processor controls the display to show:
    a game level position of a player and game level positions of one or more social network contacts of said player on a virtual path or other virtual world; and
    a prompt to notify a social network contact when the social network contact's high score on a specific level has been beaten by that player.

21. The method of claim 1 in which the processor controls the display to show a game level position of a player and game level positions of one or more social network contacts of said player on a virtual path or other virtual world, in which the game state information is fully sync'd across different platforms, and, in which the gameplay for each level can be enhanced through the use of an acquired item.

22. The method of claim 1 in which the processor controls the display to show a game level position of a player and game level positions of one or more social network contacts of said player on a virtual path in which the game state information is fully sync'd across different platforms, and, in which the gameplay for each level can be enhanced through the use of an acquired item, and where the game state information relating to the acquisition or use of an acquired item is synchronized across several different platforms.

23. The method of claim 1 in which the processor controls the display to show:
    a game level position of a player and game level positions of one or more social network contacts of said player on a virtual path or other virtual world; and
    a game board containing switchable elements that can be matched with other switchable elements and switchable elements that cannot be matched with other switchable elements on the game board,
    wherein one of the goals for completing a level is to interact with the game board in such a way that a predefined number of non-matchable switchable elements are placed in any of a plurality of predefined areas on the game board.

24. The method of claim 1 in which a player has to satisfy multiple criteria within a limited number of moves to complete the level; in which the criteria include at least two of the following:
    reaching a target score
    removing matchable game elements to clear a path for a non-matchable game element to reach a predefined area on a game board; and
    clear a predefined number of a certain type of game items layered on the game board having a matchable game element, together with each of the layered game items, where each layered game item can be removed by removing a matcheable game element in the same position as the layered game item.

25. The method of claim 1 in which a player can purchase on-line a booster to aid gameplay and that booster, once available for use on the player's current platform, can be used immediately and alternatively on any other platform used by the player, and in which game state information for that player, including information relating to use of the booster, is synchronised using a remote server across each of several different devices used by that player.

26. The method of claim 1 in which players can see their own and their social network friends' game level position on a virtual path (or other virtual world) with nodes representing levels in the game, and each node can reveal, in response to user input, a graphical preview representation of the gameboard for that level and, if the player has played that level before, a visual indication of how well the player succeeded on that level.

27. The method of claim 1 in which, after a player has failed to meet one or more level completion criteria, the processor controls the display to show a message articulating why the level completion criteria was not met, and offering as the only option to replay a level.

28. The method of claim 1 in which, after a player has achieved one or more level completion criteria, the processor controls the display to show a message articulating that the level was successfully completed, and offering as the only option to share information to a social network.

29. The method of claim 1 in which some or all game levels have no time limit.

30. The method of claim 1 in which the game is a casual, social game and some or all levels of said game may be failed.

31. The method of claim 1 further comprising playing a continuous musical soundtrack during gameplay.

32. The method of claim 1 in which the processor controls the display to show congratulatory messages when the player scores more than a predefined amount, or matches more than a predefined number of game elements, in a single move.

33. The method of claim 1 in which the processor detects when there are no possible moves left.

34. The method of claim 1 in which the processor controls the display to show game elements of a gameboard, reshuffled on the gameboard.

35. The method of claim 1 in which a processor controls the display to show, if no move has been made for a predefined time period, help or hints by brightening and enlarging game elements used in a possible move on the board with a flashing animation.

36. The method of claim 1 in which a processor is programmed to require a player to reach a target score before running out of moves in order to complete a level successfully, wherein the level has no time limited.

37. The method of claim 1 in which a processor is programmed to automatically replenish a life for a player in response to the expiry of a predefined time period.

38. The method of claim 1 in which a processor is programmed so that, if a player finishes a level of the game in under the predefined number of moves, then one or more game elements of a plurality of game elements shown on the game board are randomly selected and removed, and the player receives bonus points.

39. The method of claim 1 in which a processor is programmed to control the display to show, if a level is finished with remaining moves, those remaining moves being converted to game elements that trigger for extra bonus points.

40. The method of claim 1 in which a processor is programmed to control the display to display congratulatory messages when a player scores more than a predefined amount, or matches more than a predefined number of game elements, in a single move.

41. The method of claim 1 in which a processor is programmed to control the computer device to transmit a message comprising a request for lives to a social network contact of a player of the computer device.

42. The method of claim 1 in which a processor is programmed to control the computer device to transmit a message comprising a request for help to a social network contact of a player of the computer device.

43. The method of claim 1 further comprising transmitting a message to a player of a further device, said messaging comprising a prompt to assist a player of said computer device if that said player of said computer device has played, but not completed, a level meeting a certain criteria.

44. The method of claim 1 to control the computer device to transmit a message comprising an in game item to a social network contact of a player of the computer device.

45. The method of claim 1 in which a processor is programmed so that the game can be synchronized between different devices.

46. The method of claim 1 in which a processor is programmed so that a player can seamlessly stop and re-start playing the game at any time since game state information is stored remotely and/or on the playing device.

47. The method of claim 1 in which changes in game state, and every consequential change in every game piece on the game board, is accompanied by sound and visual feedback.

48. The method of claim 1 in which game state information is preserved, enabling a remote server system to identify a player and all aspects of the state of the game they are playing, so that the player can end game play on one device and resume from a different device at a later time at exactly the same state.

49. The method of claim 1 in which the different device can be a different type of device, so that the player can move seamlessly between playing the game on a smartphone and on a tablet.

50. The method of claim 1 in which a remote server system can identify a player because that player has accessed the game through a social network.

51. The method of claim 1 in which the game is a casual, social game, wherein said game can be downloaded as an app to a smartphone and/or tablet computer and which can be accessed or played using a social network application or environment.

52. The method of claim 1 in which the processor is programmed to control the display to show a virtual path or other virtual world that indicates the level reached by a player of and one or more of said player's social network friends.

53. The method of claim 1 in which the design of the game is optimised through a process including the step of: using data analytics to understand the impact of changes to the game design in terms of player engagement and/or monetisation and/or viralisation and; implementing changes to the game design.

54. The method of claim 1, further comprising, in response to user input associated with said message:
    causing said message to stop being displayed without enabling gameplay to continue by extending at least one of said predefined limit; and
    ending the level of the game.

55. The method of claim 1, further comprising, in response to a determination that said message has been displayed for said predefined period of time without user input associated with said message, ending the level of the game.

56. A computing device adapted to play a computer game, the device including one or more processors, a memory, a display configured to display computer game graphics for a game, a timer, and computer code stored in said memory or on a remote server and executable by the device processor and in which said one or more processors execute said computer code to perform the steps of:
    controlling the display to display, for a level of said game, a game area having a plurality of game objects on said display, said game level having at least one of a time limitation and a move limitation;
    determining whether at least one of time and moves have reached a predefined limit;
    if it is determined that at least one of said time and said moves has reached said predefined limit, controlling said display to show a message;
    in response to user input associated with said message at least one of:
        enabling gameplay to continue by extending at least one of said predefined limit; and
        causing said message to stop being displayed; and
    using the timer to determine if said message has been displayed for a predefined period of time without user input associated with said message and in response thereto stopping said message being displayed.

57. A non-transitory computer readable medium encoded with instructions stored thereon for controlling a computing device comprising one or more processors, a timer, and a display, said display configured to display computer game graphics for a game, such that when the instructions are executed on the one or more processors, the one or more processors are configured to:

control the display to display, for a level of said game, a game area having a plurality of game objects, said game level having at least one of a predefined time limit and a predefined move limit;

determine whether at least one of the predefined time limit and predefined move limit have been reached;

control said display to display a message if it is determined at least one of the predefined time limit and predefined move limit have been reached and start a timer when said message is displayed;

receive user input associated with said message;

in response to said user input associated with said message at least one of:
  (a) enable gameplay to continue by extending at least one of said predefined limit and predefined move limit; and
  (b) cause said message to stop being displayed; and determine if said message has been displayed for a predefined period of time without user input associated with said message and in response thereto, stop said message being displayed.

\* \* \* \* \*